(12) United States Patent
Burke

(10) Patent No.: US 10,650,359 B2
(45) Date of Patent: May 12, 2020

(54) ENERGY DISTRIBUTION AND MARKETING BACKOFFICE SYSTEM AND METHOD

(71) Applicant: Ambit Holdings, L.L.C., Dallas, TX (US)

(72) Inventor: John Burke, Dallas, TX (US)

(73) Assignee: BLUENET HOLDINGS, LLC, Dallas, TX (US)

(*) Notice: Subject to any disclaimer, the term of this patent is extended or adjusted under 35 U.S.C. 154(b) by 566 days.

(21) Appl. No.: 13/892,706

(22) Filed: May 13, 2013

(65) Prior Publication Data

US 2013/0246257 A1  Sep. 19, 2013

Related U.S. Application Data

(63) Continuation-in-part of application No. 11/899,197, filed on Sep. 4, 2007, now Pat. No. 8,442,917.

(51) Int. Cl.
G06Q 20/10 (2012.01)
G06Q 50/06 (2012.01)

(52) U.S. Cl.
CPC ........... *G06Q 20/102* (2013.01); *G06Q 50/06* (2013.01)

(58) Field of Classification Search
CPC .............................. G06Q 20/102; G06Q 50/06
USPC ........................................................ 705/40
See application file for complete search history.

(56) References Cited

U.S. PATENT DOCUMENTS

| | | |
|---|---|---|
| 3,231,670 A | 1/1966 | Lane et al. |
| 4,509,128 A | 4/1985 | Coppola et al. |
| 5,943,656 A | 8/1999 | Crooks et al. |
| 6,018,726 A | 1/2000 | Tsumura |
| 6,088,688 A | 7/2000 | Crooks et al. |
| 6,240,167 B1 | 5/2001 | Michaels |
| 6,343,277 B1 * | 1/2002 | Gaus ................. G06Q 30/0283 235/378 |

(Continued)

FOREIGN PATENT DOCUMENTS

| | | |
|---|---|---|
| WO | 0150313 A1 | 7/2001 |
| WO | 0165823 A1 | 9/2001 |

(Continued)

OTHER PUBLICATIONS

ERCOT protocols Table of Contents—Sep. 1, 2007, 847 pages, published by ERCOT (Electric Reliability Council of Texas).*

(Continued)

*Primary Examiner* — James D Nigh

(74) *Attorney, Agent, or Firm* — Schultz & Associates, P.C.

(57) ABSTRACT

A retail energy provider system comprising a market transaction manager, business rules and requirements processor, usage rater, customer analysis and quality control auditor, customer billing processor and collection manager, customer payment processor, third party sales and marketing application programming interface, customer acquisition and residual income interface, having a wholesale forecaster, interactive voice response system, intranet web services, internet web services and network based external customer service and executive management systems and financial services functions, all said functions and systems interacting with a robust SQL database engine for which the novel database schema is taught herein.

6 Claims, 70 Drawing Sheets

(56) References Cited

U.S. PATENT DOCUMENTS

| | | | |
|---|---|---|---|
| 6,366,889 B1* | 4/2002 | Zaloom | G06Q 10/04 705/7.37 |
| 6,618,709 B1 | 9/2003 | Sneeringer | |
| 7,043,459 B2 | 5/2006 | Peevey et al. | |
| 7,117,172 B1 | 10/2006 | Black | |
| 7,149,707 B2 | 12/2006 | Scoble | |
| 7,233,843 B2 | 6/2007 | Budhraja et al. | |
| 2002/0120519 A1 | 8/2002 | Martin et al. | |
| 2003/0009401 A1 | 1/2003 | Ellis | |
| 2003/0046252 A1 | 3/2003 | Spool et al. | |
| 2003/0149603 A1 | 8/2003 | Ferguson | |
| 2003/0182187 A1 | 9/2003 | Scoble | |
| 2004/0093200 A1 | 5/2004 | Scott | |
| 2004/0133514 A1 | 7/2004 | Zielke et al. | |
| 2004/0143464 A1* | 7/2004 | Houle | G06Q 10/10 705/4 |
| 2004/0179672 A1 | 9/2004 | Pagel et al. | |
| 2005/0187888 A1 | 8/2005 | Sherman et al. | |
| 2005/0192897 A1 | 9/2005 | Rogers et al. | |
| 2006/0001414 A1 | 1/2006 | Angerame et al. | |
| 2006/0026017 A1 | 2/2006 | Walker | |
| 2006/0036501 A1 | 2/2006 | Shahbazi et al. | |
| 2006/0161450 A1 | 7/2006 | Carey et al. | |
| 2006/0173779 A1 | 8/2006 | Bennett et al. | |
| 2006/0206425 A1 | 9/2006 | Sharma | |
| 2006/0256951 A1 | 11/2006 | Rodenbusch et al. | |
| 2007/0112579 A1* | 5/2007 | Ratnakaran | G06Q 30/06 705/1.1 |
| 2007/0250384 A1 | 10/2007 | Geller et al. | |
| 2007/0260562 A1 | 11/2007 | Hutson et al. | |
| 2008/0091626 A1* | 4/2008 | Kremen | G06Q 40/00 705/412 |
| 2008/0319777 A1 | 12/2008 | Hoff | |
| 2009/0276289 A1 | 11/2009 | Dickenson | |
| 2009/0307074 A1 | 12/2009 | Sharma | |
| 2011/0264291 A1 | 10/2011 | Le Roux | |
| 2012/0095841 A1 | 4/2012 | Luckerman | |
| 2012/0136780 A1 | 5/2012 | El-Awady et al. | |
| 2014/0067461 A1 | 3/2014 | Zhang | |
| 2014/0200930 A1 | 7/2014 | Zizzamia | |

FOREIGN PATENT DOCUMENTS

| | | | |
|---|---|---|---|
| WO | 0177973 | A2 | 10/2001 |
| WO | 2006119185 | A2 | 11/2006 |

OTHER PUBLICATIONS

"Oracle Advanced Collections User Guide", Release 11, Part No. B19161-02, Oct. 2005, 148 pages, Oracle Corporation.

ERCOT Protocols—Sep. 1, 2007, published by the Electric Reliability Council of Texas, 848 pages.

ERCOT Protocols Retail Market Guide, Jun. 25, 2007, Electric Reliability Council of Texas, 187 pages.

Texas SET 814 25: Move Out Response dated Jun. 25, 2007.

Texas SET 814 26: Ad-Hoc Historical Usage Request dated Jun. 25, 2007.

Texas SET 814 27: Ad-Hoc Historical Usage Response dated Jun. 25, 2007.

Texas SET 814 28: Complete Unexecutable or Permit Required dated Jun. 25, 2007.

Texas SET 814 29: Response to Complete Unexecutable or Permit Required dated Jun. 25, 2007.

Texas SET 814 PC: Maintain Customer Information Request dated Jun. 25, 2007.

Texas SET 814 PD: Maintain Customer Information Response dated Jun. 25, 2007.

Texas SET 820 02: Remittance Advice dated Jun. 25, 2007.

Texas SET 820 03: Muni/ Co-op Remittance Advice dated Jun. 25, 2007.

Texas SET 824: Application Advice dated Jun. 25, 2007.

Texas SET 867 02: Historical Usage dated Jun. 25, 2007.

Texas SET 867 03: Monthly Usage dated Jun. 25, 2007.

Texas SET 867 04: Initial Meter Read Notification dated Jun. 25, 2007.

Texas SET 997: Functional Acknowledgement dated Jun. 25, 2007.

Texas SET Change Request Form: Change Control #2004-674 dated Dec. 8, 2004.

Texas SET Change Request Form: Change Control #2004-678 dated Dec. 3, 2004.

Texas SET Change Request Form: Change Control #2005-687 dated Mar. 9, 2005.

Texas SET Change Request Form: Change Control #2006-691 dated Jun. 6, 2006.

Texas SET 650 02: Service Order Complete, Complete Unexecutable, Reject Response or Notification of Permit Required.

Texas SET 650 04: Suspension of Delivery Service Notification or Cancellation.

Texas SET 810 02: TDSP to CR Invoice.

Texas SET 814 PC: Maintain Customer Information Request.

Texas SET 820 02: Remittance Advice.

Texas SET 867 03: Monthly Usage.

Texas SET Change Request Form: Change Control #2006-692 dated Jun. 7, 2006.

Texas SET 814 15: Affiliated Retail Electric Provider (AREP) Drop Enrollment Response.

Texas SET 814 19: Establish/Delete Continuous Service Agreement (CSA) Response.

Texas SET 814 25: Move Out Response.

Texas SET 814 27: Ad-Hoc Historical Usage Response.

Texas SET 814 28: Complete Unexecutable or Permit Required.

Texas SET Change Request Form: Change Control #2006-693 dated Jul. 3, 2006.

Texas SET Change Request Form: Change Control #2006-694 dated Jul. 10, 2006.

Texas SET Change Request Form: Change Control #2006-696 dated Jul. 17, 2006.

Texas SET Change Request Form: Change Control #2006-697 dated Jul. 17, 2007.

Texas SET Change Request Form: Change Control #2006-698 dated Jun. 19, 2006.

Texas SET Change Request Form: Change Control #2006-699 dated Jul. 3, 2006.

Texas SET Change Request Form: Change Control #2006-700 dated Aug. 23, 2006.

Texas SET Change Request Form: Change Control #2006-701 dated Aug. 22, 2006.

Texas SET Change Request Form: Change Control #2006-702 dated Aug. 23, 2006.

Texas SET Change Request Form: Change Control #2006-703 dated Aug. 24, 2006.

Texas SET Change Request Form: Change Control #2007-704 dated Jan. 31, 2007.

Texas SET Change Request Form: Change Control #2006-708 dated Jun. 5, 2007.

Texas SET Change Request Form: Change Control #2007-712 dated Jul. 9, 2007.

Texas SET 814 04: Switch CR Notification Response.

Texas SET 814 08: Cancel Switch Request.

Texas SET 814 14: Affiliated Retail Electric Provider (AREP) Drop Enrollment Request.

Texas SET Swimlanes Customer Switch Scenarios dated Apr. 12, 2005.

Texas SET Swimlanes Customer Move Out Scenarios dated Apr. 12, 2005.

Texas SET Swimlanes Billing Scenarios dated Feb. 13, 2007.

Texas SET Swimlanes Customer Move in Scenarios dated Apr. 12, 2005.

Texas SET Swimlanes CSA Scenarios dated Apr. 12, 2005.

Texas SET Swimlanes Provider of Last Resort Scenarios dated Apr. 12, 2005.

Texas SET Swimlanes Establish Maintain ESI Scenarios dated Apr. 20, 2005.

(56) References Cited

OTHER PUBLICATIONS

Texas SET Swimlanes AD Hoc Historical Usage Scenarios dated Apr. 12, 2005.
Texas SET Swimlanes H1 Maintain Customer Information dated Apr. 12, 2005.
Texas SET Swimlanes Service Order Scenarios dated Apr. 12, 2005.
Texas SET Swimlanes Billing Scenarios dated Apr. 12, 2005.
Texas SET 814 07: Drop Due to Switch Response dated Jun. 25, 2007.
Texas SET 814 08: Cancel Switch Request dated Jun. 25, 2007.
Texas SET 814 09: Cancel Switch Response dated Jun. 25, 2007.
Texas SET 814 10: Drop to AREP Request dated Jun. 25, 2007.
Texas SET 814 11: Drop Response dated Jun. 25, 2007.
Texas SET 814 12: Date Change Request dated Jun. 25, 2007.
Texas SET 814 13: Date Change Response dated Jun. 25, 2007.
Texas SET 814 14: Drop Enrollment Request dated Jun. 25, 2007.
Texas SET 814 15: Drop Enrollment Response dated Jun. 25, 2007.
Texas SET 814 16: Move in Request dated Jun. 25, 2007.
Texas SET 814 17: Move in Reject Response dated Jun. 25, 2007.
Texas SET 814 18: Establish/Delete Continuous Service Agreement (CSA) Request dated Jun. 25, 2007.
Texas SET 814 19: Establish/Delete Continuous Service Agreement (CSA) Response dated Jun. 25, 2007.
Texas SET 814 20: Create/Maintain/Retire ESI ID Request dated Jun. 25, 2007.
Texas Set 814 21: Create/Maintain/Retire ESI ID Response dated Jun. 25, 2007.
Texas SET 814 22: Continuous Service Agreement (CSA) CR Move in Request dated Jun. 25, 2007.
Texas SET 814 23: Continuous Service Agreement (CSA) CR Move in Response dated Jun. 25, 2007.
Texas SET 814 24: Move Out Request dated Jun. 25, 2007.

Business Intelligence: A Design Science Perspective, Salvatore T. March, David K Wilson Professor of Management, Owen Graduate School of Management, Vanderbilt University, Apr. 21, 2010, 93 pages.
Texas SET Swimlanes Notification of Suspension Scenarios dated Apr. 12, 2005.
Texas SET Swimlanes Unplanned Outage Scenarios dated Apr. 12, 2005.
Texas SET Swimlanes MIMO Cancellation Scenarios dated Apr. 12, 2005.
Texas SET Swimlanes MIMO Cancellation Scenarios dated Feb. 13, 2007.
Texas SET Swimlanes MIMO Concurrent Processing Scenarios dated Apr. 12, 2005.
Texas SET Swimlanes Move In dated Dec. 8, 2008.
Texas SET 650 01: Service Order Request dated Jun. 25, 2007.
Texas SET 650 02: Service Order Complete, Complete Unexecutable, Reject Response or Notification of Permit Required dated Jun. 25, 2007.
Texas SET 650 04: Suspension of Delivery Service Notification or Cancellation dated Jun. 25, 2007.
Texas SET 650 05: Suspension of Delivery Service Reject Response dated Jun. 25, 2007.
Texas SET 810 02: TDSP to CR Invoice dated Jun. 25, 2007.
Texas SET 810 03: Muni / Co-op Invoice dated Jun. 25, 2007.
Texas SET 814 01: Enrollment Request dated Jun. 25, 2007.
Texas SET 814 02: Enrollment Reject Response dated Jun. 25, 2007.
Texas SET 814 03: Switch CR Notification Request dated Jun. 25, 2007.
Texas SET 814 04: Switch CR Notification Response dated Jun. 25, 2007.
Texas SET 814 05: Premise Information and Enrollment Response dated Jun. 25, 2007.
Texas SET 814 06: Drop Due to Switch Request dated Jun. 25, 2007.

* cited by examiner

ENERGY DISTRIBUTION AND MARKETING BACKOFFICE SYSTEM AND METHOD

CROSS-REFERENCE TO RELATED APPLICATION

This application is a Continuation-in-Part of application Ser. No. 11/899,197 filed on Sep. 4, 2007. The patent application identified above is incorporated here by reference in its entirety to provide continuity of disclosure.

FIELD OF INVENTION

The present invention relates to the field of back office information technology systems for a retail electricity provider and is a computer system for automatically performing market transactions, customer billing and customer service functions.

BACKGROUND OF THE INVENTION

In the 1990s groups of utilities along with their federal and state regulators began forming independent system operators (ISOs) or regional transmission organizations (RTOs) as states and regions in the United States established wholesale competition for electricity. ISOs and RTOs (hereafter ISOs) coordinate generation and transmission of electric power across wide geographic regions, matching generation to load instantaneously to keep supply and demand for electricity in balance. These organizations forecast load and schedule generation to assure sufficient capacity and back-up power in case demand rises, a power-plant goes offline or a power line is lost. The primary role of the ISO is to ensure equal access to the power grid for non-utility firms, enhance the reliability of the transmission system and operate wholesale electricity markets which includes the flow of money between wholesale producers, marketers, transmission and distribution service providers (TDSP) owners, buyers including other ISOs.

TDSP entities are responsible for the transmission and distribution of energy through power lines that they are responsible to maintain and typically own. As service providers, they typically own the metering devices attached to residential and commercial customers, servicing the meters and reading them periodically.

A Public Utilities Commission (PUC) regulates the delivery of electricity including reliability and safety, rates and terms, setting the operating standards for the TDSPs. The PUC typically oversees the regional ISO market, for example by reviewing proposals for new transmission facilities or generators. The PUC enforces rules and regulations for retail competition, including customer protections, "price to beat" rules and the implementation of renewable energy goals. The PUC also handles the licensing and rules enforcement to REPs.

An example of an ISO is the Energy Reliability Council of Texas (ERCOT) which manages the Texas power grid, an example of a TDSP is TXU Energy Delivery; an example of a PUC is the Texas Public Utilities Commission.

The operation of a wholesale electricity market by the ISO enables local retail electricity providers (REPs) to buy and sell electricity on a real-time spot market basis supplying REPs with a means for meeting consumer needs for power at the lowest possible costs. An example of a REP is Ambit Energy, Inc. of Dallas, Tex. REPs have need for an accurate and continuous information exchange with ISOs including data such as market transactions and information related thereto, historical or current load information and customer specific transactions (e.g. connect or disconnect, meter readings, etc.). The state of the art in the energy industry to exchange information with ISOs is to utilize the electronic data interchange (EDI) standard.

REPs have certain requirements typically set by the relevant state public utilities commission to have adequate technical resources to provide continuous and reliable electric service to customers in its service area and for the technical and managerial ability to supply electric services at retail in accordance with its customer contracts. Such resources include a fundamental capability to comply with all scheduling, operating, planning, reliability, customer registration policies, settlement policies, and other rules and procedures as established by the ISO. The REP must have the ability to meet ISO requirements for 24 hour coordination with control centers for scheduling changes, reserve implementation, curtailment orders, interruption plan implementation and escalation procedures. The REP must meet certain financial standards relating to the protection of its customers and sufficient for accurate billing and collection from its customers.

An example of a set of requirements for REPs is the Texas state PUC document: P.U.C. SUBST. R.25, "Substantive Rules Applicable to Electric Service Providers", Chapter 25.

In general there is a significant amount of information that must be managed and serviced on a real-time basis (often minute to minute) by a REP to meet the requirements and to operate its systems effectively. For example, the costs of energy are generally fluctuating according to market prices and thereby rated in time intervals of 15 minutes and sold in blocks of time. The REP continuously purchases blocks of energy on the market to meet its demands, sometimes only 15 minutes in advance, but normally several days in advance or according to a forecasted buy order. To determine the costs of energy usage for its customer base a REP must be able to accurately correlate customer usage information with the rated cost of the energy as it was purchased in a given block for a given geographical area.

A need exists in the retail electric provider business community for a comprehensive automated system to manage market transactions with the ISO, apply business rules and requirements, apply ratings to usage, perform customer analysis and quality control audits, perform customer billing including customer protective measures in collection, process customer payments, manage 3rd party sales and marketing subsystems, manage customer acquisition and residual income systems and manage customer service systems including call centers and back-office support for financial and corporate executives.

FIG. 1 shows a representative situation of the prior art. A process for servicing energy customers 10 is indicated on a timeline 90. End customer 20 has their local meters read or serviced by the TDSP 30 which in turn submits the service information to ISO 40. ISOs sort the various service data coming in from a variety of TDSPs in a variety of geographical locations and sends the service information to the appropriate REP. In FIG. 1, ISO 40 sends service information from end customer 20 to REP 50 for processing. The service information arrives at REP 50 mainframe computer 60 in the form of an electronic data interexchange (EDI) formatted transaction. A set of transactions are the processed by a set of service operators 70. In addition to processing transactions, set of service operators 70 may also perform a set of manual system operations 80 including, for example, usage rating, customer billing, bill collections activities, connect and disconnect orders, and some sales functions.

Those of skill in the art will recognize that in the prior art REP 50 will require a large number of service operators 70 to keep the time from end customer requests to the processing of those requests to a minimum. In the prior art, the time lag of delivery of a meter read may be on the order of days or a week.

The system of the present invention was designed to address the following issues competitive REPs face (and others):

1. Market Exceptions
2. Cost of doing business
3. Cash flow exposure
4. Rapid responses to Market/Customer preference changes.

The primary issue that residential energy utilities face with their back-office systems is the large amount of market data exceptions that typically occur between the REP and the TDSP. Market exceptions include data integrity issues to operating issues that result in complex customer situations, such as errors in meter reads and service change requests. Together with a large customer base, these exceptions create a ripple effect across the back-office that typically results in errors with:

Billing
Service provisioning timing
Collections and Treatment processes

The present invention addresses the pervasive problems created by market exceptions though a novel system design that segments system responsibility, promotes system "learning" without introducing complexity, and supports large customer data sets. For example, system exceptions are categorized and managed through an exception flow. End users use interface heuristics to further define and resolve all exceptions, including through the addition of new system rules.

A further novel aspect of the present invention addresses the overall cost of doing business of a REP. The energy industry is a commodity driven market. Competitive advantages rely on service quality and accuracy in billing. The present invention creates a competitive position for the reseller by fundamentally reducing the cost to operate. This is achieved by:

1. Flow through transaction business rule processing that reduces exceptions typically handled by staff,
2. Automated Rating, quality control, and billing systems that reduces the need of staff,
3. System intelligence and analysis in "Treatment"—i.e., the handling of customers with past due balances in the best manner possible. Staff costs are reduced in operating treatment through systems. Additional staff costs are avoided by ensuring treatment works correctly, thus avoiding escalating customer issues which in turn consumes more staff resources to resolve.

A further novel aspect of the present invention addresses a common issue faced by a REP, namely, cash/capital requirements to support billing in arrears. Meter reads are performed by the TDSP and the read sent to the REP to bill in arrears. This results in the reseller having to "front" its customer's energy base as it attempts to collect from customers after purchasing the energy. The present invention addresses this though automated, real-time flow-through of meter read transactions that result in near-same day billing. This optimizes the cash collection process in order to reduce cash exposure.

A further novel aspect of the present invention addresses resistance in back-office IT systems of the REP, that prevent companies from implementing changes and improvements in system functions to meet customer/market demands. The modular design and solid relational data architecture prescribed in the preferred embodiment of the present invention, coupled with defined development standards, provide the REP with the ability to quickly and cost-effectively introduce system changes.

Yet another novel aspect of the present invention is the combination of features meant to automatically ensure the integrity of energy business data to meet PUC requirements, said combination comprising a market transaction manager, business rules and requirements processor, usage rater, customer analysis and quality control auditor, customer billing processor and collection manager, customer payment processor, third party sales and marketing subsystems API, customer acquisition and residual income web interface and customer service and executive backoffice systems, all said subsystems interacting with an intelligent SQL database subsystem. In a preferred embodiment of the present invention, said features are implemented as a coordinated set of software programs running under the framework of a Microsoft Windows™ Services platform utilizing Microsoft C#.net as the programming environment.

SUMMARY OF INVENTION

The present invention teaches an apparatus and method for a retail energy provider (REP) system that functions to automatically service market transactions and to control internal processes such as usage rating and account aging in such a way as to reduce human workload requirements over requirements typically found in the prior art. A novel set of transaction rules, usage rating rules and pre-bill quality control rules operate on market transactions to detect system exceptions by automatically performing quality control processes on internal and external data flow within and external to the REP system.

REP system comprises a set of internal entities which service a set of external entities in a real-time event-driven process. REP System interacts with external energy ISO partners to perform inbound and outbound energy market transactions. REP system interacts with a set of sales and marketing organizations via an application programming interface to perform sales functions such as order placement and residual income calculations.

REP System comprises a set of automated processes, the set of automated processes interacting with and exchanging data with a core SQL database engine which is a container for holding and organizing a set of customer data records and a set of persistent transaction records. The set of automated processes defined herein including a sales application programming interface connecting to an internet web service, an interactive voice and response system, an intranet web service, a payment processor, a business process function, and a wholesale forecaster with a corresponding data warehouse. In the preferred embodiment of the present invention, the connections between the set of automated processes and the SQL database engine are made by a corporate intranet consisting of internet protocol IP services over an Ethernet physical infrastructure which may include local area networks (LANs) and wide area networks (WANs) of suitable computers.

To service external entities, the present invention includes an internet web service which accepts customer input such as residential data or requests for information and sends it to an application programming interface (API) for processing, the API being defined in an API specification to allow a variety of external entities to simultaneously connect to and utilize REP system in a standardized way.

The business process function is a set of inter-related processes that perform continuous and real-time operations on the database and is comprised of a market transaction importer for automatically accepting market transactions in the form of EDI transactions and grouping them according to function; an inbound transaction processor (ITP) for applying a set of transaction business rules to the EDI transactions obtained by the market transaction importer; a usage rating processor for applying a set of rates to a set of usages and for completing a scaling process useful for wholesale forecasting; a pre-bill quality control (QC) processor for checking all billable usages for exceptions, a billing processor for computing, creating and automatically sending bills; an account aging processor for applying a set of aging rules to bin unpaid bills into past due time frames; a bill treatment processor for automatically controlling a treatment process incorporating PUC requirements; and a novel customer residual income processor for computing and controlling a customer residual income system.

In the preferred embodiment of the present invention, the REP system is implemented on a network of servers operating a Microsoft .NET services network by Microsoft Corporation. The business process functions are run continuously as event driven processes which are controlled and generated by a Microsoft .NET services application server.

The present invention requires a robust and novel relational database infrastructure to operate efficiently and with a high degree of data integrity which allows for rapid and large overall system scaling with numbers of customers. The preferred embodiment of the present invention herein teaches a novel relational database schema for a highly normalized relational database structure to support the REP system functions.

In particular, the database schema includes a set of entities wherein the entities are comprised of sets of data tables. The entities have relationships between them as shown the relationships allowing for relational sharing of data between tables within one entity and the tables within another entity. The entities in REP database schema are: ESI ID warehouse entity for holding data relating to specific ESI IDs, Wholesale entity for compiling data relating to forecast models and ESI ID usage profiles, Market Transactions entity for storing transactions sent/received to/from the ISO or TDSP, Orders entity for containing sales order information, Sales Consultants entity for containing records relating to the sales process, Customer entity for accumulating detailed customer information, Rating entity for compiling usage rating data, Products and Rates entity for holding the various products and rates for the ESI IDs, Discounts entity for describing customer discounts, Payments entity for keeping records related to customer payments, Bills entity for accumulating billing information for customers and commissions entity for containing sales commission information relating to commissions and residual income.

Data table relationships are defined within the REP database schema: Customer entity shares relational data with Rating entity, Wholesale entity, Orders entity, Sales consultants entity and Bills entity. Market transactions entity shares relational data with Orders entity, ESI ID Warehouse, Wholesale entity and Rating entity. Orders entity shares relational data with Sales consultants in addition to those relationships already described. Bills entity shares relational data with Rating entity, Payments entity, Commissions entity and Customer entity. Rating entity shares relational data with Products and Rates entity, Discounts entity and Bills entity.

REP Database schema includes queuing and logging entities for managing the operational aspects of the REP system, the queuing entities typically being accessed by the company operations staff, customer service staff, or IT operations staff within the REP. The queuing entities within data model being: Exceptions entity for logging transaction exceptions and other system exceptions, System Queues entity comprised of queuing tables relating to worklists and business operational functions such as a queue for printing bills, Security entity for holding system user data such as authorization data, System logs entity for containing tables of various system software logs, and Alerts entity for logging data records relating to critical system alerts.

Detailed discussions and instruction of the REP system function and the REP system database schema are explained according to the preferred embodiments described herein.

BRIEF DESCRIPTION OF DRAWINGS

The disclosed inventions will be described with reference to the accompanying drawings, which show important sample embodiments of the invention and which are incorporated in the specification hereof by reference, wherein.

DETAILED DESCRIPTION OF PREFERRED EMBODIMENTS

The numerous innovative teachings of the present application will be described with particular reference to the presently preferred embodiments (by way of example, and not of limitation).

The present invention teaches the construction and method of operation of an efficiently tuned back office system for a retail energy provider (REP), the primary objective of said system being the automatic execution of business rules and market transaction rules to enable energy services to retail customers and to coordinate critical activity between the REP and one or more regional ISOs responsible for energy production and delivery, examples of said activity being the purchase of energy from the ISO and the acceptance of and action upon customer connects or disconnects from the REP.

Figure 1:
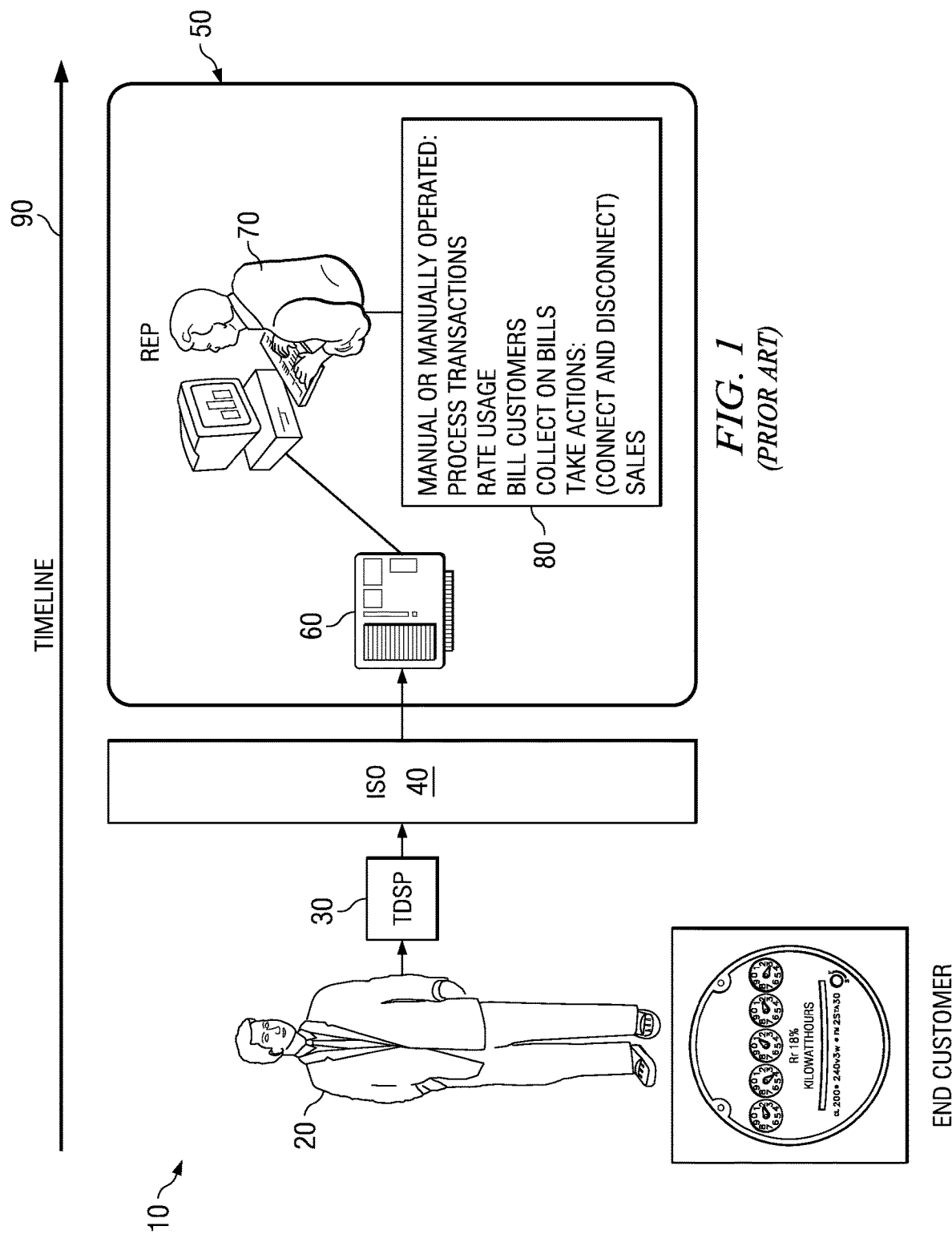
FIG. 1 is a drawing of a prior art system for servicing energy consumers.
Figure 2:
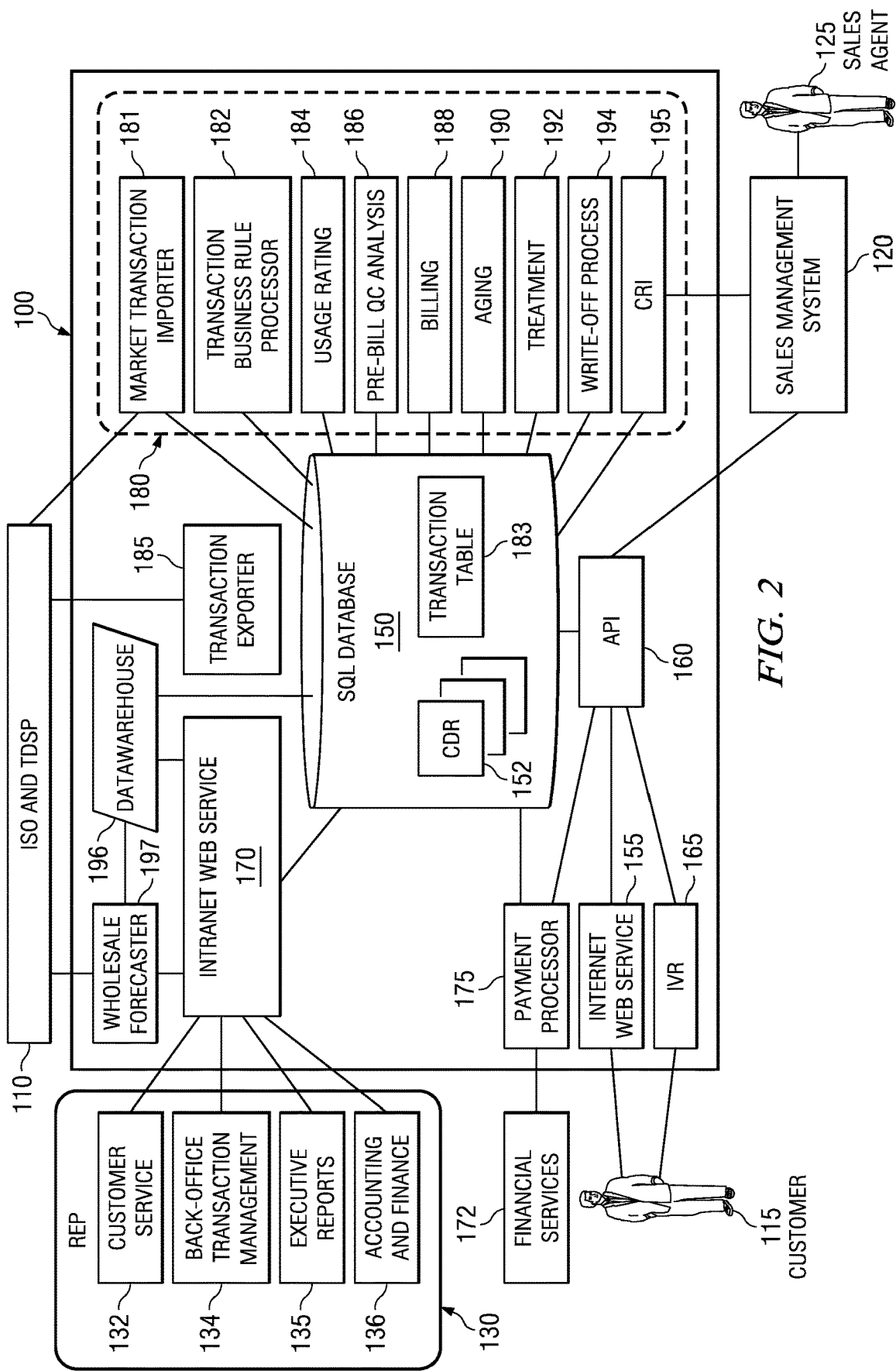
FIG. 2 is block diagram depicting the system functionality of the preferred embodiment of the present invention.

A functional diagram of the system is shown in FIG. 2. System 100 comprises a series of modules and system components that are designed to handle unique processing tasks. Each task is "object-oriented" in that the task is self-contained and not dependent on other tasks. This gives the system 100 modularity, which reduces overall system complexity and allows for rapid deployment and updates to system components without increasing the risk of system errors. Although system 100 modules are independent within the system framework, they are interdependent in the system flow. The primary flow of system 100 is indicated in FIG. 2 beginning with receipt of market transactions in market importer 181 and ending with customer residual income processor, CRI 195.

The system 100 comprises a number of internal entities and a number of external entities both of which are serviced by the system in a real-time event-driven process. System 100 interacts with external energy ISO partners 110 to perform inbound and outbound energy market transactions. System 100 interacts with external customers 115 who are connected to system 100 via the internet. System 100 also interacts with an external internet-based sales management system 120, the sales management system 120 in turn connected over the internet to sales agents 125 in a set of sales and marketing organizations. System 100 also interacts with external financial services 172 to aid in the collection of payment for services.

In a preferred embodiment, sales agents 125 are customers of energy services from REP 130 who have signed up in a customer residual income program. According to the customer residual income program, customers receive commissions in the form of residual income based on signing up additional customers for receiving energy services from REP 130.

In an alternate embodiment, sales agents 125 include a first set of sales agents who are customers of the REP 130 under the customer residual income program and a second set of sales agents who are not customers of the REP 130.

REP 130 must interact with system 100: to perform customer service operations by its customer service call center 132; to allow for interaction with back office transaction management 134 personnel within REP 130 so that transaction exceptions may be serviced according to the performance required by REP 130 and its ISO partners 110; to create executive reports 135; to perform wholesale forecasting for purchase decisions; and to generally support the performance of corporate accounting and financial functions 136 of REP 130.

System 100 comprises a set of automated processes to service stimuli that are generated to and from REP 130, sales management system 120, financial services 172, and ISO partners 110. The set of automated processes, which are shown as blocks inside system 100 in FIG. 2, interact with a core SQL database engine 150 which is a container for holding and organizing a set of customer data records, CDR 152, and a set of persistent transaction records in transaction table 183. The set of automated processes are shown in FIG. 2 connected by solid lines to SQL database engine 150, a given solid line indicating that the associated process to which it is connected exchanges data with the SQL database engine 150, the associated process generally operating upon said data and selectively reading and writing new data to the SQL database engine 150. The set of automated processes connected to the SQL database engine are sales application programming interface (API) 160 which integrally connects internet web service 155, interactive voice and response system IVR 165 to the SQL database engine, intranet web service 170, payment processor 175, business process function 180 and wholesale forecaster 197 which utilizes a data warehouse 196. REP 130 and data warehouse 196 are connected to SQL database engine 150 via the intranet web service 170. In the preferred embodiment of the present invention, the connections between the set of automated processes and the SQL database engine 150 are made by a corporate intranet (not shown) consisting of at least internet protocol IP services over an Ethernet physical infrastructure which may include local area networks (LANs) and wide area networks (WANs) of suitable computers. Such networks are known in the art and will not be further described.

To service external customers 115, internet web service 155 accepts customer input such as residential data or requests for information (e.g. monthly electricity usage chart) and sends it to API 160 for processing.

API 160 interfaces to internet web service 155, IVR 165 and sales management system 120. API 160 operates as a communications interface between third party software systems of the sales management system 120 and SQL database engine 150 to implement CDR 152. For example, API 160 accepts requests from sales management system 120 and converts them into queries appropriate for the SQL database engine 150 and then returns information in the form requested. In the preferred embodiment of the present invention, SOAP protocol over XML is utilized between API 160 and sales management system 120 and IVR 165.

Interactive voice response system, IVR 165, is a system for receiving and servicing telephone calls from external customers 115 and sales agents 125. IVR 165 allows customers to access information in customer data records, CDR 152 via API 160 by telephonic means.

Payment processor 175 provides an interface for system 100 to financial services 172 necessary to accept cash payment for services rendered to the customer. For example, payment processor 175, upon valid notice of payment from financial services 172, updates customer data records, CDR 152, in the SQL database engine 150. In the preferred embodiment of the present invention, financial services 172 includes the automated clearing house (ACH) network; at least one U.S. Bank for personal check clearing and automated bill payment; the VISA and MasterCard authorization network, at least one major U.S. check cashing firm; and at least one electronic web-based cash transfer firm. Payment processor 175 is connected to API 160 to service payments over the internet from external customers 115 via IVR 165 or internet web service 155. The description of the preferred embodiment of the present invention is not intended to limit the invention to the financial system interfaces so described. Other financial service interfaces in payment processor 175 may be extended for automatic payment processing. Examples of financial services firms are Ace Cash Express, Chase Bank (lockbox), Authorize.Net, PaymentTech and Moneygram.

System 100 operates an intranet web service 170 over REP 130 corporate intranet. Intranet web service 170 services requests for information to and from SQL database engine 150 including executive reports 135, requests for wholesale forecaster 197 and access to data warehouse 196, data exchange with back office transaction management 134 and queries from customer service call center 132. In another embodiment of the present invention, customer service call center 132 also utilizes intranet web service 170 for voice communications using voice over IP.

The business process function 180 is a set of processes that perform continuous and real-time operations on the data contained in SQL database engine 150 and is comprised of market importer 181, inbound transaction processor (ITP) 182, usage rating process 184, pre-bill quality control (QC) process 186, billing process 188, account aging process 190, bill treatment and collections process 192, and CRI 195.

In the preferred embodiment of the present invention, the system 100 is implemented on a network of servers operating a Microsoft .NET services network by Microsoft Corporation. The automated processes of business process function 180 are run continuously as event driven processes which are controlled and generated by a Microsoft .NET services application server.

The business process functions run on a schedule as shown in TABLE 1.

TABLE 1

| Business Process function | Frequency of runtimes |
|---|---|
| Inbound transaction process | Every 2 min |
| Rating process | Every 4 hours |
| Pre-bill quality control | Daily |
| Billing | Daily |
| Aging process | Daily |
| Treatment process | Daily after Aging process |
| CRI - daily calculations | Daily |
| CRI - release process | $25^{th}$, $1^{st}$, $5^{th}$ and $10^{th}$ of month |

Market importer 181 continuously monitors the ISO for available transaction data via electronic data interchange (EDI) with ISO partner 110 and if an EDI transaction exists, downloads it into the SQL database for further processing. More specifically, a transaction event handler (not shown) flags the system 100 that a transaction has arrived and creates a record of the arrived transaction in transaction table 183. A transaction in the context of the present invention is a customer related event such as a meter reading, connect declaration, or disconnect declaration. In the preferred embodiment of the present invention described herein, system 100 is described in terms of specific interaction with ERGOT, the Electric Reliability Council of Texas via electronic data interchange (EDI) transactions according to the ANSI ASC X12 Ver/Rel 004010 Transaction Set and the ERGOT transaction set known as the "Texas Standard Electronic Transmission" or "Texas SET". Table 2 shows a list of transaction types and names in the Texas SET which pertain to the present invention. Alternate embodiments are conceived and implemented in the more general case of EDI transaction not confined to the Texas SET definitions, the discussion of the preferred embodiment not intended to limit the processing functions and data structures described herein. For example, the system 100 has also been applied to actively interoperate with a New York ISO for natural gas services.

TABLE 2

| Transaction | Document Title | Document Flow |
|---|---|---|
| 650_01 | Service Order Request | REP to TDSP |
| 650_02 | Service Order Complete Response, Complete Unexecutable, Reject Response, or Notification of Permit Required | TDSP to REP |

TABLE 2-continued

| Transaction | Document Title | Document Flow |
|---|---|---|
| 650_04 | Suspension of Delivery Service Notification or Cancellation | TDSP to REP |
| 650_05 | Suspension of Delivery Service Reject Response | REP to TDSP |
| 810_02 | TDSP to REP Invoice | TDSP to REP |
| 810_03 | MOU/EC Invoice | REP to MC TDSP |
| 814_PC | Maintain Customer Information Request | REP to TDSP |
|  |  | TDSP to REP |
| 814_PD | Maintain Customer Information Response | TDSP to REP |
|  |  | REP to TDSP |
| 814_01 | Enrollment Request | REP to ISO |
| 814_02 | Enrollment Reject Response | ISO to REP |
| 814_03 | Switch REP Notification Request | ISO to TDSP |
| 814_04 | Switch REP Notification Response | TDSP to ISO |
| 814_05 | Premise Information and Enrollment Response | ISO to REP |
| 8I4_06 | Drop Due to Switch Request | ISO to REP |
| 814_07 | Drop Due to Switch Response | REP to ISO |
| 814_08 | Cancel Switch Request | REP to ISO |
|  |  | ISO to REP |
|  |  | ISO to TDSP |
| 814_09 | Cancel Switch Response | REP to ISO |
|  |  | TDSP to ISO |
|  |  | ISO to REP |
| 814_11 | Drop Response | ISO to REP |
| 814_I2 | Date Change Request | REP to ISO |
|  |  | ISO to REP |
|  |  | ISO to TDSP |
| 814_13 | Date Change Response | REP to ISO |
|  |  | TDSP to ISO |
| 814_14 | Drop Enrollment Request | ISO to Designated REP during Mass transition |
| 814_15 | Drop Enrollment Response | Designated REP during Mass Transition to ISO |
| 814_16 | Move-In Request | REP to ISO |
| 814_17 | Move-In Reject Response | ISO to REP |
| 814_18 | Establish/Delete Continuous Service Agreement (CSA) Request | REP to ISO |
|  |  | ISO to MC TDSP |
| 814_19 | Establish/Delete Continuous Service Agreement (CSA) Response | ISO to REP |
|  |  | MCTDSP to ISO |
| 814_20 | Create/Maintain/Retire ESI ID Request | TDSP to ISO |
|  |  | ISO to REP |
| 814_21 | Create/Maintain/Retire ESI ID Response | ISO to TDSP |
|  |  | REP to ISO |
| 814_22 | Continuous Service Agreement (CSA) REP Move In Request | ISO to REP |
| 814_23 | Continuous Service Agreement (CSA) REP Move In Response | REP to ISO |
| 814_24 | Move-Out Request | REP to ISO |
|  |  | ISO to TDSP |
| 814_25 | Move-Out Response | ISO to REP |
|  |  | TDSP to ISO |
| 814_26 | Ad-Hoc Historical Usage Request | REP to ISO |
|  |  | ISO to TDSP |
| 814_27 | Ad-Hoc Historical Usage Response | ISO to REP |
|  |  | TDSP to ISO |
| 814_28 | Completed Unexecutable or Permit Required | TDSP to ISO |
|  |  | ISO to REP |
| 814_29 | Response to Completed Unexecutable or Permit Required | ISO to TDSP |
|  |  | REP to ISO |
| 820_02 | Remittance Advice | REP to TDSP |
| 820_03 | MOU/EC Remittance Advice | MCTDSP to REP |
| 824 | Application Advice | REP to TDSP |
|  |  | REP to ISO |
|  |  | ISO to TDSP |
| 867_02 | Historical Usage | TDSP to ISO |
|  |  | ISO to REP |
| 867_03 | Monthly Usage | TDSP to ISO |
|  |  | ISO to REP |
| 867_04 | Initial Meter Read Notification | TDSP to ISO |
|  |  | ISO to REP |

Once a transaction arrival is flagged, ITP 182 is started and operates on the data associated with the set of arrived transaction records in transaction table 183 by applying a given set of business rules to the transaction record to determine further steps to be taken. The details of the given set of business rules and the operation of ITP 182 will be discussed further in relation to FIG. 4. Application of business rules to a set of transaction records normally results in updating a set of customer data records in CDR 152 associated to the transaction records. Other processes in business process function 180 are activated according to the schedule and execute further billing oriented processes to operate on the set of associated customer records in CDR 152. The most common transaction for REP 130 is a meter reading which will indicate the read date and the usage.

Usage rating process 184 is activated according to the schedule in Table 1 and operates on the set of customer records, functioning to assign the correct usage billing rate to the current usage for each customer record.

Pre-bill QC process 186 is activated according to the schedule in Table 1 and operates on the set of customer records. Pre-bill QC process 186 functions to automatically identify and repair potential errors in customer bills that are about to be generated. For example, a customer may be inappropriately billed because of a change in product code. Pre-bill QC process cross-checks valid product codes with product codes that appear in the transaction record. As another example, a billing error in an amount that is more than five standard deviations above the historical average usage for that customer is flagged as an exception to prevent billing of excessive amounts or to confirm correctness. Once pre-bill QC process 186 is completed it marks the customer records in the set of customer records as qualified customer records.

Billing process 188 is activated according to the schedule in Table 1 and generates customer bills, applying taxes and fixed charges as required by REP 130. Furthermore, customer data records in CDR 152 for which bills are generated are marked as billed and placed in accounts receivable status.

Account aging process 190 is activated according to the schedule in Table 1 and retrieves the customers' past due balance based on the payment history contained in CDR 152 for that customer. Adjustments and payments are recorded according to the age of the invoice. A queue is established and populated to manage the past due invoices. If a customer account has reached a past due status requiring further treatment, then the qualified customer data record is further processed in bill treatment and collections process 192.

Bill treatment and collections process 192 then is activated according to the schedule in Table 1 and operates on qualified customer data records requiring treatment applying a set of treatment rules. Treatment rules may be governed by the regional PUC wherein certain customers' accounts may be protected. The customer's Dunning score is calculated and used to assign a grace period for bill payment and a minimum payment amount (or payment they hold). A set of automated actions are taken by bill treatment and collections process 192 such as past due letter generation, the accrual of charges or fees, sending of a disconnect notice, sending of a disconnect order, sending of a move-out order and sending of an accrued bill to outside collection agency. The bill treatment and collections processor 192 automatically checks customer data records in CDR 152 for payments received or for account protection.

Write-off process 194 is executed by system 100 when a customer data record indicates that that a customer is in collection. If outside collections have failed after a predetermined time period, the account is automatically closed and the accumulated customer bill is flagged as uncollectible. The system automatically determines that an account is "Written Off" 10 days after a market "move out" order is sent and accepted by the market. A "move out" order formally releases an REP as the representative of a customer for the given retail energy segment.

Updated customer data records in CDR 152 for which bills have been paid are associated with sales agents 125 and further processed by CRI 195. In the preferred embodiment of the present invention, customer data records in CDR 152 have a sales agent field which is checked by CRI 195. CRI 195 checks the customer data records in CDR 152 bills paid and then provides an accounting to the associated sales agents 125. Each customer bill is analyzed against payments received and bills are determined to be "paid in full" or "still under collection". If a bill is paid in full and a valid sales agent exists for the customer, CRI 195 schedules automatic payment of referral and/or residual fees due to the proper sales agent.

The ESI ID is an electric service identifier assigned to each meter in the ISO region. The ISO typically compiles usage profiles of smaller areas within the region such as zip code areas. REP 130 may look up a usage profile for an area based on the ESI ID.

Data warehouse 196 is a repository of data related to the wholesale energy market barriers for decision including a repository of ESI ID information, ESI ID usage profiles, a repository for weather data, a repository for backcast profile load data from ISO partners 110, a repository for forecast profile load data and a repository for purchasing strategies and information related thereto.

Figure 3:
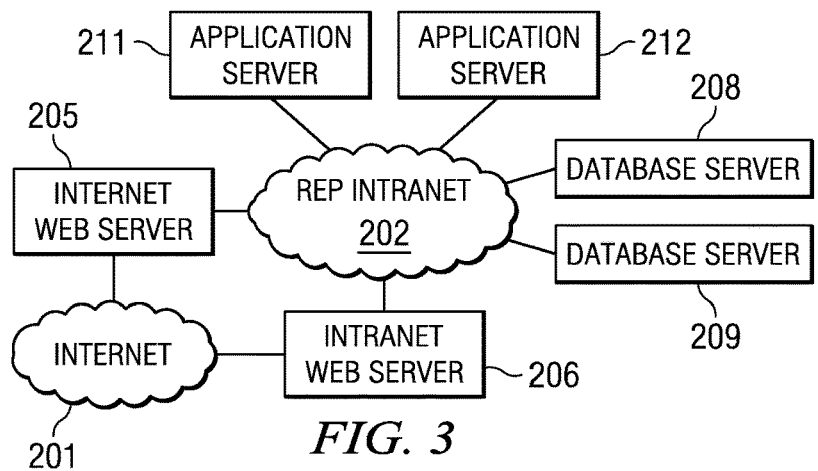
FIG. 3 is a block diagram showing the hardware configuration of the preferred embodiment of the present invention.

System 100 is implemented on networked computer servers as a set of software programs executing on the networked servers. As shown in FIG. 3, the hardware model in the preferred embodiment comprises internet web server 205; intranet web server 206; redundant database servers, DB server 208 and DB server 209; and redundant application servers APP server 211 and APP server 212. All of said servers are connected together by a corporate intranet, REP intranet 202, which forms the basis for network communications. In the preferred embodiment of the present invention, the web servers are connected to the public internet 201 via Ethernet and an appropriate internet services provider and the servers are: Application Servers 212: Dell PowerEdge Servers—2 GHZ Dual Core Processors—4 GB RAM; web servers 205 and 206: Dell PowerEdge 2950 Servers—2 GHZ Dual Core Processors—8 GB RAM; SQL Database Servers, DB Server 208 and DB Server 209: Dell PowerEdge 6950 Servers—(4) 2 GHZ Dual Core Processors—32 GB RAM. Servers in the context of the present invention may imply a cluster of servers, for example, a cluster of three internet web servers. The current hardware implementation is limited only by cost and availability. Other embodiments may utilize other server and network models.

Referring to FIGS. 2 and 3, the system 100 is implemented across the network of servers as a systems application. The software code for business process function 180, payment processor 175 and API 160, as well as Microsoft services scheduler programs are operated on the application servers, APP server 211 and APP server 212, which continuously and redundantly accept market transactions and organize batch loads of processing events through business process function 180. The software code for end-user internet web service 155 and API 160 are operated on internet web server 205 while the software code for internal intranet web service 170 are operated on intranet web server 206. The SQL database engine 150 is implemented redundantly on database servers, DB server 208 and DB server 209. The construction of the physical network is done in a standard consistent with the current art of computer networking so that the servicing of the system 100 programs can be done easily and at reasonable cost by those who are skilled in the art of modern information technology.

Figure 4A:
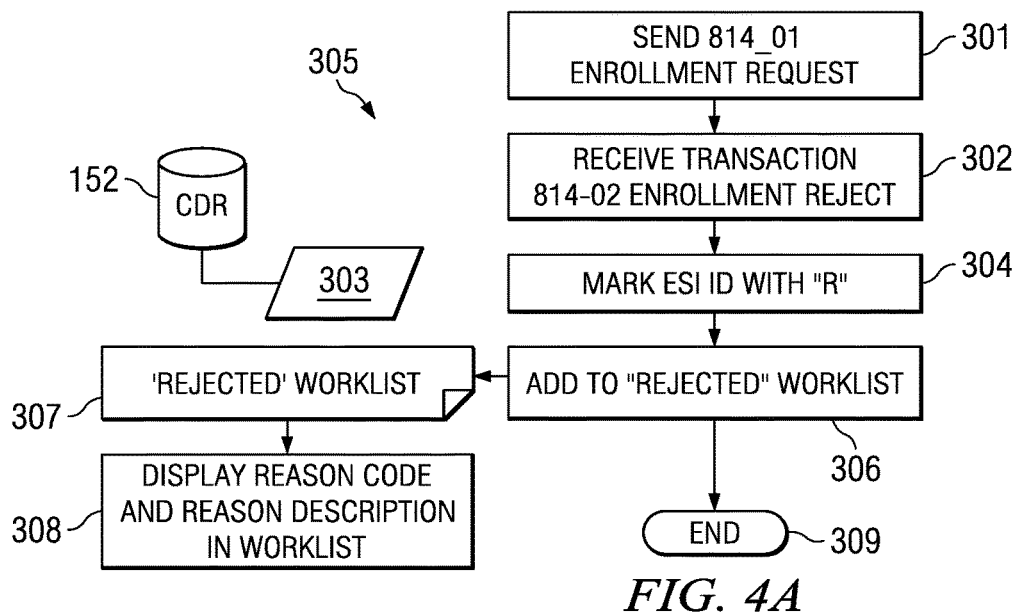
FIGS. 4A-4N are block diagrams of the methods of the transaction business rules processor in the preferred embodiment of the present invention.
Figure 4N:
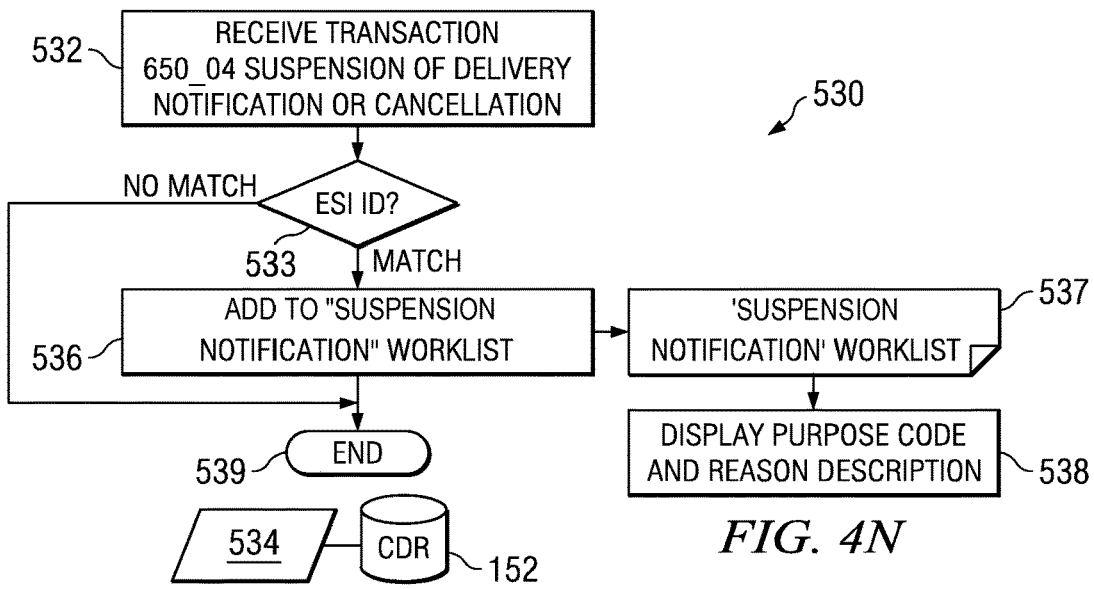

FIGS. 4A through 4N show the various transaction business rules implemented by ITP 182. In the preferred embodiment, the ITP 182 business rules operate on inbound EDI transactions including those EDI transactions defined within the Texas SET. ITP 182 is a Windows Service coded in C# (.NET) that runs automatically every 2 minutes. In alternate embodiments, other EDI transaction specifications besides the Texas SET specification may be utilized.

Beginning with FIG. 4A and in reference to FIG. 2, a business rule process 305 for an inbound "Enrollment Rejection" 814_02 transaction is shown. The enrollment step 301 is executed by REP 130 wherein an 814_01 transaction is sent to ERCOT, the 814_01 transaction being sent to begin the customer enrollment process for a customer in CDR 152 with a customer record 303 corresponding to the ESI ID contained in the 814_02 transaction record. In receive step 302, an 814_02 transaction appears as a transaction record in transaction table 183, having been received by market importer 181. ITP 182 then marks the ESI ID status in customer record 303 in the 814_02 transaction record as 'R' for 'reject' in marking step 304 and in step 306 adds a copy of the marked 814_02 transaction record to the 'Rejected' worklist 307. At a later time, the 'Rejected' worklist is opened for viewing and the reason code and reasons description contained in the 814_02 transaction record are displayed in step 308. The "enrollment rejection" process ends in step 309.

Figure 4B:
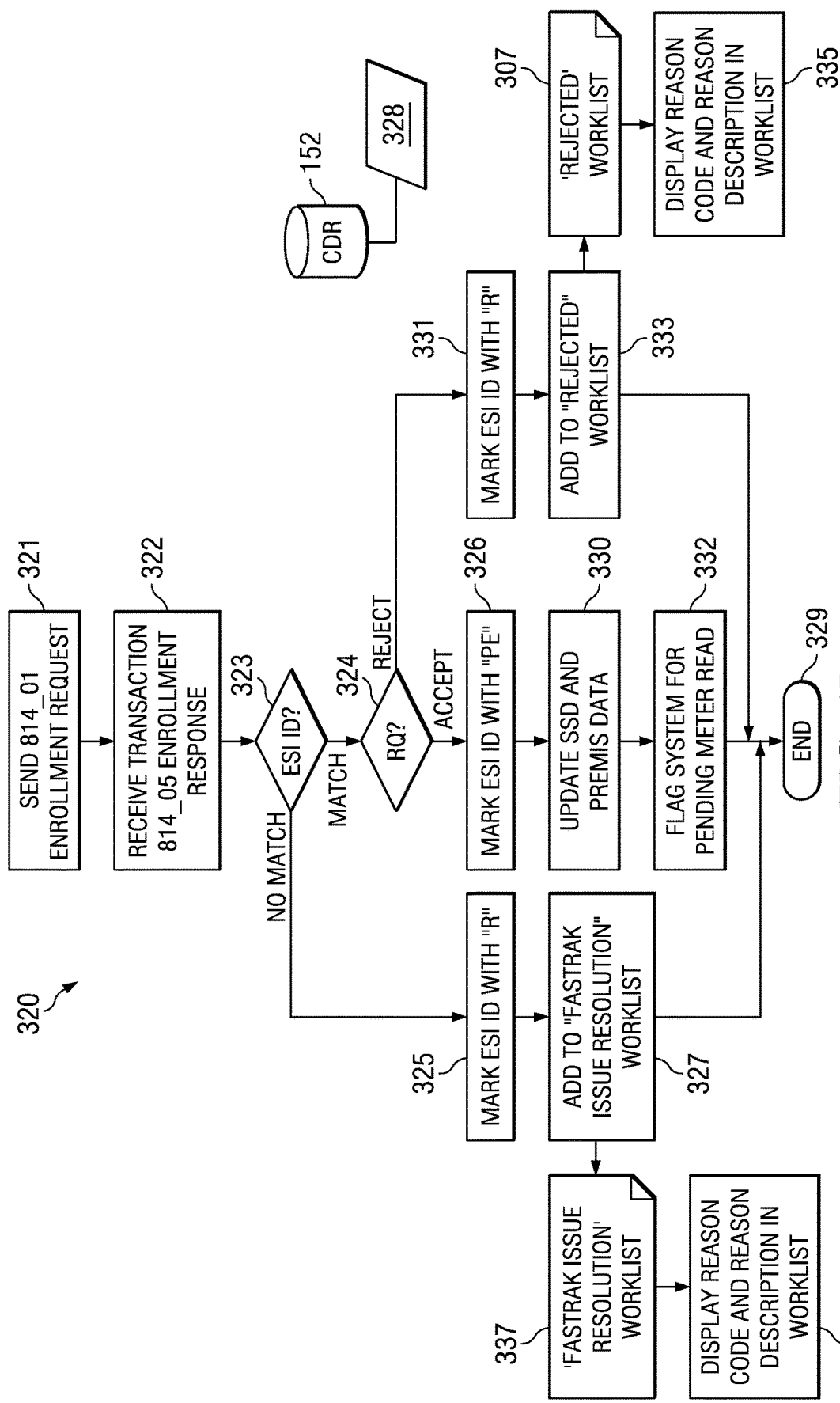

FIG. 4B, shows the business rule process 320 for an inbound "Enrollment Response" 814_05 transaction. The enrollment step 321 is executed by REP 130 wherein an 814_01 transaction is sent to ERCOT the 814_01 transaction being sent to begin the customer enrollment process for a switch. In receive step 322, an 814_05 "Enrollment Response" transaction appears as a transaction record in transaction table 183, having been received by market importer 181.

The ESI ID in 814_05 transaction record is checked to match existing REP customer ESI IDs in CDR 152 in step 323. If there is no match to any customer ESI ID, the associated 814_05 transaction record is marked in mark step 325 with 'R' for rejection and the marked transaction is added in step 327 to a "Fast track issue resolution" worklist 337. In step 329, the business rule process 320 ends.

In step 323, if a customer record 328 is matched to the ESI ID, then a response qualifier in the 814_05 transaction record is checked in RQ step 324 for an 'accept' response or a 'reject' response. In the case of a 'reject' response, the ESI ID status in customer record 328 is marked in step 331 with 'R' and then in step 333, the matched 814_05 transaction record is placed in 'Rejected' worklist 307.

In the case of an 'accept' response in RQ step 324, the ESI ID status in customer record 328 is marked in step 326 with 'PE' for 'pending' and relevant premise data, meter data, and service start date from the matched 814_05 transaction record is stored in step 330 in the matching customer record in CDR 152. The system 100 is then flagged for a pending meter read in flag step 332. Both the 'accept' and 'reject' processes as well as the business rule process 320 end in end step 329. At a later time, the 'Rejected' worklist 307 or the 'Fast track issue resolution' worklist 337 is opened for viewing and the reason code and reasons description contained in the 814_05 transaction record are displayed in step 335 or step 338, respectively.

Figure 4C:
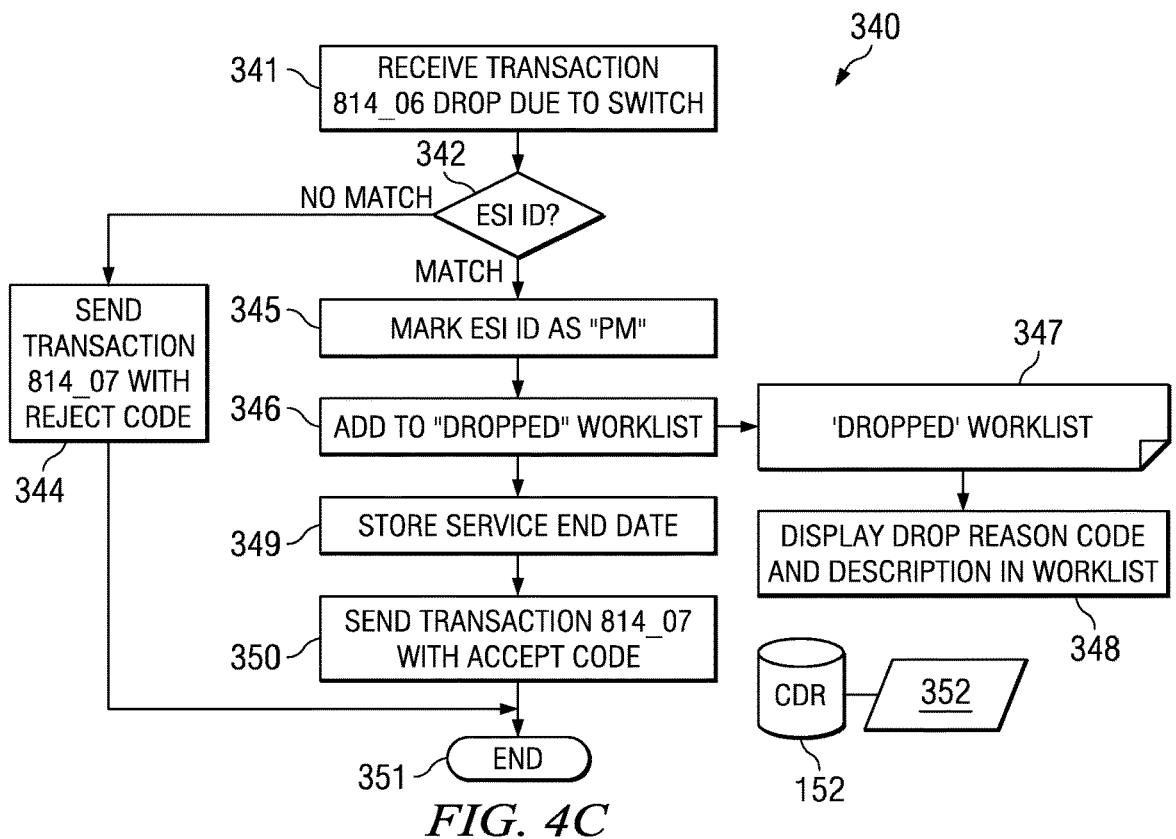

ITP 182 business rules include process 340 for the reception of a 'Drop due to switch' 814_06 transaction shown in FIG. 4C. In receive step 341, a 814_06 'Drop due to switch" transaction appears as a transaction record in transaction table 183, having been received by market importer 181. The ESI ID in the 814_06 transaction record is checked for a match to REP customer ESI IDs in CDR 152 in step 342. If there is no match with any customer ESI ID, an 814_07 'Drop due to switch response' transaction is sent including a 'reject' code from the REP 130 to the ISO partners 110. In step 342, if a customer record 352 matches the ESI ID, then the ESI ID in customer record 352 status is marked in step 345 with 'PM' (pending move out or drop) and then in step 346 the associated transaction record is placed in 'Dropped' worklist 347. Service end date from the associated 814_06 transaction record is stored in step 349 in customer record 352. Following step 349, an 814_07 'Drop due to switch response' transaction is sent (including an 'accept' code) from the REP 130 to the ISO partners 110. After either the 'accept' or 'reject' responses are sent to ISO partners 110, steps 344 or 350, respectively, the business rule process 340 ends in end step 351. At a later time, the 'Dropped' worklist 347 is opened for viewing and the reason code and reasons description contained in the 814_06 transaction record are displayed in step 348.

Figure 4D:
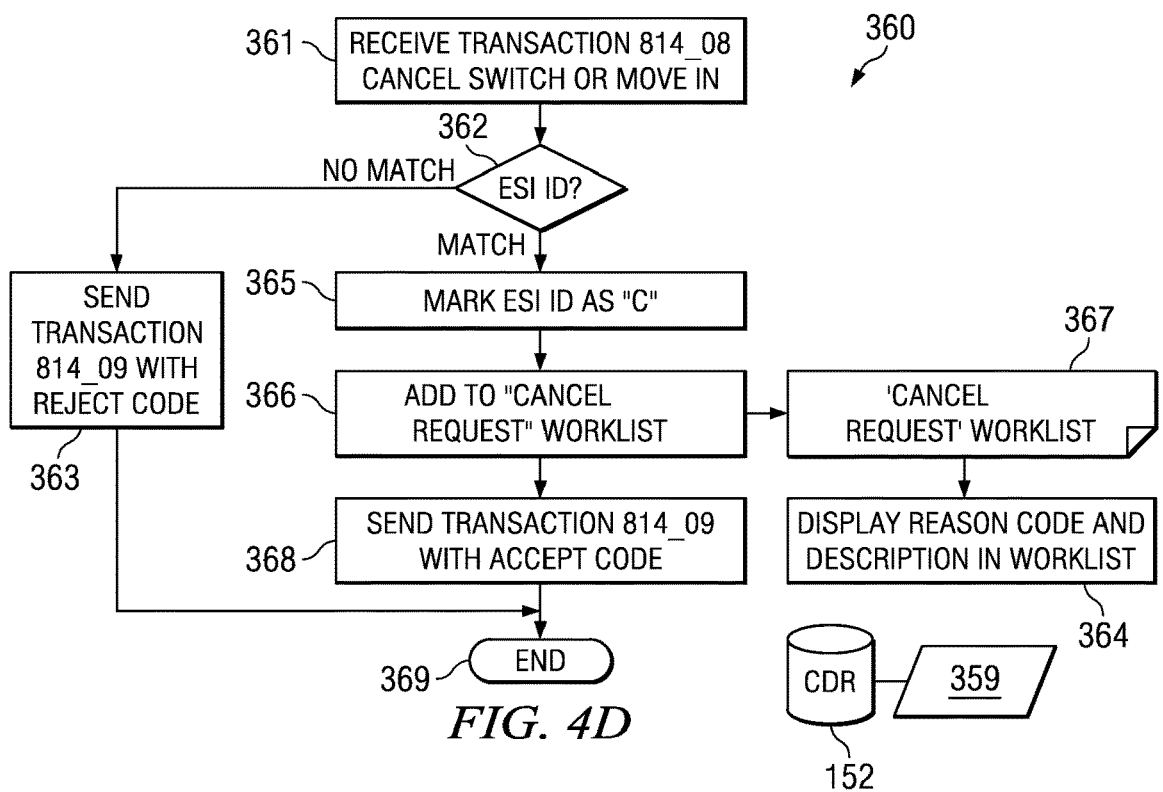

ITP 182 business rules include process 360 for the reception of a 'Cancel switch or move in request' type 814_08 transaction shown in FIG. 4D. In receive step 361, an 814_08 'Cancel switch or move in request' transaction appears as a transaction record in transaction table 183, having been received by market importer 181. The ESI ID in the 814_08 transaction record is checked for a match to REP customer ESI IDs in CDR 152 in step 362. If there is no match with a customer ESI ID, an 814_09 'Cancel switch response' transaction is sent from the REP 130 to the ISO partners 110 including a 'reject' code in step 363. In step 362, if a customer record 359 is matched to the ESI ID, then the associated ESI ID status in customer record 359 is marked in step 365 with 'C' (cancelled) and then in step 366 the associated 814_08 transaction record is placed in 'Cancel Request' worklist 367. Following step 366, an 814_09 'Cancel switch response' transaction is sent from REP 130 to ISO partners 110 including an 'accept' code in step 368. After either the 'accept' or 'reject' responses are sent to ISO partners 110, steps 363 or 368, respectively, the business rule process 360 ends in end step 369. At a later time, 'Cancel Request' worklist 367 is opened for viewing and the reason code and reasons description contained in the 814_08 transaction record are displayed in step 364.

Figure 4E:
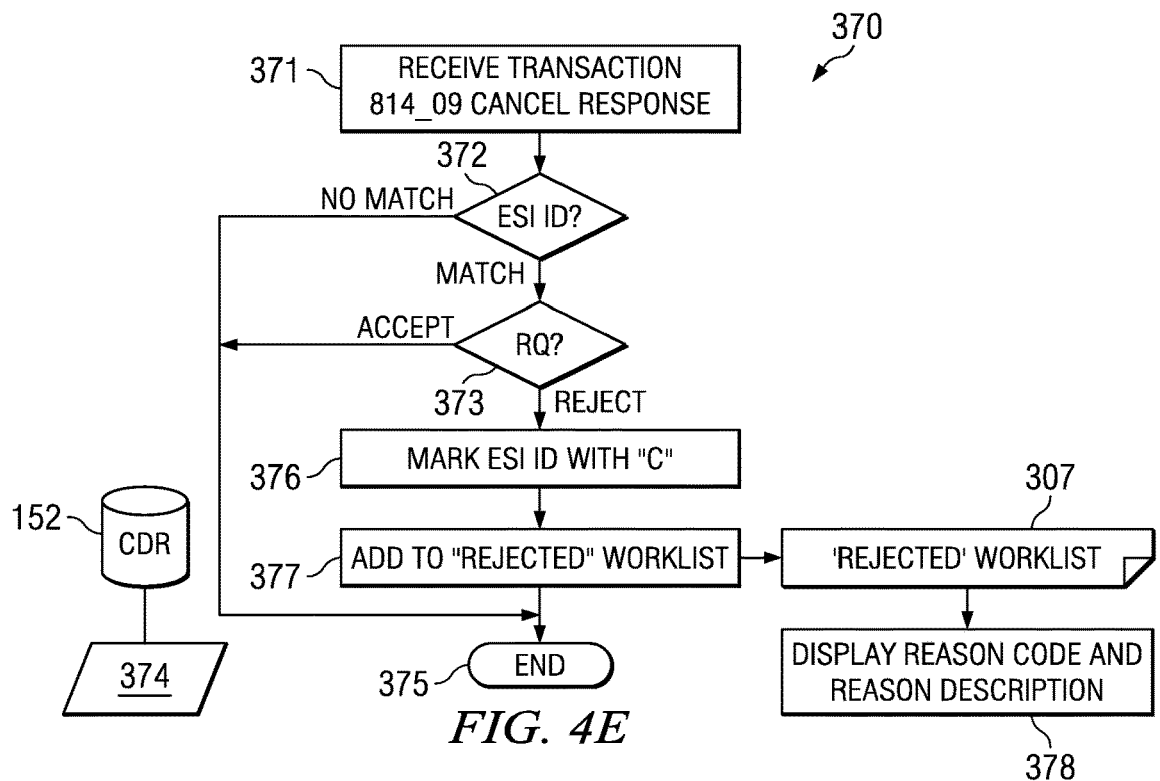

ITP 182 business rules include process 370 for the reception of a 'Cancel switch response' type 814_09 transaction shown in FIG. 4E. In receive step 371, an 814_09 'Cancel switch response' transaction appears as a transaction record in transaction table 183, having been received by market importer 181. The ESI ID in the 814_09 transaction record is checked for a match to REP customer ESI IDs in CDR 152 in step 372. In step 372, if any customer record 374 is matched to the ESI ID, then a response qualifier in the 814_09 transaction record is checked in RQ step 373 for either an 'accept' response or a 'reject' response. If a 'reject' response in RQ step 373, then the associated ESI ID status in customer record 374 is marked in step 376 with 'C' (cancelled) and then in step 377 the associated 814_09 transaction record is placed in 'Rejected' worklist 307. If the ESI ID does not match a customer ESI ID in step 372 then the business rule process 370 ends. Also, if the response qualifier is an 'accept' in RQ step 373, then the business rule process 370 ends at end step 375. At a later time, the 'rejected' worklist 307 is opened for viewing and the reason code and reason description contained in the 814_09 transaction record are displayed in step 378.

Figure 4F:
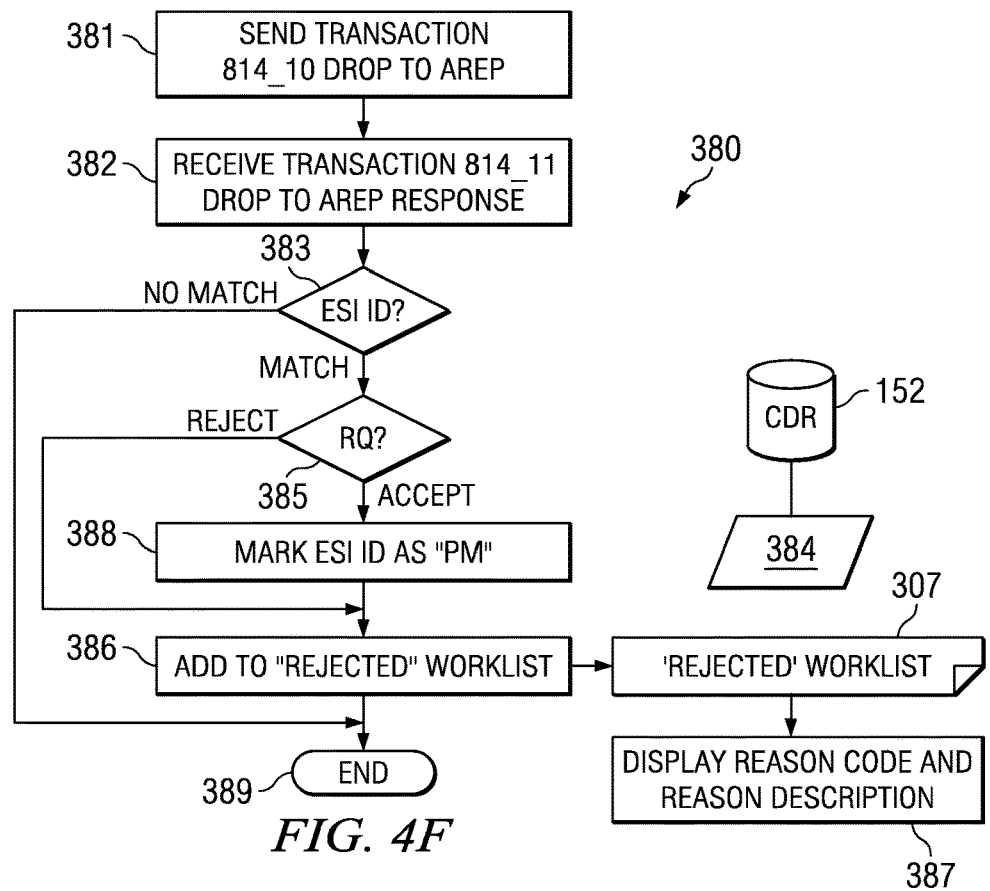

FIG. 4F shows the business rule process 380 for an inbound "Drop to AREP response" 814_11 transaction. The 'Drop to AREP' step 381 is executed by REP 130 wherein a 814_10 transaction is sent to ISO partners 110, the 814_10 transaction initiating a 'Drop to AREP' process which drops a customer from REP 130 to a standard incumbent REP. In receive step 382, an 814_11 "Drop to AREP Response" transaction appears as a transaction record in transaction table 183, having been received by market importer 181. The ESI ID in the 814_11 transaction record is checked for a match to REP customer ESI IDs in CDR 152 in step 383. If there is no match with any customer ESI ID, the business rule process 380 ends in end step 389.

In step 383, if customer record 384 in CDR 152 matches the ESI ID, then a response qualifier in the 814_11 transaction record is checked in RQ step 385 for an 'accept' response or a 'reject' response. In the case of a 'reject' response, the associated 814_11 transaction record is placed in 'Rejected' worklist 307 in step 386. In the case of an 'accept' response, the ESI ID status in customer record 384 is marked in step 388 with 'PM' for pending and the associated 814_11 transaction record is placed in 'Rejected' worklist 307 in step 386. Both the 'accept' and 'reject' processes as well as the business rule process 380 end in end step 389. At a later time, the 'Rejected' worklist 307 is opened for viewing and the reason code and reasons description contained in the 814_11 transaction record are displayed in step 387.

Figure 4G:
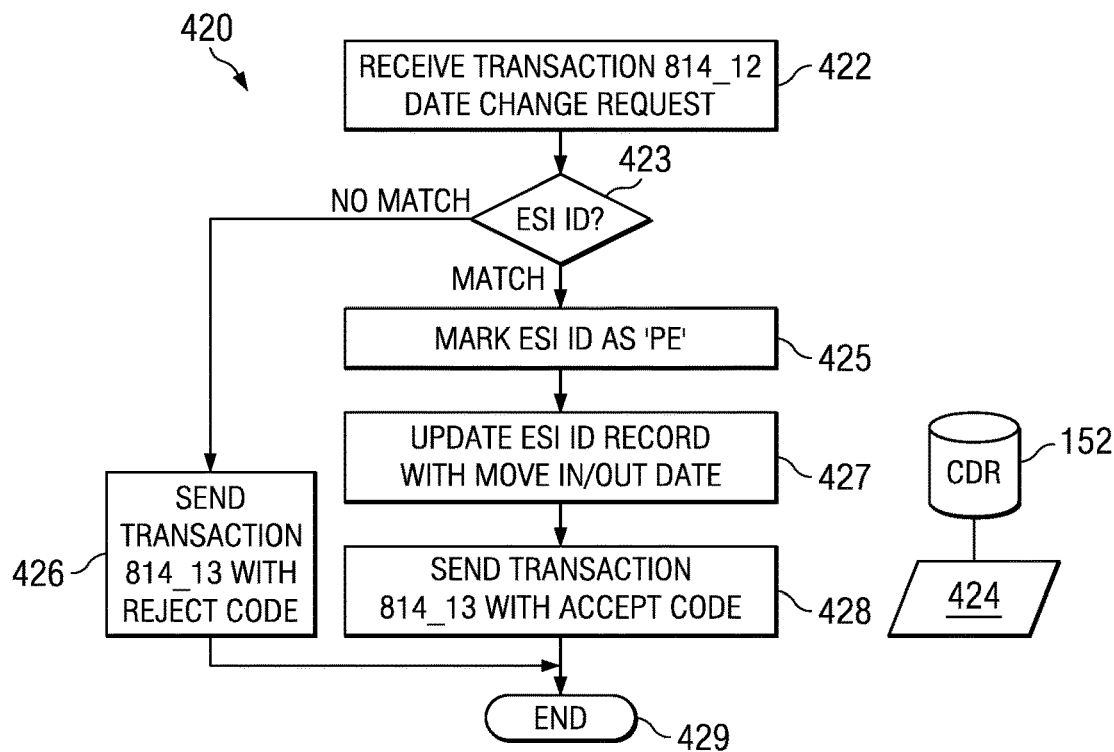

ITP 182 business rules include process 420 for the reception of a 'Date change request' type 814_12 transaction shown in FIG. 4G. In receive step 422, an 814_12 'Date change request' transaction appears as a transaction record in transaction table 183, having been received by market importer 181. The ESI ID in the 814_12 transaction record is checked for a match to REP customer ESI IDs in step 423. If there is no match with any customer ESI ID, an 814_13 'Date change response' transaction is sent from the REP 130 to the ISO partners 110 including a 'reject' code in step 426. In step 423, if customer record 424 in CDR 152 matches the ESI ID, then the ESI ID status in customer record 424 is marked in step 425 with 'PE' (pending) and then in step 427 the customer record 424 is updated to reflect the valid move in date and move out date. Following step 427, an 814_13 'Date change response' transaction is sent from REP 130 to ISO partners 110 including an 'accept' code in step 428. After either the 'accept' or 'reject' responses are sent to ISO partners 110, steps 426 or 428, respectively, the business rule process 420 ends in end step 429.

Figure 4H:
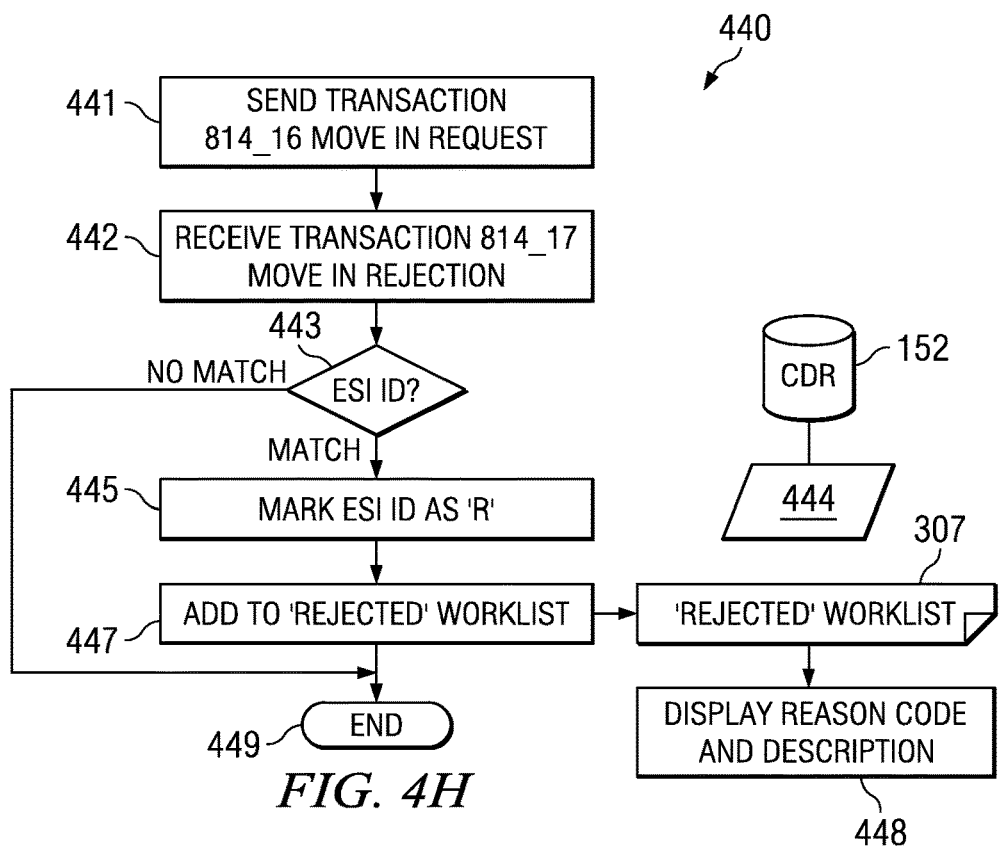

ITP 182 business rules include process 440 for the reception of a 'Move in reject response' type 814_17 transaction shown in FIG. 4H. 'Move In request' step 441 is executed by REP 130 wherein a 814_16 transaction is sent to ISO partners 110, the 814_16 transaction being used to establish a move in date for a customer. In receive step 442, an 814_17 'Move in response' transaction appears as a transaction record in transaction table 183, having been received by market importer 181. The ESI ID in the 814_17 transaction record is checked for a match to REP customers' ESI IDs in CDR 152 in step 443. If there is no match with a customer ESI ID, the business rule process 440 is ended in end step 449.

In step 443, if a customer record 444 matches the ESI ID, then the ESI ID status in customer record 444 is marked in step 445 with 'R' (rejected) and the associated 814_17 transaction record is placed in 'Rejected' worklist 307 in step 447 in which the reason code and reason description are displayed in step 448 at a later time after opening and reviewing the 'Rejected worklist 307. The business rule process 440 ends with end step 449.

Figure 4I:
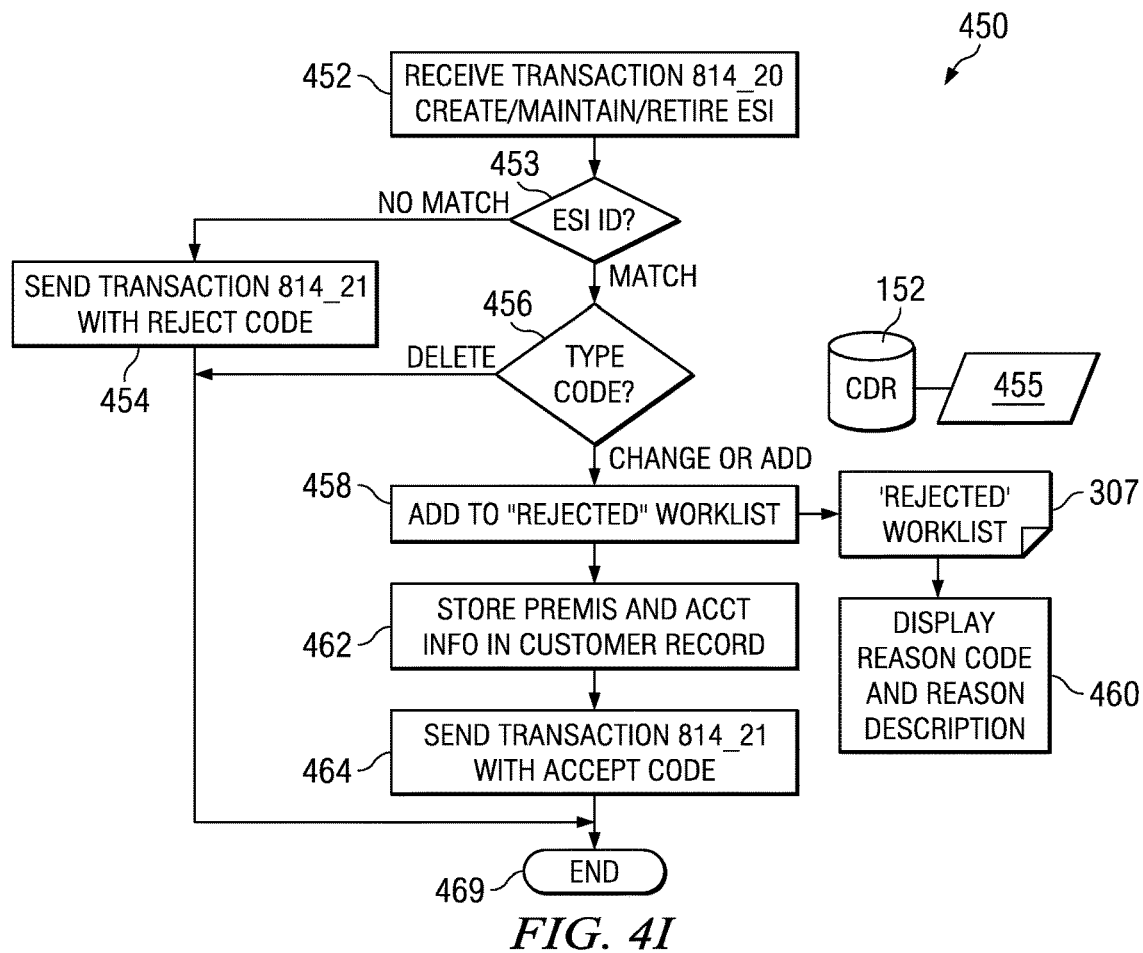

FIG. 4I shows the business rule process 450 for an inbound "Create/Maintain/Retire ESI request" 814_20 transaction. In receive step 452, an 814_20 "Create/Maintain/Retire ESI request" transaction appears as a transaction record in transaction table 183, having been received by market importer 181. The ESI ID in the 814_20 transaction record is checked for a match to REP customer ESI IDs in CDR 152 in step 453. If there is no match with any customer ESI ID, an 814_21 'Create/Maintain/Retire response' transaction is sent from the REP 130 to the ISO partners 110 including a 'reject' code in step 454. In step 453, if customer record 455 in CDR 152 matches the ESI ID, then the type qualifier is checked in type code step 456 for a 'change' or 'add' type or a 'delete' type. In the case of a 'delete' type, the business rules process 450 ends in end step 469. In the case of a 'change' or 'add' type, the associated 814_20 transaction record is placed in 'Rejected' worklist 307 in step 458. Premise data and account information are updated in the customer record 455 in update step 462. An 814_21 'Create/Maintain/Retire response' transaction is sent from the REP 130 to the ISO partners 110 including a 'accept' code in step 464. At a later time, the 'Rejected' worklist 307 is opened for viewing and the reason code and reasons description contained in the 814_11 transaction record are displayed in step 460.

Figure 4J:
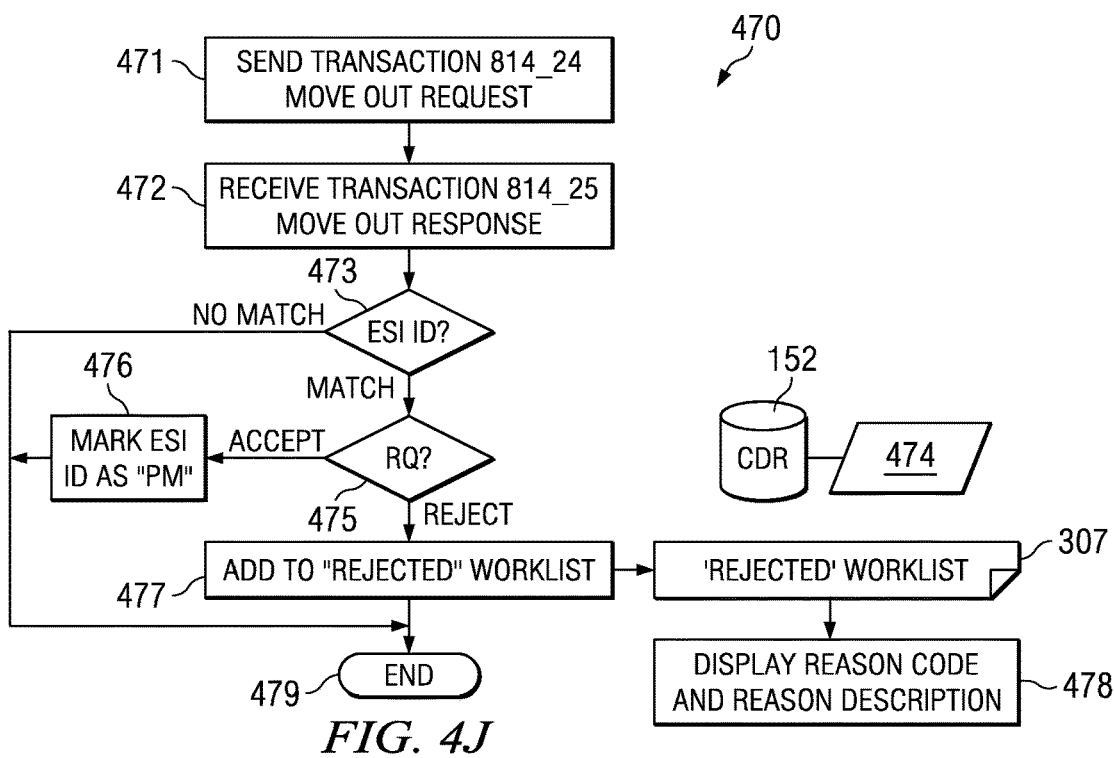

FIG. 4J shows the business rule process 470 for an inbound "Move Out Response" 814_25 transaction. 'Move out request' step 471 is executed by REP 130 wherein a 814_24 transaction is sent to ISO partners 110, the 814_24 transaction initiating a 'Move Out request' process in which a customer vacates a location currently receiving service. In receive step 472, an 814_25 'Move Out Response' transaction appears as a transaction record in transaction table 183, having been received by market importer 181. The ESI ID in the 814_25 transaction record is checked for a match to REP customer ESI IDs in CDR 152 in step 473. If there is no match with any customer ESI ID, the business rule process 470 ends in end step 479. In step 473, if a customer record 474 in CDR 152 matches the ESI ID, then a response qualifier in the 814_25 transaction record is checked in RQ step 475 for an 'accept' response or a 'reject' response. In the case of a 'reject' response, the associated 814_25 transaction record is placed in 'Rejected' worklist 307 in step 477. In the case of an 'accept' response, the ESI ID status in customer record 474 is marked in step 476 with 'PM' (pending move). Both the 'accept' and 'reject' processes 476 and 477 respectively, as well as the business rule process 470 end in end step 479. At a later time, the 'Rejected' worklist 307 is opened for viewing and the reason code and reasons description contained in the 814_25 transaction record are displayed in step 478.

Figure 4K:
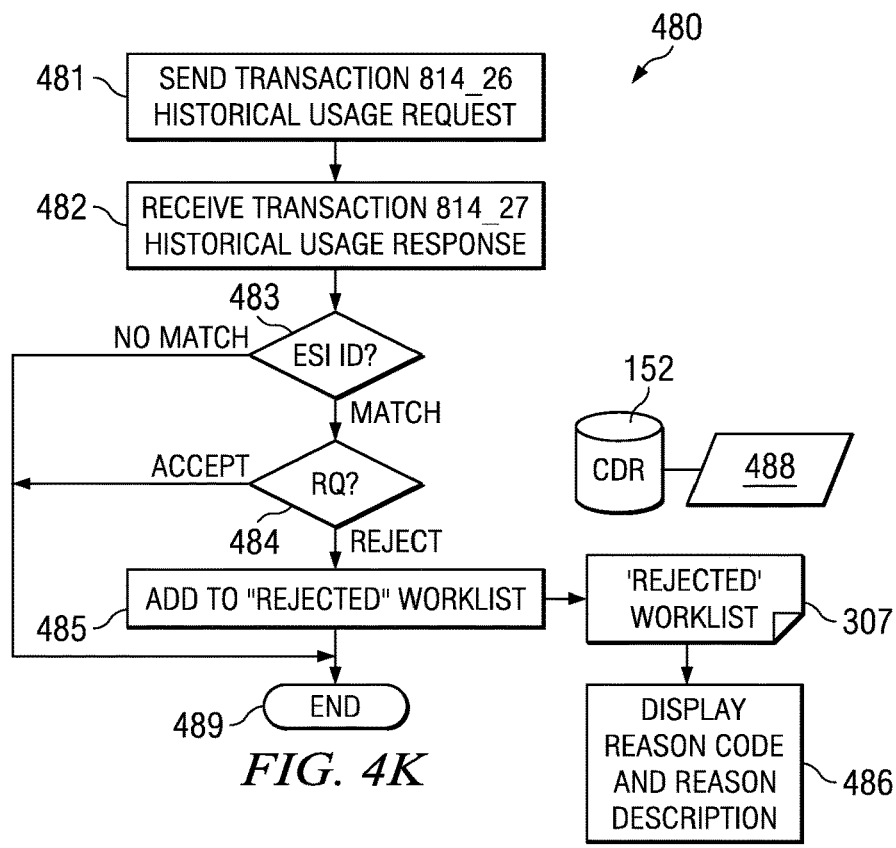

FIG. 4K shows the business rule process 480 for an inbound "Historical Usage response" 814_27 transaction. The 'Historical usage request' step 481 is executed by REP 130 wherein a 814_26 transaction is sent to ISO partners 110, the 814_26 transaction initiating a request for historical energy usage of a particular customer with customer record 488 in CDR 152. In receive step 482, an 814_27 'Historical Usage Response' transaction appears as a transaction record in transaction table 183, having been received by market importer 181. The ESI ID in the 814_27 transaction record is checked for a match to REP customer ESI IDs in CDR 152 in step 483. If there is no match with any customer ESI ID, the business rule process 480 ends in end step 489. If there is a match between the ESI ID and customer record 488 in step 483, then the response qualifier in the 814_27 transaction record is checked in RQ step 484 for an 'accept' response or a 'reject' response. In the case of a 'reject' response, the associated 814_27 transaction record is placed in 'Rejected' worklist 307 in step 485. The business rules process 480 ends in end step 489. In the case of an 'accept' response, the business rules process simply ends in end step 489. No other actions are taken. At a later time, the 'Rejected' worklist 307 is opened for viewing and the reason code and reasons description contained in the 814_27 transaction record are displayed in step 486.

Figure 4L:
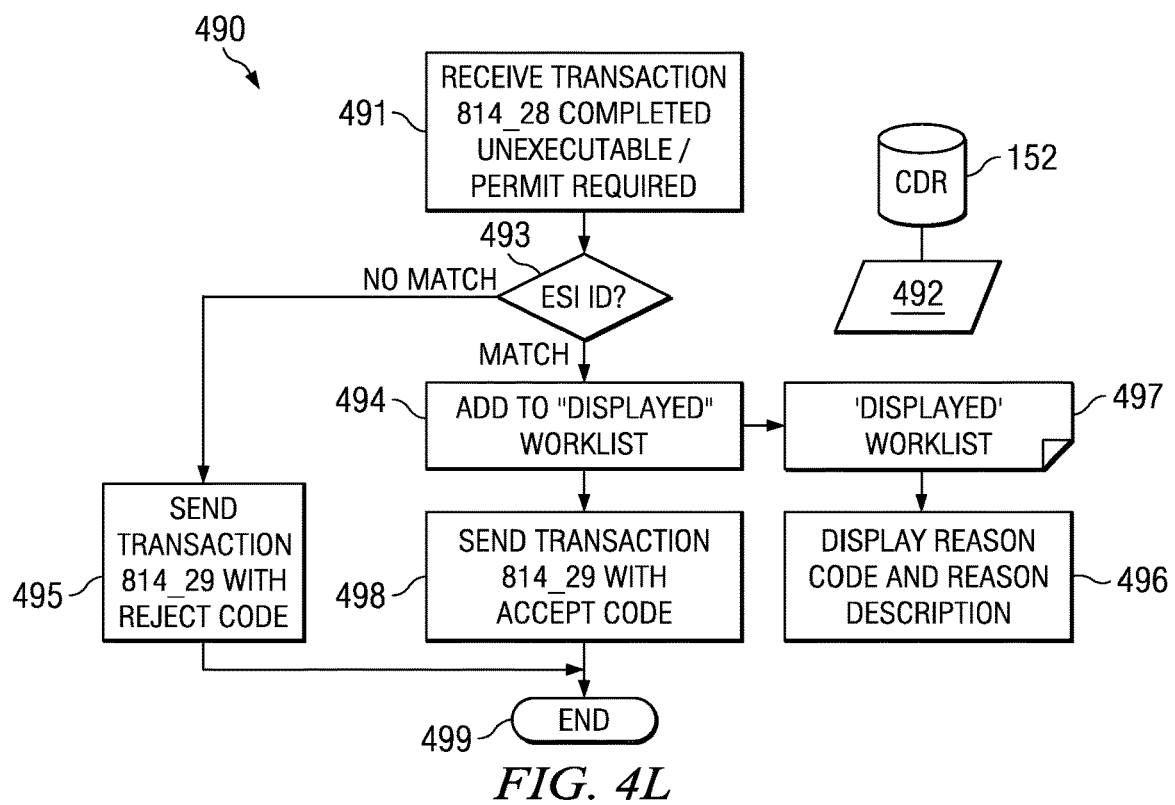

ITP 182 business rules include process 490 for the reception of a 'Completed unexecutable/permit required' 814_28 transaction shown in FIG. 4L. In receive step 491, a 814_28 'Completed unexecutable/permit required' transaction appears as a transaction record in transaction table 183, having been received by market importer 181. The ESI ID in the 814_28 transaction record is checked for a match to REP customer ESI IDs in CDR 152 in step 493. If there is no match with a customer ESI ID, an 814_29 'Response to completed unexecutable/permit required' transaction is sent in step 495 including a 'reject' code from the REP 130 to the ISO partners 110.

In step 493, if customer record 492 in CDR 152 matches the ESI ID, then in step 494 the associated transaction record is placed in 'displayed' worklist 497. Following step 494, an 814_29 'Response to completed unexecutable/permit required' transaction is sent in step 498 including an 'accept' code from the REP 130 to the ISO partners 110. After either the 'accept' or 'reject' responses are sent to ISO partners 110, steps 498 or 495, respectively, the business rule process 490 ends in end step 499. At a later time, the 'Displayed' worklist 497 is opened for viewing and the reason code and reasons description contained in the 814_28 transaction record are displayed in step 496.

Figure 4M:
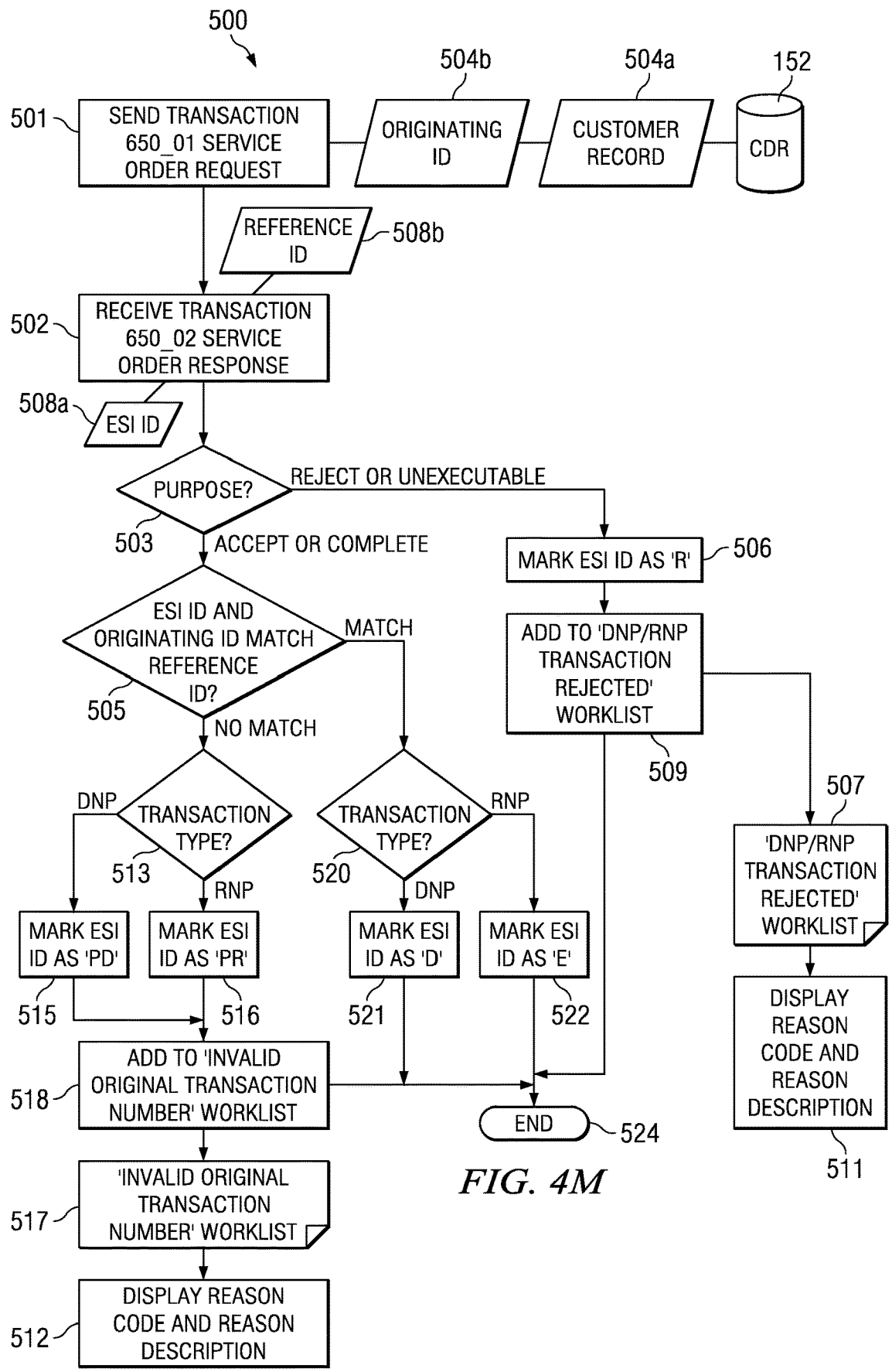

FIG. 4M shows the business rule process 500 for an inbound "Service Order response" 650_02 transaction. The 'Service Order request' step 501 is executed by REP 130 wherein a 650_01 transaction is sent to ISO partners 110, the 650_01 transaction initiating a 'Service Order' process in which a customer contracts to receive service. A customer record 504a is created in CDR 152 in which a unique ESI ID and originating ID 504b is stored. In receive step 502, a 650_02 'Service Order Response' transaction appears as a transaction record in transaction table 183, having been received by market importer 181 and including a reference ID 508b and ESI ID 508a. In purpose step 503, the purpose code is read from the 650_02 transaction as 'reject', 'unexecutable', 'accept', or 'complete'.

If the 650_02 purpose code is 'reject' or 'unexecutable', then the ESI ID status in the customer record 504a corresponding to ESI ID 508a is marked in step 506 with 'R' (rejected) and in step 509, the 650_02 transaction record is placed in 'DNP/RNP transaction rejected' worklist 507. The reason code and reason description are displayed in step 511 at a later time after opening and reviewing the 'DNP/RNP transaction rejected' worklist 507. The business rule process 500 then ends with end step 524.

If the 650_02 purpose code is 'accept' or 'complete' in step 503 and reference ID 508b is found to match originating ID 504b in customer record 504a in step 505 and ESI ID 508a matches the ESI ID in customer record 504a, then the transaction type is checked in step 520 for DNP (disconnect for non-pay) or RNP (reconnect for non-pay). If the transaction type is DNP (disconnect for non-pay) then the ESI ID status in customer record 504a is marked in step 521 as 'D' (DNP). If the transaction type is RNP (reconnect for non-pay) then the ESI ID status in customer record 504a is marked in step 522 as 'E' (RNP).

If the 650_02 purpose code is 'accept' or 'complete' in step 503 and reference ID 508b does not match any originating ID in customer records of CDR 152 in step 505, then the transaction type is checked in step 513 for DNP (disconnect for non-pay) or RNP (reconnect for non-pay). If the transaction type is DNP (disconnect for non-pay) then the ESI ID status in the customer record 504a having ESI ID 508a is marked in step 515 as 'PD' (pending DNP). If the transaction type is RNP (pending RNP) then the ESI ID status in the customer record having ESI ID 508a is marked in step 516 as 'E' (RNP). After either step 515 or step 516 the transaction record is added in step 518 to the 'invalid original transaction number' worklist 517. The business rules process 500 ends in any of the above cases after step 509, step 521, step 522 or step 518 with end step 524. At a later time, the 'invalid original transaction number' worklist 517 is opened for viewing and the reason code and reason description are displayed in step 512.

ITP 182 business rules include process 530 for the reception of a 'Suspension of delivery notification or cancellation' type 650_04 transaction shown in FIG. 4N. In receive step 532, a 650_04 'Suspension of delivery notification or cancellation' transaction appears as a transaction record in transaction table 183, having been received by market importer 181. The ESI ID in the 650_04 transaction record is checked for a match to REP customer ESI IDs in CDR 152 in step 533. If there is no match with any customer ESI ID, the business rule process 530 is ended in end step 539. In step 533, if a customer record 534 matches the ESI ID, then the associated 650_04 transaction record is placed in 'Suspension of service notification' worklist 537 by step 536. The purpose code and reason description may be displayed in step 538 at a later time after opening and reviewing the 'Suspension and service notification' worklist 537. The business rule process 530 ends with end step 539.

Figure 5:
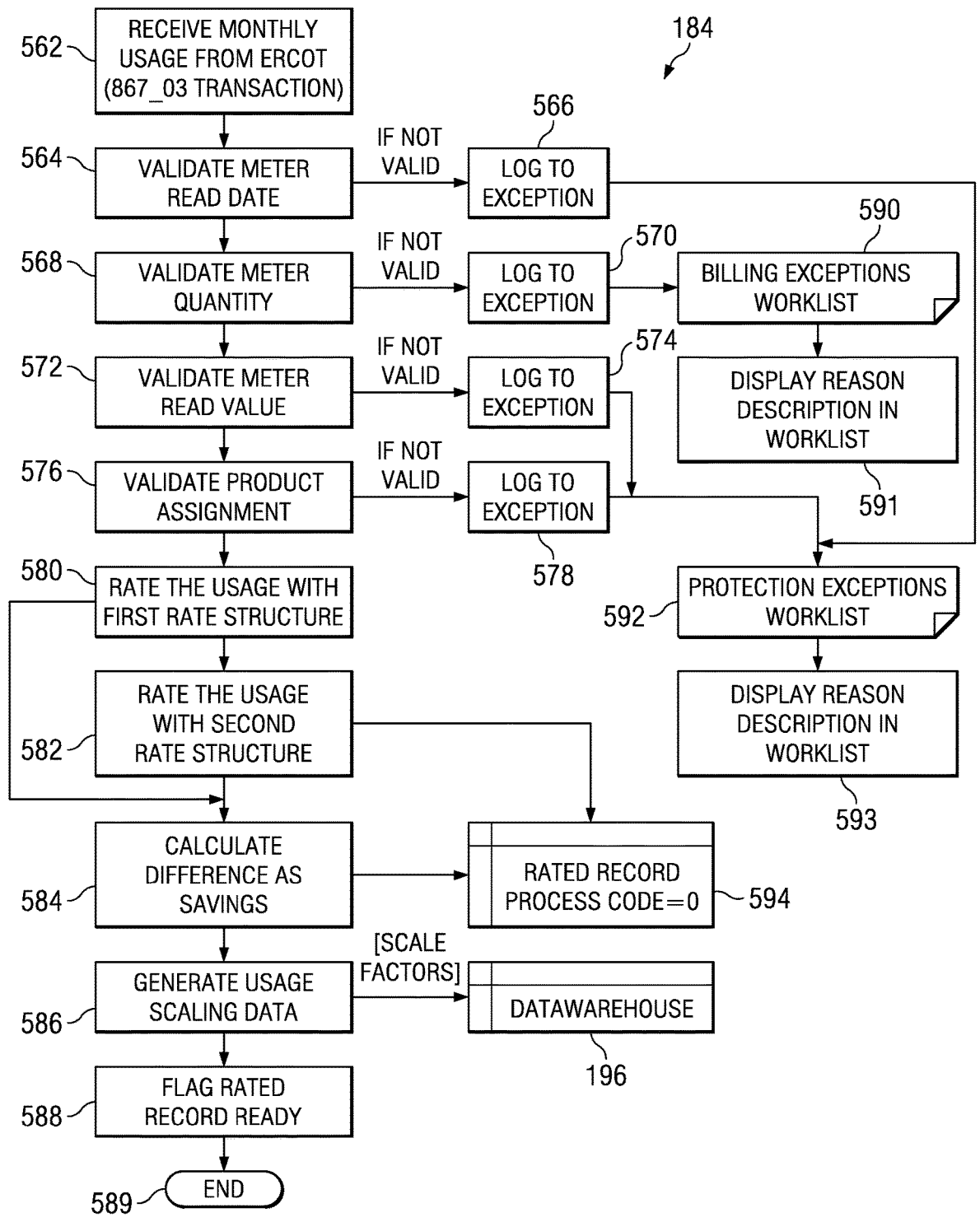
FIG. 5 is a block diagram of the rating process of the preferred embodiment of the present invention.

FIG. 5 is a flowchart of usage rating process 184 rules and functions. Usage rating process 184 begins with transaction step 562 when a monthly usage transaction of type 867_03 appears as a transaction record in transaction table 183, having been received by market importer 181. Usage is equivalent to energy consumption in kWh. Usage rating process 184 runs approximately every 4 hours in the preferred embodiment of the present invention. In the paragraphs to follow, current usage is the usage reported in the 867_03 transaction as 'quantity delivered'.

Usage rating process 184 continues with the step 564 of validating the meter read date in the 867_03 transaction. If the meter read start date is less than the meter read end date then the meter read date is valid and the following step 568 is performed. If the meter read date is not valid then a notice is logged to exception in step 566 where the transaction record is placed in the protection exceptions worklist 592.

Step 568 validates the quantity of the meter reading in the 867_03 transaction wherein if the meter quantity value is found to be greater than zero, then the meter quantity is considered to be valid and the following step 572 is performed. If the meter quantity is not valid then a notice is logged to exception in step 570 where the transaction record is placed in the billing exceptions worklist 590.

Step 572 validates the meter read value in the 867_03 transaction wherein if the meter read start value is found to be greater than meter read end value as long as product transfer type code is not 'BD' (demand type), then the meter read value is considered to be valid and the following step 576 is performed. If the meter read value is not valid then a notice is logged to exception in step 574 where the transaction record is placed in the protection exceptions worklist 592.

Step 576 validates the product assignment in the 867_03 transaction wherein if the customer record with ESI ID contained in the 867_03 transaction has a valid rate product assigned to it then the product assignment is considered to be valid and the following step 580 is performed. If the customer is not assigned a proper rate product then a notice is logged to exception in step 578 where the transaction record is placed in the protection exceptions worklist 592.

First rating step 580 rates the current usage by applying a first provider's rate structure to the usage to calculate a first usage cost to the customer. In the preferred embodiment, a rate, in cost per unit usage, is multiplied by the meter read value, although more complicated rate structures are conceived based upon the given rate structure for a given provider.

Second rating step 582 rates the current usage by applying a second provider's rate structure to the usage to calculate a second rated usage cost to the customer. The second provider in the preferred embodiment is REP 130 and the rate structure is based on the customer's assigned product rate structure as checked in step 580. The second rating step 582 creates a rated record 594 in which the customer ID, usage and second rated usage cost is stored along with an initial rating process code having value equal to 0 (zero). Step 584 calculates the difference between the first rated usage and the second rated usage and stores that value in the rated record 594.

Scaling factors are generated in scaling process 586; a scale factor describing a multiplier between an average backcasted usage from ISO partners 110 and the marking interval usage derived for vector read values for the customer. Backcasting is a process wherein the ISO averages the usage of ESI IDs in similar weather zones to create an average usage profile for that weather zone. Scaling process 586 will be described further in relation to FIG. 18.

Scale factors generated in scaling process 586 are stored in data warehouse 196 for further use by wholesale forecasters. Wholesale forecaster will be described further in relation to FIG. 19.

The final step in usage rating process 184 is the step 588 of setting a system flag to indicate that a rated record is available for further processing. The rating process ends in end step 589. At a time after usage rating process 184 completes, the 'billing exceptions' worklist 590 is opened for viewing being displayed in step 591. Similarly, the 'protection exceptions' worklist 592 is opened at a later time for viewing being displayed in step 593.

Figure 6:
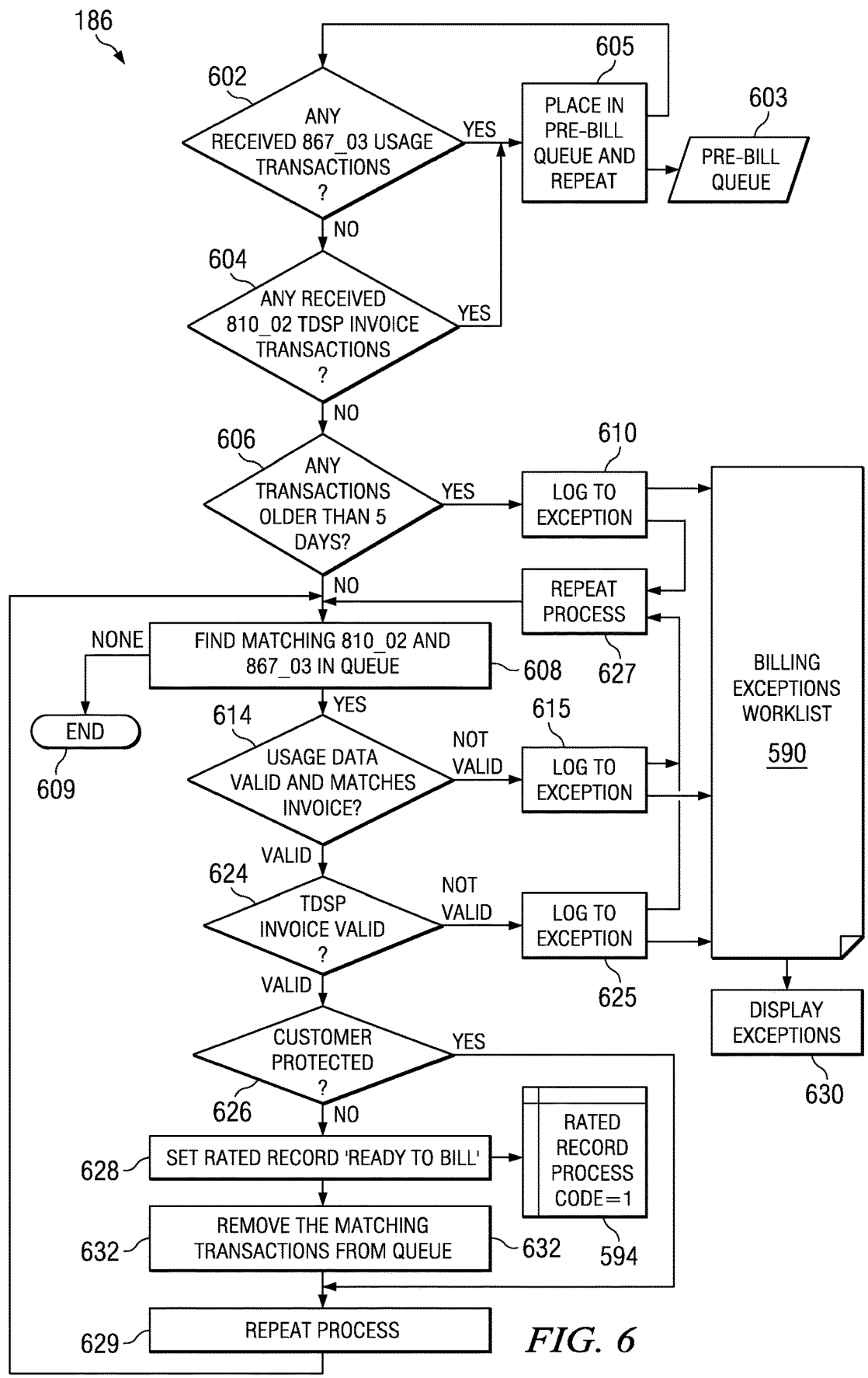
FIG. 6 is a block diagram of the pre-bill quality control process of the preferred embodiment of the present invention.

Pre-bill QC process 186 is described in flowchart form in FIG. 6. Pre-bill QC process 186 runs approximately once per day. Pre-bill QC starts by checking for 867_03 monthly usage transactions in transaction table 183. Pre-bill QC process 186 in step 602 checks if a 867_03 monthly usage transaction is available, and if available then a record of the 867_03 transaction is placed in a pre-bill queue 603 in step 605. The process is repeated at step 602 until no more 867_03 transactions are available in transaction table 183. Then pre-bill QC process 186 checks the transaction table 183 for newly downloaded TDSP invoice 810_02 type transactions in step 604. If an 810_02 transaction is available, then a record of the 810_02 transaction is placed in a pre-bill queue 603 in step 605. The process is repeated at step 602 until no more 867_03 transactions or 810_02 transactions are available in transaction table 183.

At step 606, the pre-bill queue is checked for transaction records that have been queued for more than 5 (five) days. If a transaction record is more than five days old, then a log to exception is created in step 610 and a record is created in 'Billing exceptions' worklist 590 which may be viewed by system operators at a later time in step 630. Pre-bill QC process 186 then continues to step 608 of querying pre-bill queue 603 for matching 810_02 and 867_03 transactions records, a match occurring whenever the 810_02 and 867_03 refer to the same ESI ID. If a match is not found in the pre-bill queue 603 then pre-bill QC process 186 ends at step 609.

If a match is found in step 608, then pre-bill QC process 186 continues to operate on the matched 867_03 transaction and 810_02 transaction pair so as to complete the quality check process for a bill that is to be created in billing process 188.

Pre-bill QC process 186 continues by validating usage data from the 867_03 transaction in validate usage data process 614. If the usage data is found to contain errors or does not match the usage assumed in the TDSP Invoice, then the usage data is not valid and an exception is logged in step 615. The exception is logged by posting a transaction record to the 'Billing exceptions' worklist. If the usage data is determined to be valid in validate usage data process 614 then the 810_02 TDSP invoice is checked for validity in process 624. If the invoice is not valid then an exception is logged in step 625 wherein a transaction record is posted to the 'Billing exceptions' worklist. After any of the exception steps 610, 615 and 625, pre-bill QC process 186 repeats 627 at step 608 to find another matching 810_02 and 867_03 invoice.

If the TDSP invoice is validated then the customer record in CDR 152 associated with ESI ID in the 867_03 usage transaction is checked for customer protected status. If the customer is protected then pre-bill QC process 186 repeats 629 at step 608 to find another matching 810_02 and 867_03 invoice. "Protected status" occurs in situations where collections efforts are to be delayed, such as a customer in bankruptcy.

A rated record 594 associated with the matched 867_03 transaction was previously created by a run of the usage rating process 184. In the case that the customer is not protected at step 626 and can be billed for usage then the associated rated record 594 status is changed to 'Ready to Bill' in step 628 by setting process code equal to unity (=1). After the rated record is made 'Ready to Bill', then in step 632, the matched 810_02 and 867_03 transaction records are deleted from pre-bill queue 603 and pre-bill QC process 186 repeats 629 at step 608 to find another matching 810_02 and 867_03 invoice.

Figure 7:
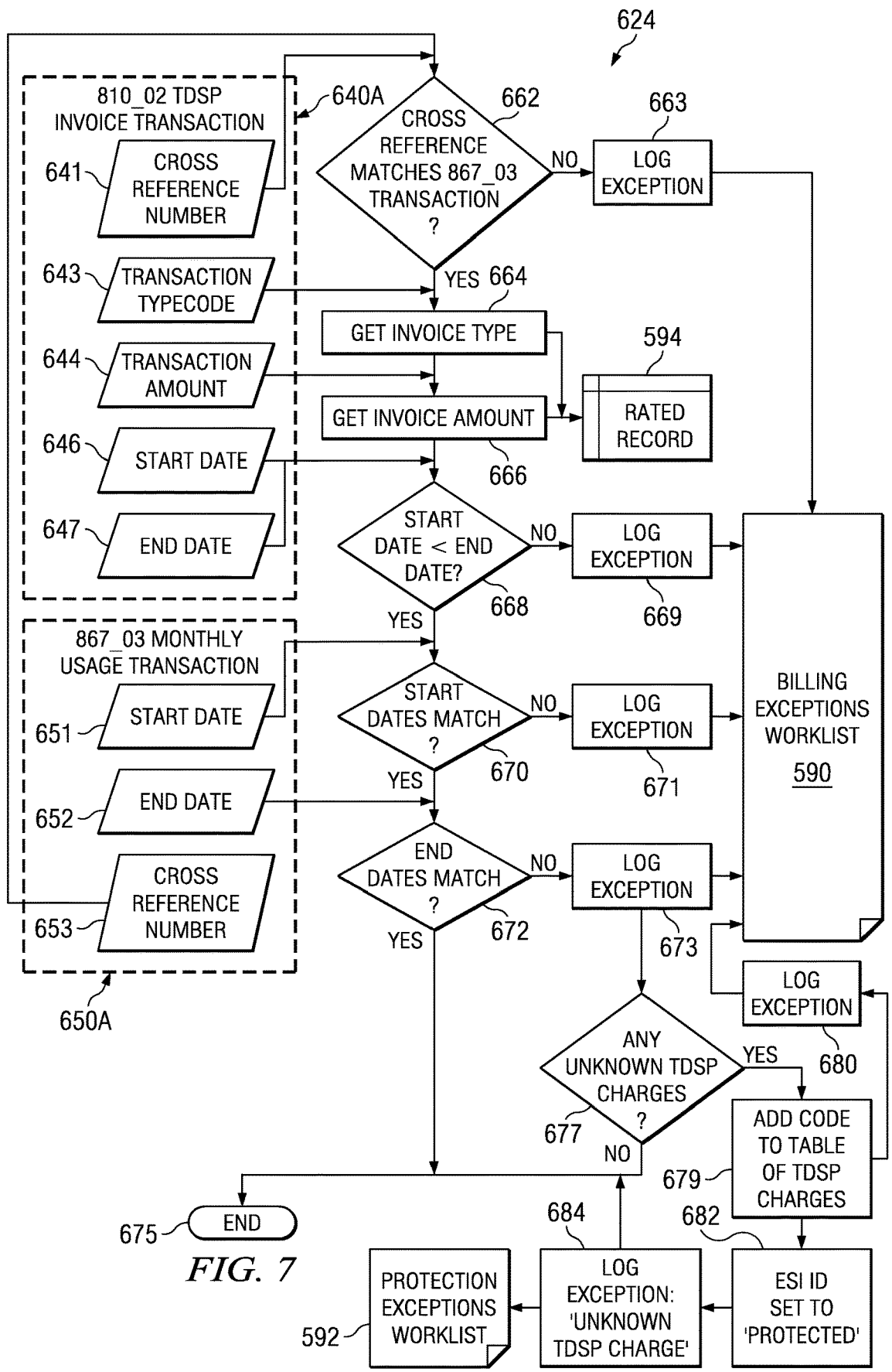
FIG. 7 is a block diagram of the TDSP invoice validation method of the pre-bill QC process in the preferred embodiment of the present invention.

FIG. 7 shows a flowchart for 'validate TDSP invoice' process 624. The process works with two transactions, the 810_02 TDSP invoice 640A and 867_03 monthly usage data 650A. The 810_02 TDSP invoice 640A contains at least a cross reference number 641, a transaction typecode 643, a transaction amount 644, a start date 646 and an end date 647. The 867_03 monthly usage transaction 650A contains at least a start date 651, an end date 652 and a cross reference number 653. The first step 662 in 'validate TDSP invoice' process 624 is to check the cross reference number 641 for a matching cross reference number 653. If the cross reference numbers do not match then an exception is logged in step 663 to the "Billing exceptions" worklist 590. Those familiar with ERCOT's Texas SET will recognize that the cross reference number 641 is the field BIG05 in an 810_02 transaction set and the cross reference number 653 is the field BPT02 in an 867_03 transaction set in the preferred embodiment of the present invention.

'Validate TDSP invoice' process 624 continues by getting the invoice type in step 664 from the transaction typecode 643. The invoice type is stored in the rated record 594 associated to the 867_03 transaction 650A. Valid invoice types are inclusive of those contained in the Texas Set which are 'PR' product (monthly usage), 'FB' (final bill), 'BD' (balance due) and '26' (miscellaneous). After the invoice type is stored the step 666 is performed wherein transaction amount 644 is stored in rated record 594. The start date 646 is then compared to the end date 647 in step 668: if start date is greater than or equal to the end date then an exception is logged step 669 to the "Billing exceptions" worklist 590; if start date is less than or equal to end date then the process continues with step 670.

'Validate TDSP invoice' process 624 continues by checking, in step 670, that the start date 651 matches the start date 646; if the two dates do not match then an exception is logged step 671 to the "Billing exceptions" worklist 590; if the start dates do match then the process continues.

'Validate TDSP invoice' process 624 continues by checking, in step 672, that the end date 652 matches the end date 647; if the two dates do not match then an exception is logged in step 673 to the "Billing exceptions" worklist 590; if the end dates do match then—'Validate TDSP invoice' process 624 ends at step 675.

After the exception is logged in step 673 then TDSP invoice 640A is checked for any unknown TDSP charges. If there are no unknown TDSP charges in step 677 then 'Validate TDSP invoice' process 624 ends at step 675. If there are unknown TDSP charges in step 677 then the unknown charge code is added in step 679 to a table of TDSP charges contained in SQL database engine 150 and an exception is logged 680 to the 'Billing exceptions' list to the effect that there was an unknown TDSP charge involved in the TDSP Invoice transaction 640A. Furthermore, after step 679 the associated customer ESI ID is set to 'Protected' in step 682, an exception is logged to 'Protected exceptions' worklist 592 in log exception step 684 and the 'Validate TDSP invoice' process 624 ends at step 675.

After each exception is logged to 'Billing exceptions' worklist in steps 663, 669, 671, and 673 'Validate TDSP invoice' process 624 ends.

Figure 8:
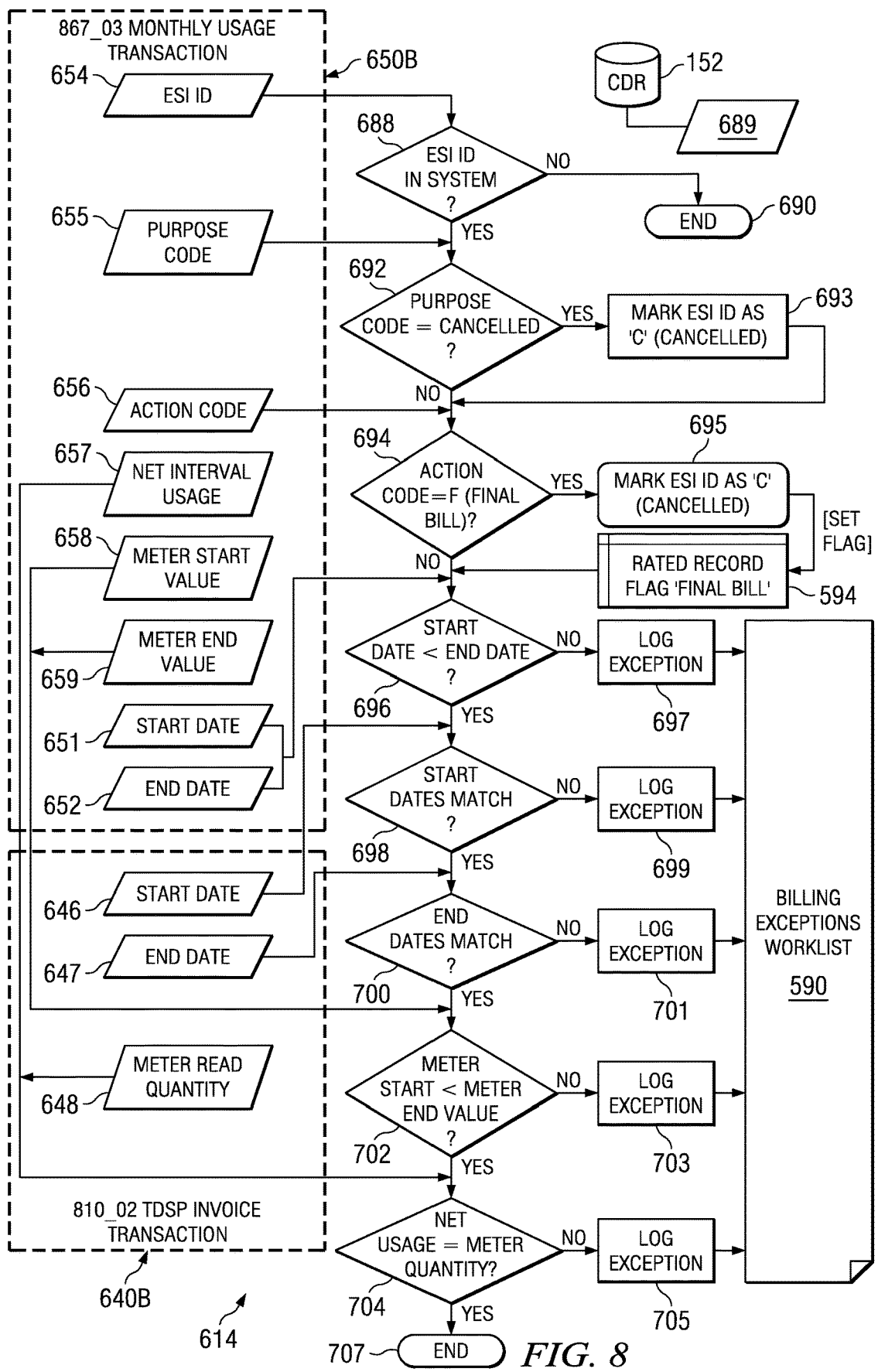
FIG. 8 is a block diagram of the usage data validation method of the pre-bill QC process in the preferred embodiment of the present invention.

FIG. 8 shows a flowchart for the 'validate usage data' process 614. The process works with two transactions, the 810_02 TDSP invoice 640B and 867_03 monthly usage data 650B. The 810_02 TDSP invoice 640B contains at least a meter read quantity 648, a start date 646 and an end date 647. The 867_03 monthly usage transaction 650B contains at least an ESI ID 654, purpose code 655, action code 656, net interval usage 657, meter start value 658, meter end value 659, a start date 651 and an end date 652.

In step 688 of 'validate usage data' process 614, ESI ID 654 is checked against REP customer ESI ID numbers in CDR 152. If no matching ESI ID is found, then validate user data ends at step 690, otherwise, in step 688, a customer record 689 in CDR 152 is found to match the ESI ID and the process continues with step 692 in which purpose code 655 is checked for 'cancelled' status. If purpose code 655 is 'cancelled' then the customer record 689 is marked 'C' in step 693 and the process continues with step 694. If purpose code 655 is not 'cancelled' in step 692, the 'validate usage data' process continues with step 694.

In step 694 of 'validate usage data' process 614 the action code 656 is checked for 'final bill' status: If the action code 656 is 'final bill' then the ESI ID in customer record 689 in step 695 is marked 'C' and a 'FINAL BILL' flag is set in rated record 594 after which the process continues with step 696. If the action code 656 is other than 'final bill' then the 'validate usage data' process continues with step 696.

In step 696 of 'validate usage data' process 614 the start date 646 is compared to the end date 647; if start date is less than the end date then an exception is logged step 697 to the "Billing exceptions" worklist 590; if start date is greater than or equal to end date then the 'validate usage data' process continues.

'Validate usage data' process 614 continues by checking, in step 698, that the start date 651 matches the start date 646; if the two dates do not match then an exception is logged step 699 to the "Billing exceptions" worklist 590; if the start dates do match then the 'validate usage data' process continues.

'Validate usage data' process 614 continues by checking, in step 700, that the end date 652 matches the end date 647; if the two dates do not match then an exception is logged step 701 to the "Billing exceptions" worklist 590; if the end dates do match then the 'validate usage data' process continues.

In step 702, meter start value 658 is compared to meter end value 659: if meter start value is greater than meter end value then an exception is logged step 703 to the 'Billing exceptions' worklist 590; if the meter start value 658 is less than or equal to the meter end value 659 then the 'validate usage data' process continues.

In step 704, net interval usage 657, which is typically the monthly usage amount, is checked to be equal to the meter read quantity 648: if meter read quantity 648 and net interval usage 657 are not equal then an exception is logged step 705 to the 'Billing exceptions' worklist 590; if the meter read quantity 648 is equal to the net interval usage 657 the 'validate usage data' process ends at step 707. After any of log exception steps 697, 699, 701, 703 and 705 are executed the 'validate usage data' process 614 ends.

Figure 9:
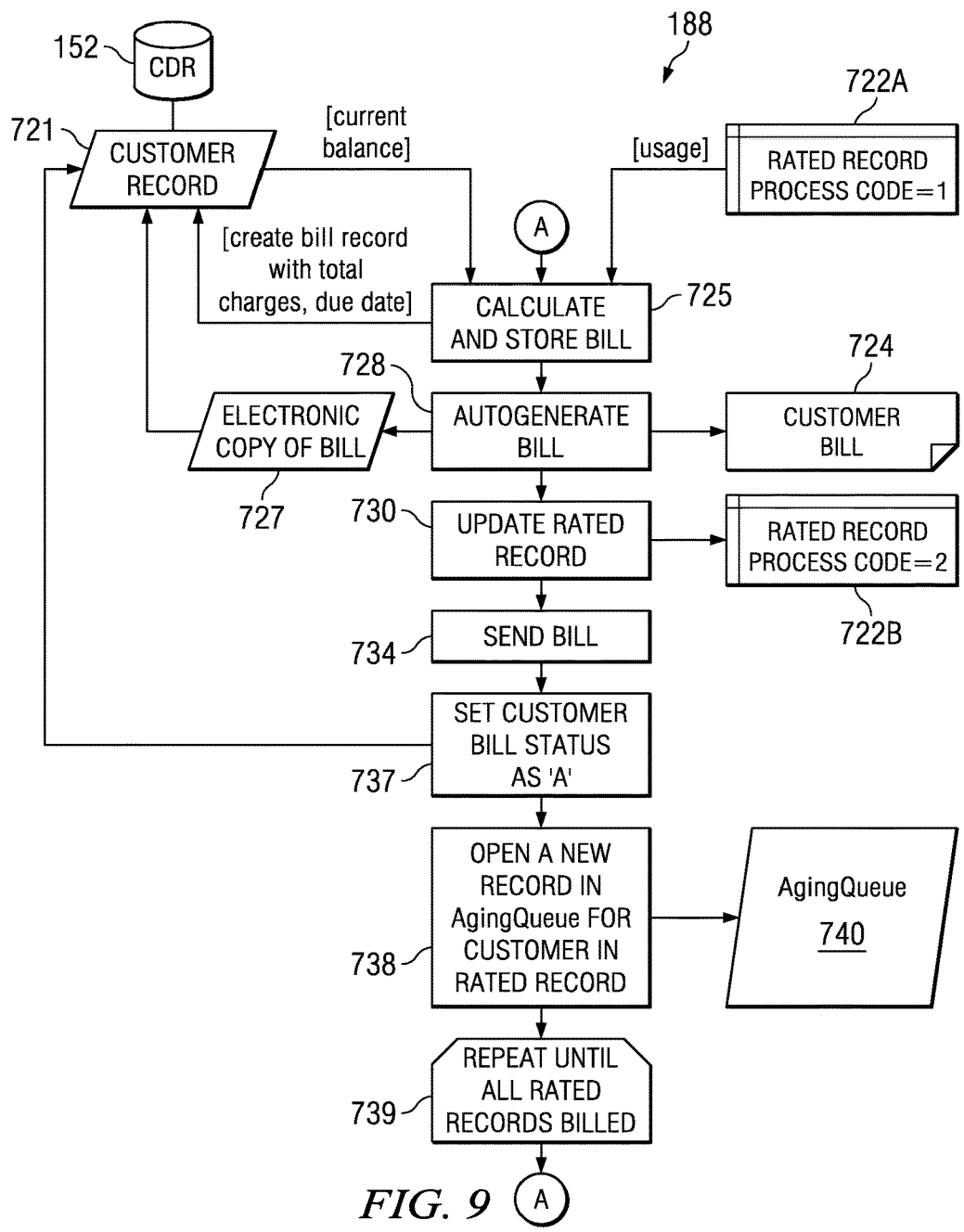
FIG. 9 is a block diagram of the billing process of the preferred embodiment of the present invention.

FIG. 9 shows a flowchart for billing process 188. Billing process 188 operates on the basis that usage rating process 184 and pre-bill QC process 186 have previously executed and that a rated record 722A with process code=1 ('Ready for billing') is available, the rated record 722A being associated to a customer record 721 in CDR 152.

In step 725 of billing process 188 a customer bill is calculated by adding the current balance and the total charges from the rated usage in rated record 722A; then an associated bill record including at least the summed balance and total charges and a due date is added to customer record 721. A customer bill 724 is automatically generated in step 728 in which an electronic copy of the bill 727 is stored in customer record 721. The following step 730 then updates the rated record 722A to rated record 722B by setting the process code equal to two (2) signaling to system 100 that customer bill 724 is 'Ready to send'. In step 734, customer bill 724 is sent to the customer. In the preferred embodiment customer bill 724 may be printed and sent by regular paper mail to the customer's service address or customer bill 724 may be emailed to the customer's email address as determined by the customer.

Once customer bill 724 has been sent in step 734 the bill status field in the customer record 721 is set to 'A' in step 737, signaling system 100 that customer record 721 has a bill in accounts receivable. Then a new AgingQueue record in AgingQueue 740 is created in step 738, the new AgingQueue record being associated to the customer record 721 by a customer ID number. After the AgingQueue record has been created the billing process 188 is repeated 739 by continuing step 725 and following subsequent steps in order until all the current rated records with process code=1 have been billed.

Figure 10:
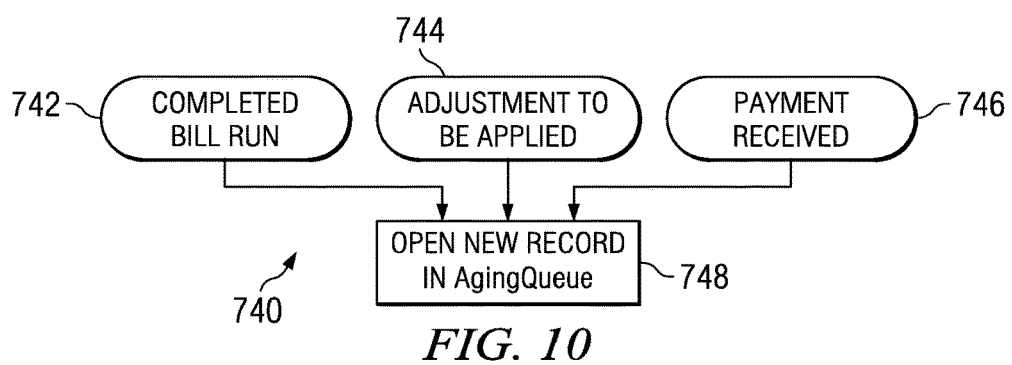
FIG. 10 is a block diagram of the AgingQueue used in the aging process of the preferred embodiment of the present invention.

FIG. 10 is a diagram of the AgingQueue 740 showing that, in the preferred embodiment of the present invention, a new AgingQueue record 748 is created when any one of three events occur: a billing completed event 742 in which billing process 188 operates on a rated record to create a bill as in step 738 of FIG. 9; an adjustment event 744 in which an adjustment is to be applied to the customer bill; and a payment received event 746 in which a payment has been received by a customer.

Figure 11:
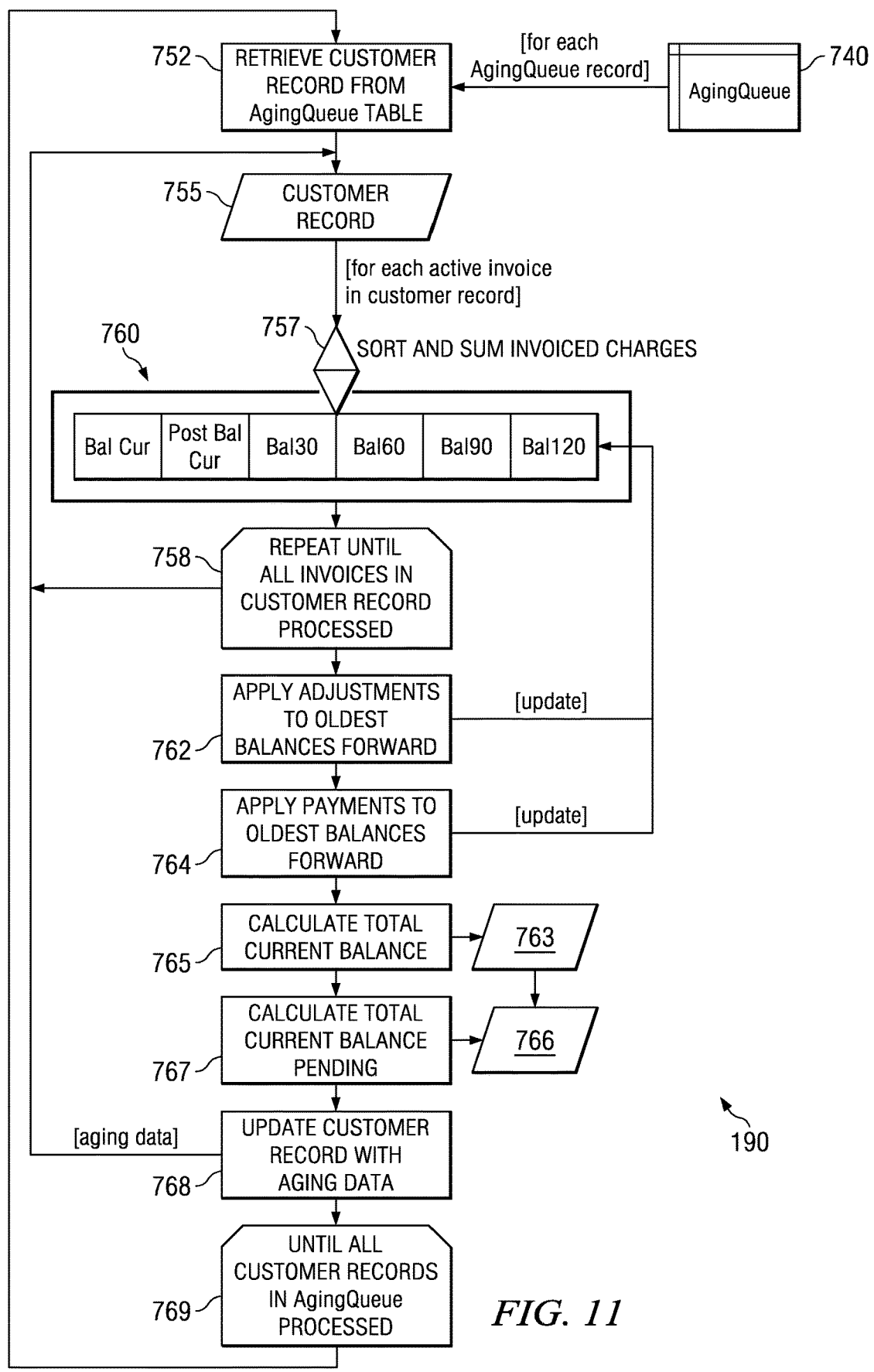
FIG. 11 is a block diagram of the aging process of the preferred embodiment of the present invention.

The AgingQueue 740 is used extensively in the Aging process 190 shown in the flowchart of FIG. 11. Aging process 190 operates on the records contained in Aging-Queue 740 preparing each customer record associated with each AgingQueue record for possible treatment in the case that customer payments have not been received in a timely manner. Aging process 190 begins with the step 752 of retrieving a customer record 755 associated to an AgingQueue record. In step 757, the oldest active invoice in customer record 755 is sorted into charges that are current, post-current (between 17 days and 30 days in the preferred embodiment), 31-60 days past due, 61-90 days past due, 91-120 days past due and 120 days or more past due. The sorted amounts are stored in accumulator bins labeled 'BalCur', 'Post BalCur', 'Bal30', 'Bal60', 'Bal90' and 'Bal120', respectively, in aging array 760. The process is repeated in step 758 for all active invoices in the customer record, with the sorted charges from each subsequent invoice being summed into the stored amounts in the appropriate accumulator bins of aging array 760. An active invoice in the preferred embodiment is a customer bill contained in the customer record 755 with the bill status field marked 'A'. In step 765, the total current balance 763 is computed as the sum of all accumulator bins after payments and adjustments.

Once all of the invoices for customer record 755 have been sorted and summed the aging process 190 continues with the step 762 of applying adjustments wherein the adjustments are applied to the oldest balance bin in the aging array forward until each balance is zero. An example of an adjustment is an adjustment from an estimated meter read to an actual meter read from a final bill. After adjustments are applied, the step 764 of applying all received payments is performed wherein payments received by the customer associated to customer record 755 are applied beginning with the oldest balance bin forward in the aging array until each balance is zero.

In step 767 the total current balance pending 766 is calculated, the total current balance pending 766 being the difference of total current balance 763 and any payments pending that are in process. Excess payment or adjustments may cause the total current balance 763 or total current balance pending 766 to be a credit. Upon calculating the balances in the aging array and the total current balance pending 766, the step 768 is performed in which customer record 755 fields associated to 'Bal Cur', 'Post BalCur', 'Bal30', 'Bal60', 'Bal90' and 'Bal120' are updated with the aging array 760 data, the total current balance 763 and the calculated total current balance pending. In step 769 the aging process 190 repeats beginning with step 752 for all customer records in the AgingQueue 740.

Treatment process 192 is now described with the help of FIG. 2 and FIGS. 10-12. Treatment process 192 runs as a Windows Service written in C# (.Net) and in the preferred embodiment runs nightly at 12:30 am. The treatment process 192 begins examining bills during a post-bill period of time which is measured from the time the bill status is marked 'A' for a billed customer with a customer record in CDR 152. Subsequently the bill goes through aging process 190 and the various balances are updated and posted in the customer record as described for aging process 190. The due date stored in the customer record is set to a given number of days, the given number of days defining the post bill period. A grace period extending the time of the post bill period until an unpaid bill is considered "in treatment" is predetermined by the associated customer's Dunning number. A post bill period of 16 days is used in the preferred embodiment. Grace periods are in the range of zero to nine days in the preferred embodiment.

Dunning numbers are used in the treatment process, the Dunning number being a credit scoring mechanism known in the art for rating the customer with an integer Dunning number of 1 to 4 with 1 being the lowest credit score, 3 being the highest credit score.

Figure 12:
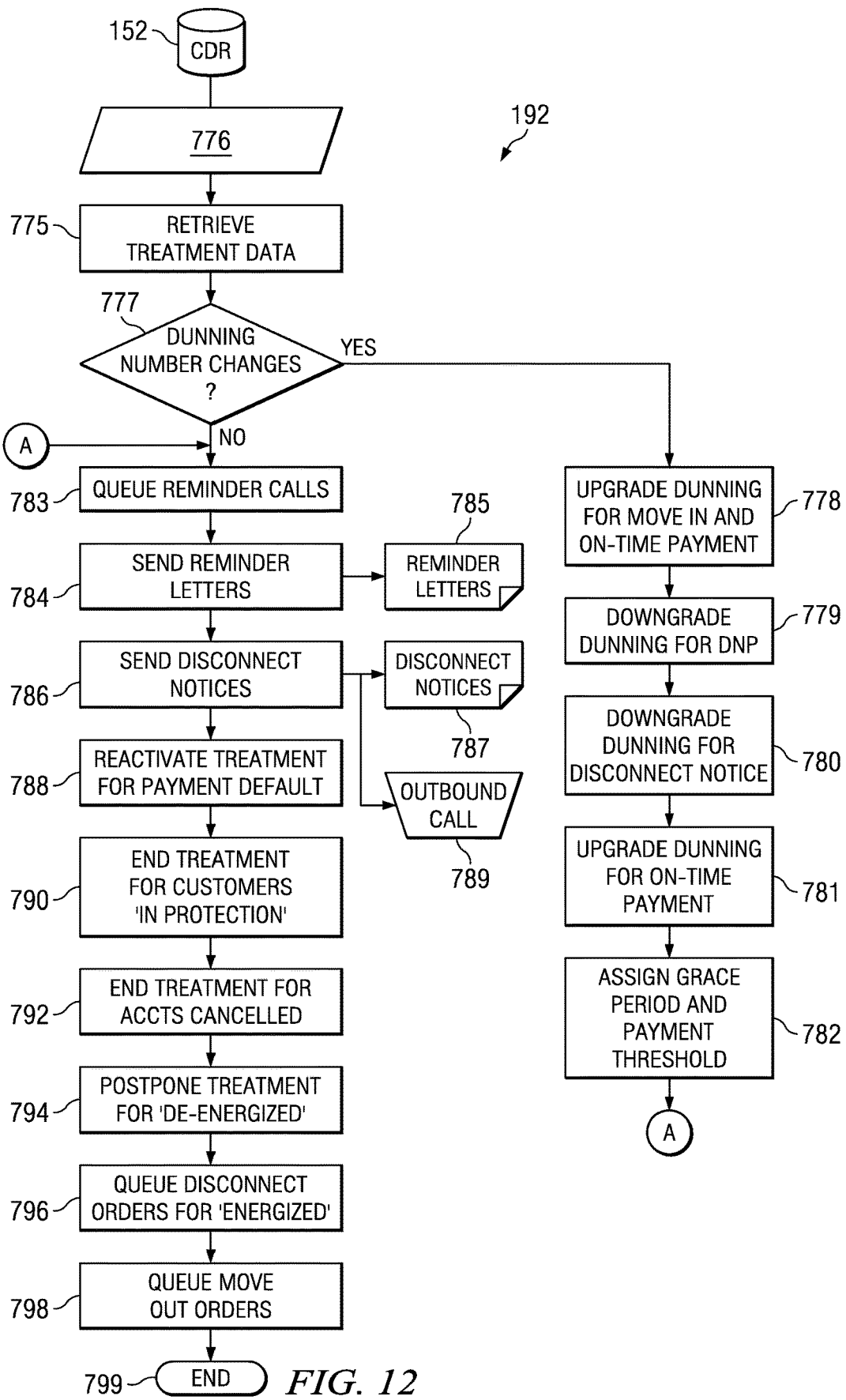
FIG. 12 is a block diagram of the customer treatment process of the preferred embodiment of the present invention.

FIG. 12 is a flowchart showing the treatment process 192 in the preferred embodiment of the present invention. In step 775, treatment data 776 is retrieved from customer records in CDR 152 for which bill status is marked 'A' for accounts receivable. Treatment data 776 includes billing and payment information from billing process 188 and from Aging process 190. Treatment data 776 also holds a recorded "Dunning" number for each customer record. Treatment data 776 holds a number of customer records which are processed by the steps that follow.

Dunning check step 777 checks, for each customer record in treatment data 776, for necessary changes to each customer's Dunning number. If in the current billing period, a customer has had a recent 'move in', has had a 'disconnect for non-payment', has had a disconnect notice sent during the billing period, or has had three or more non-stub bills paid on time, then the customer's Dunning number will be changed beginning with upgrade step 778. Otherwise, the customer's Dunning number remains the same and the process continues with step 783 after all other customer records in treatment data 776 have been checked in step 777. Upgrade step 778 increases a customer's Dunning number if they recently moved in and have Dunning numbers of 2 or 3 and if the customer has paid their first three bills on time. Downgrade step 779 decreases a customer's Dunning number to 1 if currently at Dunning numbers 2 or 3 and if the customer was disconnected for non-pay (DNP) and was reconnected. Downgrade step 780 decreases a customer's Dunning number by 1, if currently at Dunning numbers 2 or 3 and if customer has two or more disconnect notices with no DNP. Upgrade step 781 increases a customer's Dunning number from 2 to 3 when a customer pays the previous three bills on-time. At step 782, a grace period (in days) is set according to a table for each Dunning number and a minimum payment threshold is established for each customer record. The module then moves to step 783.

Queue reminder calls step 783 queues payment and agreement reminder calls for customers on a deferred payment plan who have not returned a signed contract agreement. In the preferred embodiment, step 782 looks for such customers five (5) days prior to the end of the post-bill period.

Treatment process 192 continues with reminder letter step 784 wherein payment reminder letters 785 are sent to customers whose invoice is past due during the grace period, skipping customers who have not ever been in treatment steps or beyond and who have three recent bills paid up.

In disconnect letter step 786, customer disconnect letters 787 are sent and outbound calls 789 are made to those customers whose bill is past due beyond the grace period if the customer is not already "in treatment". Customers who receive a disconnect letter 787 or outbound call 789 in step 786 have a customer status field marked as being "in treatment". In the preferred embodiment disconnect letters 787 may be in the form of an email if the customer's email address is present in the customer record. A disconnect date is established in disconnect letter step 786.

Reactivate step 788 reactivates treatment for those customers who have defaulted on their payment plan.

First end treatment step 790 cancels pending disconnect and move out orders, if present, and removes the customer from being "in treatment" for all customers who have been placed in the status of "in protection" by another system process.

Second end treatment step 792 cancels pending disconnect and move out orders, if present, and removes the customer from being "in treatment" for all customers whose accounts have been cancelled.

Postpone treatment step 794 postpones the disconnect date for customers who are already disconnected and are not in "energized" status where "energized" means that electricity is turned on to the meter associated to the customer.

Disconnect treatment step 796 queues disconnect orders for all customers "in treatment" wherein a disconnect date has been established in step 786 and wherein the disconnect date is due and wherein the customer status is currently "energized" or connected.

The disconnect order in the preferred embodiment is an ERCOT EDI transaction type 650_01 and is queued along with other transactions to be sent in a given business day by the transaction exporter 185 of FIG. 2. The disconnect order is confirmed by REP 130 after the disconnect pending time wherein the customer's service has been turned off by the TDSP and an ERCOT EDI transaction type 650_02 is sent to REP 130 with a 'disconnected for non-payment' DNP transaction 'Accept' response as described in the transaction business rules process 182.

After the disconnect order has been confirmed the treatment process 192 continues with move out step 798 wherein move out orders are queued for all active customers "in treatment". In move out step 798, customers which have disconnect orders confirmed more than five days prior to the current date will be queued to receive a move out order. The result of queuing a move out order for a customer is that the customer is removed as REP 130 customer of record with the ISO partners 110. Treatment process ends at end step 799.

Figure 13:
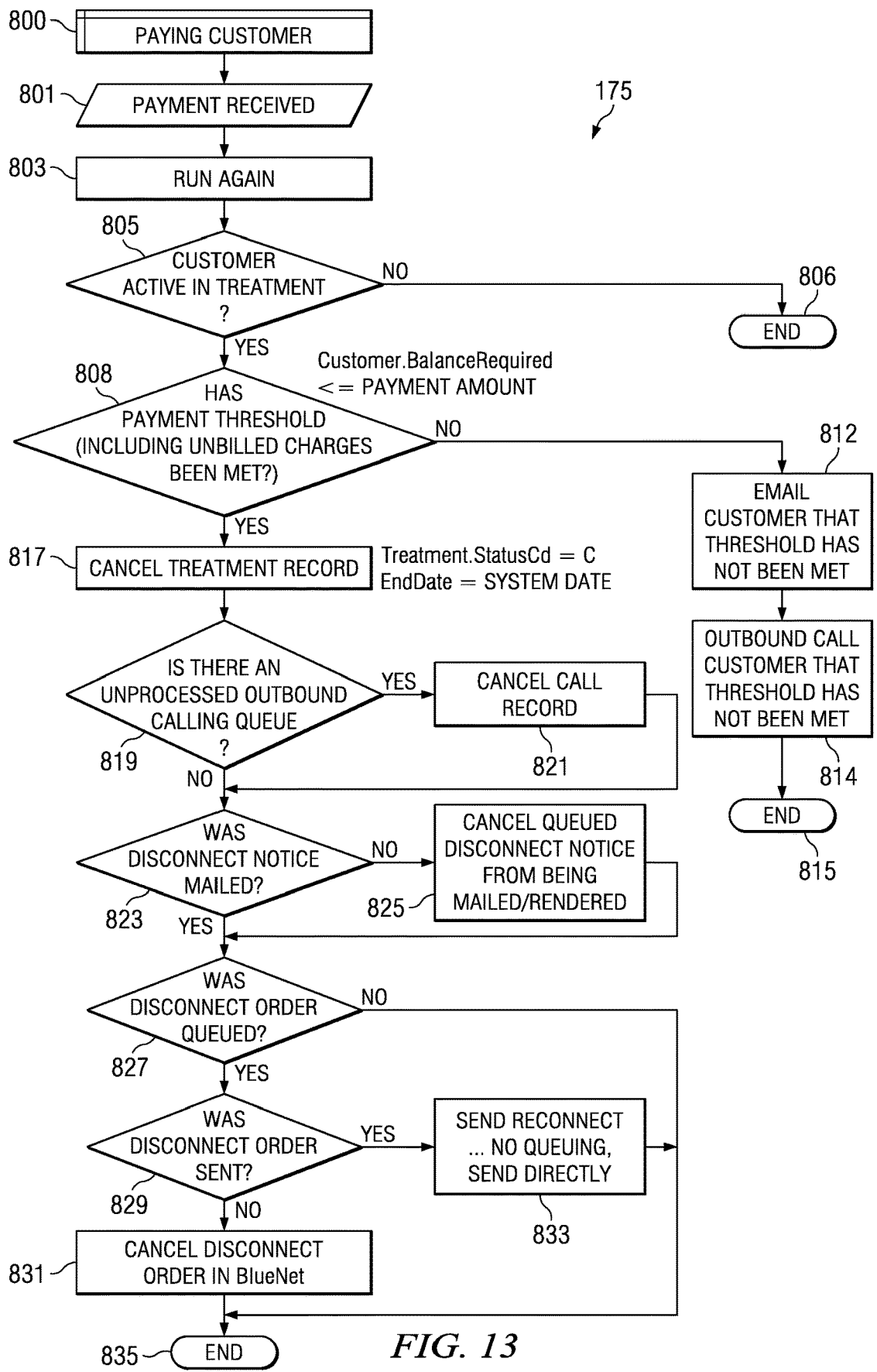
FIG. 13 is a block diagram of the payment processor of the preferred embodiment of the present invention.

FIG. 13 with the help of FIG. 2, and FIGS. 10-12, shows a flowchart of the methodology used by payment processor 175. Payment processor 175 is a service that monitors recently received payments and adjustments on customer accounts and processes any payments found at the customer level against rules. Payment processor 175 begins when a received payment 801 is associated to a paying customer 800 with a customer record in CDR 152 as shown in FIG. 2. Received payment 801 is a trigger for running Aging process 190 in step 803 since a received payment causes the creation of a new AgingQueue record in step 746 of FIG. 10. After Aging process 190 completes then treatment process 192 begins Payment processor 175 then checks in step 805 to see if the paying customer is "in treatment" status. If the paying customer is not "in treatment" status the payment processor 175 ends at step 806. If the paying customer 800 is "in treatment" status then the payment is checked in step 808 wherein if the received payment 801 is greater than or equal to the payment threshold 786 for paying customer 800 then the payment processor 175 continues by removing the customer from "in treatment" status. If the received payment is less than the payment threshold 786 for paying customer 800 then an email 812 is sent to paying customer 800 to the effect that the payment threshold has not been met. Furthermore, an outbound call queue is established for a call to be made to paying customer 800 in step 814 informing the customer that the payment threshold has not been met. The payment processor ends at step 815 after the outbound call queue is cleared.

In the case that the paying customer has been taken out of treatment in step 817 then several other steps are taken to insure that any other treatment processes underway will be cancelled. In step 819, a check for any outbound calls to paying customer 800 is made and if there is an outbound call queued then the outbound call is cancelled at step 821. If there is no outbound call queued then check step 823 is made for a disconnect notice that may have been sent to paying customer 800. If a disconnect notice was not mailed then a disconnect notice in queue is canceled 825 so that the notice is not sent. If the disconnect notice was indeed mailed in check step 823 then second check step 827 is made to ascertain if the disconnect order is queued. If the disconnect order has not been queued then payment processor 175 ends at step 835.

Once a disconnect order has been queued for paying customer 800 and check 827 verifies that this is the case, a third check step 829 is made to ascertain if the disconnect order has been sent to the associated TDSP in an EDI transaction. If the disconnect order has been sent then a reconnect order 833 is sent to the TDSP directly without queuing and the paying customer 800 will regain service. If the disconnect order has not been sent then the queued disconnect order is canceled in step 831. Payment processor 175 ends at step 835 after either step 831 or step 833.

Figure 14:
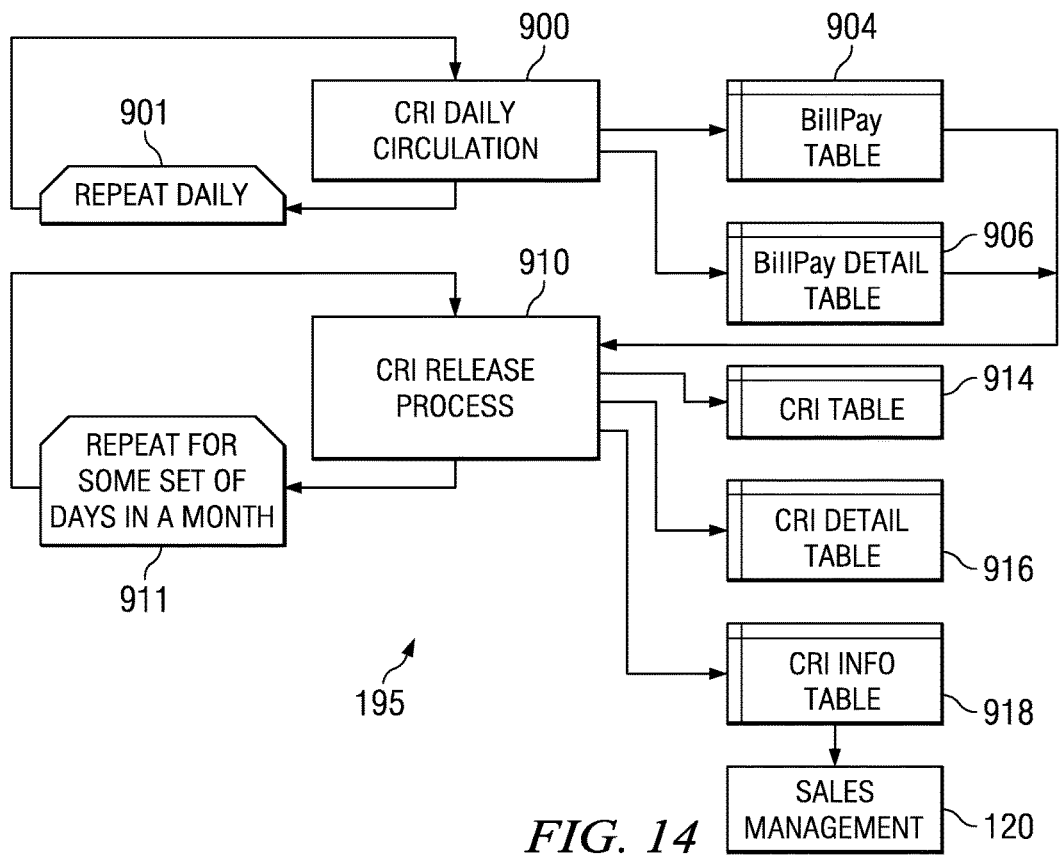
FIG. 14 is a block diagram of the customer residual income process of the preferred embodiment of the present invention.

FIG. 14 is a flowchart diagram showing the CRI 195 for releasing customer residual income including sales commissions to sales management 120 which in turn arranges to pay the sales commissions to the sales agents. CRI 195 is comprised of two primary sub-processes, CRI Daily calculation 900 and CRI Release process 910. CRI daily calculation 900 repeats daily in step 901 at 3:00 am in the preferred embodiment and operates to populate BillPay table 904 and BillPayDetail table 906. BillPay table 904 and BillPayDetail table 906 are treated as atomic in the sense that all data for the current billing month is reconstructed every time that CRI Daily calculation 900 runs.

CRI release process 910 repeats at step 911 on the 25th, 1st, 5th and 10th days of each month in the preferred embodiment and operates to populate CRI table 914, CRIDetail table 916 and CRI Info table 918. CRI table 914 and CRIDetail table 916 are treated as atomic in the sense that all data for the current billing month is reconstructed every time that CRI release process 910 runs. CRI Info table 918 is a summary data table with summary data from CRI table 914 accessible by sales management 120. Current billing month data is repopulated in CRI Info table 918 each time CRI release process 910 runs. Previous billing month data is left unaltered and is persistently stored in CRI Info table 918 in the preferred embodiment of the present invention.

Figure 15:
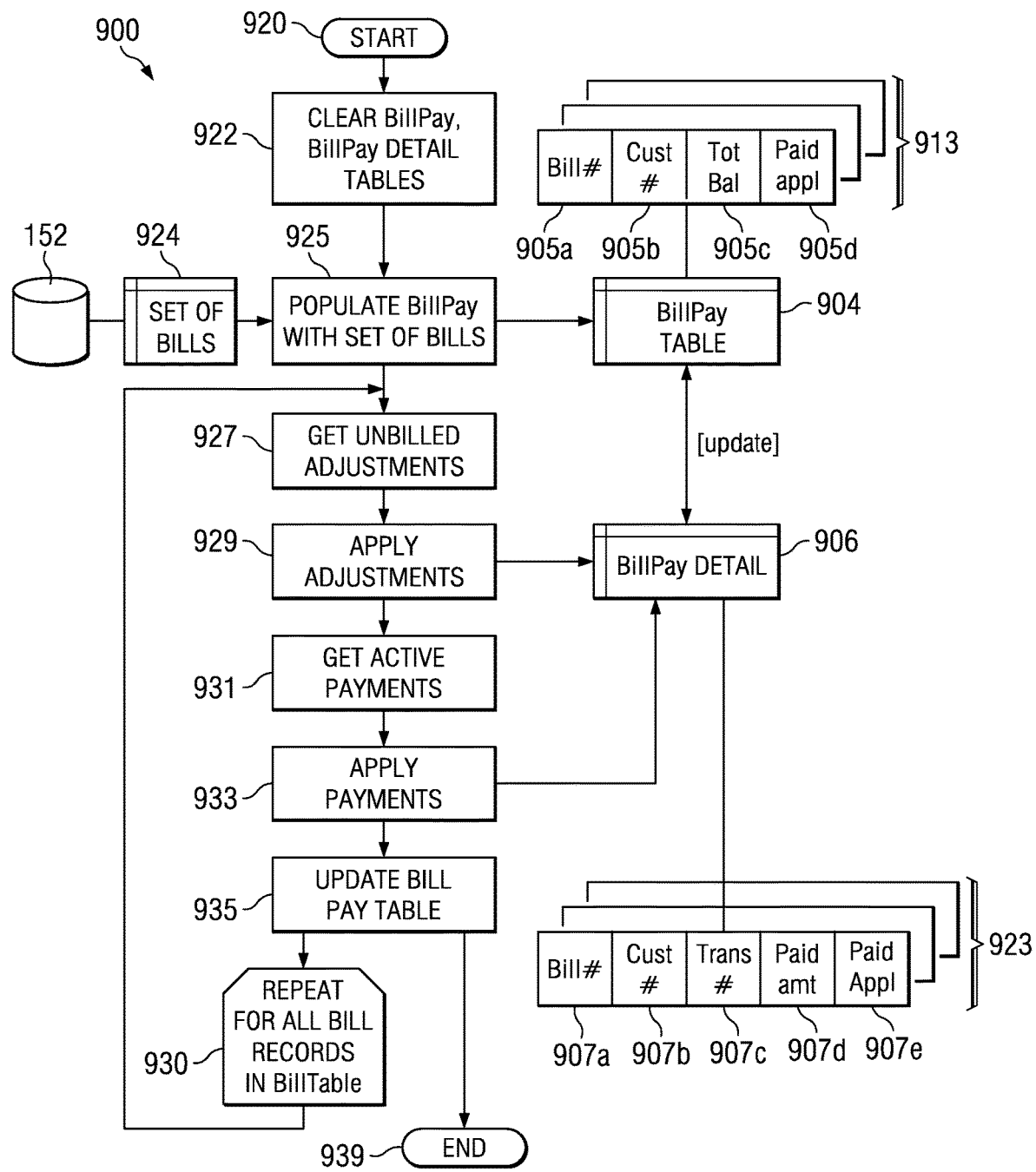
FIG. 15 is a block diagram of the CRI daily calculation method of the customer residual income process in the preferred embodiment of the present invention.

A flowchart of the CRI daily calculation process 900 is drawn in FIG. 15. The CRI daily calculation process 900 begins at start event 920 which activates process 900 at a predetermined times. The predetermined times are 3:00 am each day in the preferred embodiment. After activation, the process continues with step 922 wherein BillPay table 904 and BillPayDetail table 906 are cleared of all data for the current billing month. Once cleared the BillPay table 904 is populated in step 925 with the set of bills 924 which are marked 'A' for accounts receivable, in CDR 152. The set of bills 924 are incorporated as a set of bill records 913 contained in BillPay table 904 having at least the field's bill number 905a, customer number 905b, total current balance 905c, and payment applied 905d. A bill record represents a unique customer bill.

Process 900 continues by applying adjustments and payments on the bill records 913. BillPayDetail table 906 comprises a set of payment/adjustment records 923 with at least one payment/adjustment record per bill record in BillPay table 904. There is a one to many relation between a bill record in BillPay table 904 and the set of payment/adjustment records 923 in BillPayDetail table 906. In step 927 all unbilled adjustments are obtained from CDR 152 for the customer record associated to a first bill record in the set of bill records 913 and then the adjustments are applied to the first bill record in step 929 to create at least one payment/adjustment record in the set of payment adjustment records 923. In step 931 all active payments credited to the customer associated to the given bill record are obtained from payment processor 175 in FIG. 2 and then in step 933 the payments are applied to the given bill record to create at least one record in the set of payment/adjustment records 923.

Each payment adjustment record contains at least the fields: bill number 907a, customer number 907b, transaction number 907c, payment 907d and payment applied 907e. Payment amount 907d is collected in payment transaction with transaction number 907c; a credit equal to or less than payment amount 907d is applied to the customer bill with bill number 907a as payment applied 907e. Payment amount 907d may be generated by a customer payment from step 931 or by a system adjustment from step 929. An excess payment or adjustment, which is the difference: (payment amount 907d–payment applied 907e), is applied to another bill for the same customer number with the next largest bill number 905a associated with customer number 907b. In step 935, payment applied 905d is updated with payment applied 907e by adding the payment applied 907e to the pre-existing payment applied 905d. Then the payment/adjustment process is repeated in step 930 for all of the set of bill records 913 in BillPay table 904. When all bill records 913 have processed as described in the combination of steps 927, 929, 931, 933 and 935, CRI daily calculation process 900 ends at step 939.

Figure 16:
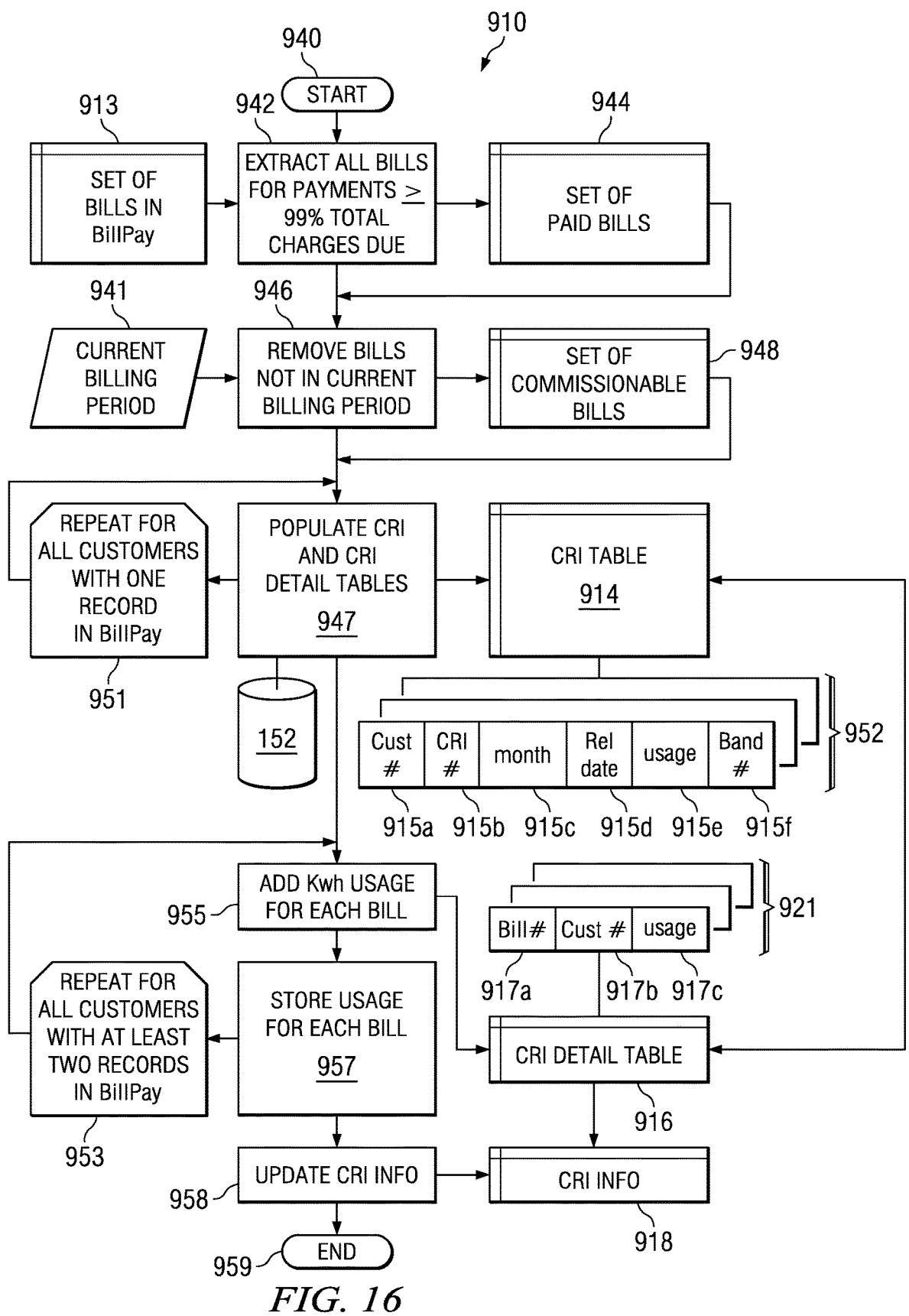
FIG. 16 is a block diagram of the CRI release method of the customer residual income process in the preferred embodiment of the present invention.

FIG. 16 shows CRI release process 910 in flowchart form. CRI release process 910 begins with start event 940 causing CRI release process 910 to be activated and run software code that executes the rules shown in the rest of the flowchart. In the preferred embodiment, start event 940 occurs on the twenty-fifth day, first day, fifth day, and tenth day of each month in continuous monthly cycles, the end of each monthly billing period being at 11:59:59 pm the night before the first day of each month.

Extract step 942 extracts from the set of bill records 913 in BillPay table 904 those bill records for which payment applied 905d is greater than or equal to 99% of total current charges 905c. The extracted bill records from extract step 942 are stored to a set of paid bills 944. From the set of paid bills 944, a set of commissionable bills 948 is created in the step 946 wherein only bill records in set of paid bills 944 for the current billing period 941 are included. The set of commissionable bills 948 is then available to populate customer records in CRI table 914. A CRI record 952 in CRI table 914 contains at least a customer number 915a, sales agent ID 915b, billing period month 915c, release date 915d, total billing period usage 915e and band number 915f.

Step 947 queries CDR 152 for data 915b-915f for each customer number in each bill record in set of commissionable bills 948 according to repeat step 951. For all customer numbers 915a with only one billing record in set of commissionable bills 948, step 947 takes a single bill from set of commissionable bills 948 and populates CRI record 952 in CRI table 914. For customers with at least two billing records in the set of commissionable bills 948, the rated kwh usage associated to each bill is added to billed usage 917c of CRI Detail table 916 in step 955 and then in step 957, the rated usage summed for each billing record associated to customer number 915a, the sum being accumulated and stored in usage 915e in CRI table 914. CRI Detail table 916 has a set of records 921 with at least the fields of bill number 917a, customer number 917b and billed usage 917c. The steps 955 and 957 are repeated 953 for all customers with at least two records in BillPay.

CRI release process 910 completes by updating CRI Info table 918 in step 958 wherein records in CRI Info table 918 are updated to include records 952 in CRI table 914. CRI info table 918 persistently stores records 952 from each execution of release process 910. CRI release process 910 then ends at step 959.

Figure 17:
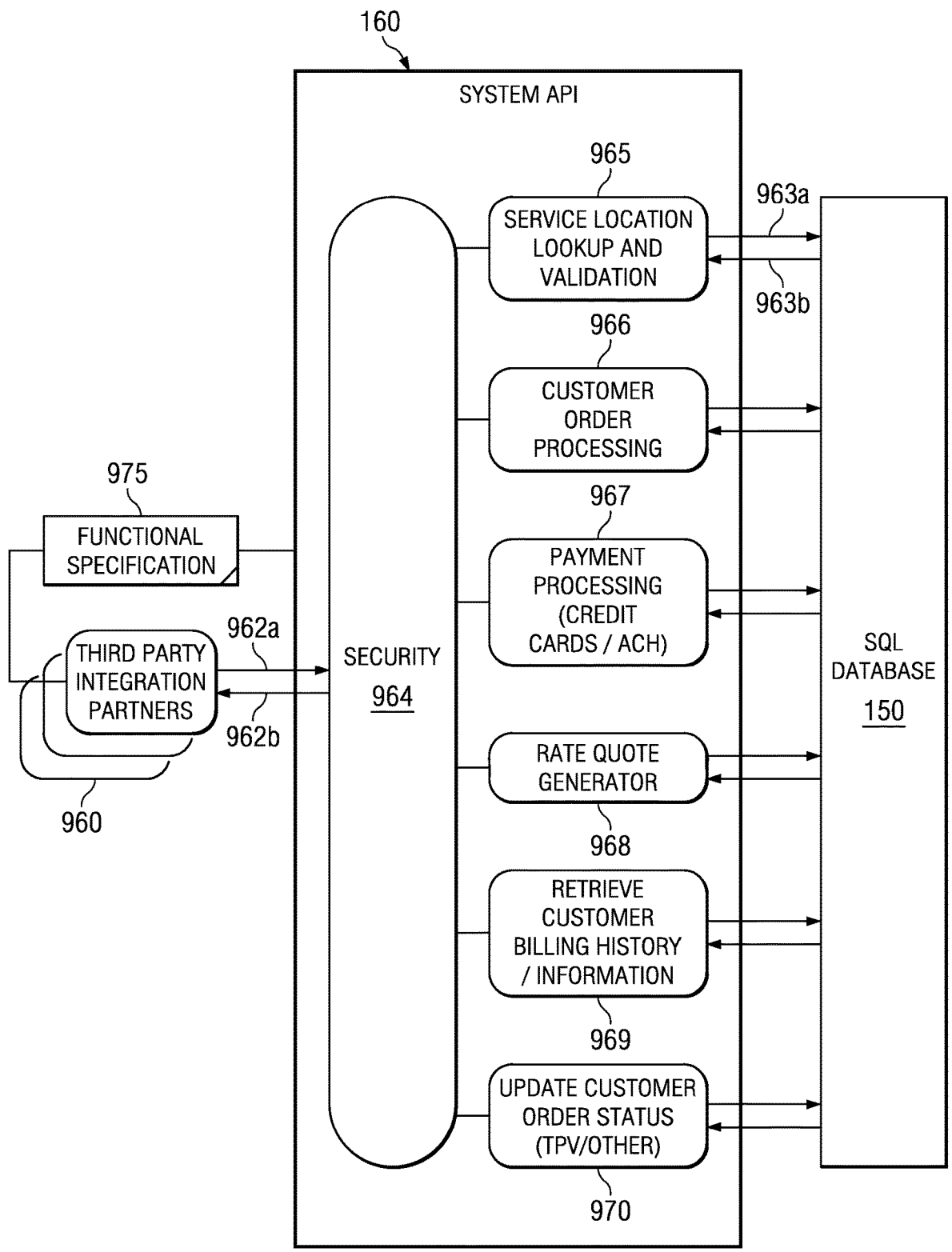
FIG. 17 is a block diagram of the system API in the preferred embodiment.

Application programming interface, API 160 of FIG. 2 is further described in reference to FIG. 17. API 160 is a secure gateway into the functionality provided by system 100. API 160 is a means to accelerate integration of systems owned and operated by third party integration partners 960 without sacrificing business rules and controls necessary to the integrity of system 100. Third party integration partners 960 are provided a security protocol and functional specification 975 that are used to integrate with system 100.

In addition to functional specification 975, API 160 comprises security protocol 964, service location lookup service 965, customer order processing service 966, payment processing service 967, rate quote generation service 968, customer billing information service 969 and customer order status service 970. All six API services 965, 966, 967, 968, 969 and 970 are accessed from third party integration partners 960 via security protocol 964. All six API services access SQL database engine 150 via database servers 208 and 209 (shown in FIG. 3).

API 160 functions to receive system requests 962a from third party integration partners 960, process requests 962a according to the type of request utilizing one of the six API services, transforming the requests 962a into SQL database queries 963a which are sent to SQL database engine 150, receiving query results 963b from SQL database 150, transforming query results 963b into a standard form specified by functional interface specification 175, and replying to third party integration partners 960 with system results 962b.

All system requests 962a transit security protocol 964. The security protocol includes authorization as a valid user of API 160 and assignment of security rights/privileges to the available set of function calls in API 160. Once a system request 962a clears security protocol 964, pre-approved third party third party integration partners 960 have access to the six primary functional API services:

Service location lookup and validation service 965 provides for input of physical address locations and determines if the "service location" is serviceable for the requested energy service. In addition, if the location is serviceable, the function returns a unique industry standard location identifier, the ESI ID, that is required during customer enrollment with REP 130.

Customer Order Processing service 966 provides a single interface to process a new energy customer enrollment. The function wraps several sub-functions that are designed to enforce system 100 business rules and process flow:

Data field validation—ensuring all data passed to SQL database 150 meets system requirements, Critical data requirements—ensuring that the appropriate data is passed to SQL database engine 150 ensure a full and complete system record supporting data integrity and consistency rules in system 100.

Credit Score lookups—which is a real-time application that places calls to credit agencies that result in an industry credit score classification.

Depositary requirements decisions—which are decisions based on data and scoring wherein system business rules are applied that determine whether the customer order will require a dollar deposit in order to proceed.

Consistent Data Model Setup—ensuring all captured and validated data is populated in appropriate entities within SQL database engine 150 and that any additional data components are populated, such as queues and outbound transaction sets.

Payment Processing service 967 provides third party integrators with the ability to process both credit card and ACH (i.e., bank account draft) payment transactions in system 100 against valid REP 130 customer accounts. As in other API services, all appropriate system 100 business rules are applied to transactions, as well as security protocol 964.

Rate Quote Generator 968 generates a pre-sale quote for service provided through REP 130. All relevant information, such as service location, product set, discounts, rates and usage volumes are included to provide accurate quotes for service.

Customer Billing Information service 969 retrieves energy customer information concerning billing, payment, and balance histories.

Update Customer Order Status service 970 sends order status updates directly into system 100 for real-time order status updates. Examples of real-time order status updates include Third Party Verification (TPV) updates as well as sales consultant status updates.

Figure 18:
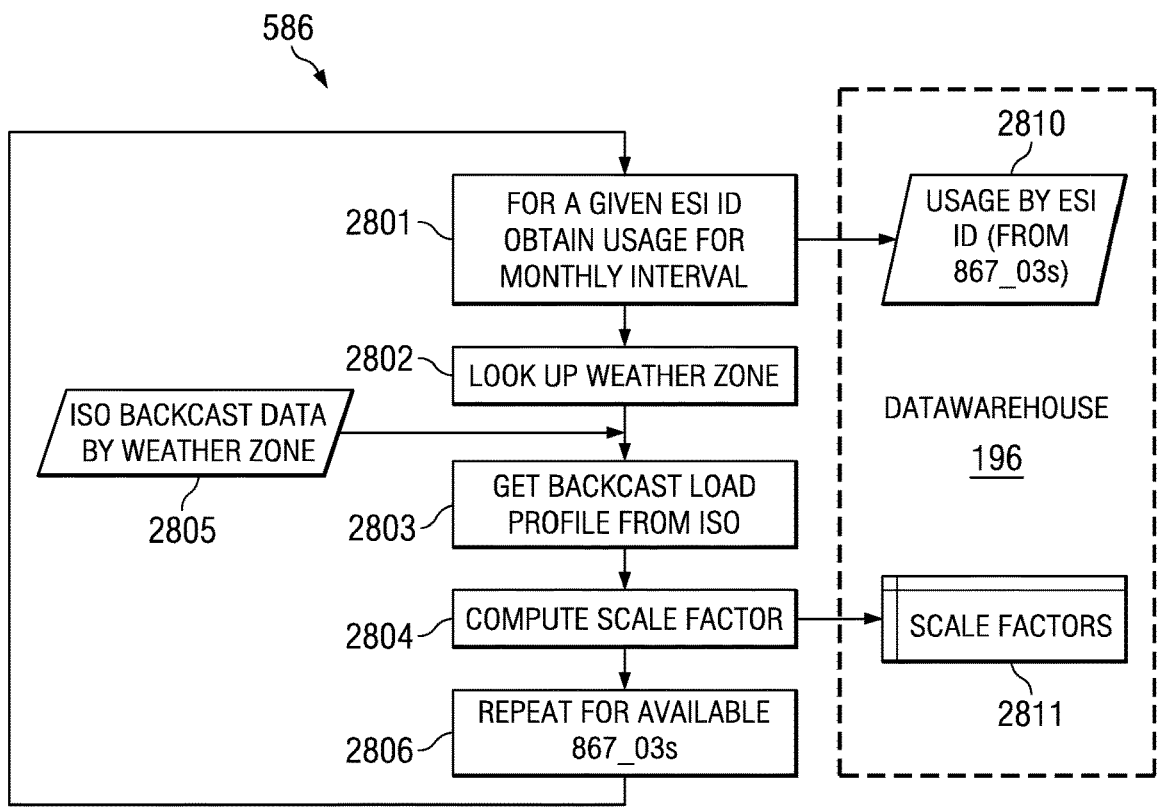
FIG. 18 is a block diagram of the scaling process used in conjunction with the usage rating process within the preferred embodiment of the present invention.

Scaling process 586 is shown in the block diagram FIG. 18 wherein the monthly interval usage and scale factor is calculated and stored for a given 867_03 transaction associated to a customer ESI ID. In step 2801, monthly interval usage from the 867_03 transaction is stored in datawarehouse 196 as usage 2810. The weather zone is then looked up for the ESI ID in step 2802 followed by a lookup of a set of backcast profiles 2805 from one of ISO partners 110 associated to the weather zone in step 2803. A backcast profile, in the set of backcast profiles, is a profile of usage for a given day in kW, wherein the usage is averaged for a group of ESI Ds in the weather zone and reported in 15 second time intervals. The backcast profile may be looked up for an entire monthly interval.

In step 2804 a scale factor for the ESI ID for a given monthly interval is computed and stored in datawarehouse 196 as scale factor 2811 according to:

$$S(ESIID) = \frac{U(ESIID)}{\sum_{i,day} U(i, \text{day}, \text{zone})}$$

where U(ESIID) is the monthly interval usage reported in the 867_03 transaction for ESI ID in the usage interval, U(i,day,zone) is the usage in the interval corresponding to the ith 15 minute time interval within a given day for a given weather zone and the sum is performed for all time intervals and days in the given monthly interval. Scale factors are stored by month in the preferred embodiment of the present invention, with a running average scale factor being used to compute forecasts. In step 2806, the scaling process is repeated for available 867_03 transactions.

Figure 19:
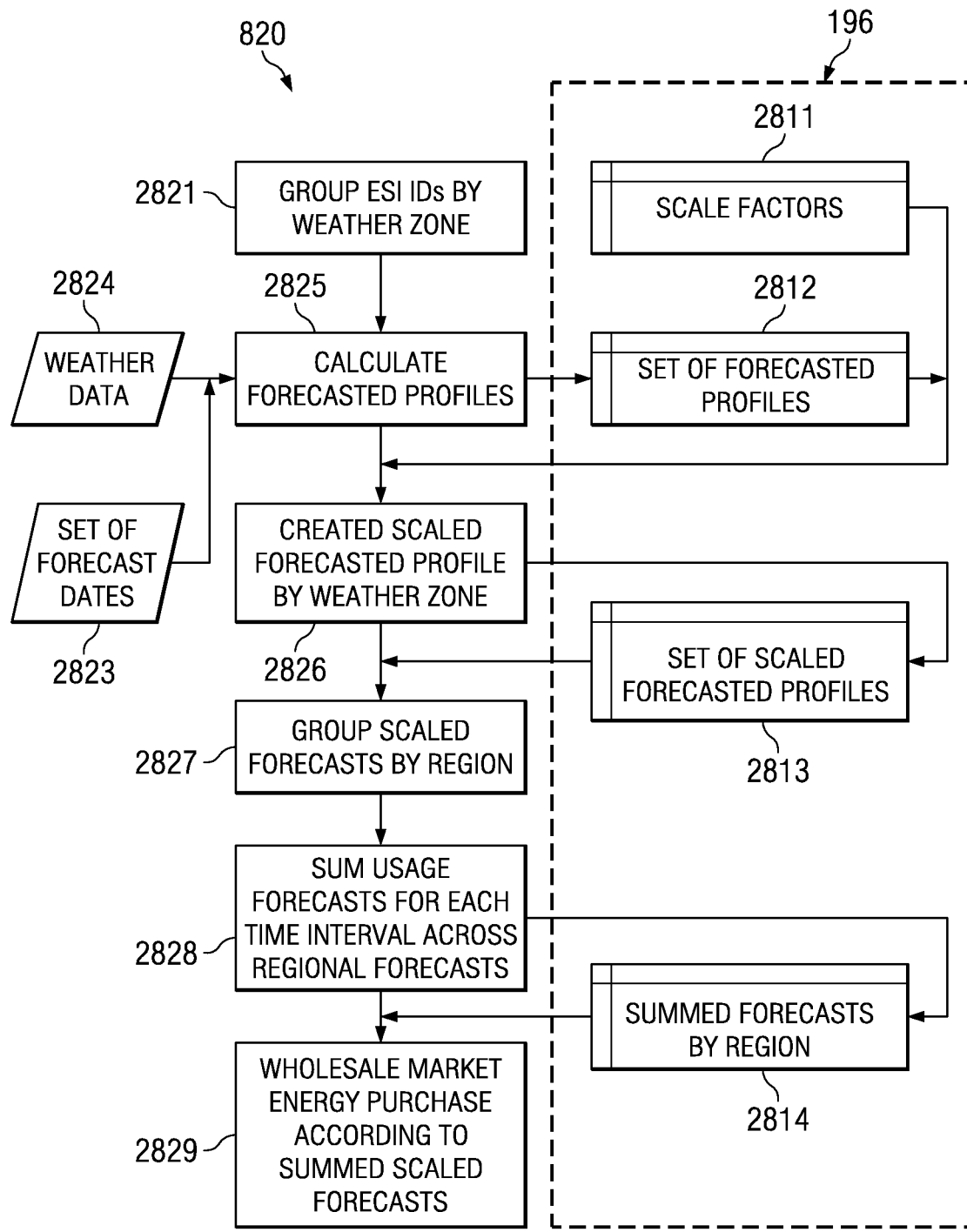
FIG. 19 is a block diagram of the wholesale forecasting method in the preferred embodiment of the present invention.

FIG. 19 is a block diagram of the wholesale forecasting process 820. In step 2821 ESI IDs are grouped by weather zone to begin the forecast process. Weather data 2824 is imported for a weather zone and a set of forecast dates 2823 of interest. For the set of forecast dates of interest, a set of average forecast profiles 2812 corresponding to the weather zone and a day is computed and stored in step 2825. In scaling step 2826, each profile of the set of scaled forecast profiles 2813, one profile for each ESI ID in the weather zone, is computed by multiplying the average forecast profiles 2812 by the scale factors S(ESIID) 2811 in datawarehouse 196 according to $$U_f(d, ESIID) = S(ESIID) * U_f(d, zone)$$

where Uf(d,ESIID) is a scaled forecast profile computed for each ESI ID and each day d in the set of forecast dates of interest, Uf(d,zone) is an average forecast profile of usage for each day d and zone zone, and where S(ESIID) are the scale factors calculated as in scaling process 586 of FIG. 18.

In step 2827, the forecast profiles are grouped by regions in which energy will be purchased and then in step 2828 the usage days d are summed for all ESI IDs in the set of scaled forecast profiles 2813 according to $$U_{region}(d) = \sum_{ESIID \text{ in region}} U_f(d, ESIID)$$

where U_region(d) forms a set of summed forecasts 2824 per day d by region. In step 2829, wholesale market energy purchases are made using summed forecasts 2814. In alternate embodiments of the present invention, the usages may be computed in 15 minute intervals and summed by region in 15 minute intervals to arrive at the set of scaled forecast profiles 2813.

Depositary requirements decisions—which are decisions based on data and scoring wherein system business rules are applied—that determine whether the System 100 data model is a highly relational set of SQL table structures designed to support self-enforcing rules, data integrity, system queues, and last-point exception buckets. The overall design is centered on the customer data entity and provides relationships to all energy system business entities and processes.

Figure 20:
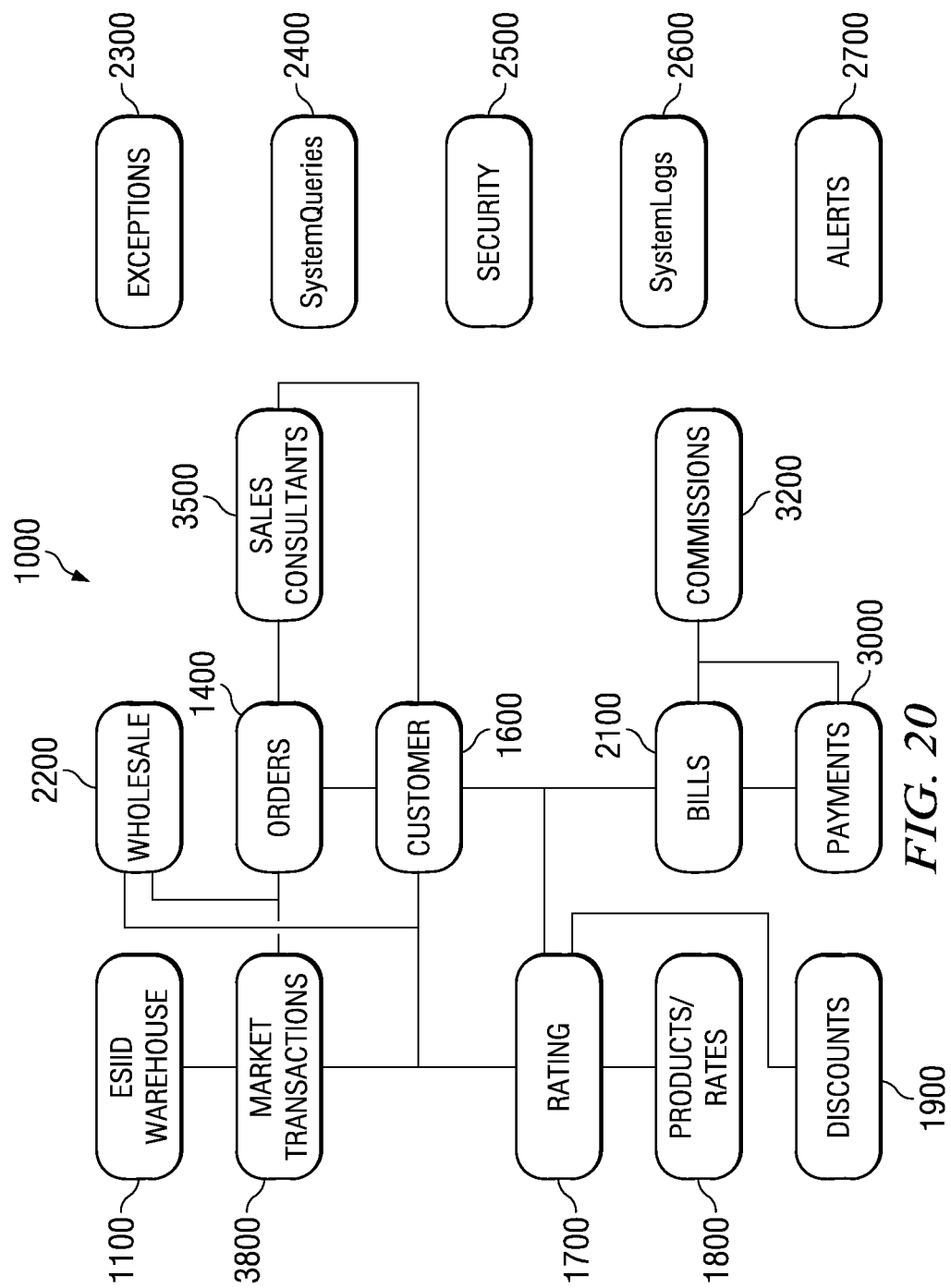
FIG. 20 is a block diagram of the system data model in the preferred embodiment.

A block diagram of system 100 data model is provided in FIG. 20. Data model 1000 comprises a set of entities wherein the entities are comprised of sets of data tables. The entities have relationships between them as shown by the solid lines in FIG. 20, the relationships enforcing relational sharing of data between tables within one entity and with tables within another entity.

The entities in data model 1000 are: ESI ID warehouse entity 1100 for holding data relating to specific ESI IDs, Wholesale entity 2200 for compiling data relating to forecast models and ESI ID usage profiles, Market Transactions entity 3800 for storing transactions sent/received to/from the ISO or TDSP, Orders entity 1400 for containing sales order information, Sales Consultants entity 3500 for containing records relating to the sales process, Customer entity 1600 for accumulating detailed customer information, Rating entity 1700 for compiling usage rating data, Products and Rates entity 1800 for holding the various products and rates for the ESI IDs, Discounts entity 1900 for describing customer discounts, Payments entity 3000 for keeping records related to customer payments, Bills entity 2100 for accumulating billing information for customers and commissions entity 3200 for containing sales commission information relating to customer residual income.

The entities in data model 1000 sharing relational data are as follows: Customer entity 1600 shares relational data with Rating entity 1700, Wholesale entity 2200, Orders entity 1400, Sales consultants entity 3500 and Bills entity 2100. Market transactions entity 3800 shares relational data with Orders entity 1400, ESI ID Warehouse 1100, Wholesale entity 1200 and Rating entity 1700. Orders entity 1400 shares relational data with Sales consultants entity 3500 in addition to those relationships already described. Bills entity 2100 shares relational data with Rating entity 1700, Payments entity 3000, Commissions entity 3200 and Customer entity 1600. Rating entity 1700 shares relational data with Products and Rates entity 1800, Discounts entity 1900 and Bills entity 2100.

Data model 1000 includes queuing and logging entities for managing the operational aspects of REP 130, the queuing entities typically being accessed by the company operations staff, customer service staff, or IT operations staff within REP 130. The queuing entities within data model 1000 are: Exceptions entity 2300 for logging transaction exceptions and other system exceptions, System Queues entity 2400 comprised of queuing tables relating to worklists and business operational functions such as a queue for printing bills, Security entity 2500 for holding system user data such as authorization data, System logs entity 2600 for containing tables of various system software logs, and Alerts entity 2700 for logging data records relating to critical system alerts.

FIGS. 21-37 show a set of entity-relationship diagrams, such diagrams being used in the art of relational database programming to indicate a database schema. A brief review of the diagrammatics used herein is now provided. Data tables within entities contain rows and columns of data. Fields generally define the columns in data tables and records are define the rows. Some tables are shared between entities, such shared data tables appearing in the entity-relationship diagrams of multiple entities.

Most data tables have a key assigned to one field indicated by a key graphic in the given figure. Where the key is assigned to one field, the field is called the primary key and serves as a unique identifier to each record in the data table. In some cases there may be multiple primary keys, wherein a combination of the multiple primary keys is required to uniquely specify each record in the data table. The solid line relationships have either a key or an infinity symbol graphic on the ends. A single key on one end and a single key on the other end of a solid line connection indicates a one-to-one relationship between the connected data tables. A single key on one end and an infinity symbol on the other end of a solid line connection indicates a one-to-many relationship between the a first data table and a second data table—implying that for each instance of the first data table there may be many instances of the second data table. Relationships between tables require a foreign key, a foreign key being a predefined field within a data table that contains data matching the primary key in another data table.

Figure 21:
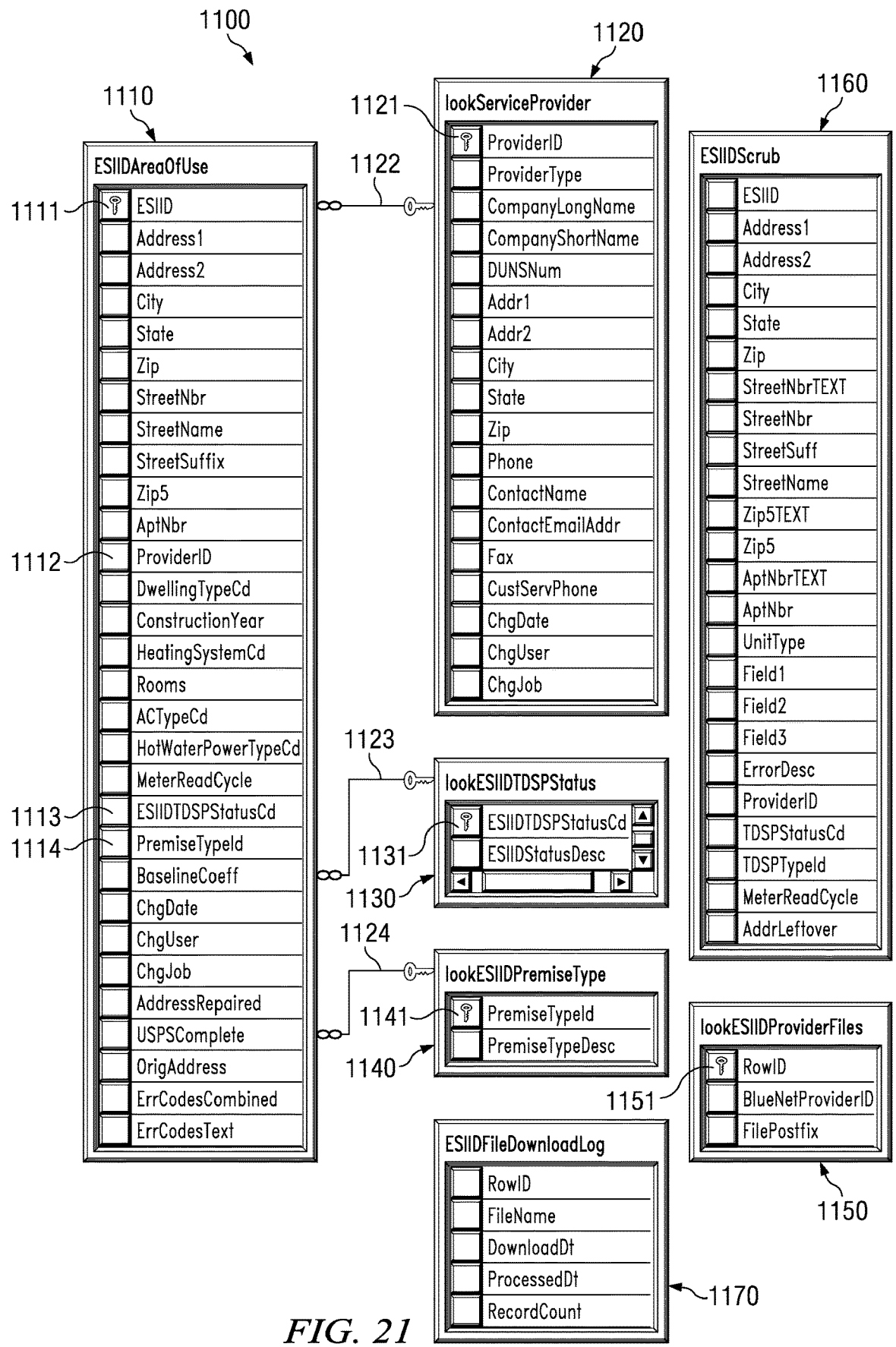
FIG. 21 is an entity relationship diagram of the ESI ID warehouse entity in the preferred embodiment.
Figure 22A:
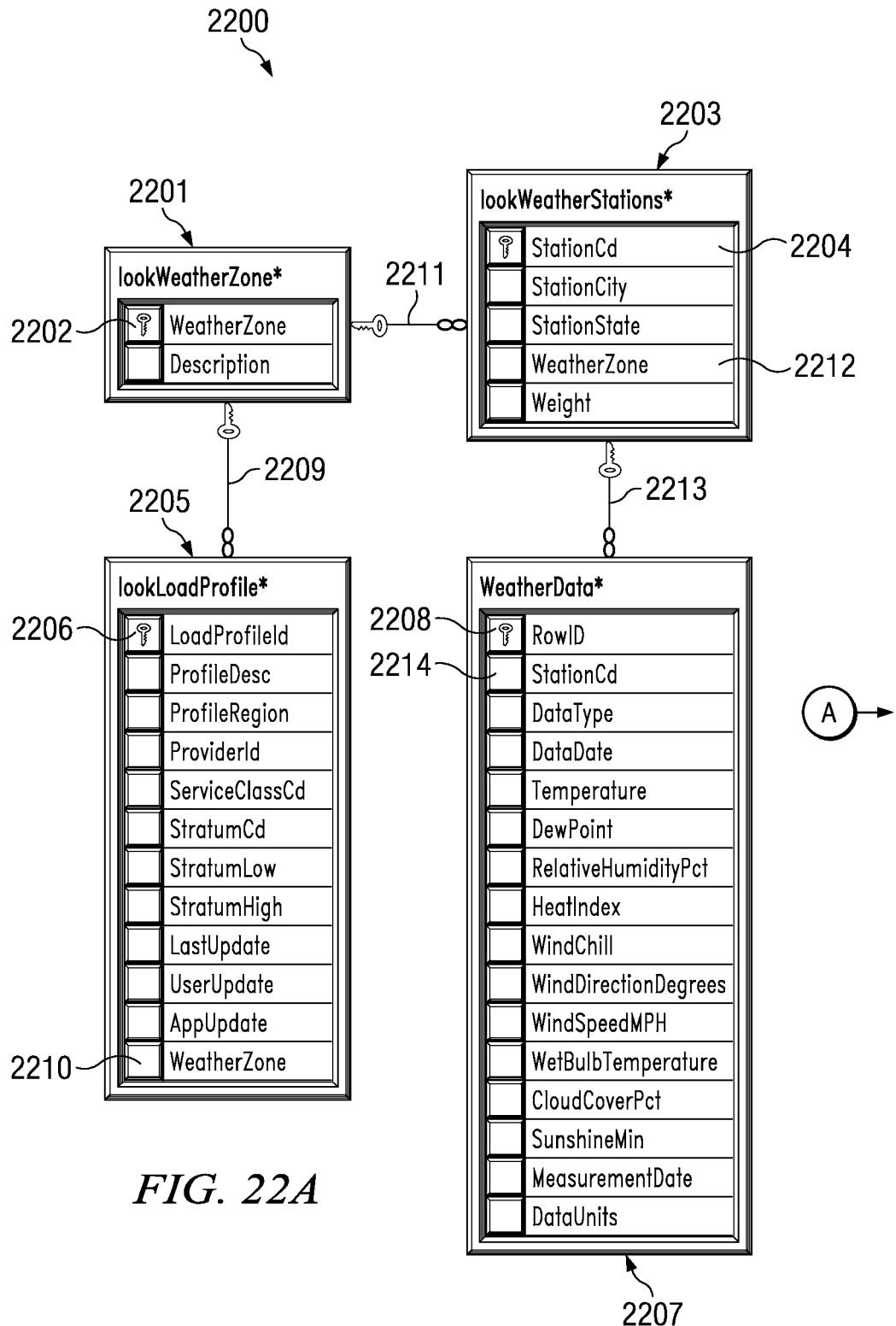
FIGS. 22a, 22b, 22c and 22d comprise an entity relationship diagram of the wholesale entity in the preferred embodiment.
Figure 22B:
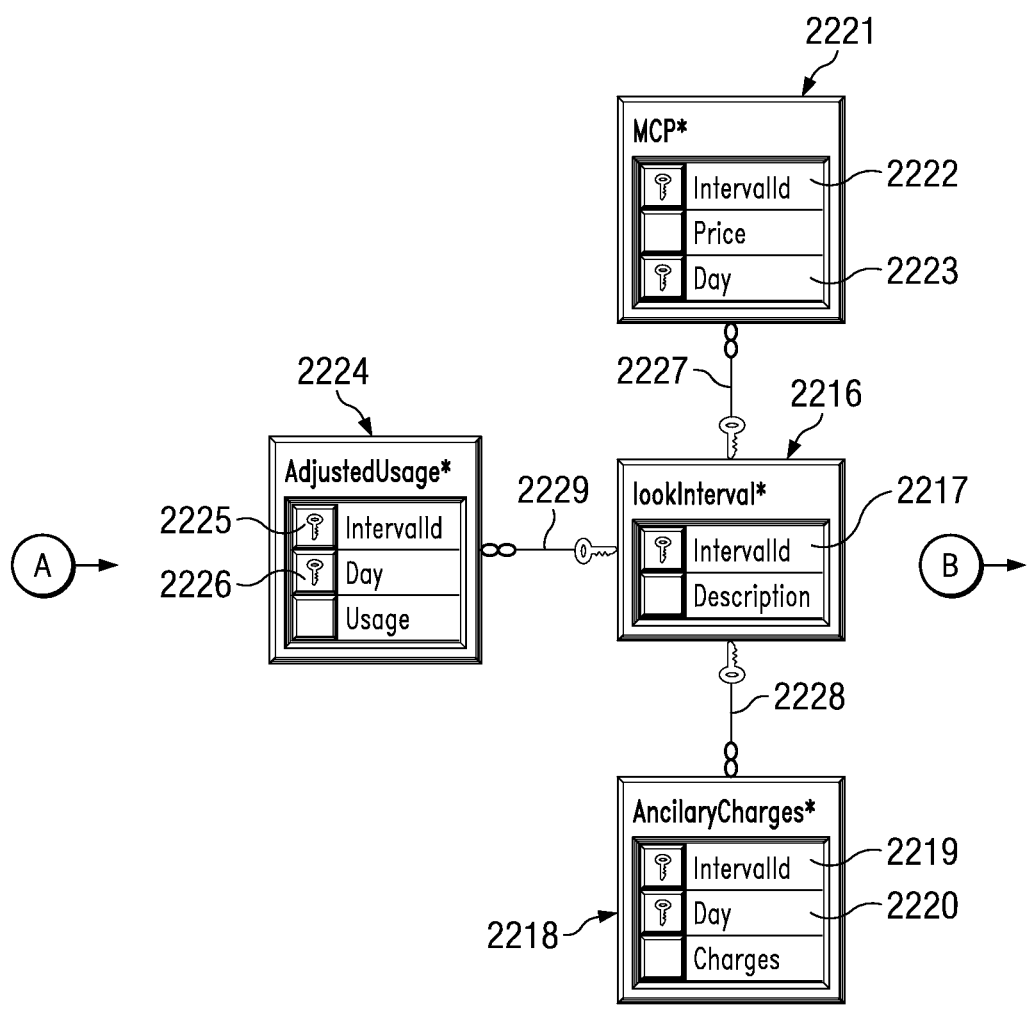
Figure 22C:
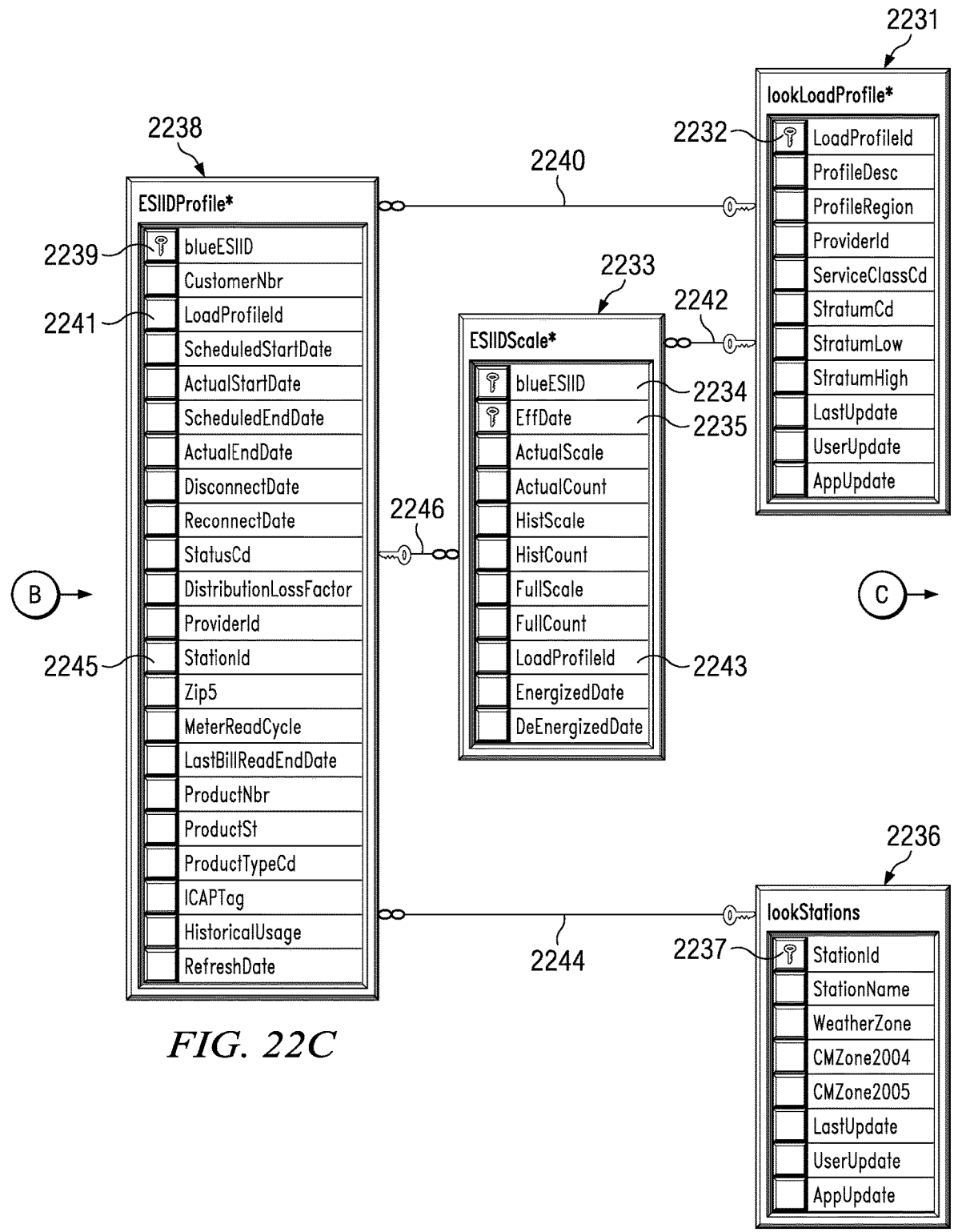
Figure 22D:
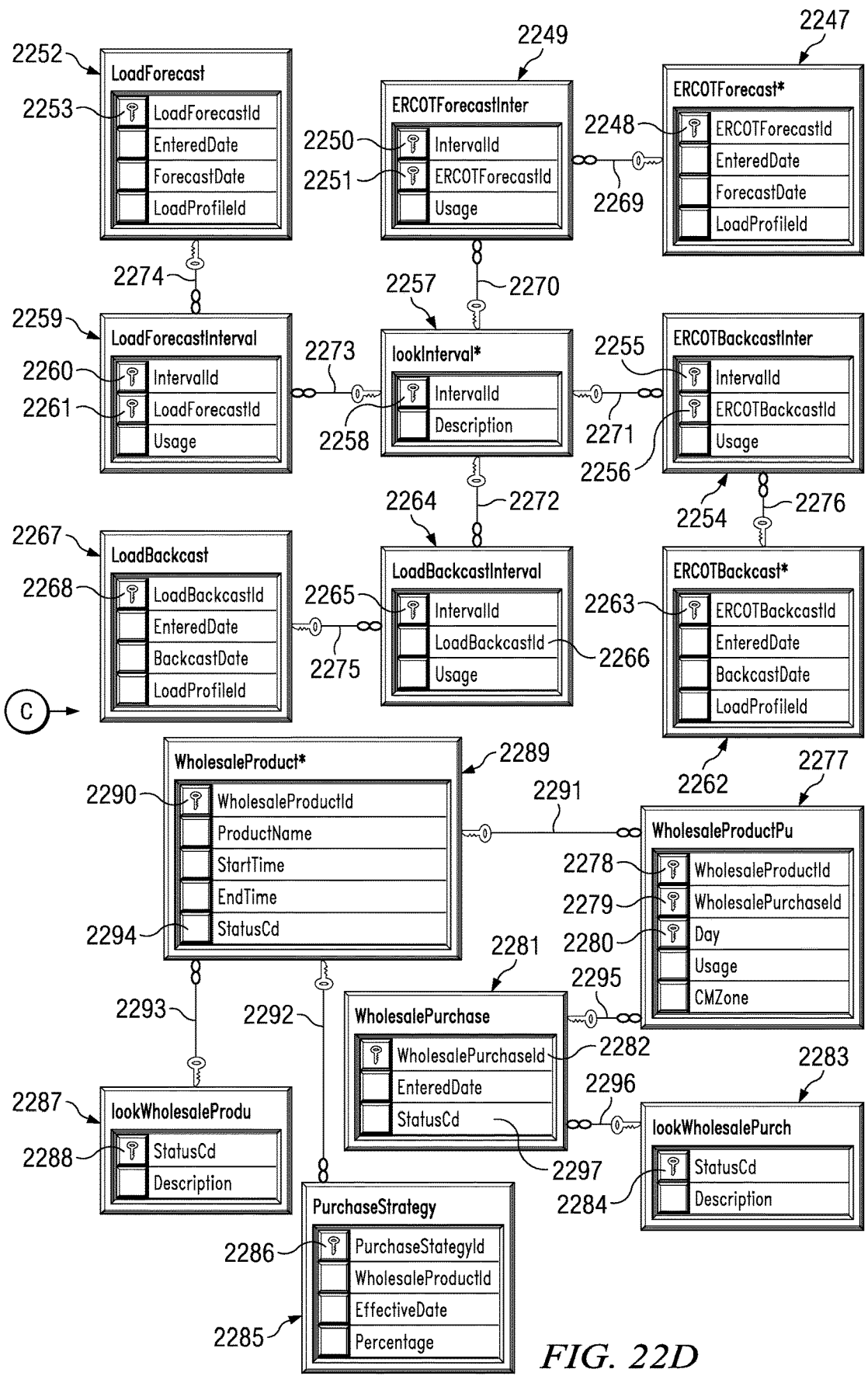

FIG. 21 is an entity-relationship diagram of the ESIID-Warehouse entity 1100 within the preferred embodiment SQL database engine 150. ESIIDWarehouse entity 1100 comprises a set of tables, ESIIDAreaOfUse table 1110 for containing premise information records, ESIIDAreaOfUse table 1110 having a primary key ESIID 1111; lookService-Provider table 1120 for containing information about the providers associated with ESIIDs, lookServiceProvider table 1120 having a primary key ProviderID 1121; lookESI-IDTDSPStatus table 1130 for holding information about the TDSPs associated to the ESIIDs, lookESIIDTDSPStatus table 1130 having a primary key ESIIDTDSPStatus Cd 1131; lookESIIDPresmise Type table 1140 for containing premise types, lookESIID Premise Type table 1140 having a primary key PremiseTypeId 1141; lookESIIDProviderFiles table 1150 for looking up REP provider identifications associated to ESIID, lookESIIDProviderFiles table 1150 having a primary key RowID 1151; ESIIDScrub table 1160 for containing premise data; and ESIIDFileDownloadLog table 1170 for containing log records of downloaded files.

LookServiceProvider table 1120 has a one to many relationship 1122 with ESIIDAreaOfUse table 1110 wherein ESIIDAreaOfUse table 1110 contains foreign key ProviderID 1112 corresponding to lookServiceProvider table 1120 primary key 1121.

LookESIIDTDSPStatus table 1130 has a one to many relationship 1123 with ESIIDAreaOfUse table 1110 wherein ESIIDAreaOfUse table 1110 contains foreign key ESI-IDTDSP StatusCd 1113 corresponding to LookESIIDTD-SPStatus table 1130 primary key 1131.

LookESIIDPremiseType table 1140 has a one to many relationship 1124 with ESIIDAreaOfUse table 1110 wherein ESIIDAreaOfUse table 1110 contains foreign key Premise-TypeId 1114 corresponding to LookESIIDPremiseType table 1140 primary key 1141.

FIGS. 22A, 22B, 22C and 22D combine to form an entity-relationship diagram of the Wholesale entity 2200 within the preferred embodiment SQL database engine 150. Wholesale entity 2200 comprises a set of tables; Look-WeatherZone table 2201 for holding descriptions of weather zones, LookWeatherZone table 2201 having a primary key WeatherZone 2202; LookWeatherStations table 2203 for containing records of weather stations, LookWeatherSta-tions table 2203 having a primary key StationCd 2204; LookLoadProfile table 2205 for containing usage profile records, LookLoadProfile table 2205 having a primary key LoadProfileId 2206; WeatherData table 2207 for containing weather related information, WeatherData table 2207 having a primary key RowID 2208; LookInterval table 2216 for holding usage interval descriptions, LookInterval table 2216 having a primary key IntervalId 2217; AncilaryCharges table 2218 for containing a record of ancillary charges per usage interval, AncilaryCharges table 2218 having combination primary keys IntervalId 2219 and Day 2220; MCP table 2221 for containing pricing data, MCP table 2221 having combination primary keys IntervalId 2222 and Day 2223; AdjustedUsage table 2224 for containing usage data, AdjustedUsage table 2224 having combination primary keys IntervalId 2225 and Day 2226; LookLoadProfile table 2231 for holding indexed load profiles, LookLoadProfile table 2231 having a primary key LoadProfileId 2232; ESIIDScale table 2233 for containing calculated usage scaling records per ESIID, ESIIDScale table 2233 having combination primary keys blueESIID 2234 and EffDate 2235; LookSta-tions table 2236 for containing weather station location data, LookStations table 2236 having a primary key StationID 2237; ESIIDProfile table 2238 for containing records of load profiles per ESIID, ESIIDProfile table 2238 having a primary key blueESIID 2239; ERCOTForecast table 2247 for holding forecast dates and related information, ERCOT-Forecast table 2247 having a primary key ERCOTForecastId 2248; ERCOTForecastInterval table 2249 for containing forecasted usage data per interval, ERCOTForecastInterval table 2249 having combination primary keys IntervalId 2250 and ERCOTForecastId 2251; LoadForecast table 2252 for containing load forecasts, LoadForecast table 2252 having a primary key LoadForecastId 2253; ERCOTBackcastInterval table 2254 for containing backcasted usage data, ERCOTBackcastInterval table 2254 having combination primary keys IntervalId 2255 and ERCOTBackcastId 2256; LookInterval table 2257 for holding interval descriptions, LookInterval table 2257 having a primary key IntervalId 2258; LoadForecastInterval table 2259 for containing forecasted usage data, LoadForecastInterval table 2259 having combination primary keys IntervalId 2260 and LoadForecastId 2261; ERCOTBackcast table 2262 for containing backcasted usage data, ERCOTBackcast table 2262 having a primary key ERCOTBackcastId 2263; LoadBackcastInterval table 2264 for containing backcasted usage data, LoadBackcastInterval table 2264 having combination primary keys IntervalId 2265 and LoadBackcastId 2266; LoadBackcast table 2267 for holding backcast records, LoadBackcast table 2267 having a primary key LoadBackcastId 2268; WholesaleProductPurchase table 2277 for containing product availability information, WholesaleProductPurchase table 2277 having combination primary keys WholesaleProductId 2278, WholesalePurchaseId 2279 and Day 2280; WholesalePurchase table 2281 for containing product purchase records, WholesalePurchase table 2281 having a primary key WholesalePurchaseId 2282; LookWholesalePurchase table 2283 for containing purchase descriptions, LookWholesalePurchase table 2283 having a primary key StatusCd 2284; PurchaseStrategy table 2285 for containing business data related to purchased products, PurchaseStrategy table 2285 having a primary key PurchaseStrategyId 2286; LookWholesaleProduct table 2287 for containing product descriptions, LookWholesaleProduct table 2287 having a primary key StatusCd 2288; WholesaleProduct table 2289 for holding purchase records, WholesaleProduct table 2289 having a primary key WholesaleProductId 2290.

LookWeatherZone table 2201 has a one-to-many relationship 2209 with LookLoadProfile table 2205 wherein LookLoadProfile table 2205 contains foreign key WeatherZone 2210 corresponding to LookWeatherZone table 2201 primary key 2202. LookWeatherZone table 2201 has a one-to-many relationship 2211 with LookWeatherStations table 2203 wherein LookWeatherStations table 2203 contains foreign key WeatherZone 2212 corresponding to LookWeatherZone table 2201 primary key 2202. LookWeatherStations table 2203 has a one-to-many relationship 2213 with WeatherData table 2207 wherein WeatherData table 2207 contains foreign key StationCd 2214 corresponding to LookWeatherStations table 2203 primary key 2204.

LookInterval table 2216 has a one-to-many relationship 2227 with MCP table 2221 wherein MCP table 2221 contains foreign key IntervalId 2222 corresponding to LookInterval table 2216 primary key 2217. LookInterval table 2216 has a one-to-many relationship 2228 with AncilaryCharges table 2218 wherein AncilaryCharges table 2218 contains foreign key IntervalId 2219 corresponding to LookInterval table 2216 primary key 2217. LookInterval table 2216 has a one-to-many relationship 2229 with AdjustedUsage table 2224 wherein AdjustedUsage table 2224 contains foreign key IntervalId 2225 corresponding to LookInterval table 2216 primary key 2217.

LookLoadProfile table 2231 has a one-to-many relationship 2240 with ESIIDProfile table 2238 wherein ESIIDProfile table 2238 contains foreign key LoadProfileId 2241 corresponding to LookLoadProfile table 2231 primary key 2232. LookLoadProfile table 2231 has a one-to-many relationship 2242 with ESIIDScale table 2233 wherein ESIIDScale table 2233 contains foreign key LoadProfileId 2243 corresponding to LookLoadProfile table 2231 primary key 2232. LookStations table 2236 has a one-to-many relationship 2244 with ESIIDProfile table 2238 wherein ESIIDProfile table 2238 contains foreign key StationID 2245 corresponding to LookStations table 2236 primary key 2237. ESIIDProfile table 2238 has a one-to-many relationship 2246 with ESIIDScale table 2233 wherein ESIIDScale table 2233 contains foreign key BlueESIID corresponding to ESIIDProfile table 2238 primary key 2239.

ERCOTForecast table 2247 has a one-to-many relationship 2269 with ERCOTForecastInterval table 2249 wherein ERCOTForecastInterval table 2249 contains foreign key ERCOTForecastId 2251 corresponding to ERCOTForecast table 2247 primary key 2248. LookInterval table 2257 has a one-to-many relationship 2270 with ERCOTForecastInterval table 2249 wherein ERCOTForecastInterval table 2249 contains foreign key IntervalId 2250 corresponding to lookInterval table 2257 primary key 2258. LookInterval table 2257 has a one-to-many relationship 2271 with ERCOTBackcastInterval table 2254 wherein ERCOTBackcastInterval table 2254 contains foreign key IntervalId 2255 corresponding to LookInterval table 2257 primary key 2258. LookInterval table 2257 has a one-to-many relationship 2272 with LoadBackcastInterval table 2264 wherein LoadBackcastInterval table 2264 contains foreign key IntervalId 2265 corresponding to LookInterval table 2257 primary key 2258. LookInterval table 2257 has a one-to-many relationship 2273 with LoadForecastInterval table 2259 wherein LoadForecastInterval table 2259 contains foreign key IntervalId 2260 corresponding to LookInterval table 2257 primary key 2258. LoadForecast table 2252 has a one-to-many relationship 2274 with LoadForecastInterval table 2259 wherein LoadForecastInterval table 2259 contains foreign key LoadForecastId 2261 corresponding to LoadForecast table 2252 primary key 2253. LoadBackcast table 2267 has a one-to-many relationship 2275 with LoadBackcastInterval table 2264 wherein LoadBackcastInterval table 2264 contains foreign key LoadBackcastId 2266 corresponding to LoadBackcast table 2267 primary key 2268. ERCOTBackcast table 2262 has a one-to-many relationship 2276 with ERCOTBackcastInterval table 2254 wherein ERCOTBackcastInterval table 2254 contains foreign key ERCOTBackcastId 2256 corresponding to ERCOTBackcast table 2262 primary key 2263.

WholesaleProduct table 2289 has a one-to-many relationship 2291 with WholesaleProductPurchase table 2277 wherein WholesaleProductPurchase table 2277 contains foreign key WholesaleProductId 2278 corresponding to WholesaleProduct table 2289 primary key 2290. WholesaleProduct table 2289 has a one-to-many relationship 2292 with PurchaseStrategy table 2285 wherein PurchaseStrategy table 2285 contains foreign key WholesaleProductId corresponding to WholesaleProduct table 2289 primary key 2290. LookWholesaleProduct table 2287 has a one-to-many relationship 2293 with WholesaleProduct table 2289 wherein WholesaleProduct table 2289 contains foreign key StatusCd 2294 corresponding to LookWholesaleProduct table 2287 primary key 2288. WholesalePurchase table 2281 has a one-to-many relationship 2295 with WholesaleProductPurchase table 2277 wherein WholesaleProductPurchase table 2277 contains foreign key WholesalePurchaseId 2279 corresponding to WholesalePurchase table 2281 primary key 2282. LookWholesalePurchase table 2283 has a one-to-many relationship 2296 with WholesalePurchase table 2281 wherein WholesalePurchase table 2281 contains foreign key StatusCd 2297 corresponding to LookWholesalePurchase table 2283 primary key 2284.

Figure 24A:
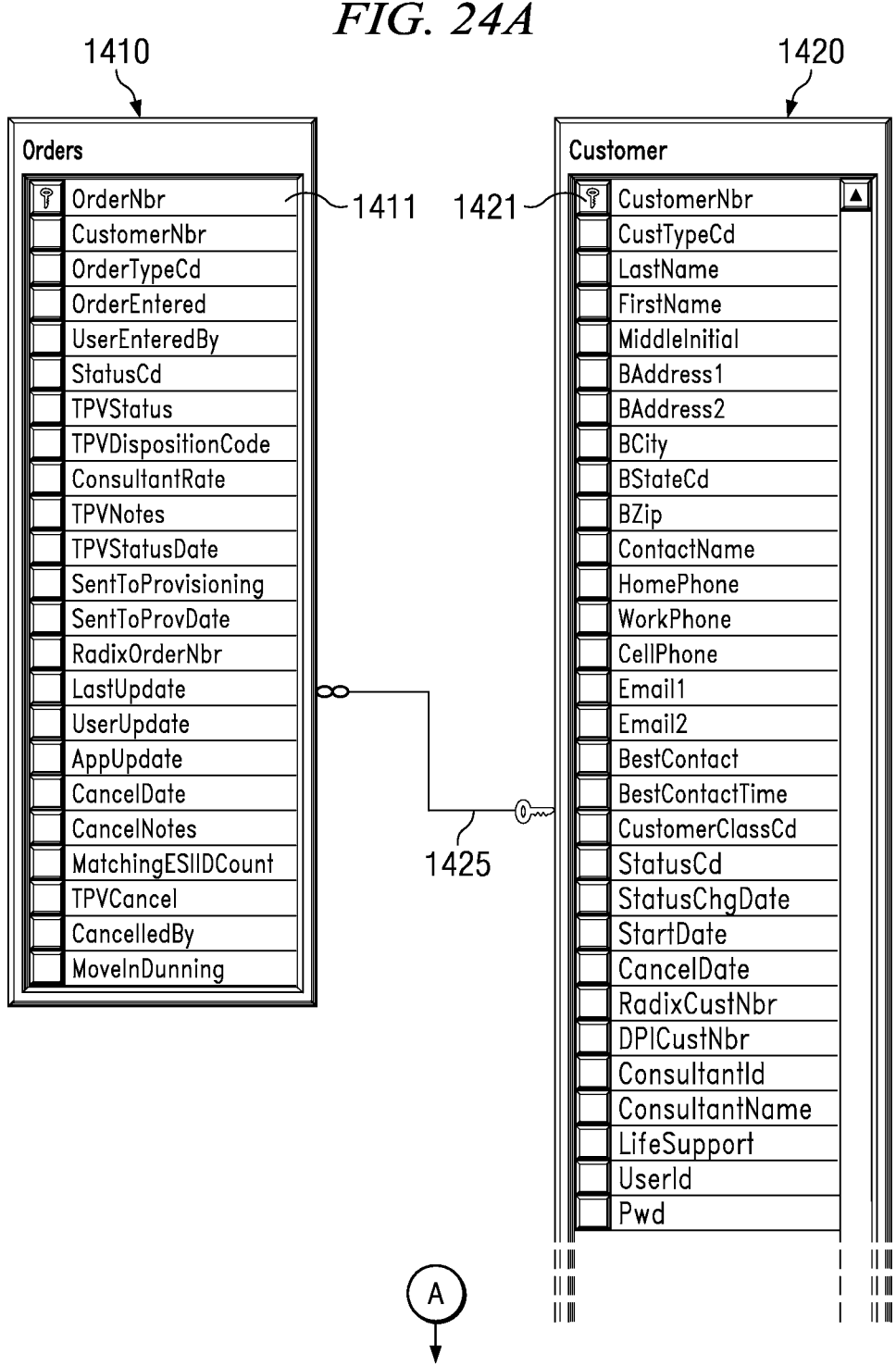
Figure 24B:
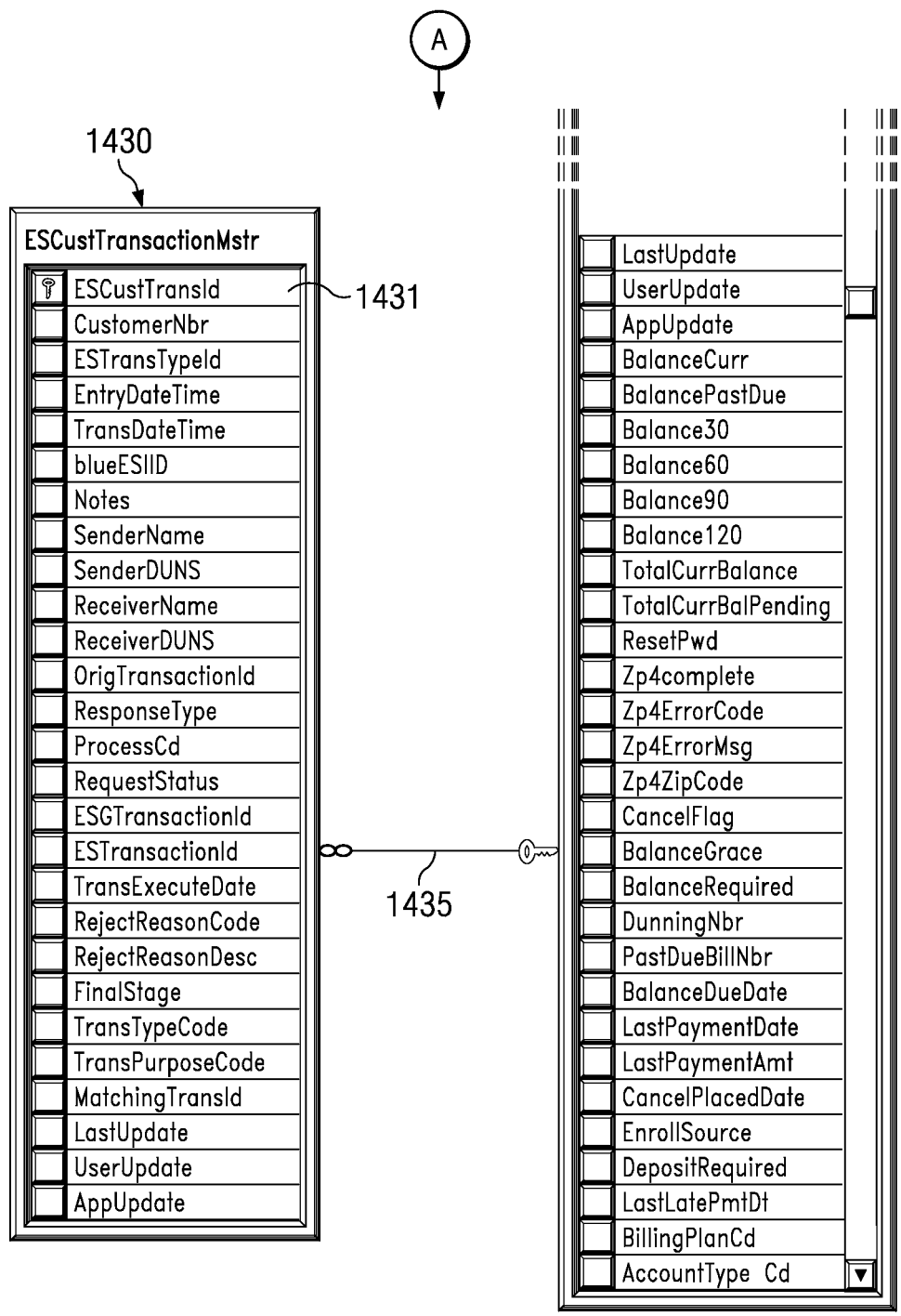

FIGS. 24A and 24B combine to form an entity-relationship diagram of the Orders entity 1400 within the preferred embodiment SQL database engine 150. Orders entity 1400 comprises a set of tables: Orders table 1410 for containing records of customer orders, Orders table 1410 having a primary key OrderNbr 1411; Customer table 1420 for containing customer records, Customer table 1420 having primary key CustomerNbr 1421; and ESCustTransactionMstr table 1430 for containing customer related market transaction records, ESCustTransactionMstr table 1430 having primary key ESCustTransID 1431.

Customer table 1420 has a one-to-many relationship 1425 with Orders table 1410 wherein Orders table 1410 contains foreign key CustomerNbr corresponding to Customer table 1420 primary key 1421. Customer table 1420 has a one-to-many relationship 1435 with ESCustTransactionMstr table 1430 wherein ESCustTransactionsMstr table 1430 contains foreign key CustomerNbr corresponding to Customer table 1420 primary key 1421.

Figure 25:
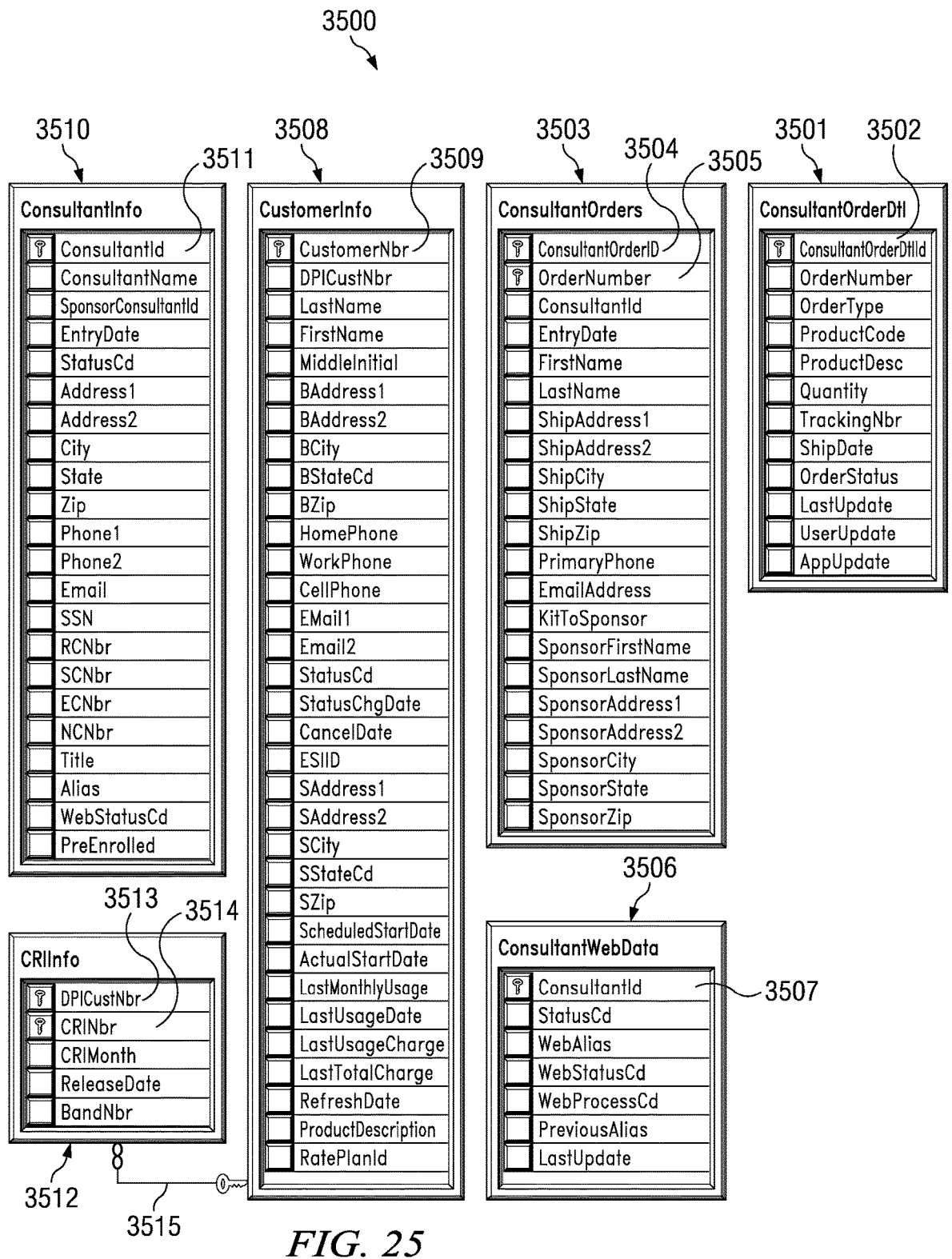
FIG. 25 is an entity relationship diagram of the sales consultants entity in the preferred embodiment.
Figure 26A:
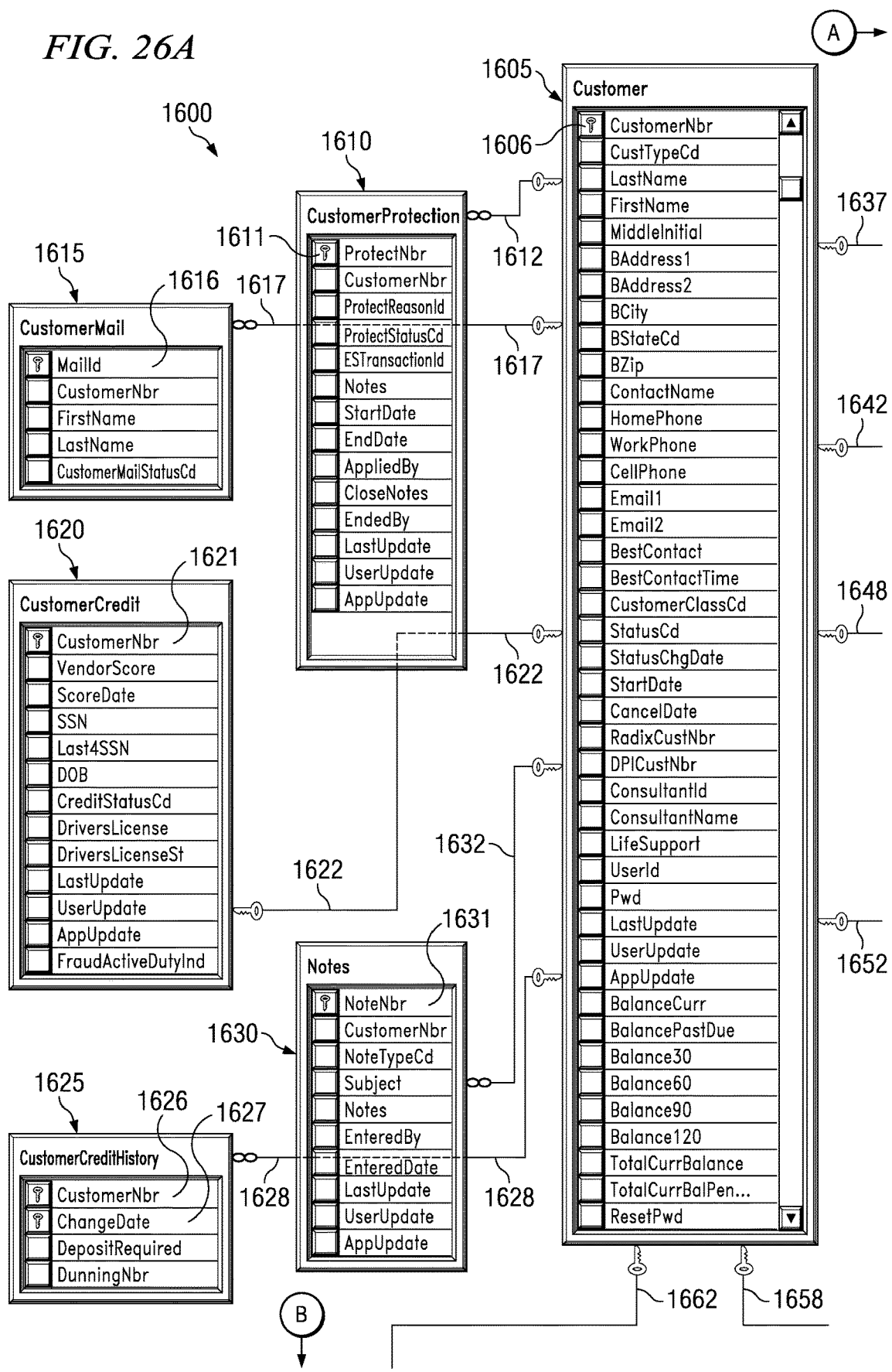
FIGS. 26a, 26b, 26c and 26d comprise an entity relationship diagram of the customer entity in the preferred embodiment
Figure 26B:
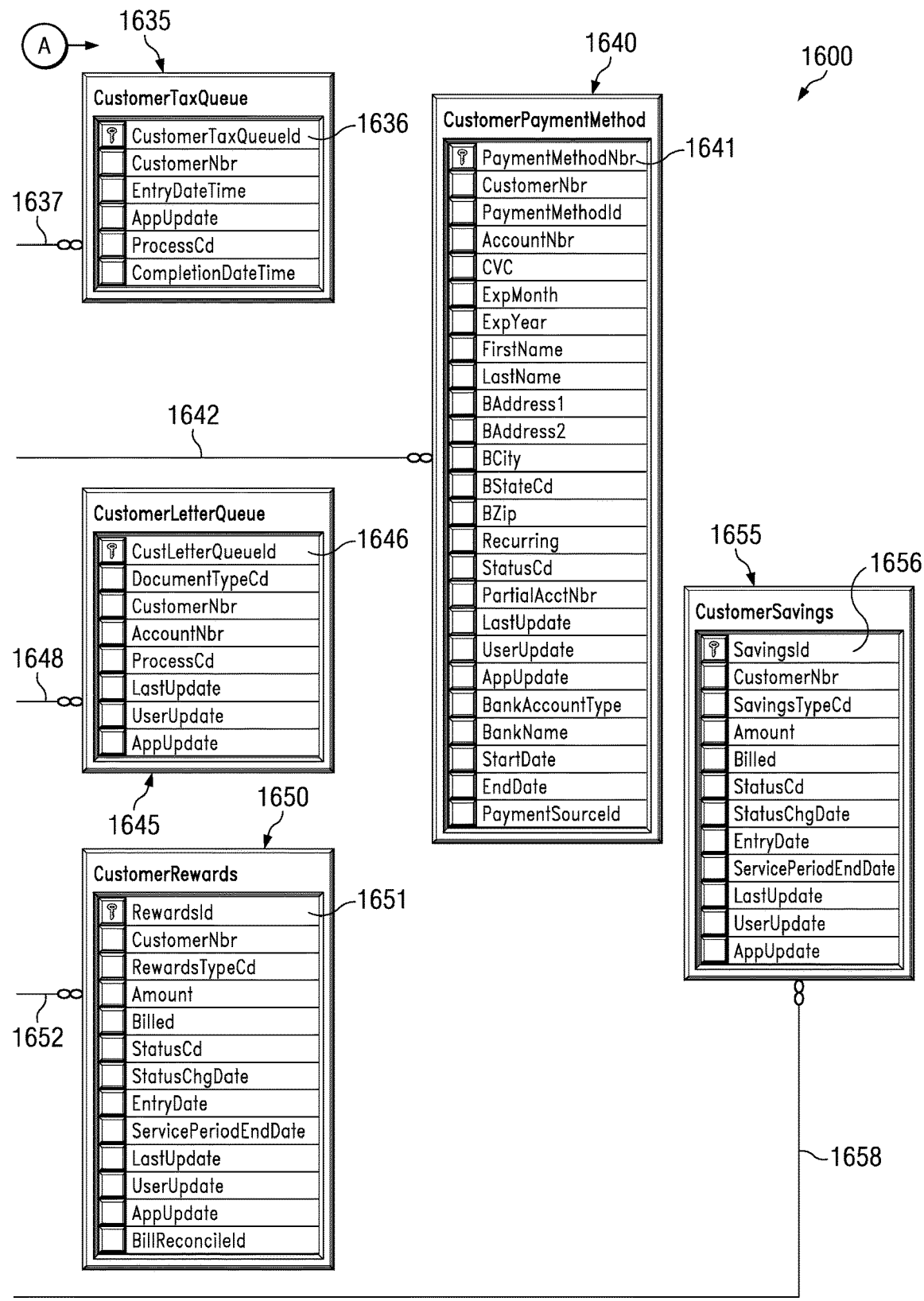
Figure 26C:
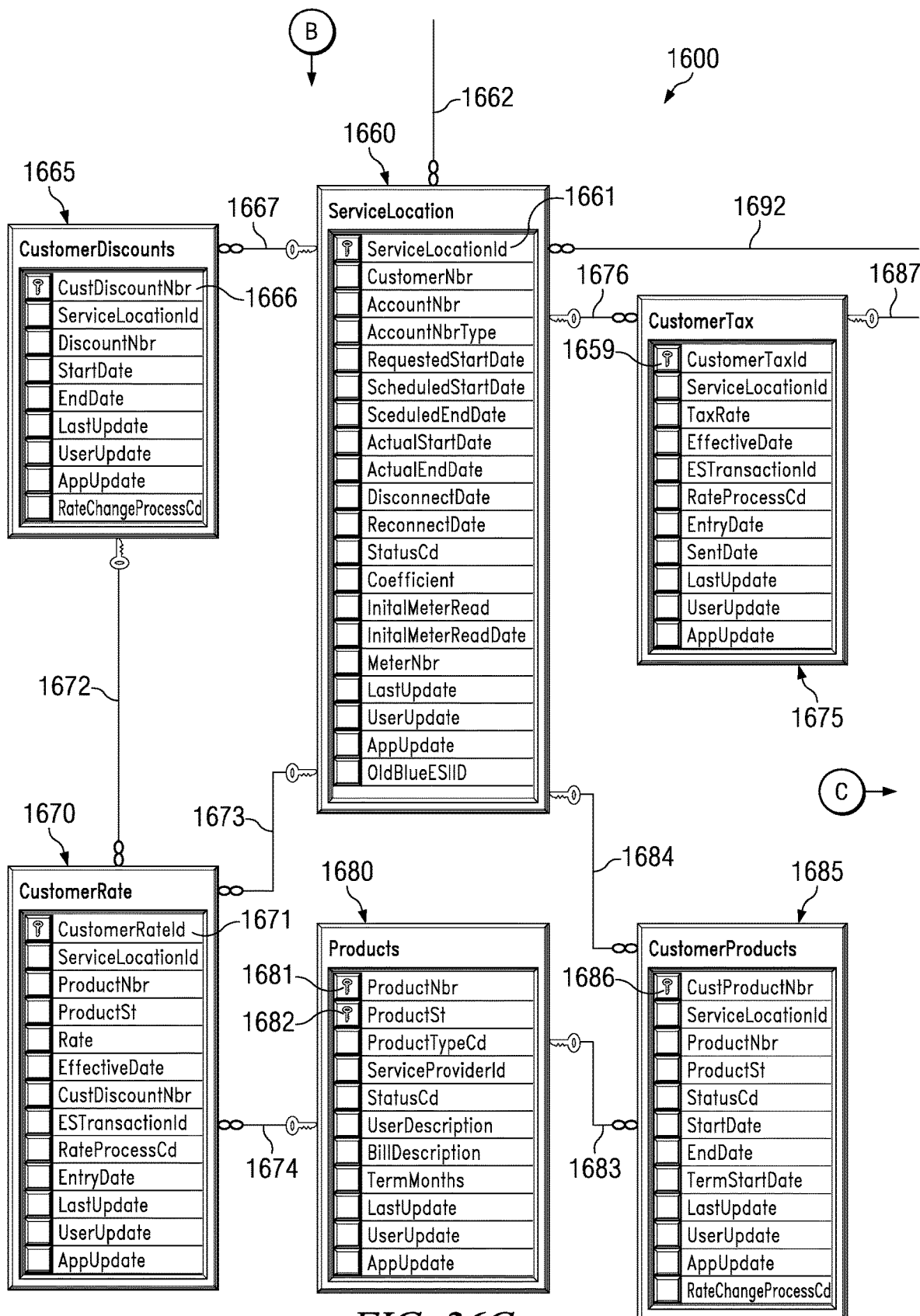
Figure 26D:
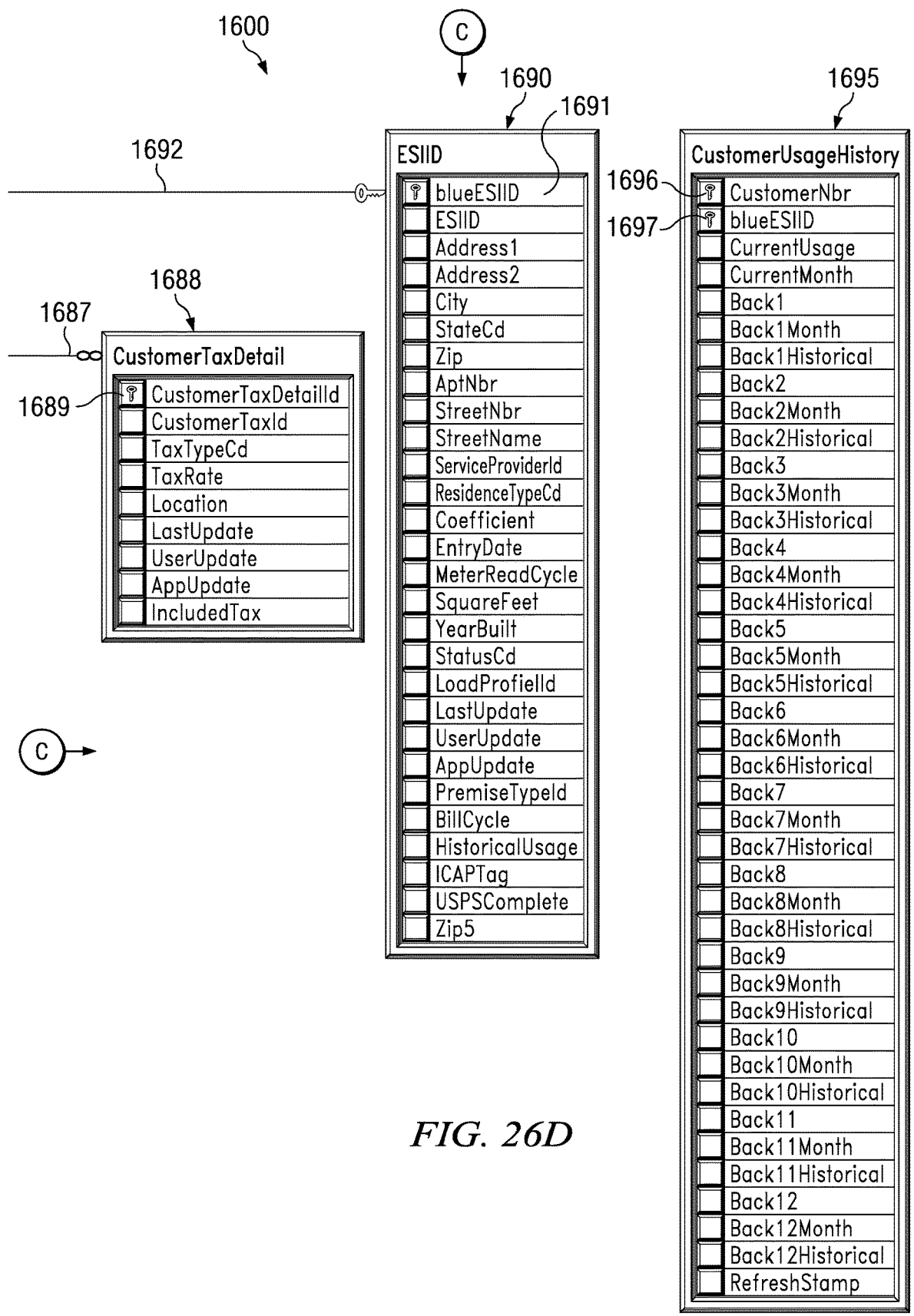

FIG. 25 is an entity-relationship diagram of the Sales Consultants entity 3500 within the preferred embodiment SQL database engine 150. Sales Consultants entity 3500 comprises a set of tables; ConsultantOrderDtl table 3501 for containing product order detail records, ConsultantOrderDtl table 3501 having a primary key ConsultantOrderDtlIdr 3502; ConsultantOrders table 3503 for containing customer order data, ConsultantOrders table 3503 having combination primary keys ConsultantOrderID 3504 and OrderNumber 3505; ConsultantWebData table 3506 for recording web status information for a consultant, ConsultantWebData table 3506 having a primary key ConsultantId 3507; CustomerInfo table 3508 for containing customer data, CustomerInfo table 3508 having a primary key CustomerNbr 3509; ConsultantInfo table 3510 for containing consultant information, ConsultantInfo table 3510 having a primary key ConsultantID 3511; CRIInfo table 3512 for holding customer residual income data, CRIInfo table 3512 having combination primary keys DPICustNbr 3513 and CRINbr 3514.

CustomerInfo table 3508 has a one-to-many relationship 3515 with CRIInfo table 3512 wherein CRIInfo table 3512 contains foreign key DPICustNbr 3513 corresponding to CustomerInfo table primary key 3509.

FIGS. 26A, 26B, 26C and 26D combine to form an entity-relationship diagram of the Customer and Service entity 1600 within the preferred embodiment SQL database engine 150. Customer and Service entity 1600 comprises a set of tables: Customer table 1605 for containing detailed customer records with customer specific information, Customer table 1605 having a primary key CustomerNbr 1606; CustomerProtection table 1610 for containing customer protection status records, CustomerProtection table 1610 having a primary key ProtectNbr 1611; CustomerMail table 1615 for containing records relating to customer mail, CustomerMail table 1615 having primary key MailID 1616; CustomerCredit table 1620 for containing credit related records for customers, CustomerCredit table 1620 having primary key CustomerNbr 1621; CustomerCreditHistory table 1625 for containing records of credit histories pertaining to customers, CustomerCreditHistory table 1625 having a combination of primary keys, CustomerNbr 1626 and ChangeDate 1627; Notes table 1630 for containing records of notes left by service personnel on customer accounts, Notes table 1630 having a primary key NotesNbr 1631; CustomerTaxQueue table 1635 for holding a queue of tax related records for customers, CustomerTaxQueue table 1635 having a primary key CustomerTaxQueueID 1636; CustomerPaymentMethod table 1640 for holding payment method information for customers, CustomerPaymentMethod table 1640 having a primary key PaymentMethodNbr 1641; CustomerLetterQueue table 1645 for holding a queue of customer documents to be sent to customers, CustomerLetterQueue table 1645 having a primary key CustomerLetterQueueID 1646; CustomerRewards table 1650 for holding records related to customer reward information, CustomerRewards table 1650 having a primary key, RewardsID 1651; CustomerSavings table 1655 for containing records of customer savings per service period, CustomerSavings table 1655 having a primary key SavingsID 1656; ServiceLocation table 1660 for containing records of location and connection histories, ServiceLocation table 1660 having a primary key ServiceLocationID 1661; CustomerDiscounts table 1665 for containing records relating to customer discounts, CustomerDiscounts table 1665 having primary key CustDiscountNbr 1666; CustomerRate table 1670 for containing product rate related records for customers, CustomerRate table 1670 having primary key CustomerRateID 1671; CustomerTax table 1675 for containing records of tax rates for customers, CustomerTax table 1675 having a primary key, CustomerTaxID 1659; Products table 1680 for containing records of available products, Products table 1680 having a combination of primary keys, ProductNbr 1681 and ProductSt 1682; CustomerProducts table 1685 for containing records of products used at specific service locations, CustomerProducts table 1685 having a primary key CustomerProductNbr 1686; CustomerTaxDetail table 1688 for holding detailed tax rate and tax type records for customers, CustomerTaxDetail table 1688 having a primary key CustomerTaxDetailID 1689; ESIID table 1690 for holding records of information specific to ESI ID numbers, ESIID table 1690 having a primary key blueESIID 1691; CustomerUsageHistory table 1695 for containing historical records of customer usage specific to customers and ESI ID numbers, CustomerUsageHistory table 1695 having a combination of primary keys, CustomerNbr 1696 and blueESIID 1697.

Customer table 1605 has a one-to-many relationship 1612 with CustomerProtection table 1610 wherein CustomerProtection table 1610 contains foreign key CustomerNbr corresponding to Customer table 1605 primary key 1606. Customer table 1605 has a one-to-many relationship 1617 with CustomerMail table 1615 wherein CustomerMail table 1615 contains foreign key CustomerNbr corresponding to Customer table 1605 primary key 1606. Customer table 1605 has a one-to-one relationship 1622 with CustomerCredit table 1620 wherein CustomerCredit table 1620 contains foreign key CustomerNbr 1621 corresponding to Customer table 1605 primary key 1606. Customer table 1605 has a one-to-many relationship 1632 with Notes table 1630 wherein Notes table 1630 contains foreign key CustomerNbr corresponding to Customer table 1605 primary key 1606. Customer table 1605 has a one-to-many relationship 1628 with CustomerCreditHistory table 1625 wherein CustomerCreditHistory table 1625 contains foreign key CustomerNbr corresponding to Customer table 1605 primary key 1606. Customer table 1605 has a one-to-many relationship 1637 with CustomerTaxQueue table 1635 wherein CustomerTaxQueue table 1635 contains foreign key CustomerNbr corresponding to Customer table 1605 primary key 1606. Customer table 1605 has a one-to-many relationship 1642 with CustomerPaymentMethod table 1640 wherein CustomerPaymentMethod table 1640 contains foreign key CustomerNbr corresponding to Customer table 1605 primary key 1606. Customer table 1605 has a one-to-many relationship 1648 with CustomerLetterQueue table 1645 wherein CustomerLetterQueue table 1645 contains foreign key CustomerNbr corresponding to Customer table 1605 primary key 1606. Customer table 1605 has a one-to-many relationship 1652 with CustomerRewards table 1650 wherein CustomerRewards table 1650 contains foreign key CustomerNbr corresponding to Customer table 1605 primary key 1606. Customer table 1605 has a one-to-many relationship 1658 with CustomerSavings table 1655 wherein CustomerSavings table 1655 contains foreign key CustomerNbr corresponding to Customer table 1605 primary key 1606. Customer table 1605 has a one-to-many relationship 1662 with ServiceLocation table 1660 wherein Service Location table 1660 contains foreign key CustomerNbr corresponding to Customer table 1605 primary key 1606.

ServiceLocation table 1660 has a one-to-many relationship 1667 with CustomerDiscounts table 1665 wherein CustomerDiscounts table 1665 contains foreign key ServiceLocationID corresponding to ServiceLocation table 1660 primary key 1661. ServiceLocation table 1660 has a one-to-many relationship 1673 with CustomerRate table 1670 wherein CustomerRate table 1670 contains foreign key ServiceLocationID corresponding to ServiceLocation table 1660 primary key 1661. ServiceLocation table 1660 has a one-to-many relationship 1676 with CustomerTax table 1675 wherein CustomerTax table 1675 contains foreign key ServiceLocationID corresponding to ServiceLocation table 1660 primary key 1661. ServiceLocation table 1660 has a one-to-many relationship 1684 with CustomerProducts table 1685 wherein CustomerProducts table 1685 contains foreign key ServiceLocationID corresponding to ServiceLocation table 1660 primary key 1661.

Products table 1680 has a one-to-many relationship 1674 with CustomerRate table 1670 wherein CustomerRate table 1670 contains foreign keys ProductNbr and ProductSt corresponding to Products table 1680 primary keys 1681 and 1682, respectively. Products table 1680 has a one-to-many relationship 1683 with CustomerProducts table 1685 wherein CustomerProducts table 1685 contains foreign keys ProductNbr and ProductSt corresponding to Products table 1680 primary keys 1681 and 1682, respectively.

CustomerDiscounts table 1665 has a one-to-many relationship 1672 with CustomerRate table 1670 wherein CustomerRate table 1670 contains foreign key CustDiscountNbr corresponding to CustomerDiscounts table 1665 primary key 1666.

ESIID table 1690 has a one-to-many relationship 1692 with ServiceLocation table 1660 wherein ServiceLocation table 1660 contains foreign key OldBlueESIID corresponding to ESIID table 1690 primary key 1691.

CustomerTax table 1675 has a one-to-many relationship 1687 with CustomerTaxDetail table 1688 wherein CustomerTaxDetail table 1688 contains foreign key CustomerTaxID corresponding to CustomerTax table 1675 primary key 1659.

Figure 27:
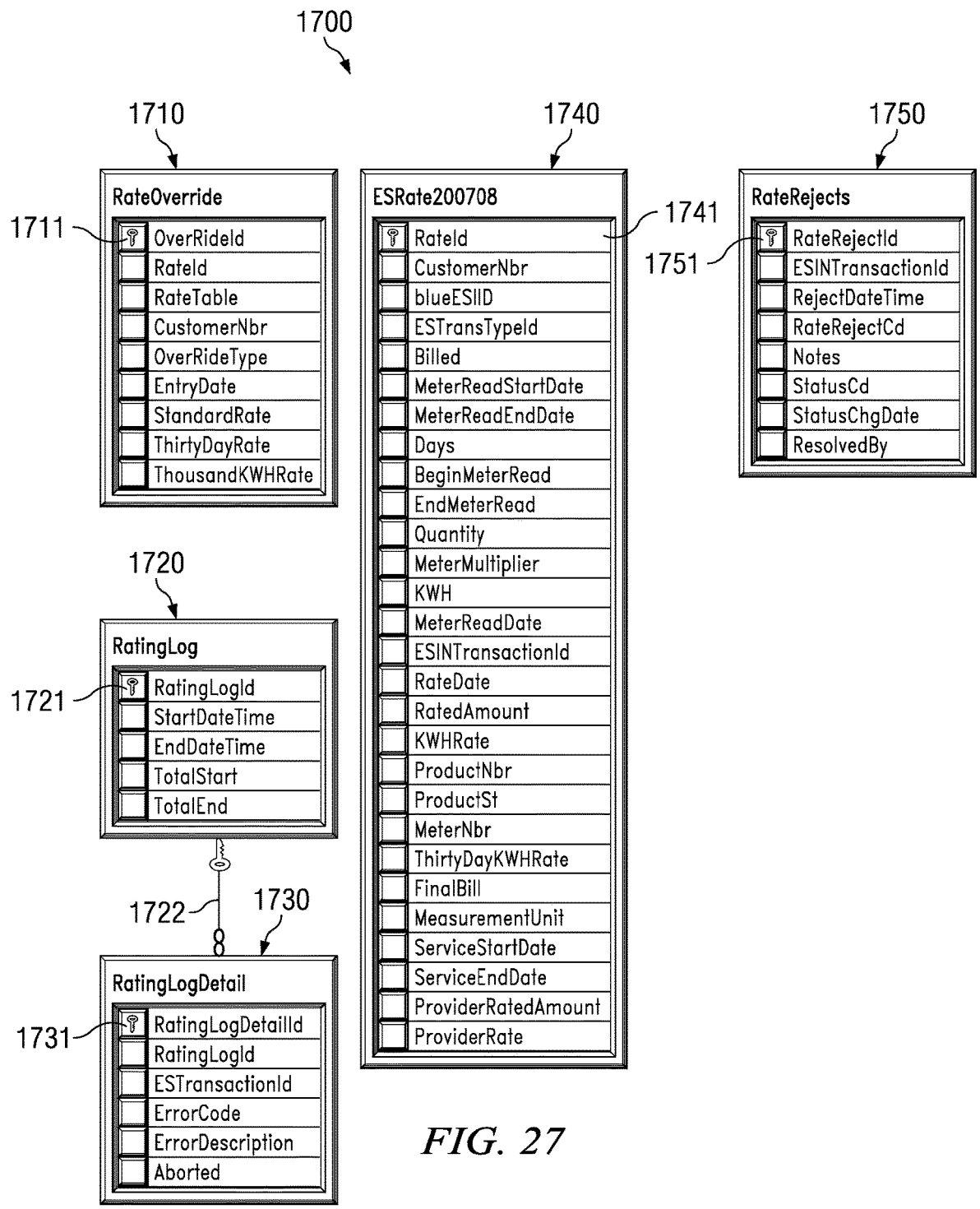
FIG. 27 is an entity relationship diagram of the rating entity in the preferred embodiment.

FIG. 27 is an entity-relationship diagram of the Rating entity 1700 within the preferred embodiment SQL database engine 150. Rating entity 1700 comprises a set of tables, RateOverride table 1710 for holding override records for customers, RateOverride table 1710 having a primary key OverRideId 1711; RatingLog table 1720 for logging rate periods, RatingLog table 1720 having a primary key RatingLogId 1721; RatingLogDetail table 1730 for holding detailed data related to rate logs, RatingLogDetail table 1730 having a primary key RatingLogDetailID 1731; ESRate200708 table 1740 for holding rate data, ESRate200708 table 1740 having a primary key RateID 1741, and RateRejects table 1750 for capturing records of rejected usage rates, RateRejects table 1750 having a primary key RateRejectId 1751.

RatingLog 1720 has a one to many relationship 1722 with RatingLogDetail 1730, wherein RatingLogDetail 1730 contains foreign key RatingLogId 1731 corresponding to RatingLog table 1720 primary key 1721.

Figure 28:
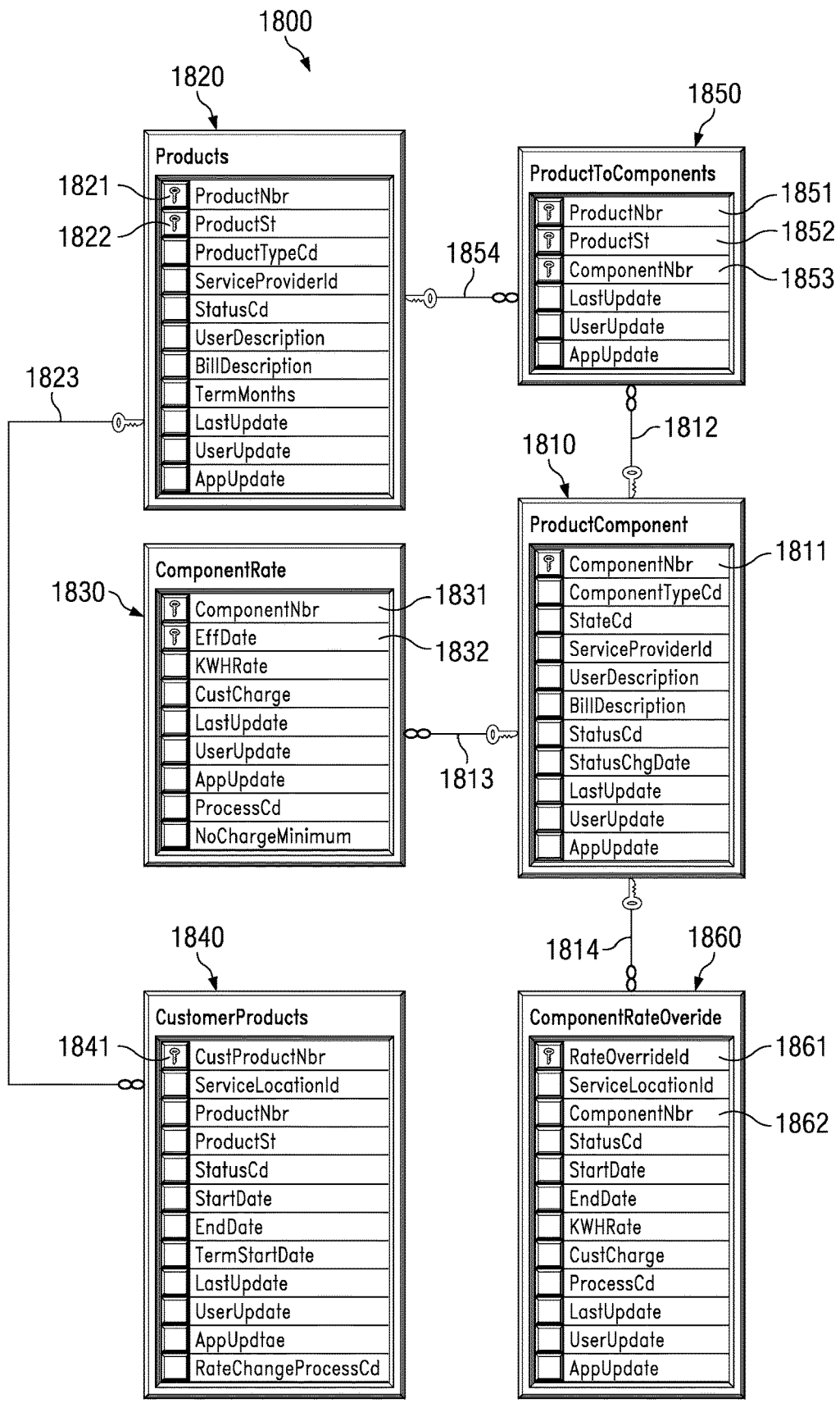
FIG. 28 is an entity relationship diagram of the products/rates entity in the preferred embodiment.

FIG. 28 is an entity-relationship diagram of the products/rates entity 1800 within the preferred embodiment SQL database engine 150. Products/rates entity 1800 comprises a set of tables: ProductComponent table 1810 for holding records of product descriptions and status, ProductComponent table 1810 having a primary key ComponentNbr 1811; Products table 1820 for containing a record of available products, Products table 1820 having a combination of primary keys, ProductNbr 1821 and ProductSt 1822; ComponentRate table 1830 for containing rates for product components, ComponentRate table 1830 having a combination of primary keys; ComponentNbr 1831 and EffDate 1832, CustomerProducts table 1840 for containing customer product assignments and related information, CustomerProducts table 1840 having a primary key CustProductNbr 1841, ProductToComponents table 1850 for translating product codes to product component codes, ProductToComponents table 1850 having a combination of primary keys; ProductNbr 1851, ProductSt 1852 and ComponentNbr 1853, and ComponentRateOverride table 1860 for holding component pricing overrides, ComponentRateOverride table 1860 having a primary key RateOverrideId 1861.

ProductComponent table 1810 has a one to many relationship 1812 with ProductToComponents table 1850 wherein ProductToComponents table 1850 contains foreign key ComponentNbr 1853 corresponding to ProductComponent table 1810 primary key ComponentNbr 1811.

ProductComponent table 1810 has a one to many relationship 1813 with ComponentRate table 1830 wherein ComponentRate table 1830 contains foreign key ComponentNbr 1831 corresponding to ProductComponent table 1810 primary key ComponentNbr 1811.

ProductComponent table 1810 has a one to many relationship 1814 with ComponentRateOverride table 1860 wherein ComponentRateOverride table 1860 contains foreign key ComponentNbr 1862 corresponding to ProductComponent table 1810 primary key ComponentNbr 1811.

Products table 1820 has a one to many relationship 1854 with ProductToComponents table 1850 wherein ProductToComponents table 1850 has combination foreign keys ProductNbr 1851 and ProductSt 1852 corresponding to Products table 1820 combination primary keys ProductNbr 1821 and ProductSt 1822.

Products table 1820 has a one to many relationship 1823 with CustomerProducts table 1840 wherein CustomerProducts table 1840 contains combination foreign keys ProductNbr and ProductSt corresponding to Products table 1820 combination primary keys ProductNbr 1821 and ProductSt 1822.

Figure 29:
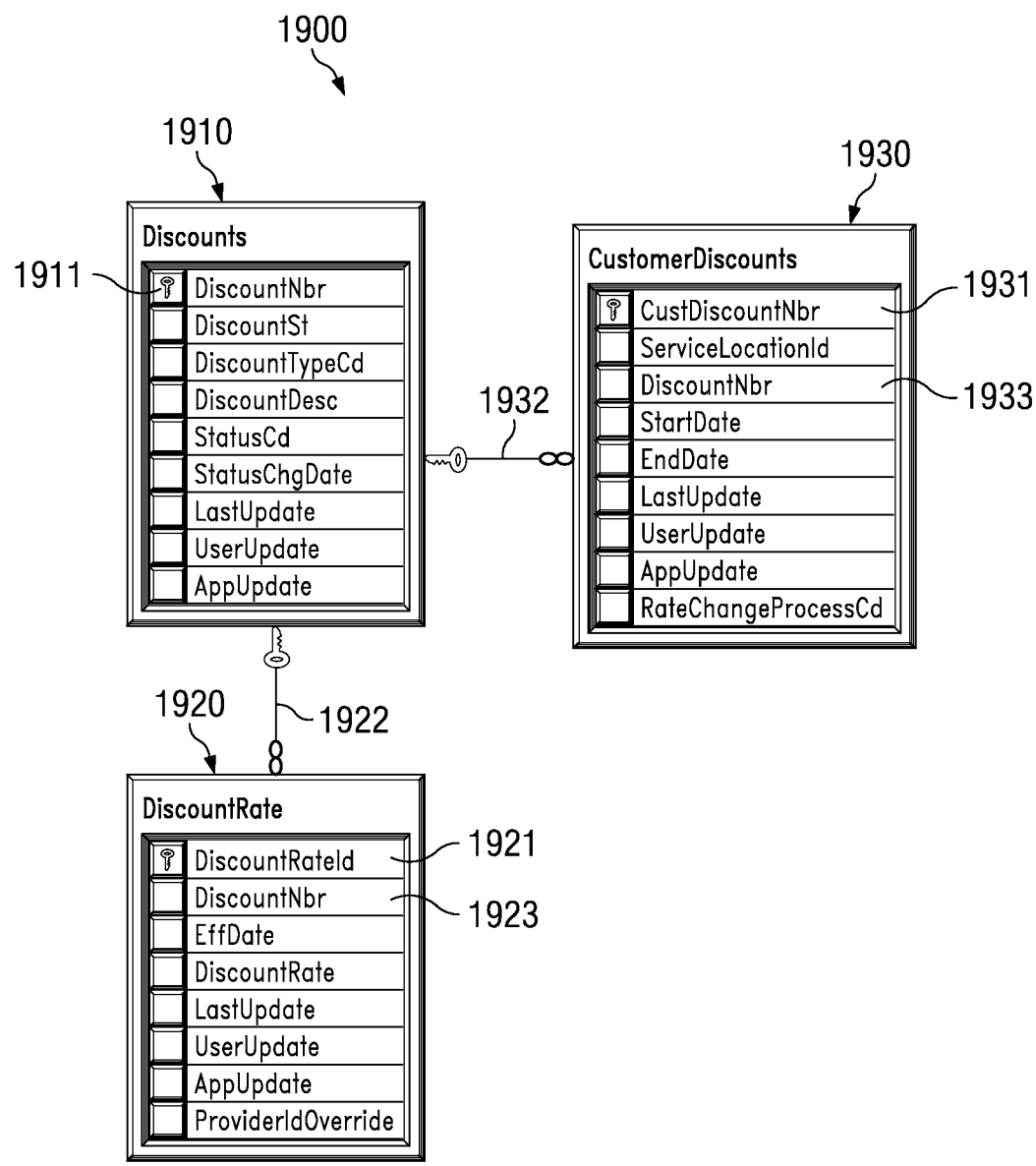
FIG. 29 is an entity relationship diagram of the discounts entity in the preferred embodiment.

FIG. 29 is an entity-relationship diagram of the Discounts entity 1900 within the preferred embodiment SQL database engine 150. Discounts entity 1900 comprises a set of tables, Discounts table 1910 for containing records of types of customer discounts, having a primary key DiscountNbr 1911; DiscountRate table 1920 for containing records of discount rates, having a primary key DiscountRateID 1921, and CustomerDiscounts table 1930 for holding records of customer discounts given, having a primary key CustDiscountNBr 1931.

Discounts table 1910 has a one to many relationship 1922 with DiscountRate table 1920 wherein DiscountRate table 1920 contains foreign key DiscountNbr 1923 corresponding to Discounts table 1910 primary key DiscountNbr 1911.

Discounts table 1910 has a one to many relationship 1932 with CustomerDiscounts table 1930 wherein CustomerDiscounts table 1930 contains foreign key DiscountNbr 1933 corresponding to Discounts table 1910 primary key DiscountNbr 1911.

Figure 30:
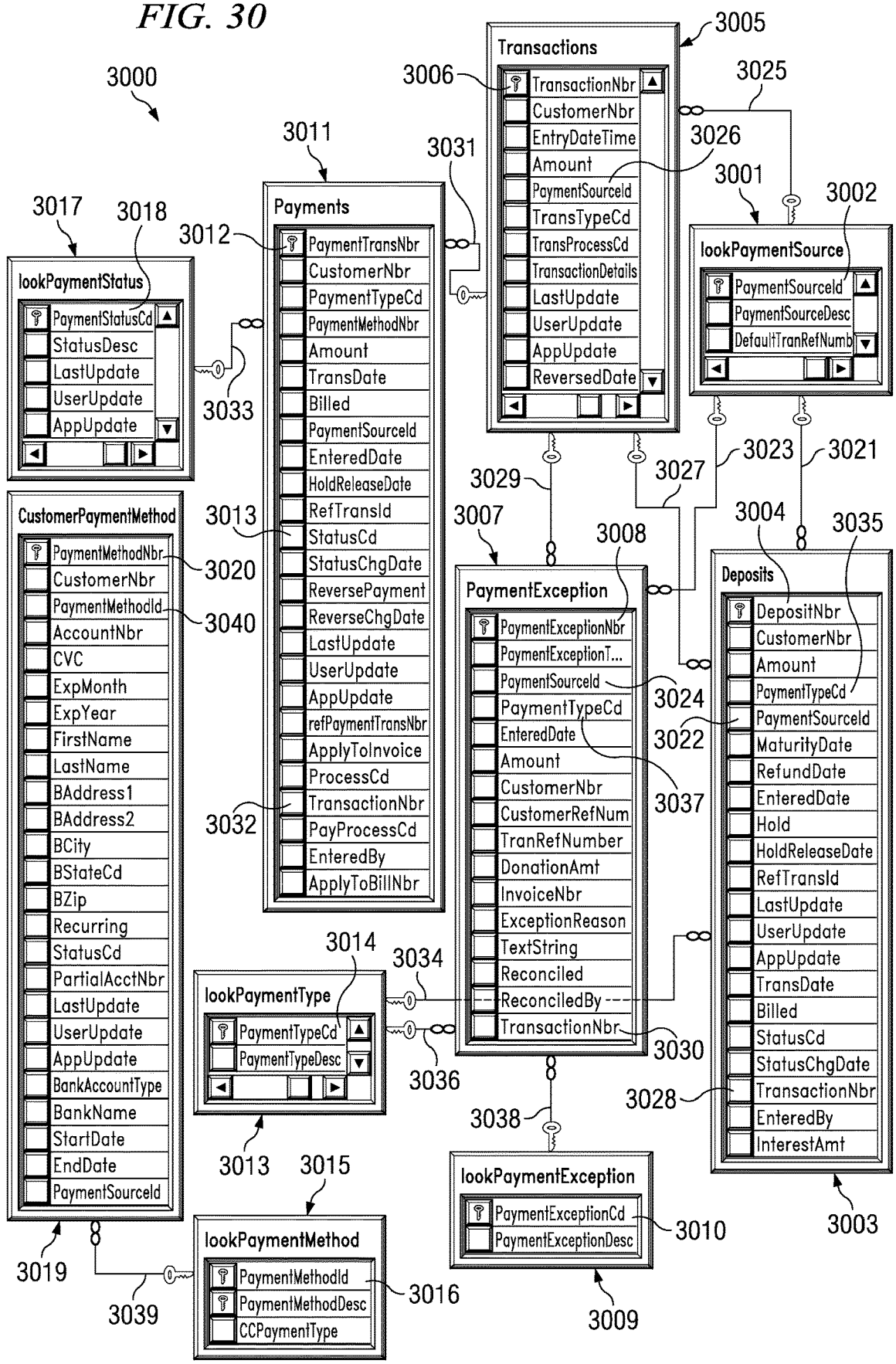
FIG. 30 is an entity relationship diagram of the payments entity in the preferred embodiment.

FIG. 30 is an entity-relationship diagram of the Payments entity 3000 within the preferred embodiment SQL database engine 150. Payments entity 3000 comprises a set of tables; LookPaymentSource table 3001 for containing a list of payment sources, LookPaymentSource table 3001 having a primary key PaymentSourceId 3002; Deposits table 3003 for containing records of customer service deposits, Deposits table 3003 having a primary key DepositNbr 3004; Transactions table 3005 for keeping records of customer transactions regarding payments, Transactions table 3005 having a primary key TransactionNbr 3006; PaymentException table 3007 for holding records related to payment errors, PaymentException table 3007 having a primary key PaymentExceptionNbr 3008; LookPaymentException table 3009 for containing a list of payment exception types, LookPaymentException table 3009 having a primary key PaymentExceptionCd 3010; Payments table 3011 for keeping records of customer payments received, Payments table 3011 having a primary key PaymentTransNbr 3012; LookPaymentType table 3013 for containing payment type descriptions, LookPaymentType table 3013 having a primary key PaymentTypeCd 3014; LookPaymentMethod table 3015 for containing a list of payment methods, LookPaymentMethod table 3015 having a primary key PaymentMethodld 3016; LookPaymentStatus table 3017 having a primary key PaymentStatusCd 3018; CustomerPaymentMethod table 3019 for containing payment status descriptions, CustomerPaymentMethod table 3019 having a primary key PaymentMethodNbr 3020.

LookPaymentSource table 3001 has a one-to-many relationship 3021 with Deposits table 3003 wherein Deposits table 3003 contains foreign key PaymentSourceId 3022 corresponding to LookPaymentSource table 3001 primary key 3002. LookPaymentSource table 3001 has a one-to-many relationship 3023 with PaymentException table 3007 wherein PaymentException table 3007 contains foreign key PaymentSourceId 3024 corresponding to LookPaymentSource table 3001 primary key 3002. LookPaymentSource table 3001 has a one-to-many relationship 3025 with Transactions table 3005 wherein Transactions table 3005 contains foreign key PaymentSourceId 3026 corresponding to LookPaymentSource table 3001 primary key 3002. Transactions table 3005 has a one-to-many relationship 3027 with Deposits table 3003 wherein Deposits table 3003 contains foreign key TransactionNbr 3028 corresponding to Transactions table 3005 primary key 3006. Transactions table 3005 has a one-to-many relationship 3029 with PaymentException table 3007 wherein PaymentException table 3007 contains foreign key TransactionNbr 3030 corresponding to Transactions table 3005 primary key 3006. Transactions table 3005 has a one-to-many relationship 3031 with Payments table 3011 wherein Payments table 3011 contains foreign key TransactionNbr 3032 corresponding to Transactions table 3005 primary key 3006.

LookPaymentStatus table 3017 has a one-to-many relationship 3033 with Payments table 3011 wherein Payments table 3011 contains foreign key StatusCd 3013 corresponding to LookPaymentsStatus table 3017 primary key 3018.

LookPaymentType table 3013 has a one-to-many relationship 3034 with Deposits table 3003 wherein Deposits table 3003 contains foreign key PaymentTypeCd 3035 corresponding to LookPaymentType table 3015 primary key 3014. LookPaymentType table 3013 has a one-to-many relationship 3036 with PaymentException table 3007 wherein PaymentException table 3007 contains foreign key PaymentTypeCd 3037 corresponding to LookPaymentType table 3013 primary key 3014.

LookPaymentException table 3009 has a one-to-many relationship 3038 with PaymentException table 3007 wherein PaymentException table 3007 contains foreign key PaymentExceptionType (shown as "PaymentExceptionT . . . " in FIG. 30) corresponding to LookPaymentException table 3009 primary key 3010. LookPaymentMethod table 3015 has a one-to-many relationship 3039 with CustomerPaymentMethod table 3019 wherein CustomerPaymentMethod table 3019 contains foreign key PaymentMethodld 3040 corresponding to LookPaymentMethod table 3015 primary key 3016.

Figure 31A:
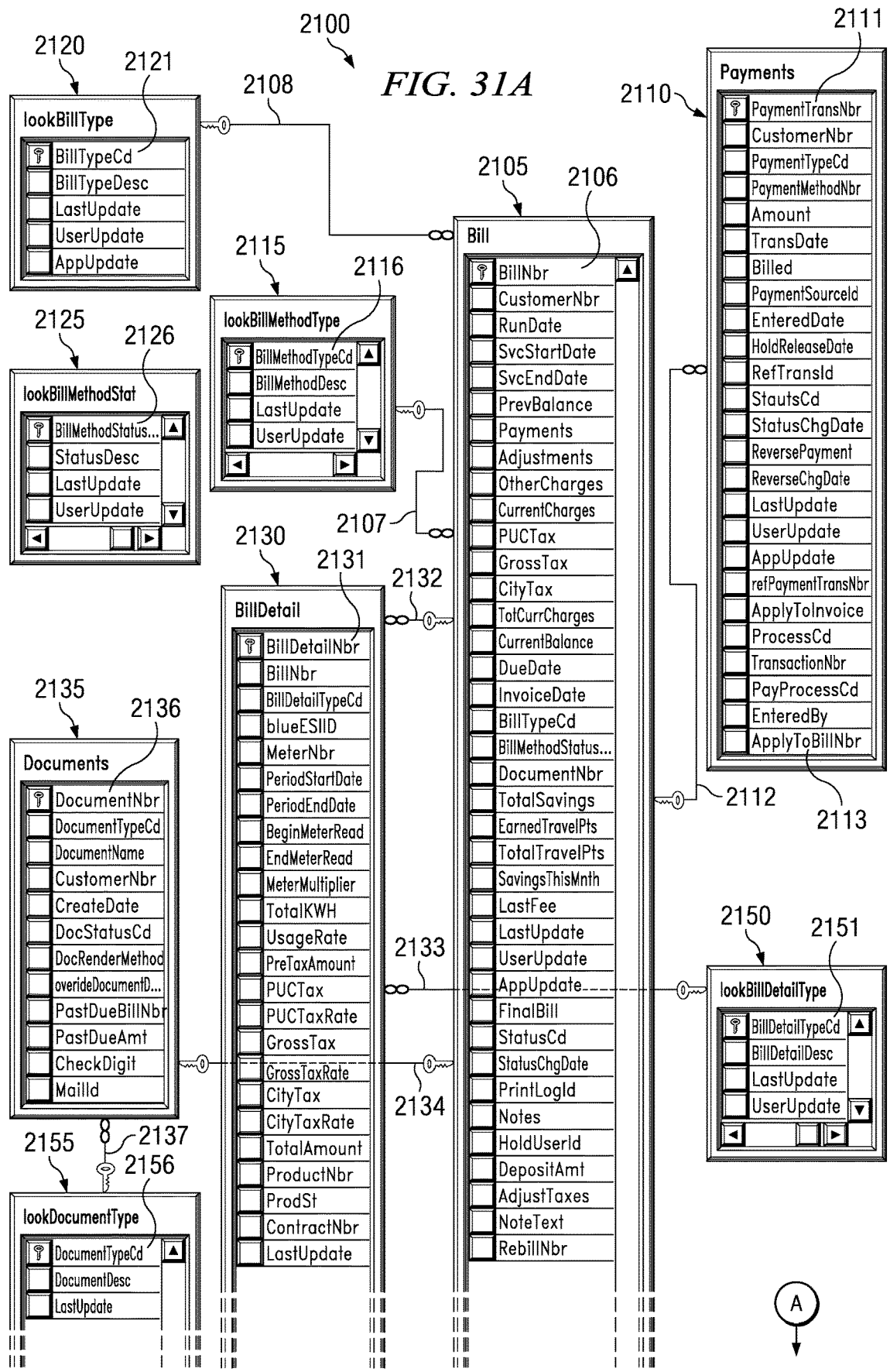
FIGS. 31a and 31b comprise an entity relationship diagram of the billing entity in the preferred embodiment.
Figure 31B:
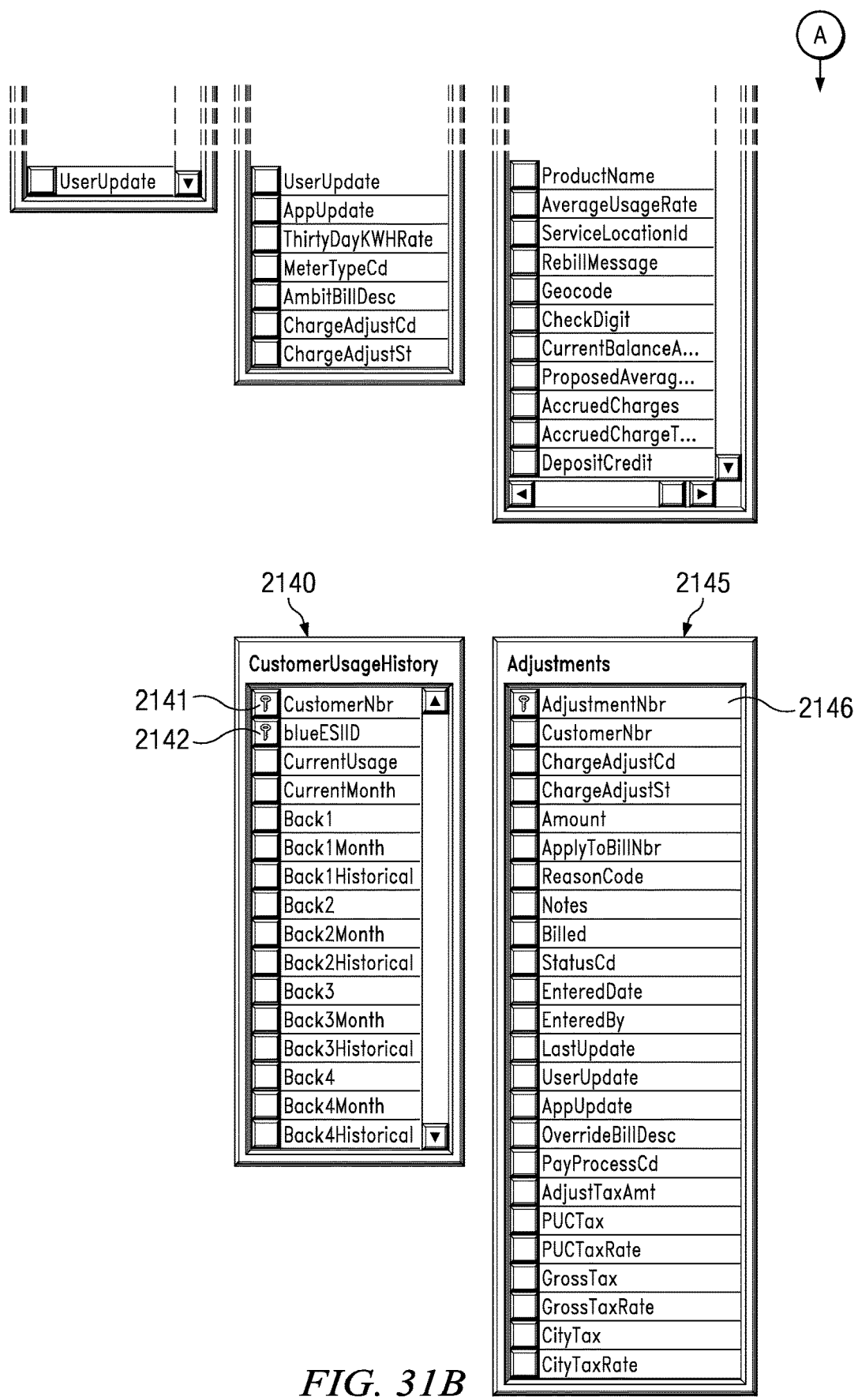

FIGS. 31A and 31B combine to form an entity-relationship diagram of the Billing entity 2100 within the preferred embodiment SQL database engine 150. Billing entity 2100 comprises a set of tables: Bill table 2105 for containing records of customer bills, Bill table 2105 having a primary key BillNbr 2106; Payments table 2110 for containing payment records of customers, Payments table 2110 having a primary key PaymentTransNbr 2111; lookBillMethodType table 2115 for containing bill methods for bill types, lookBillMethodType table 2115 having a primary key BillMethodTypeCd 2116; lookBillType table 2120 for containing records of bill types, lookBillType table 2120 having primary key BillTypeCd 2121; lookBillMethodStatus table 2125 for containing status information for billing methods, lookBillMethodStatus table 2125 having a primary key BillMethodStatusCd 2126; BillDetail table 2130 for containing detailed billing records reporting usages and other ESIID information, BillDetail table 2130 having a primary key BillDetailNbr 2131; Documents table 2135 for containing records of customer documents related to billing, Documents table 2135 having a primary key DocumentNbr 2136; CustomerUsageHistory table 2140 for recording historical customer usage data, CustomerUsageHistory table 2140 having a combination of primary keys, CustomerNbr 2141 and blueESIID 2142; Adjustments table 2145 for containing records of customer bill adjustments, Adjustments table 2145 having a primary key AdjustmentNbr 2146; LookBillDetailType table 2150 for containing descriptive records for BillDetail table 2130, LookBillDetailType table 2150 having a primary key, BillDetailTypeCd 2151. LookDocumentType table 2155 for containing descriptive records for Documents table 2135, LookDocumentType table 2155 having a primary key, DocumentTypeCd 2156.

Bill table 2105 has a one-to-many relationship 2112 with Payments table 2110 wherein Payments table 2110 contains foreign key ApplyToBillNbr 2113 corresponding to Bill table 2105 primary key 2106. Bill table 2105 has a one-to-many relationship 2132 with BillDetail table 2130 wherein BillDetail table 2130 contains foreign key BillNbr corresponding to Bill table 2105 primary key 2106. Documents table 2135 has a one to one relationship 2134 with Bill table 2105 wherein Bill table 2105 contains foreign key DocumentNbr corresponding to Documents table 2135 primary key 2136.

LookBillMethodType 2115 has a one-to-many relationship 2107 with Bill table 2105 wherein Bill table 2105 contains foreign key BillMethodTypeCd (not shown) corresponding to lookBillMethodType table 2115 primary key 2116. LookBillType 2120 has a one-to-many relationship 2108 with Bill table 2105 wherein Bill table 2105 contains foreign key BillTypeCd corresponding to lookBillType table 2120 primary key 2121. LookBillDetailType 2150 has a one-to-many relationship 2133 with BillDetail table 2130 wherein BillDetail table 2130 contains foreign key BillDetailTypeCd corresponding to lookBillDetailType table 2150 primary key 2151. LookDocumentType 2155 has a one-to-many relationship 2137 with Documents table 2135 wherein Documents table 2135 contains foreign key DocumentTypeCd corresponding to lookDocumentType table 2155 primary key 2156.

Figure 32:
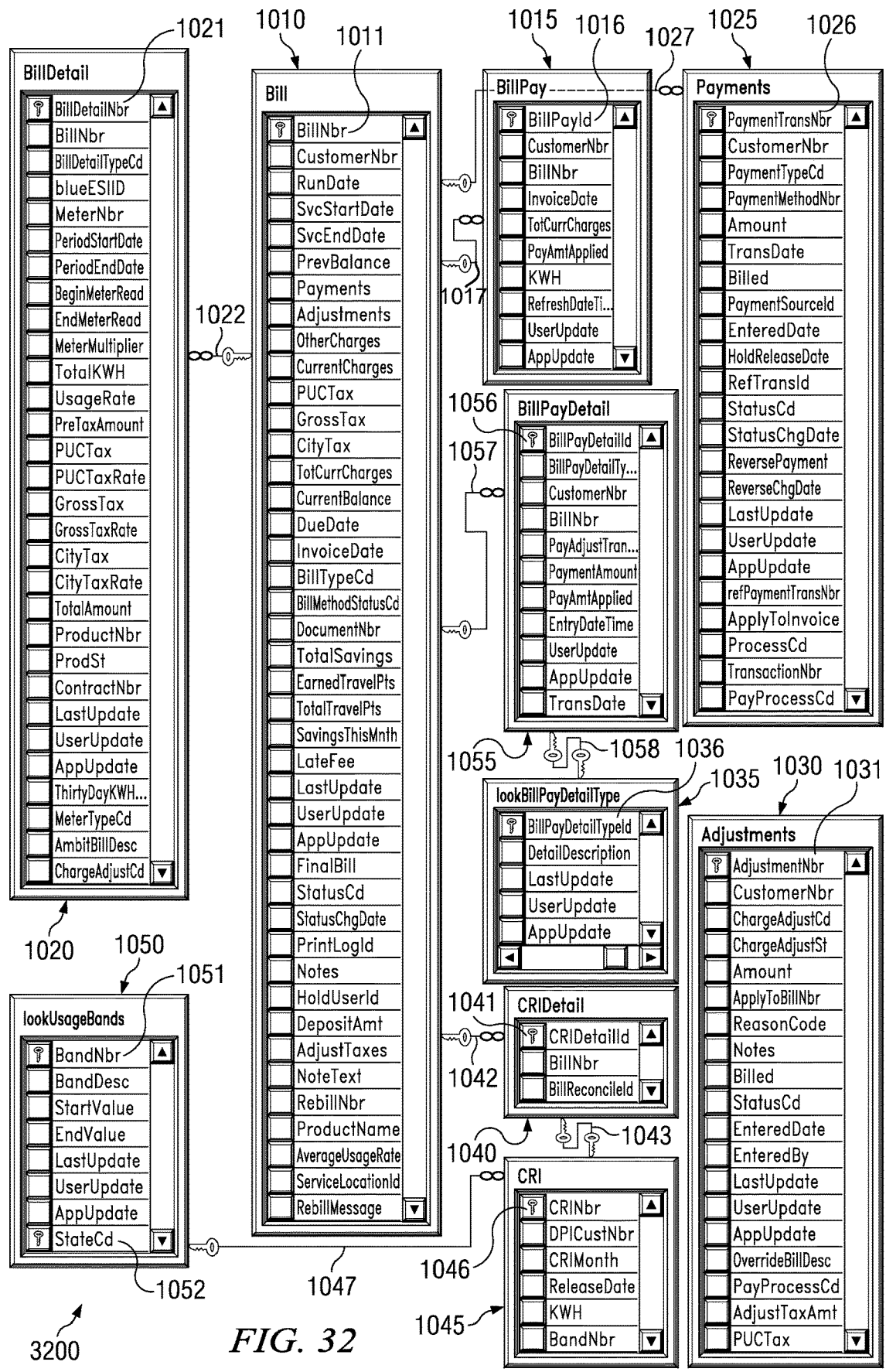
FIG. 32 is an entity relationship diagram of the commissions entity in the preferred embodiment.

FIG. 32 is an entity-relationship diagram of the Commissions entity 3200 within the preferred embodiment SQL database engine 150. Commissions entity 3200 comprises a set of tables: Bill table 1010 for containing records of customer bills, Bill table 1010 having a primary key BillNbr 1011; BillPay table 1015 for containing customer bill payment records, BillPay table 1015 having a primary key BillPayID 1016; BillDetail table 1020 for containing detailed customer billing records, BillDetail table 1020 having primary key BillDetailNbr 1021; Payments table 1025 for containing payment transaction records, Payments table 1025 having a primary key PaymentTransNbr 1026; BillPayDetail table 1055 for containing detailed billing records including payments and adjustments, BillPayDetail table 1055 having a primary key BillPayDetailID 1056; Adjustments table 1030 for containing records of customer account adjustments, Adjustments table 1030 having a primary key AdjustmentsNbr 1031; LookBillPayDetailType table 1035 for holding description records related to BillPayDetail, LookBillPayDetailType table 1035 having a primary key BillPayDetailTypeID 1036; CRIDetail table 1040 for translating between customer numbers and bill numbers, CRIDetail table 1040 having a primary key CRIDetailNbr 1041; and LookUsageBands table 1050 for containing customer banding information, LookUsageBands table 1050 having combination primary keys, BandNbr 1051 and StateCd 1052, CRI table 1045 for holding data related to payment of sales commissions; CRI table 1045 having a primary key CrInbr 1046.

Bill table 1010 has a one-to-many relationship 1022 with BillDetail table 1020 wherein BillDetail table 1020 contains foreign key BillNbr corresponding to Bill table 1010 primary key 1011. Bill table 1010 has a one-to-many relationship 1017 with BillPay table 1015 wherein BillPay table 1015 contains foreign key BillNbr corresponding to Bill table 1010 primary key 1011. Bill table 1010 has a one-to-many relationship 1057 with BillPayDetail table 1055 wherein BillPayDetail table 1055 contains foreign key BillNbr corresponding to Bill table 1010 primary key 1011. Bill table 1010 has a one-to-many relationship 1042 with CRIDetail table 1040 wherein CRIDetail table 1040 contains foreign key BillNbr corresponding to Bill table 1010 primary key 1011. Bill table 1010 has a many-to-many relationship 1027 with Payments table 1025 wherein Payments table 1025 contains foreign key BillNbr (not shown) corresponding to Bill table 1010 primary key 1011.

LookBillPayDetail table 1035 has a one-to-one relationship 1058 with BillPayDetail table 1055 wherein BillPayDetail table 1055 contains foreign key BillPayDetailTypeID corresponding to LookBillPayDetailType table 1035 primary key 1036.

CRT table 1045 has a one-to-one relationship 1043 with CRIDetail table 1040 wherein CRIDetail table 1040 contains foreign key CRINbr (not shown) corresponding to CRT table 1045 primary key 1046.

LookUsageBands table 1050 has a one-to-many relationship 1047 with CRI table 1045 wherein CRI table 1045 contains foreign key BandNbr corresponding to LookUsageBands table 1050 primary key 1051.

Figure 33:
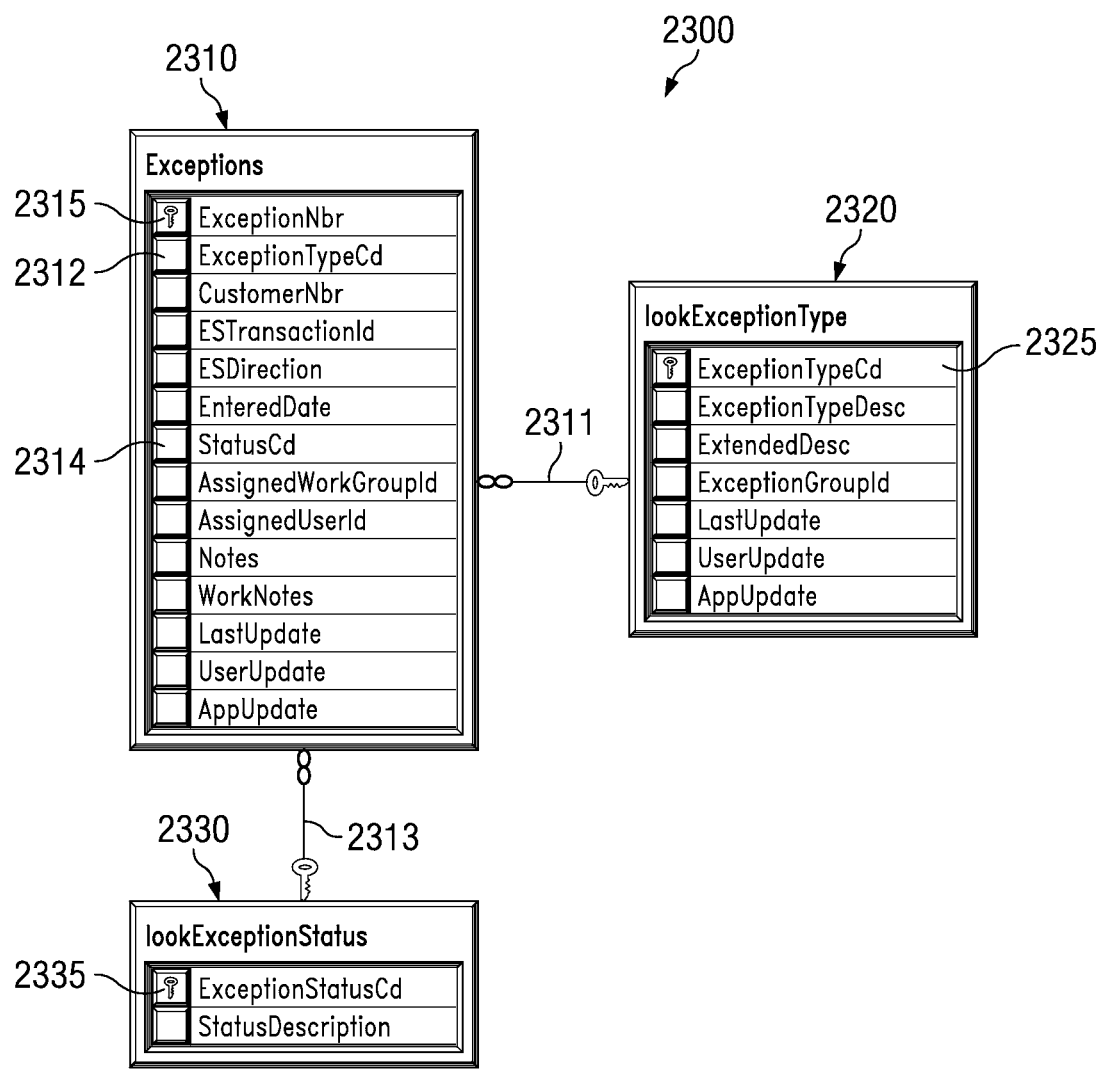
FIG. 33 is an entity relationship diagram of the exceptions entity in the preferred embodiment.

FIG. 33 is an entity-relationship diagram of the Exceptions entity 2300 within the preferred embodiment SQL database engine 150. Exceptions entity 2300 comprises a set of tables; Exceptions table 2310 for containing records of system exceptions, Exceptions table 2310 having a primary key ExceptionNbr 2315; LookExceptionType table 2320 for containing a list of exception types, LookExceptionType table 2320 having a primary key ExceptionTypeCd 2325; LookExceptionStatus table 2330 for containing list of status descriptions, LookExceptionStatus table 2330 having a primary key ExceptionStatusCd 2335.

LookExceptionType table 2320 has a one-to-many relationship 2311 with Exceptions table 2310 wherein Exceptions table 2310 contains foreign key ExceptionTypeCd 2312 corresponding to LookExceptionType table 2320 primary key 2325. LookExceptionStatus table 2330 has a one-to-many relationship 2313 with Exceptions table 2310 wherein Exceptions table 2310 contains foreign key StatusCd 2314 corresponding to LookExceptionStatus table 2330 primary key 2335.

Figure 34A:
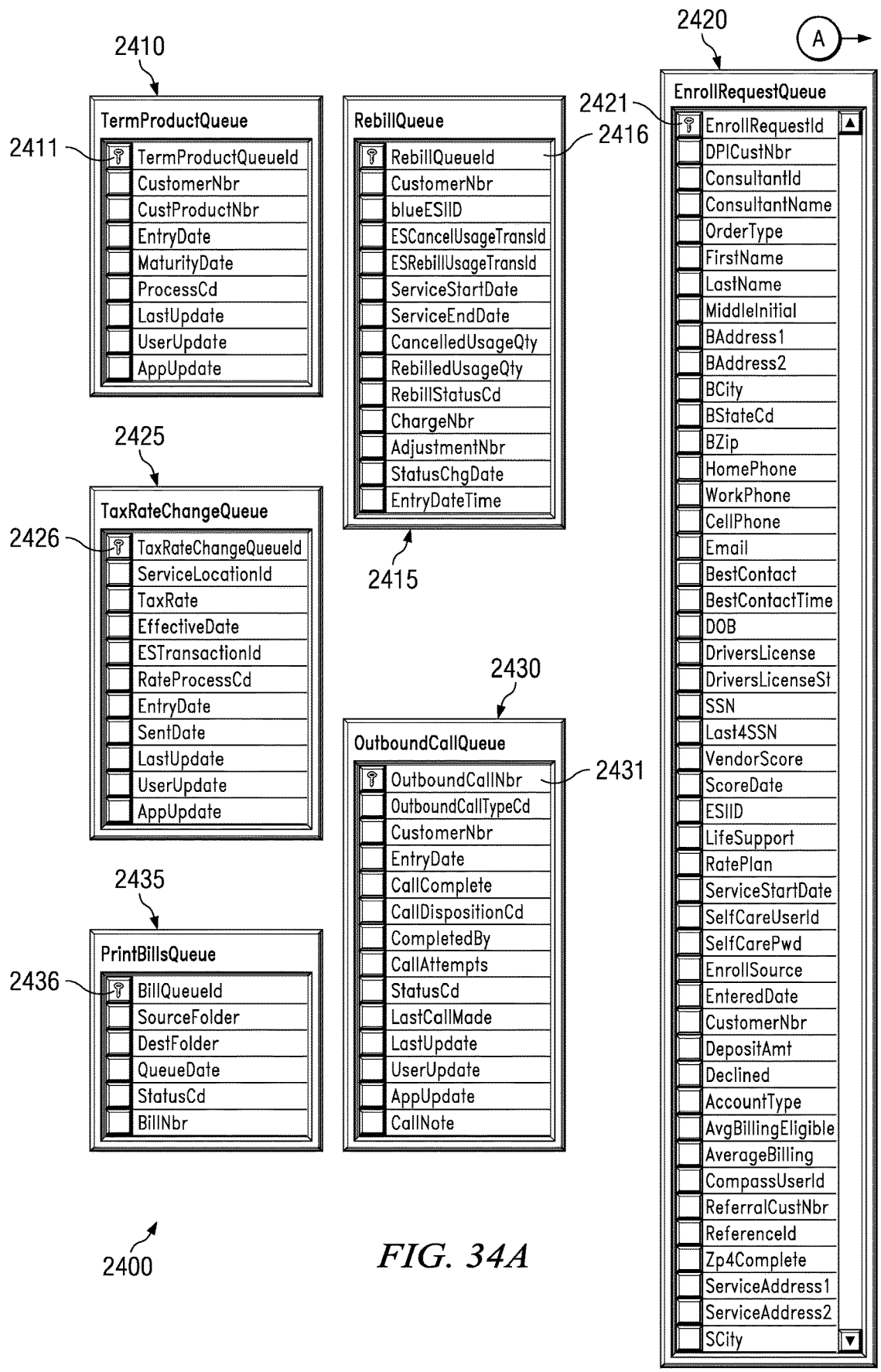
FIGS. 34a and 34b comprise an entity relationship diagram of the system queues entity in the preferred embodiment
Figure 34B:
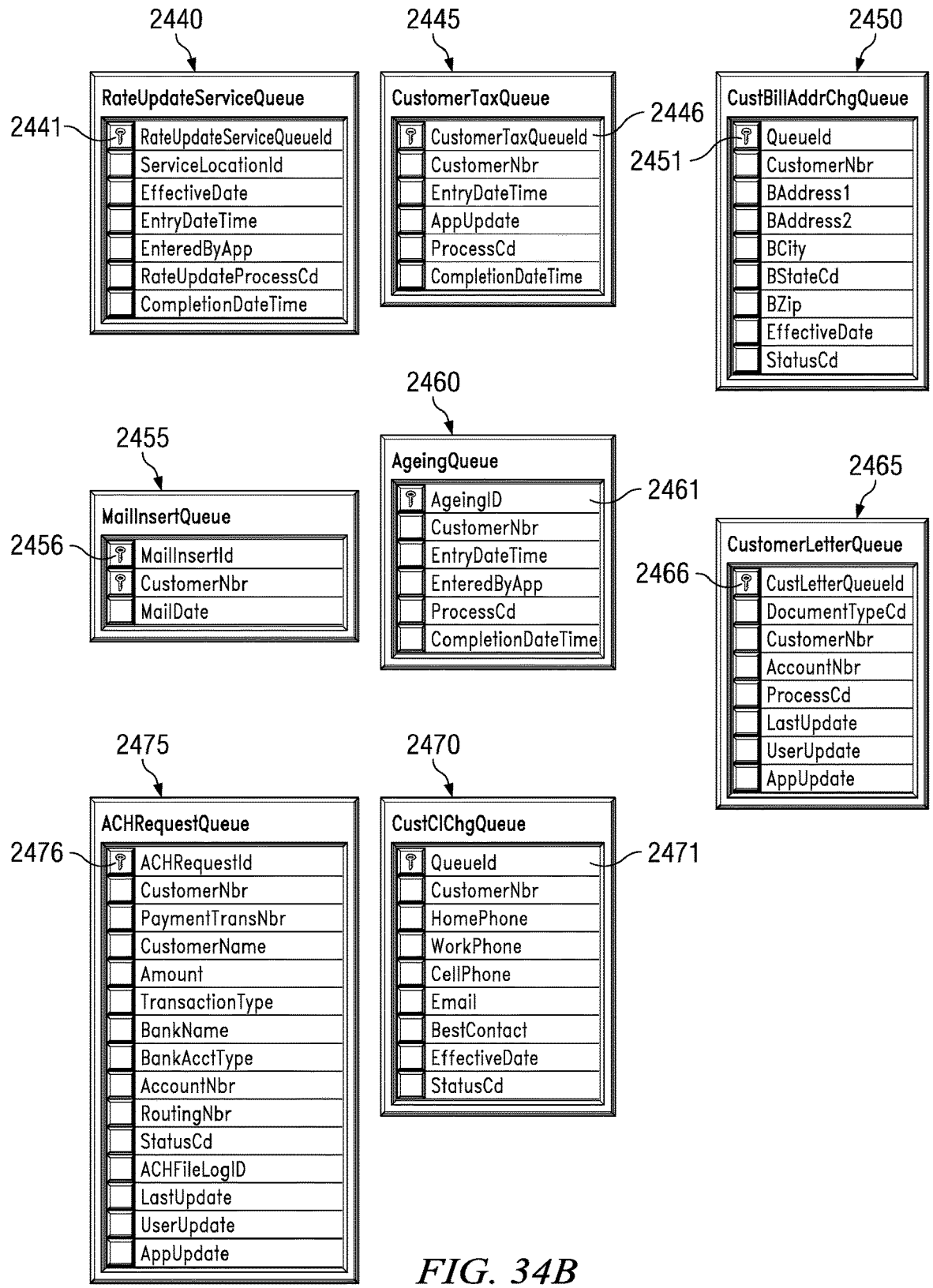

FIGS. 34A and 34B combine to form an entity-relationship diagram of the System Queues entity 2400 within the preferred embodiment SQL database engine 150. There are no relationships between tables in System Queues entity 2400, the tables therein are queues used by the system and by operations to contain workloads for various automated and manual processes. System Queues entity 2400 comprises a set of tables: TermProductQueue table 2410 for queuing terminated products, TermProductQueue table 2410 having a primary key TermProdQueueID 2411; RebillQueue table 2415 for queuing bills, RebillQueue table 2415 having a primary key RebillQueueID 2416; EnrollRequestQueue table 2420 for queuing enrollment requests, EnrollRequestQueue table 2420 having primary key EnrollRequestID 2421; TaxRateChangeQueue table 2425 for queuing tax rate changes for different service locations, TaxRateChangeQueue table 2425 having a primary key TaxRateChangeQueueID 2426; OutboundCallQueue table 2430 for queuing outbound calls and information related by customer, OutboundCallQueue table 2430 having a primary key OutboundCallNbr 2431; PrintBillsQueue table 2435 for queuing customer bills to be printed for billing, PrintBillsQueue table 2435 having a primary key BillQueueID 2436; RateUpdateServiceQueue table 2440 for queuing rate updates for usage rating, RateUpdateServiceQueue table 2440 having a primary key RateUpdateServiceQueueID 2441; CustomerTaxQueue table 2445 for queuing tax adjustments per customer, CustomerTaxQueue table 2445 having a primary key CustomerTaxQueueID 2446; CustBillAddrChgQueue table 2450 for queuing changes to customer billing addresses, CustBillAddrChgQueue table 2450 having a primary key QueueID 2451; MailInsertQueue table 2455 for queuing customer mailings, MailInsertQueue table 2455 having a primary key MailInsertID 2456; AgeingQueue table 2460 for queuing customer aging records, AgeingQueue table 2460 having a primary key AgingID 2461; CustomerLetter- Queue table 2465 for queuing customer letters, CustomerLetterQueue table 2465 having a primary key CustomerLetterQueueID 2466; CustClChgQueue table 2470 for queuing customer contact information changes, CustClChgQueue table 2470 having a primary key QueueID 2471; ACHRequestQueue table 2475 for queuing ACH requests from financial services, ACHRequestQueue table 2475 having a primary key ACHRequestID 2476.

Figure 35:
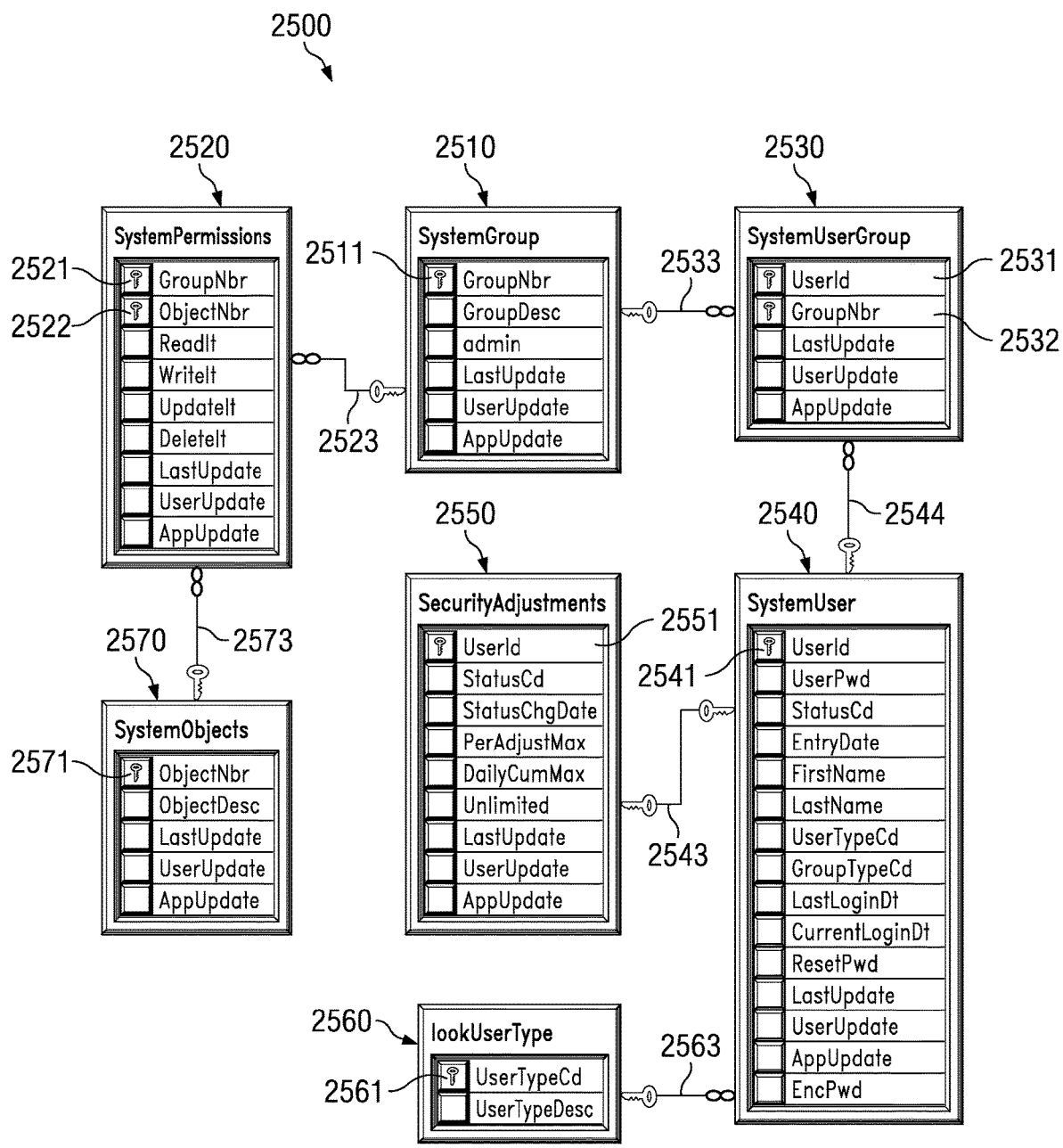
FIG. 35 is an entity relationship diagram of the security entity in the preferred embodiment.

FIG. 35 is an entity-relationship diagram of the Security entity 2500 within the preferred embodiment SQL database engine 150. Security entity 2500 comprises a set of tables: SystemGroup table 2510 for containing records with descriptions of system groups, SystemsGroup table 2510 having a primary key GroupNbr 2511; SystemPermissions table 2520 for containing system file permissions, SystemPermissions table 2520 having a combination of primary keys, GroupNbr 2521 and ObjectNbr 2522; SystemUserGroup table 2530 for assigning system users to groups, SystemUserGroup table 2530 having a combination of primary keys, UserID 2531 and GroupNbr 2532; SystemUser table 2540 for containing system user records, SystemUser table 2540 having a primary key UserID 2541; SecurityAdjustments table 2550 for containing specific user security information, SecurityAdjustments table 2550 having a primary key UserID 2551; lookUserType table 2560 for looking up user type records, lookUserType table 2560 having a primary key UserTypeCd 2561; and SystemObjects table 2570 for containing a collection of object descriptions for system objects, SystemObjects table 2570 having a primary key ObjectNbr 2571.

SystemGroup table 2510 has a one-to-many relationship 2523 with SystemPermissions table 2520 wherein SystemPermissions table 2520 contains foreign key GroupNbr corresponding to SystemGroup table 2510 primary key 2511. SystemGroup table 2510 has a one-to-many relationship 2533 with SystemUserGroup table 2530 wherein SystemUserGroup table 2530 contains foreign key GroupNbr corresponding to SystemGroup table primary key 2511.

SystemUser table 2540 has a one-to-one relationship 1543 with SecurityAdjustments table 2550 wherein SecurityAdjustments table 2550 contains foreign key UserID 2551 corresponding to SystemUser table 2540 primary key 2541. SystemUser table 2540 has a one-to-many relationship 2544 with SystemUserGroup table 2530 wherein SystemUserGroup table 2530 contains foreign key UserID 2531 corresponding to SystemUser table 2540 primary key 2541. LookUserType table 2560 has a one-to-many relationship 2563 with SystemUser table 2540 wherein SystemUser table 2540 contains foreign key UserTypeCd corresponding to lookUserType table 2560 primary key 2561. SystemObjects table 2570 has a one-to-many relationship 2573 with SystemPermissions table 2520 wherein SystemPermissions table 2520 contains foreign key ObjectNbr 2522 corresponding to SystemObjects table 2570 primary key 2571.

Figure 23A:
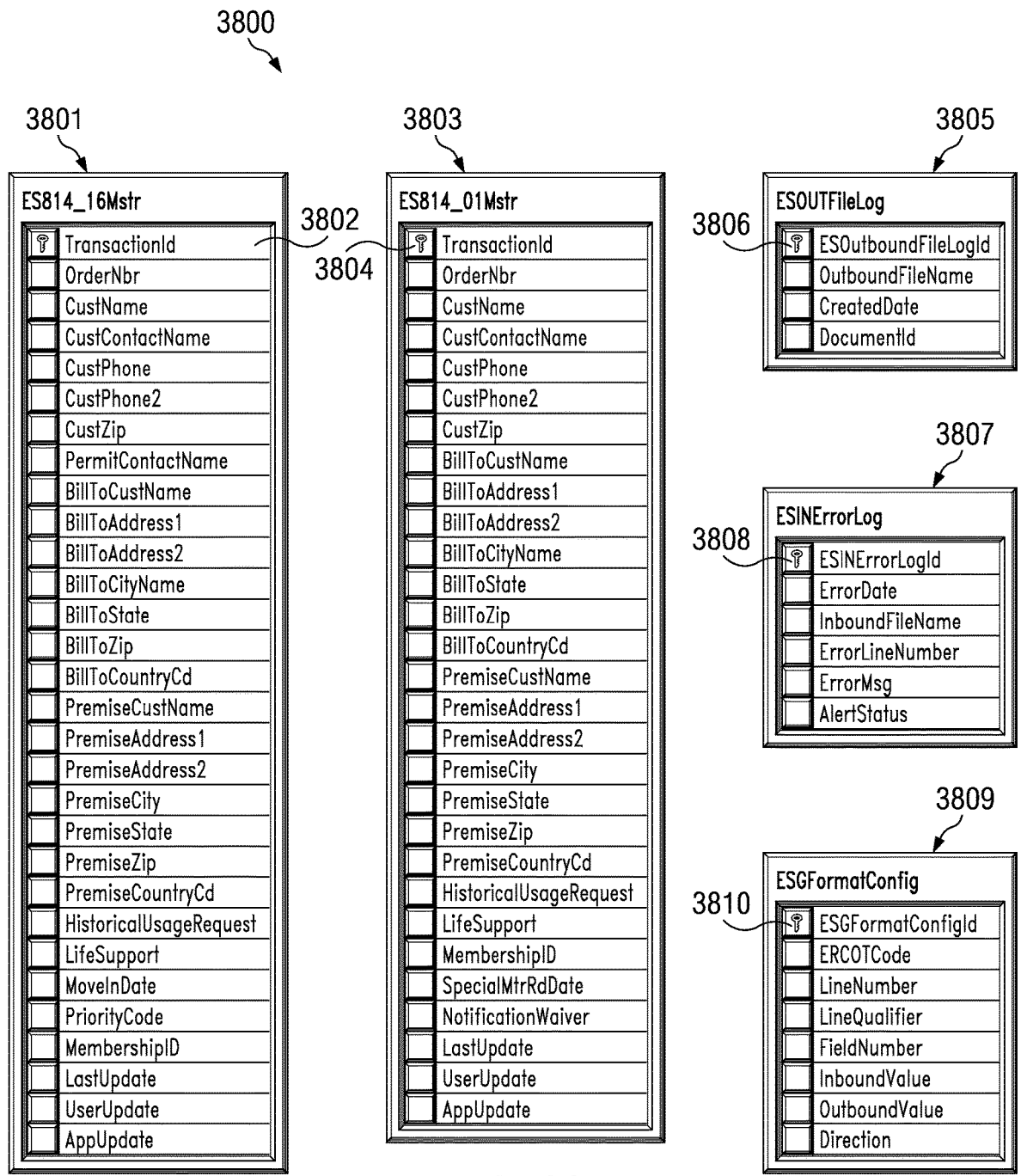
FIGS. 23a-23u comprise an entity relationship diagram of the market transaction entity in the preferred embodiment FIGS. 24a and 24b comprise an entity relationship diagram of the orders entity in the preferred embodiment.
Figure 23B:
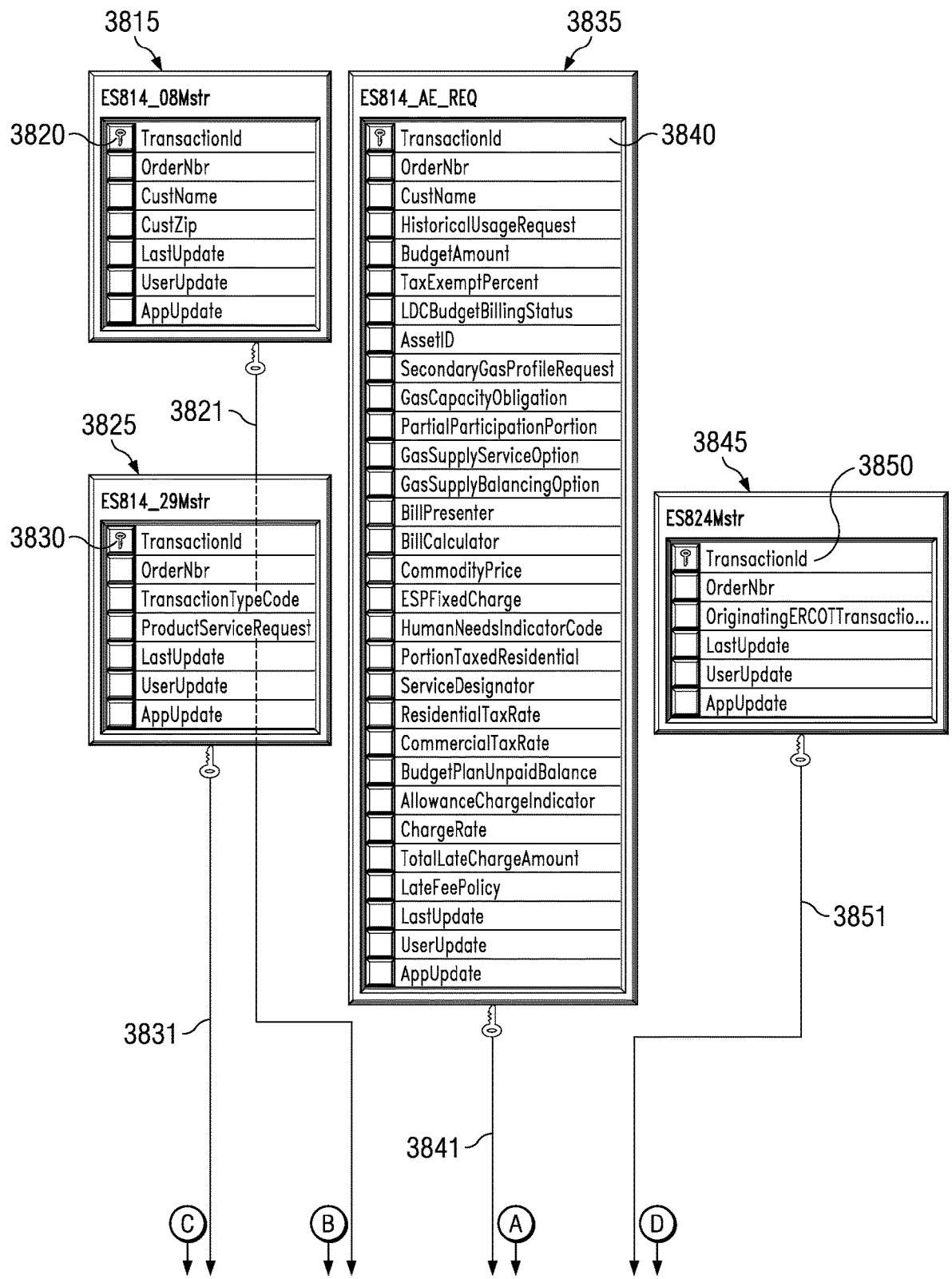
Figure 23C:
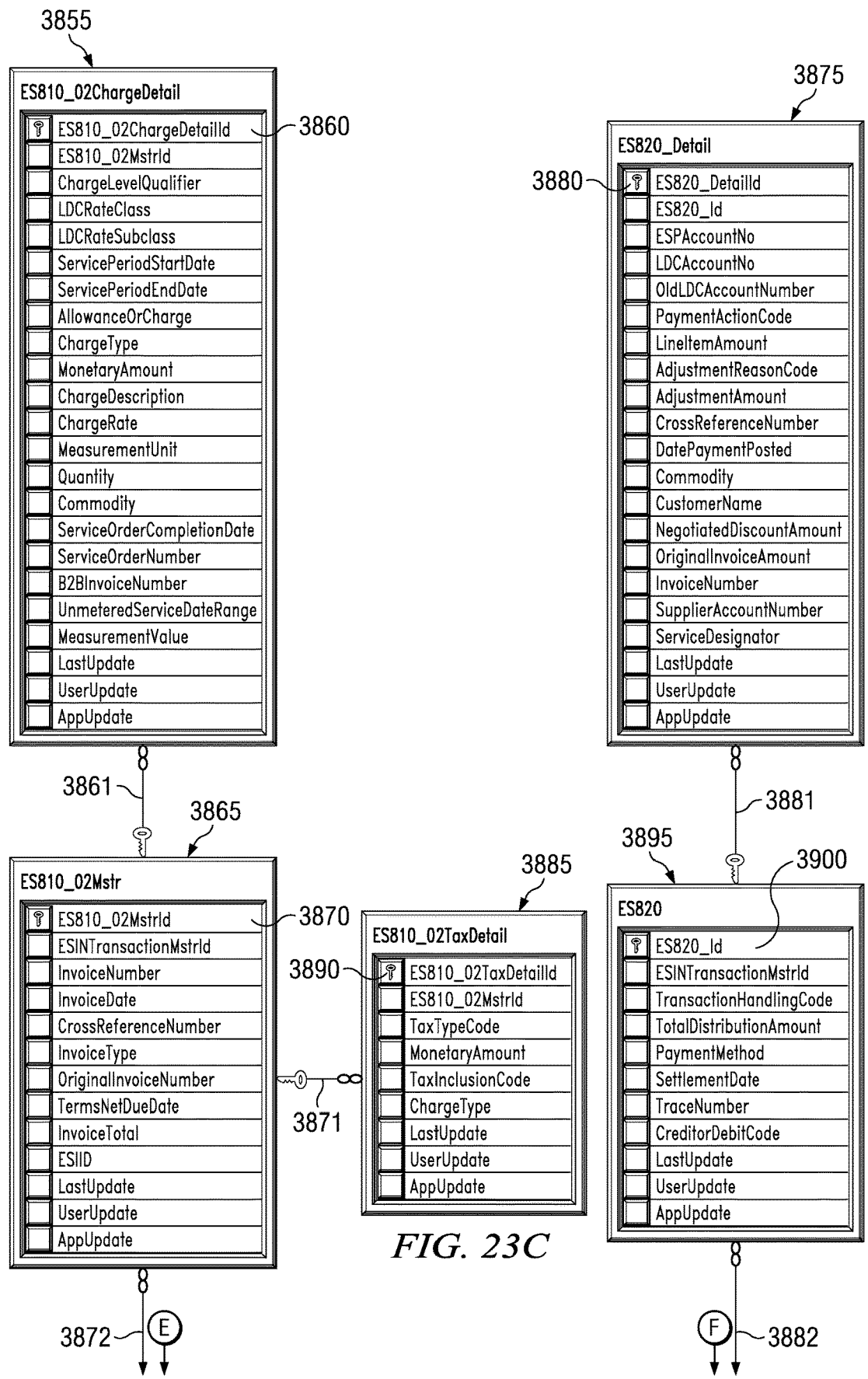
Figure 23D:
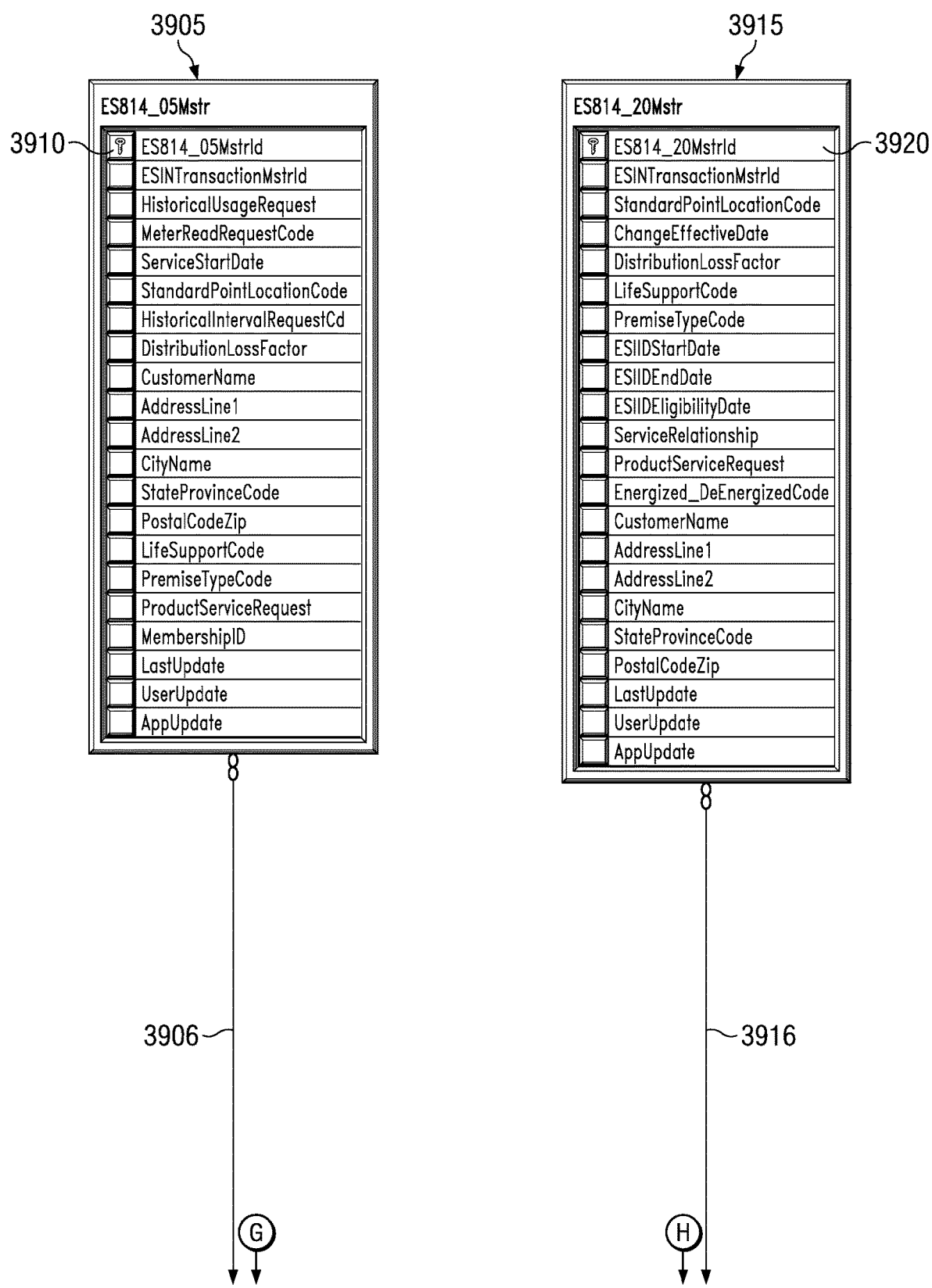
Figure 23E:
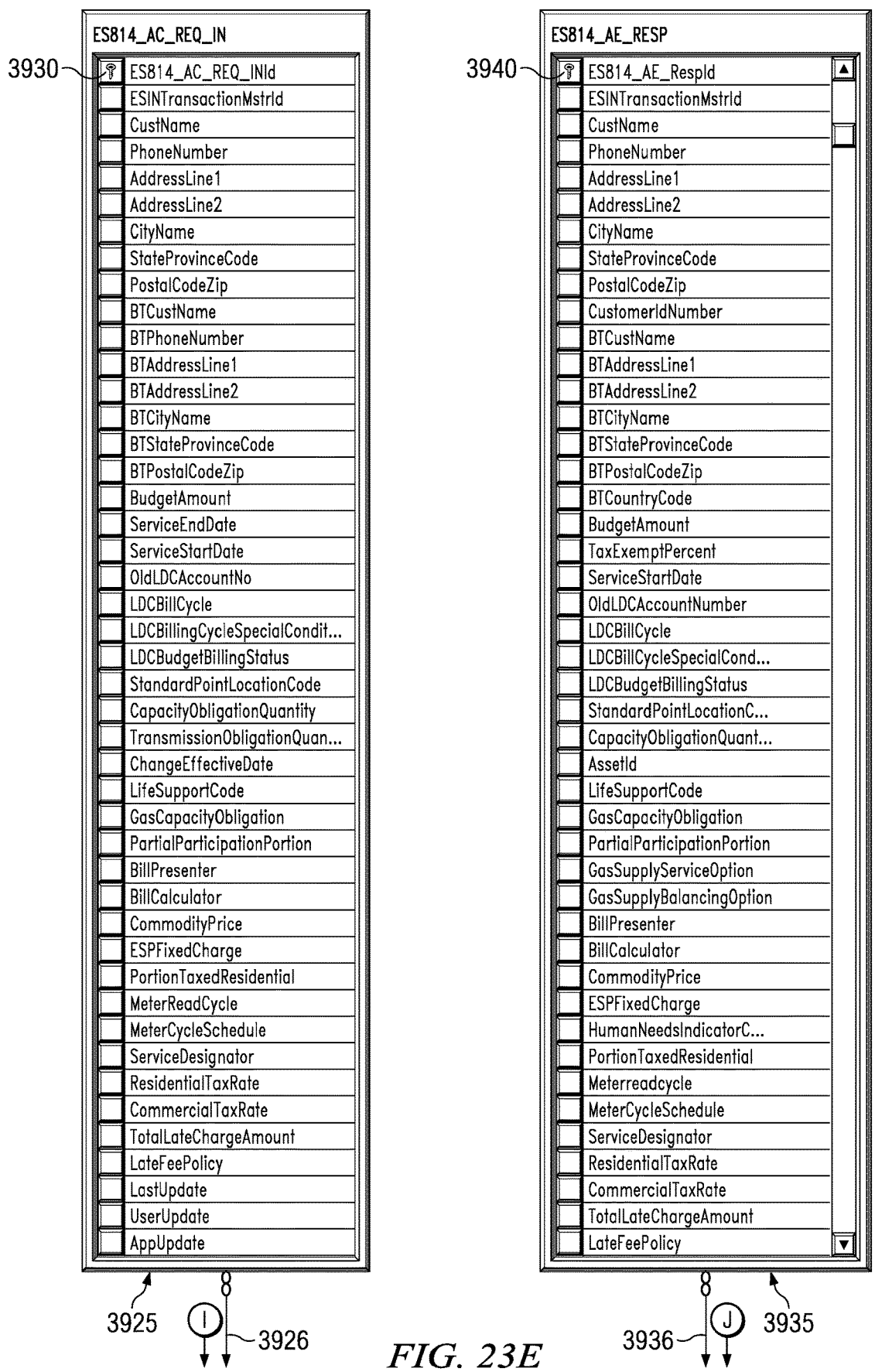
Figure 23F:
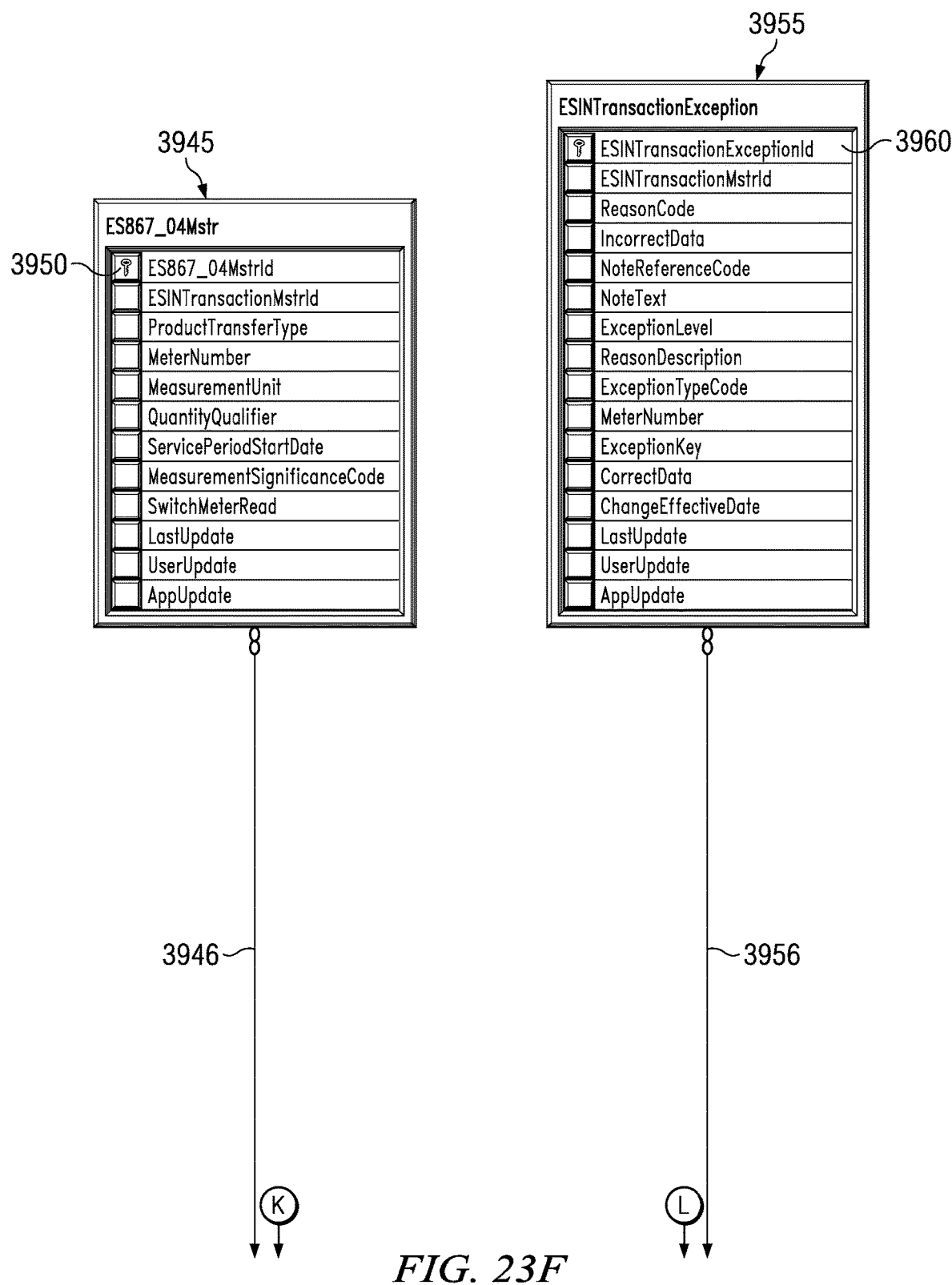
Figure 23G:
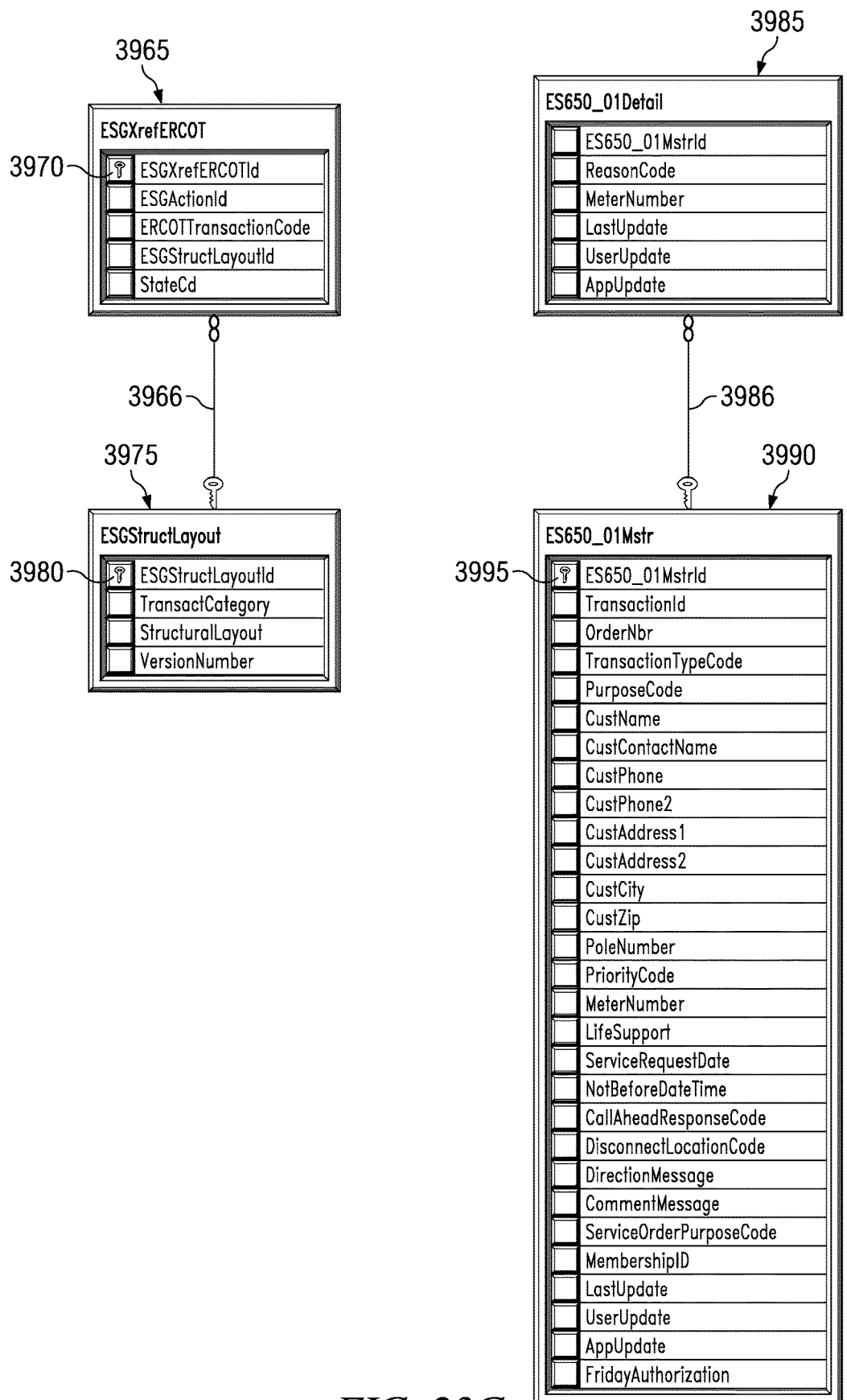
Figure 23H:
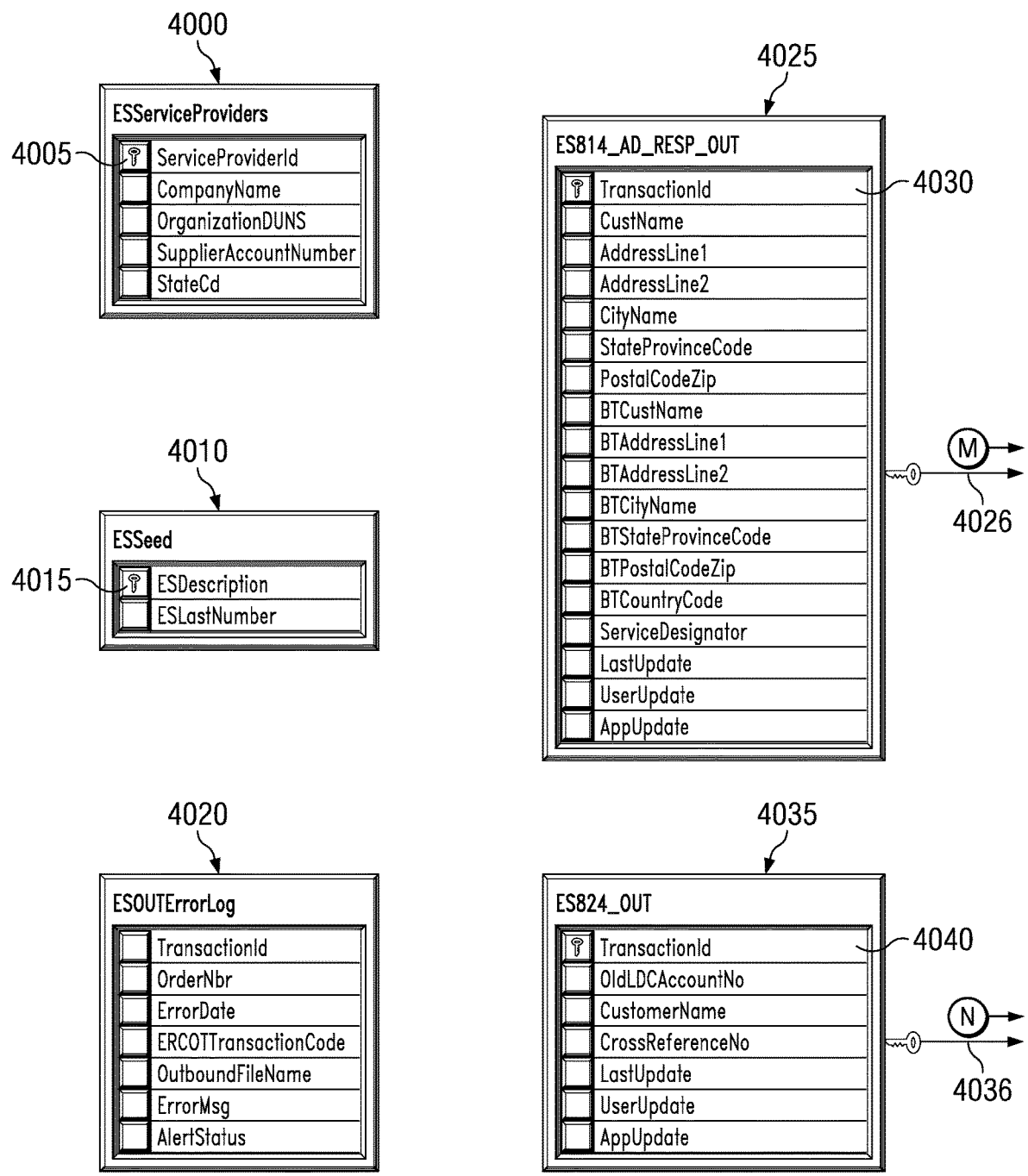
Figure 23I:
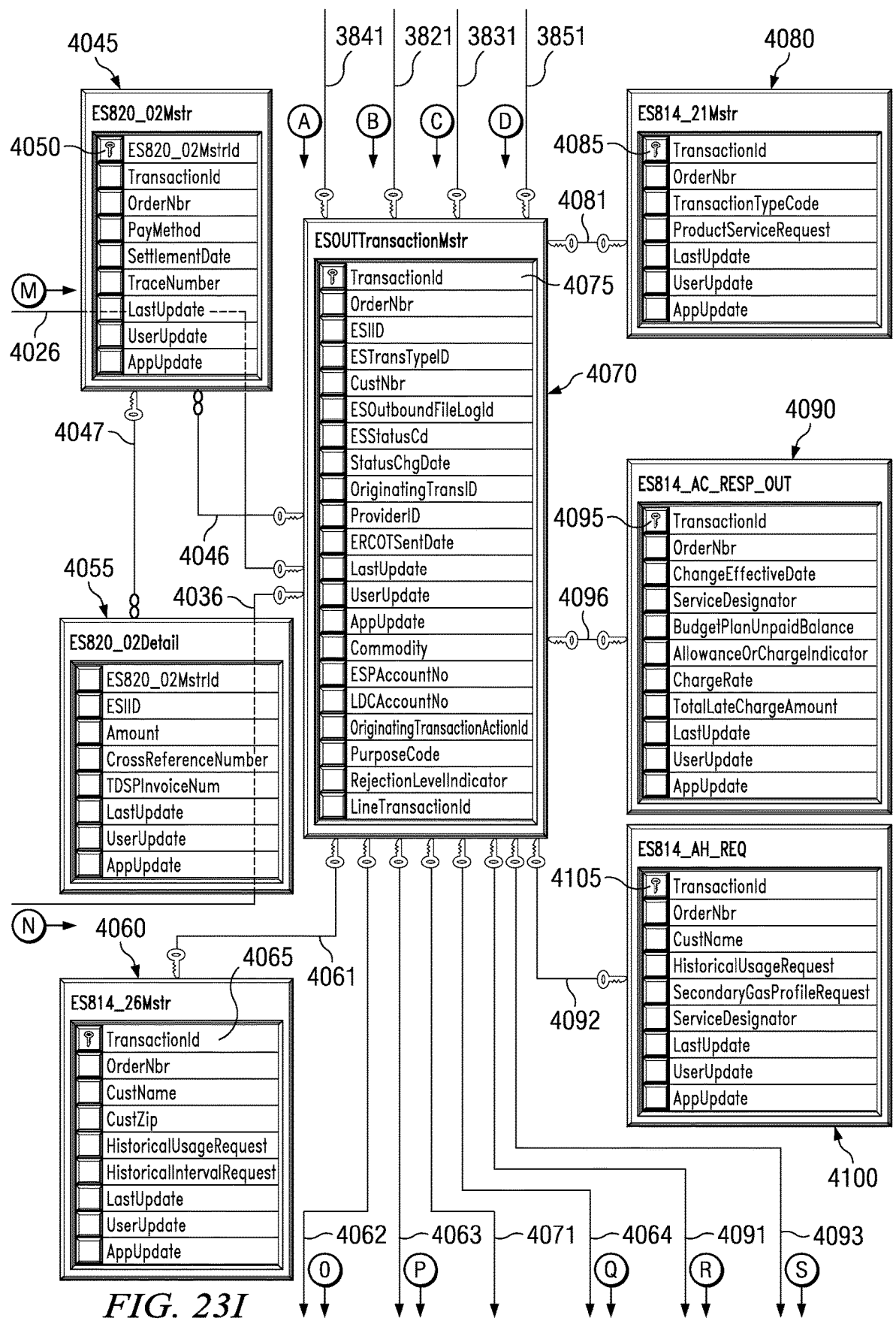
Figure 23J:
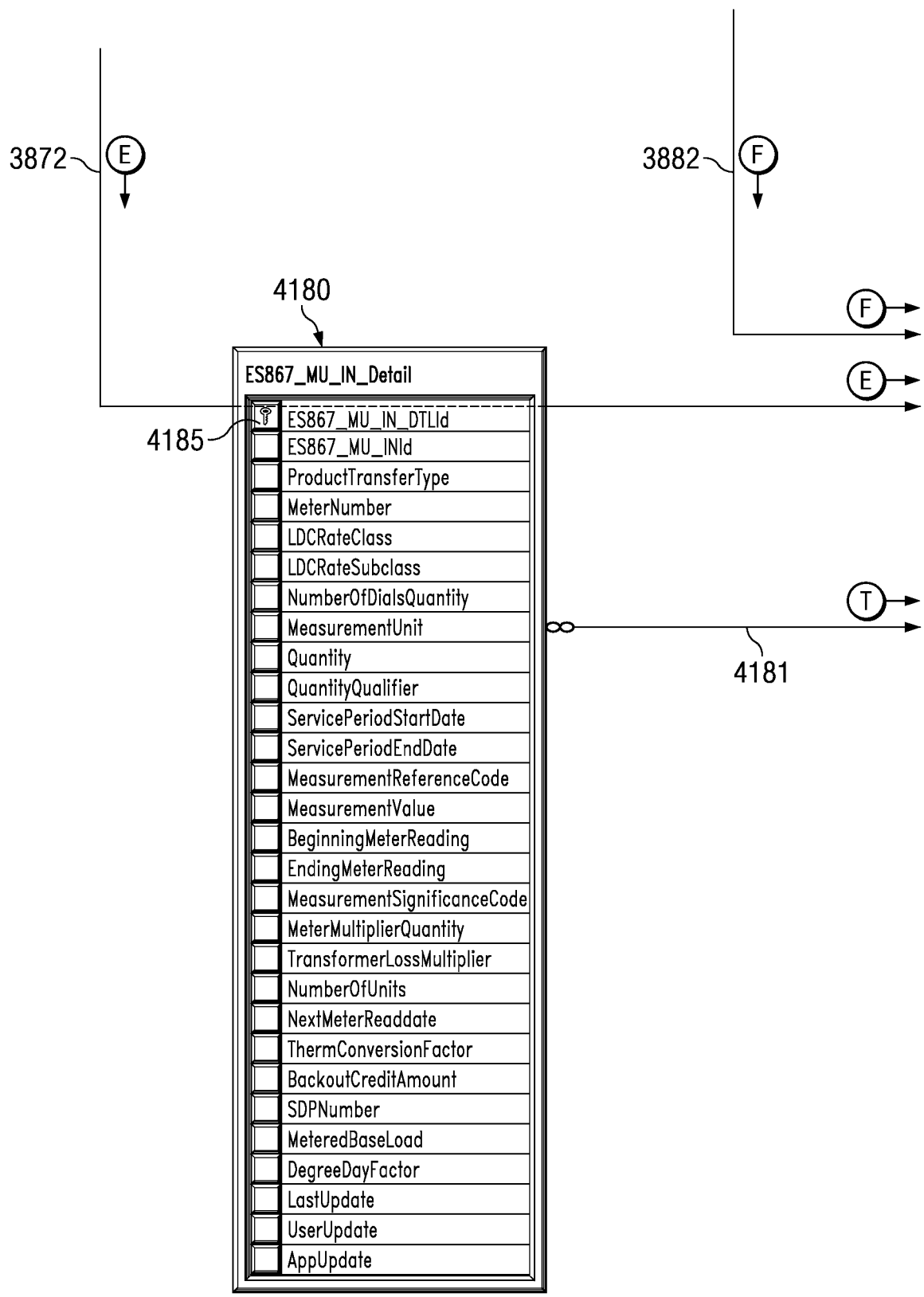
Figure 23K:
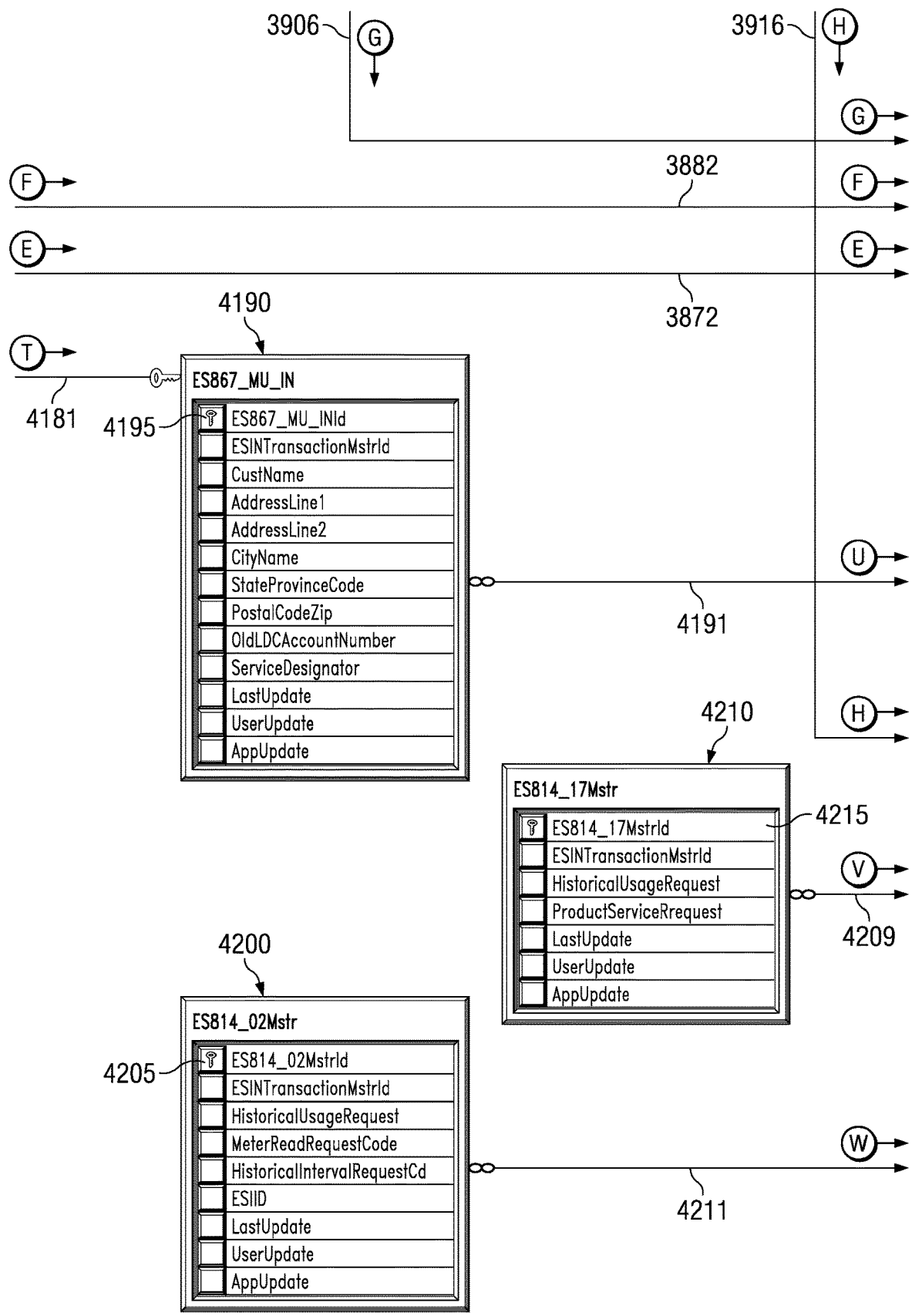
Figure 23L:
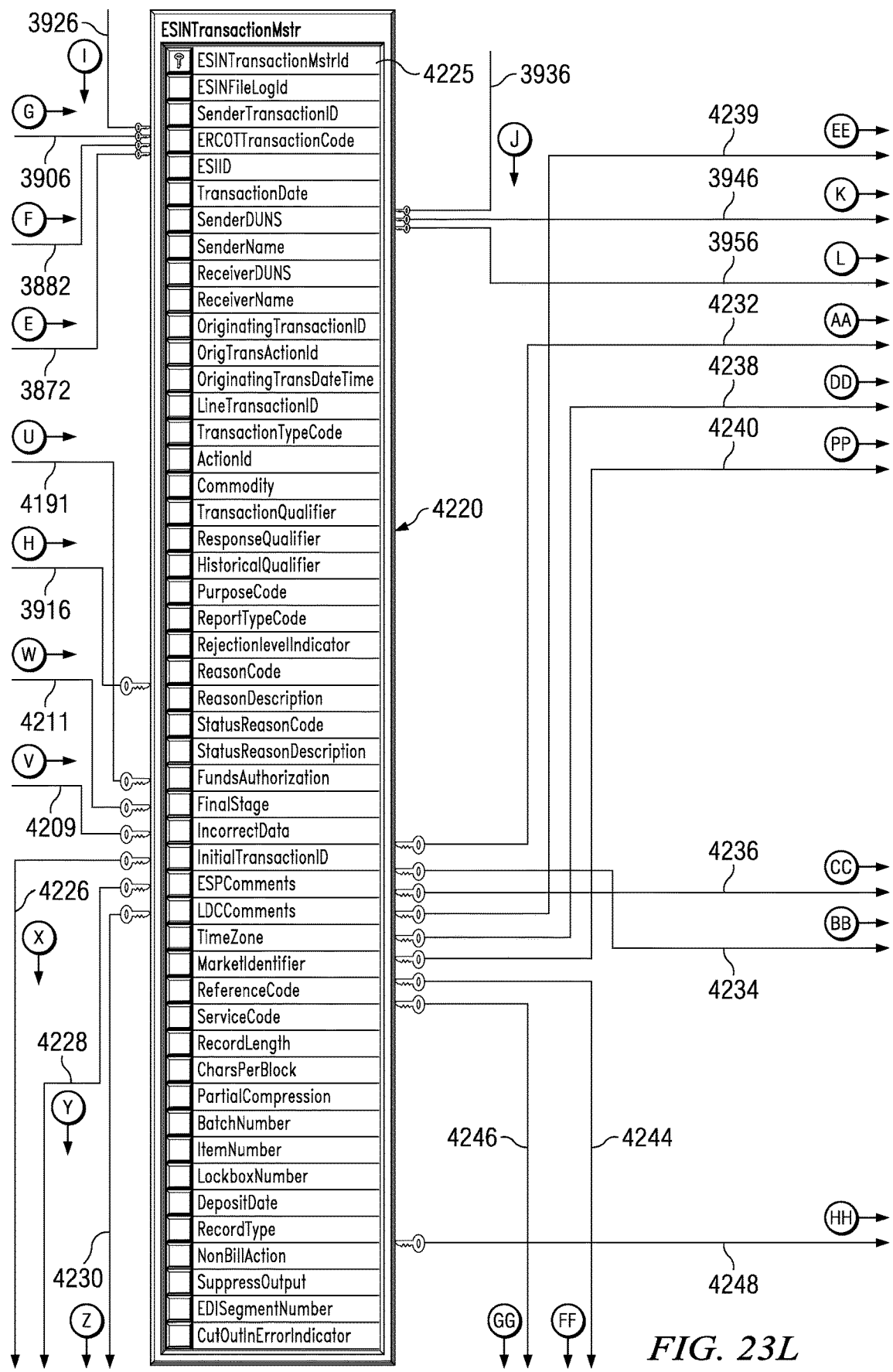
Figure 23M:
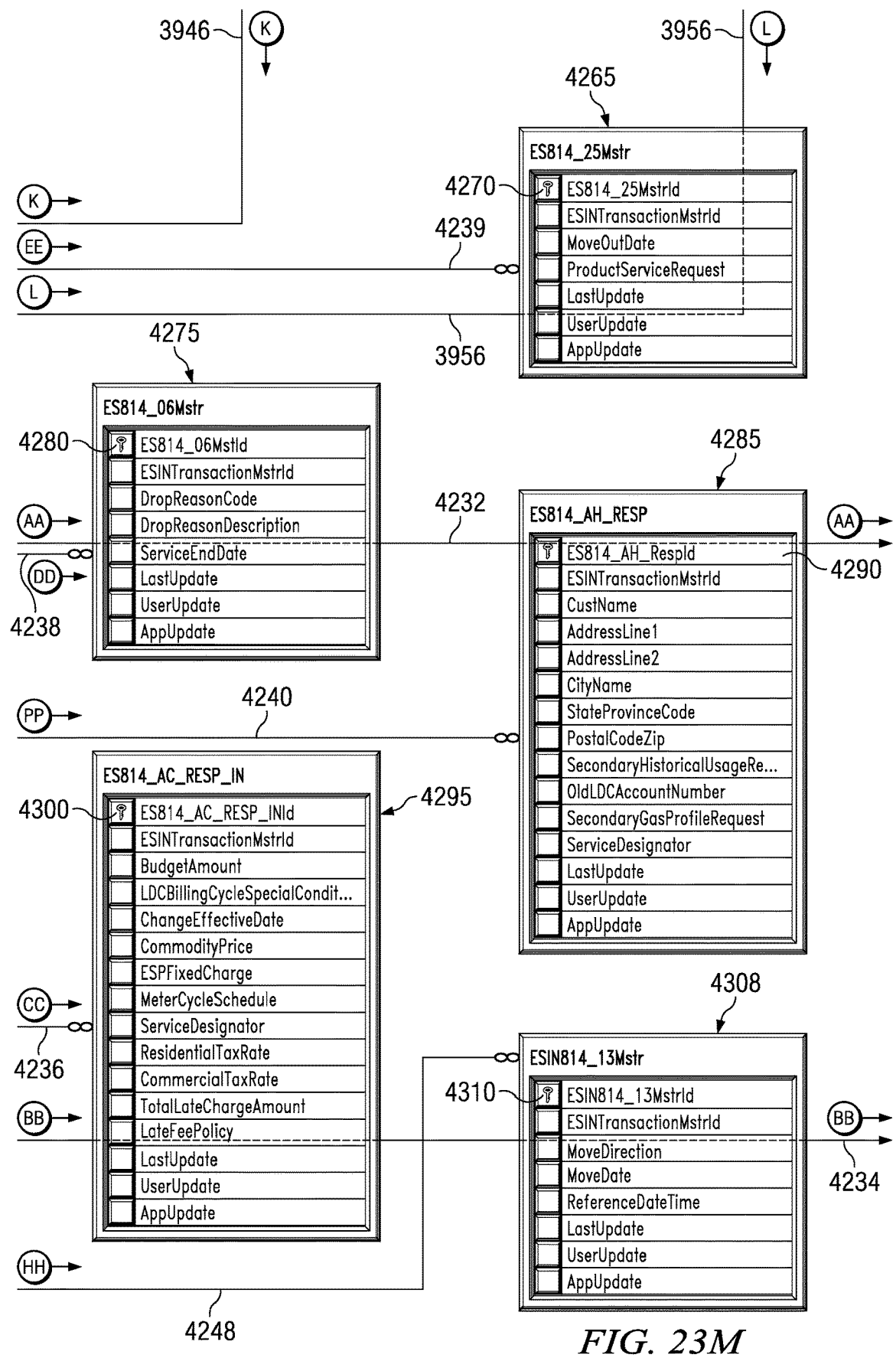
Figure 23N:
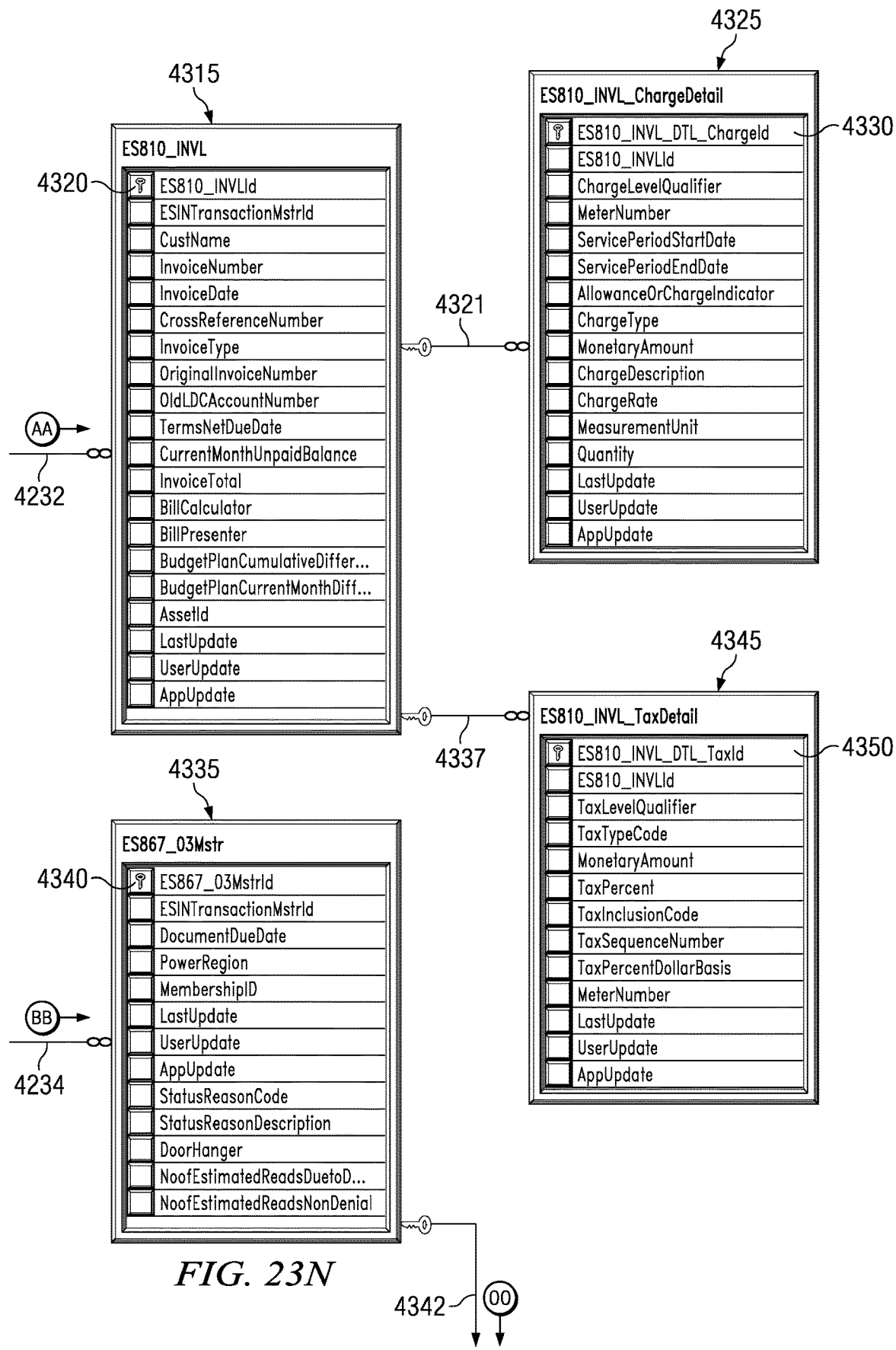
Figure 23O:
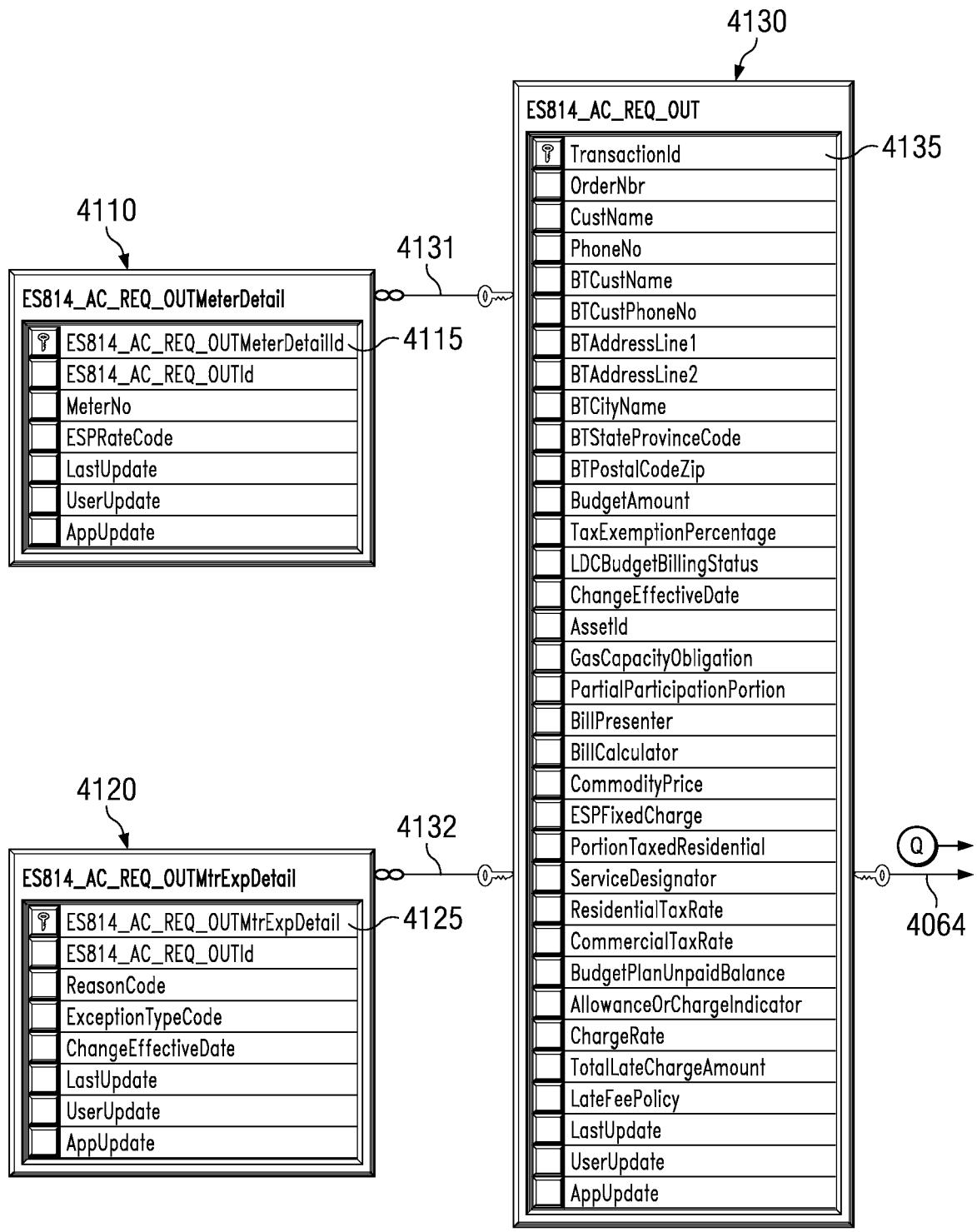
Figure 23P:
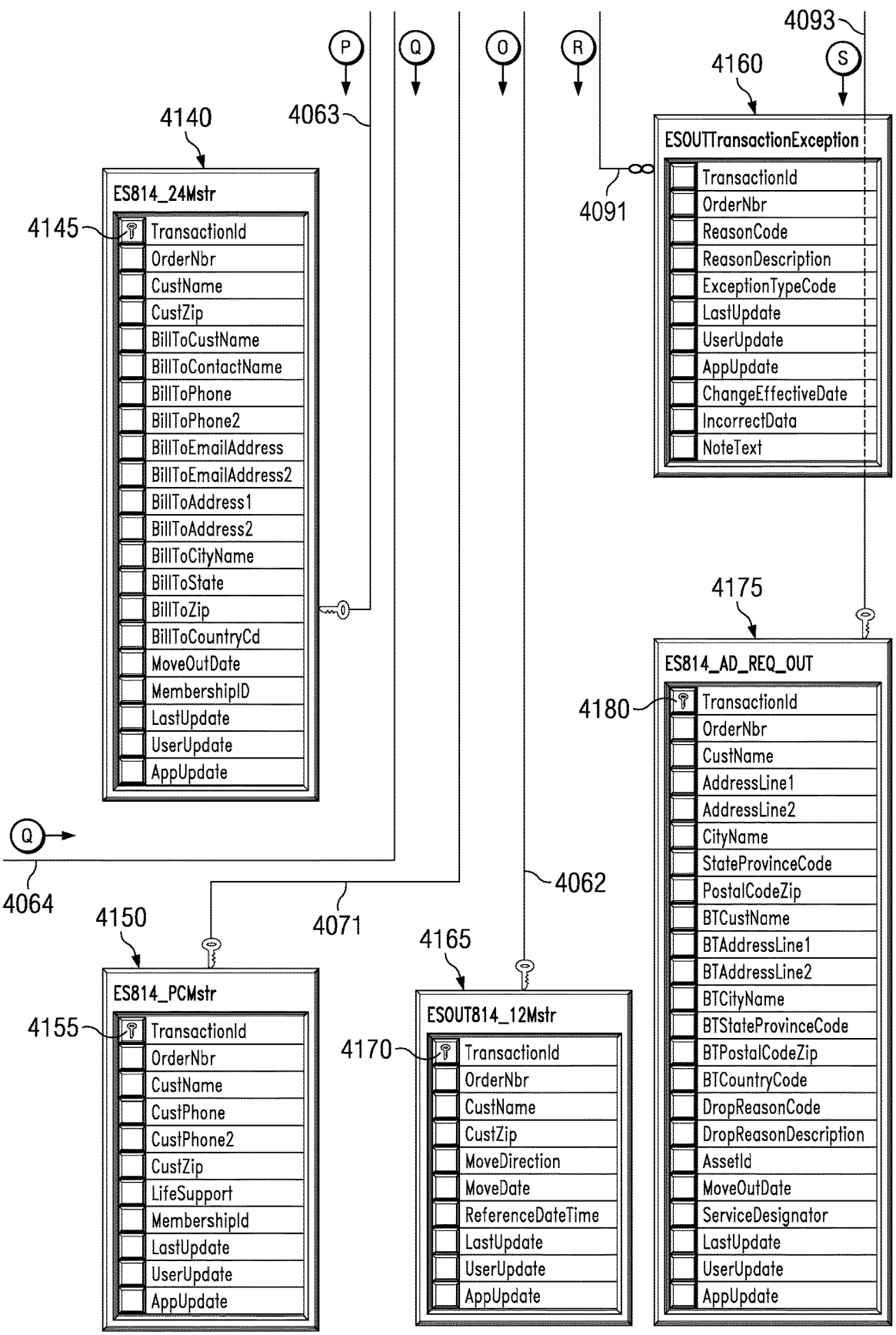
Figure 23Q:
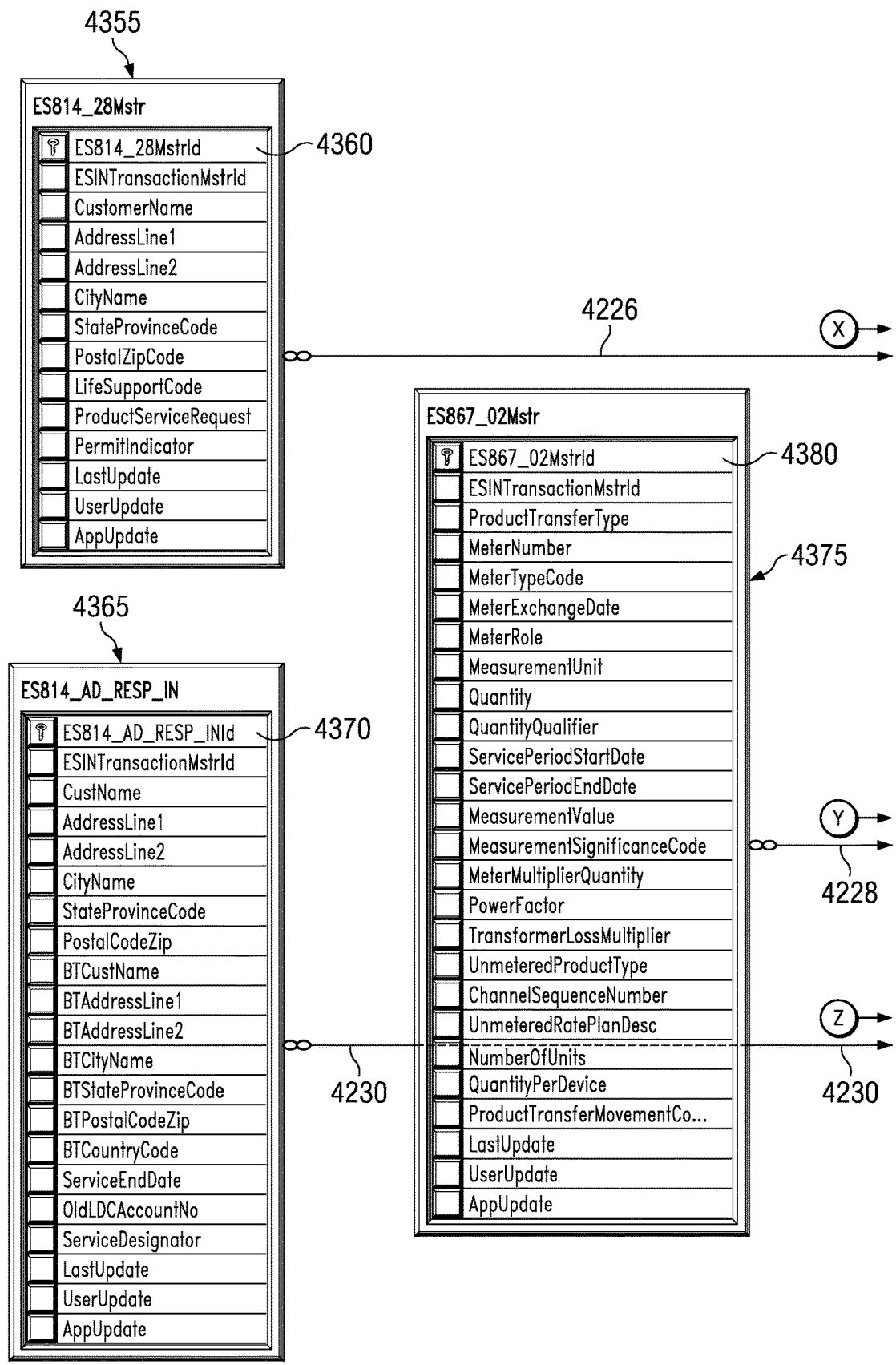
Figure 23R:
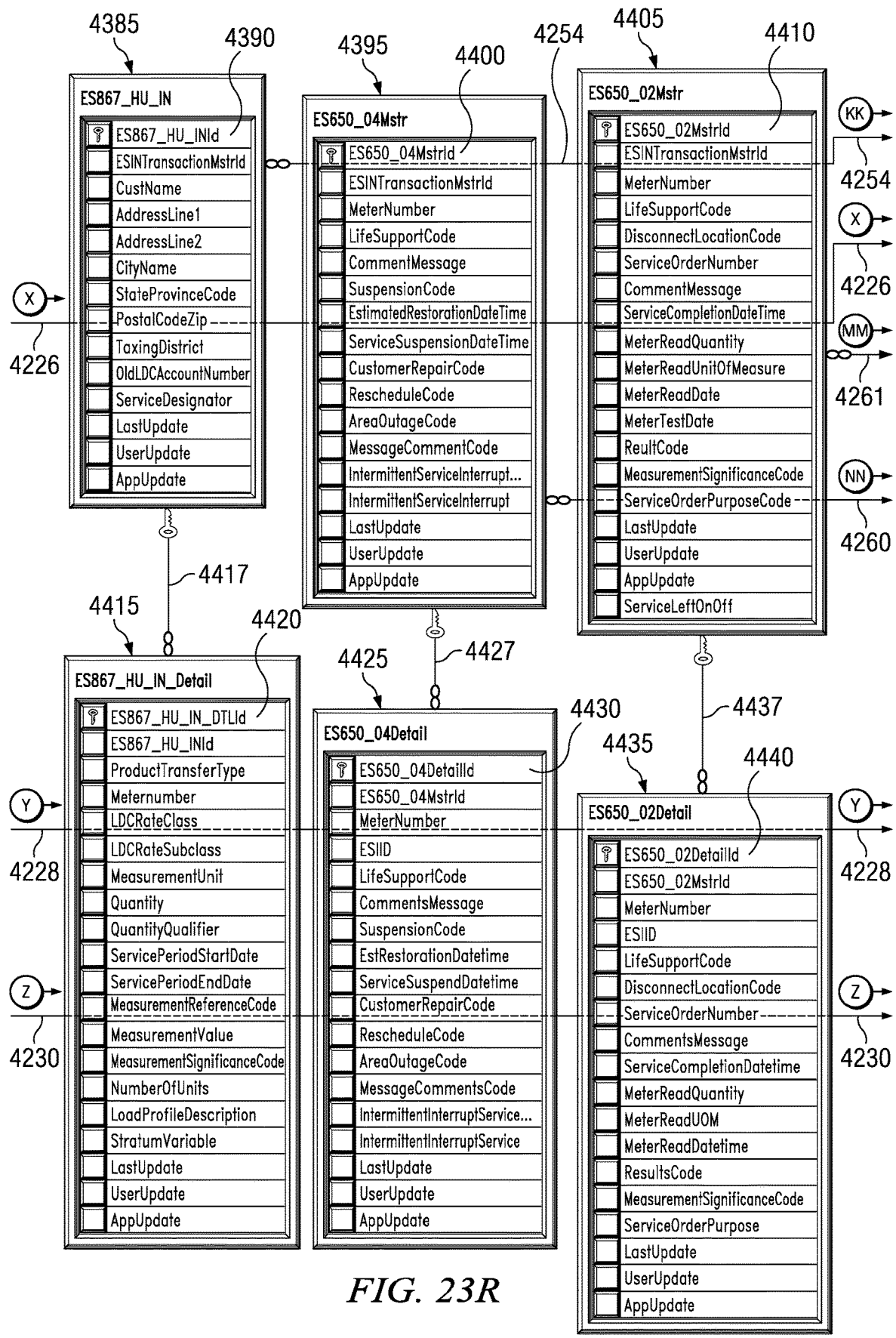
Figure 23S:
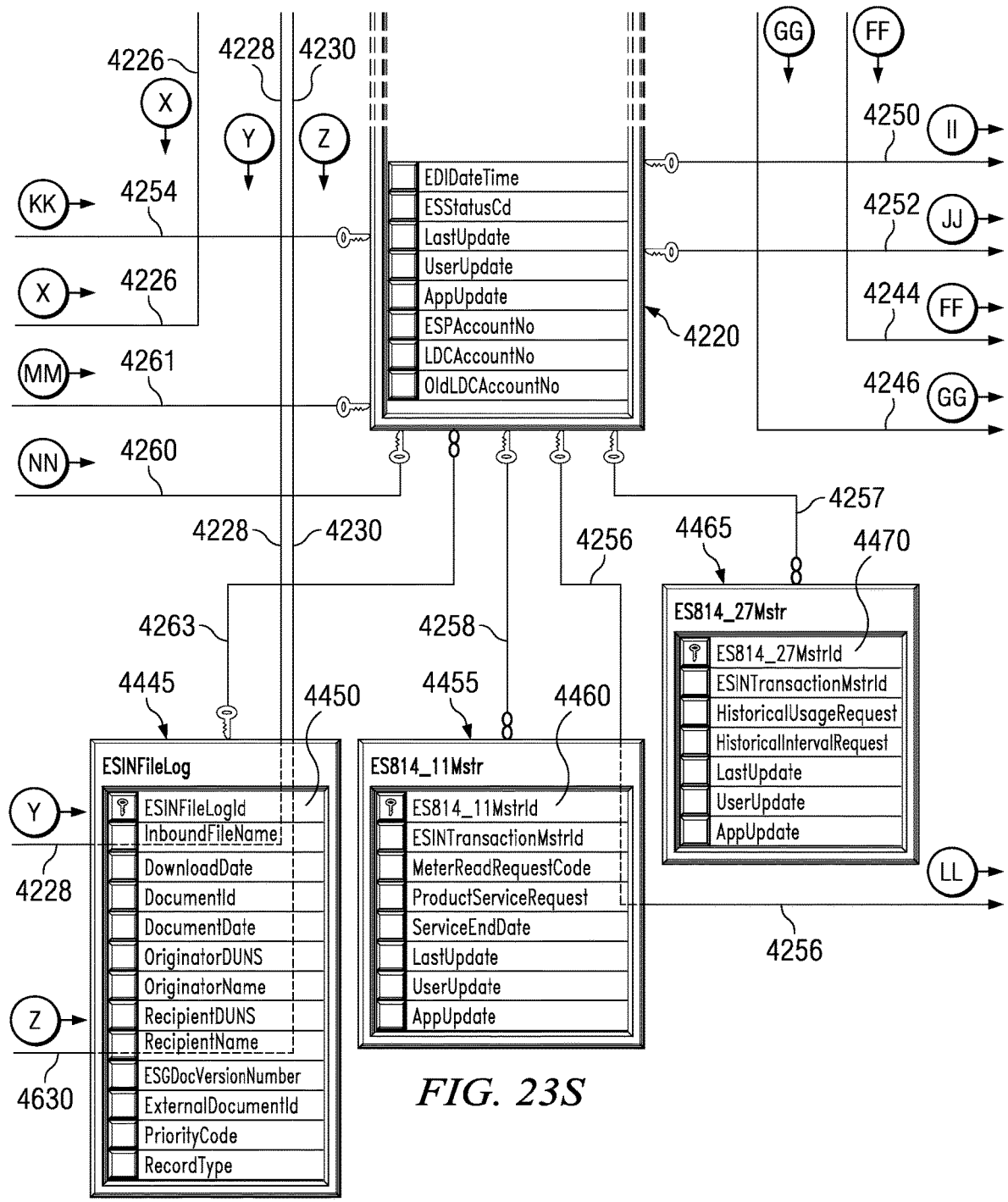
Figure 23T:
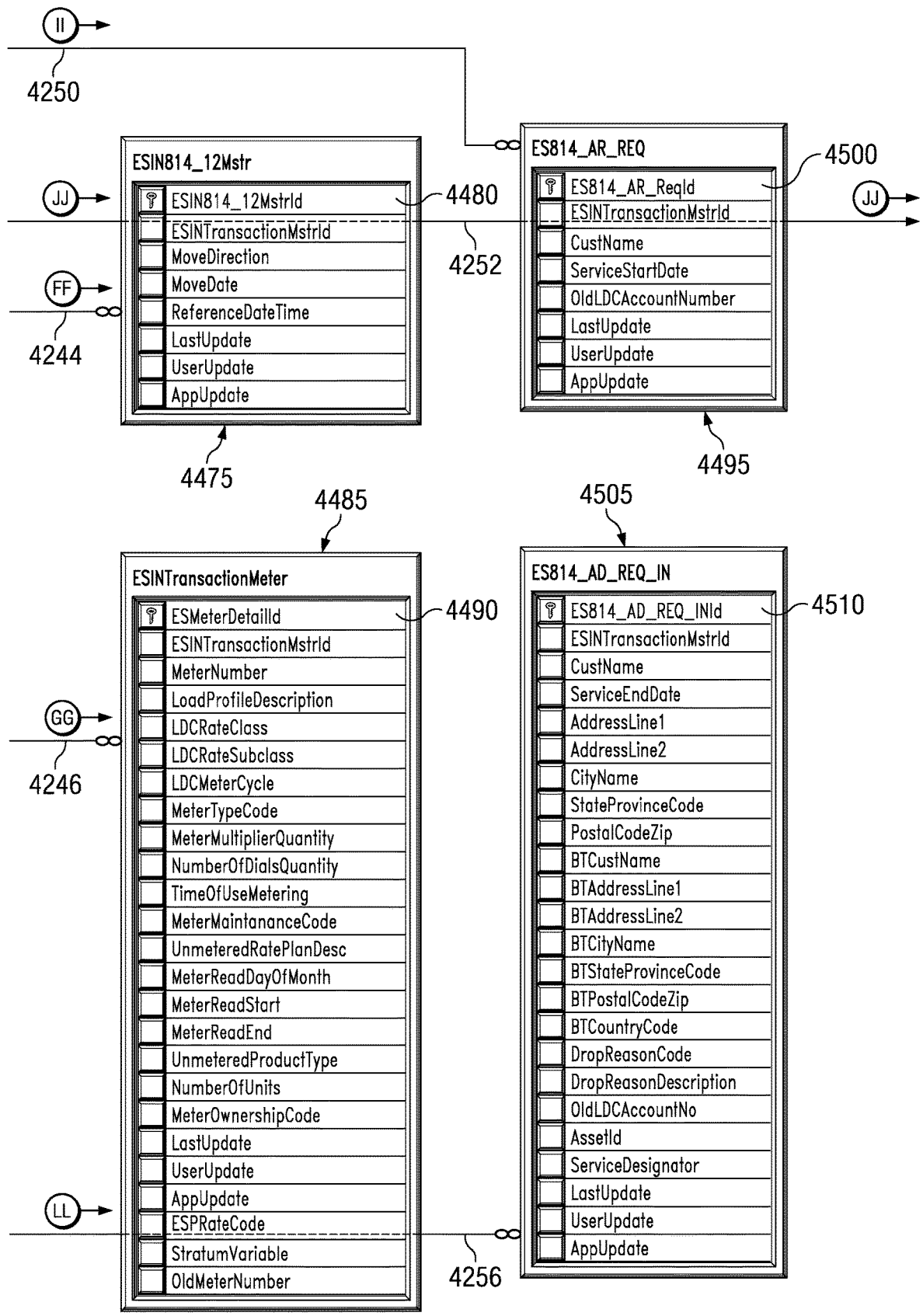
Figure 23U:
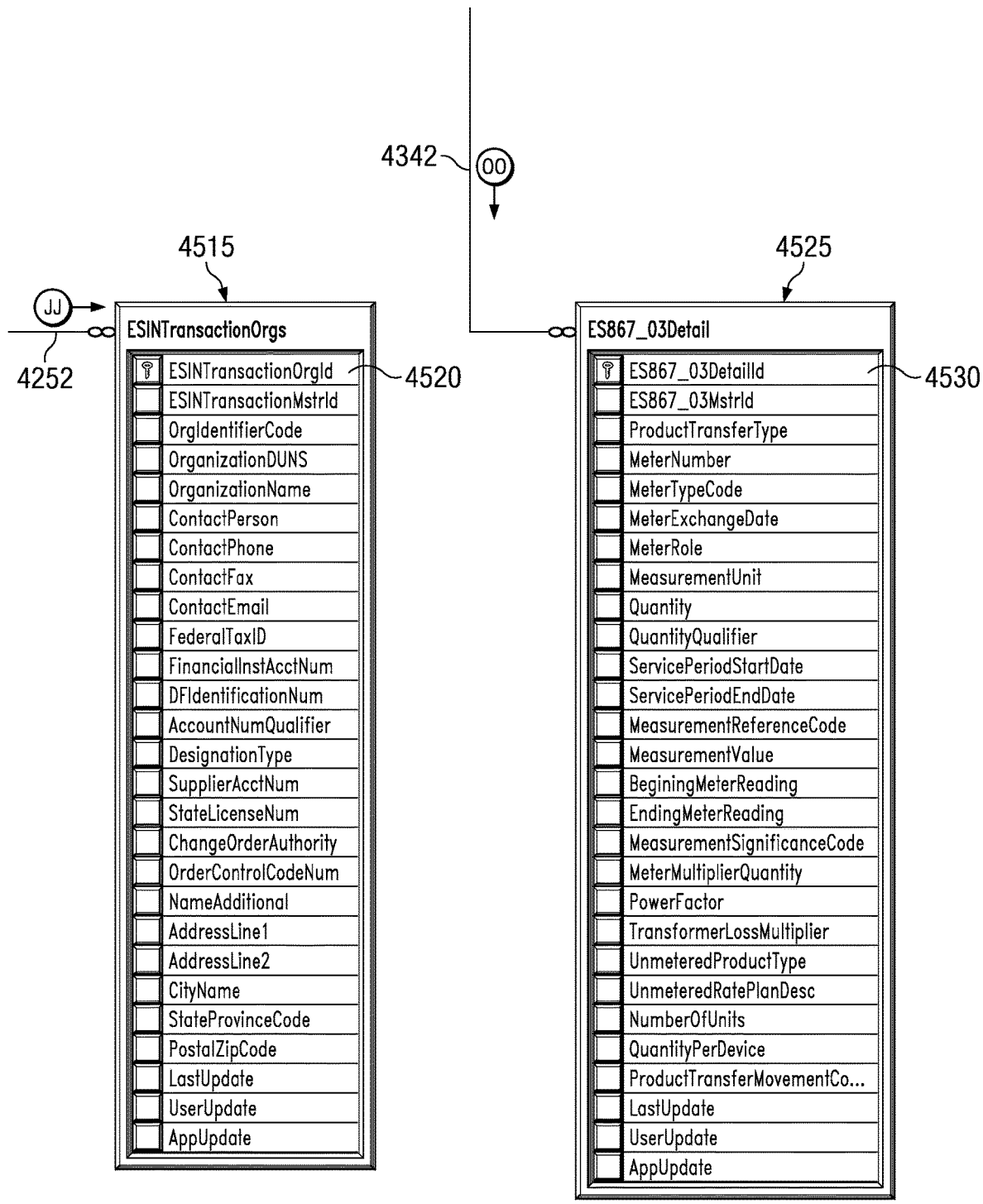

FIGS. 23A-23U combine to form an entity-relationship diagram of the Market Transactions entity 3800 within the preferred embodiment SQL database engine 150. The market transaction entity 3800 is the preferred embodiment of transaction table 183 of FIG. 2. FIGS. 23A-23U are arranged so that the entire diagram may be constructed by placing FIGS. 23A-23G adjacent to one another in a first row, FIGS. 23H-23N adjacent to one another in a second row underneath the first row, and FIGS. 23O-23U adjacent to one another in a third row underneath the second row. Market Transactions entity 3800 comprises a set of tables organized into connected groups, the first group of tables appearing in FIGS. 23A, 23B, 23H, 23I, 23O and 23P are primarily utilized in the preferred embodiment to record and organize various outbound transactions. The table ESOUTTransactionMstr is the fundamental table around which outbound transactions are organized.

The second group of tables FIGS. 23C-G, FIGS. 23J-N and FIGS. 23Q-U are primarily utilized in the preferred embodiment of the present invention to collect inbound transactions and organize them for retrieval. The table ESINTransactionMstr is the fundamental table around which inbound transactions are organized.

The Market Transaction tables shown in FIG. 23A comprise: ES814_16Mstr table 3801 for holding outbound 814_16 EDI transactions, ES814_16Mstr table 3801 having a primary key TransactionID 3802; ES814_01Mstr table 3803 for holding outbound 814_01 EDI transactions, ES814_01Mstr table 3803 having a primary key TransactionID 3804; ESOUTFileLog table 3805 for logging records of outbound transactions, ESOUFileLog table 3805 having a primary key ESOutboundFileLogID 3806; ESInErrorLog table 3807 for containing records of errored inbound transactions; ESInErrorLog table 3807 having a primary key ESInErrorLogID 3808; ESGFormatConfig table 3809 for containing ISO format information of inbound and outbound transactions, ESGFormatConfig table 3809 having a primary key ESFormatConfigID 3810.

The Market Transactions shown in FIG. 23B comprise: ES814_08Mstr table 3815 for holding outbound 814_08 EDI transactions, ES814_08Mstr table 3815 having a primary key TransactionID 3820; ES814_29Mstr table 3825 for holding outbound 814_29 EDI transactions, ES814_29Mstr table 3825 having a primary key transactionID 3830; ES824Mstr table 3845 for holding outbound 824 type EDI transactions, ES824Mstr table 3845 having a primary key transactionID 3850; ES814_AE_REQ table 3835 for containing account enrollment information, ES814_AE_REQ table 3835 having a primary key transactionID 3840.

The Market Transaction tables shown in FIG. 23C comprise: ES810_02ChargeDetail table 3855 for holding detailed invoice records from 810_02 transactions, having a primary key ES810_02ChargeDetailId 3860; ES810_02Mstr table 3865 for recording inbound 810_02 transactions, having a primary key ES810_02MstrId 3870; ES820_Detail table 3875 for holding detailed account information from 820 transactions, having a primary key ES820_DetailId 3880; ES810_02TaxDetail table 3885 for containing tax related data from 810_02 transactions, having a primary key ES810_02TaxDetailId 3890; and ES820 table 3895 for recording inbound 820 transactions, having a primary key ES820_Id 3900.

ES810_02Mstr table 3865 has a one to many relationship 3861 with ES810_02ChargeDetail table 3855 wherein ES810_02ChargeDetail table 3855 contains foreign key ES810_02MstrId corresponding to ES810_02Mstr table 3865 primary key 3870.

ES810_02Mstr table 3865 has a one to many relationship 3871 with ES810_02TaxDetail table 3885 wherein ES810_02TaxDetail table 3885 contains foreign key ES810_02MstrId corresponding to ES810_02Mstr table 3865 primary key 3870.

ES820 table 3895 has a one to many relationship 3881 with ES820_Detail table 3875 wherein ES820_Detail table 3875 contains foreign key ES820_Id corresponding to ES820 table 3895 primary key 3900.

ESINTransactionMstr table 4220 in FIG. 23L has a one to many relationship 3872 with ES810_02Mstr table 3865 in FIG. 23C wherein ES810_02Mstr table 3865 contains foreign key ESINTransactionMstrId corresponding to ESINTransactionMstr table 4220 primary key 4225.

ESINTransactionMstr table 4220 in FIG. 23L has a one to many relationship 3882 with ES820 table 3895 in FIG. 23C wherein ES820 table 3895 contains foreign key ESINTransactionMstrId corresponding to ESINTransactionMstr table 4220 primary key 4225.

The Market Transaction tables shown in FIG. 23D comprise: ES814_05Mstr table 3905 for recording inbound 814_05 transactions, having a primary key ES814_05MstrId 3910 and ES814_20Mstr table 3915 for recording inbound 81420 transactions, having a primary key ES814_20MstrId 3920.

ESINTransactionMstr table 4220 in FIG. 23L has a one to many relationship 3906 with ES814_05Mstr table 3905 in FIG. 23D wherein ES814_05Mstr table 3905 contains foreign key ESINTransactionMstrId corresponding to ESINTransactionMstr table 4220 primary key 4225.

ESINTransactionMstr table 4220 in FIG. 23L has a one to many relationship 3916 with ES814_20Mstr table 3915 in FIG. 23D wherein ES814_20Mstr table 3915 contains foreign key ESINTransactionMstrId corresponding to ESINTransactionMstr table 4220 primary key 4225.

The Market Transaction tables shown in FIG. 23E comprise: ES814_AC-REQ_IN table 3925 for recording inbound account change requests, having a primary key ES814_AC_REQ_INId 3930 and ES814_AE_RESP table 3935 for recording inbound account enrollment responses, having a primary key ES814 AE_RespId 3940.

ESINTransactionMstr table 4220 in FIG. 23L has a one to many relationship 3926 with ES814_AC-REQ_IN table 3925 in FIG. 23E wherein ES814_AC_REQ_IN table 3925 contains foreign key ESINTransactionMstrId corresponding to ESINTransactionMstr table 4220 primary key 4225.

ESINTransactionMstr table 4220 in FIG. 23L has a one to many relationship 3936 with ES814_AE_RESP table 3935 in FIG. 23E wherein ES814_AE_RESP table 3935 contains foreign key ESINTransactionMstrId corresponding to ESINTransactionMstr table 4220 primary key 4225.

The Market Transaction tables shown in FIG. 23F comprise: ES867_04Mstr table 3945 for recording inbound 867_04 transactions, having a primary key ES867_04MstrId 3950 and ESINTransactionException table 3955 for logging inbound transaction exceptions having a primary key ESINTransactionExeptionId 3960.

ESINTransactionMstr table 4220 in FIG. 23L has a one to many relationship 3946 with ES867_04Mstr table 3945 in FIG. 23F wherein ES867_04Mstr table 3945 contains foreign key ESINTransactionMstrId corresponding to ESINTransactionMstr table 4220 primary key 4225.

ESINTransactionMstr table 4220 in FIG. 23L has a one to many relationship 3956 with ESINTransactionException table 3955 in FIG. 23F wherein ESINTransactionException table 3955 contains foreign key ESINTransactionMstrId corresponding to ESINTransactionMstr table 4220 primary key 4225.

The Market Transactions shown in FIG. 23G comprise: ESGStructLayout 3975 for containing layout information, having a primary key ESGSTructLayoutID 3980; ESGXrefERCOT 3965 for cross-referencing transaction codes from ERCOT, having a primary key ESGXrefERCOTId 3970; ES650_01Detail 3985 for holding detailed 650_01 transaction data and ES650_01Mstr 3990 for recording inbound 650_01 transactions, having a primary key ES650_01MstrId 3995.

ESGStructLayout 3975 has a one to many relationship 3966 with ESGXrefFRCOT 3965 wherein ESGXrefERCOT 3965 contains foreign key ESGStructLayoutId corresponding to ESGStructLayout 3975 primary key 3980.

ES650_01Mstr 3990 has a one to many relationship 3986 with ES650_01Detail 3985 wherein ES650_01Detail 3985 contains foreign key ES650_01MstrId corresponding to ES650_01Mstr 3990 primary key 3995.

The Market Transactions shown in FIG. 23H comprise: ESServiceProviders table 4000 for containing service provider data, ESServiceProviders table 4000 having a primary key ServiceProviderID 4005; ESSeed table 4010 for generating seed numbers, ESSeed table 4010 having a primary key ESDescription 4015; ESOutErrorLog table 4020 for holding error information on outbound EDI transactions; ES814_AD_RESP_OUT table 4025 for holding address information for 814 EDI transactions, ES814_AD_RESP_OUT table 4025 having a primary key TransactionID 4030; ES824_OUT table 4035 for holding account number information for outbound 824 EDI transactions, ES824_OUT table 4035 having a primary key TransactionID 4040.

The Market Transactions shown in FIG. 23I comprise: ES820_02Mstr table 4045 for holding inbound 820_02 EDI transactions, ES820_02Mstr table 4045 having a primary key ES820_02MstrId 4050; ES820_02Detail table 4055 for holding inbound 820_02 EDI transaction detailed data; ESOUTTransactionMstr table 4070 for staging outbound EDI transactions, ESOUTTransactionMstr table 4070 having a primary key transactionID 4075; ES814_26Mstr table 4060 for holding inbound 814_26 EDI transactions, ES814_26Mstr table 4060 having a primary key transactionID 4065; ES814_21Mstr table 4080 for holding inbound 814_21 EDI transactions, ES814_21Mstr table 4080 having a primary key transactionID 4085; ES814_AC_RESP_OUT table 4090 for holding account change information for 814 EDI transactions, ES814_AC_RESP_OUT table 4090 having a primary key TransactionID 4095; ES814_AH_REQ table 4100 for containing account history information, ES814_AH_REQ table 4100 having a primary key transactionID 4105.

The Market Transaction tables shown in FIG. 23J comprise: ES867_MU_—IN_Detail table 4180 for holding details of 867_MU type transactions, having a primary key ES867_MU_IN_DTLId 4185.

The Market Transaction tables shown in FIG. 23K comprise: ES867_MU_IN table 4190 for recording inbound 867_MU transactions, having a primary key ES867_MU_INId 4195; ES814_02Mstr table 4200 for recording inbound 814_02 transactions, having a primary key ES814_02MstrId 4205; ES814_17Mstr table 4210 for recording inbound 814_17 transactions, having a primary key ES814_17MstrId 4215.

ES867_MU_IN table 4190 has a one to many relationship 4181 with ES867_MU_IN_Detail table 4180 in FIG. 23J wherein ES867_MU_IN_Detail table 4180 contains foreign key ES867_MU_INId corresponding to ES867_MU_IN table 4190 primary key 4195.

ESINTransactionMstr table 4220 in FIG. 23L has a one to many relationship 4191 with ES867_MU_IN table 4190 in FIG. 23K wherein ES867_MU_IN table 4190 contains foreign key ESINTransactionMstrId corresponding to ESINTransactionMstr table 4220 primary key 4225.

ESINTransactionMstr table 4220 in FIG. 23L has a one to many relationship 4209 with ES814_17Mstr table 4210 in FIG. 23K wherein ES814_17Mstr table 4210 contains foreign key ESINTransactionMstrId corresponding to ESINTransactionMstr table 4220 primary key 4225.

ESINTransactionMstr table 4220 in FIG. 23L has a one to many relationship 4211 with ES814_02Mstr table 4200 in FIG. 23K wherein ES814_02Mstr table 4200 contains foreign key ESINTransactionMstrId corresponding to ESINTransactionMstr table 4220 primary key 4225.

The Market Transaction table shown in FIG. 23L comprises: ESINTransactionMstr table 4220 for organizing and containing master records of all inbound EDI transactions, having a primary key ESINTransactionMstrId 4225. ESINTransactionMstr table 4220 has several one to many relationships which are described herein.

The Market Transaction tables shown in FIG. 23M comprise: ES814_06Mstr table 4275 for recording inbound 814_06 transactions, having a primary key ES814_06MstrId 4280; ES814_AC-RESP-IN table 4295 for holding inbound account change response transactions, having a primary key ES814_AC_RESP_INId 4300; ES814_25Mstr table 4265 for recording inbound 814_25 transactions, having a primary key ES814_25MstrId 4270; ES814 AH-RESP table 4285 for containing inbound account history response data, having a primary key ES814_AH_RespId 4290; and ESIN814_13Mstr table 4308 for recording inbound 814_13 transactions, having a primary key ESIN814_13MstrId 4310.

ESINTransactionMstr table 4220 in FIG. 23L has a one to many relationship 4238 with ES814_06Mstr table 4275 in FIG. 23M wherein ES814_06Mstr table 4275 contains foreign key ESINTransactionMstrId corresponding to ESINTransactionMstr table 4220 primary key 4225.

ESINTransactionMstr table 4220 in FIG. 23L has a one to many relationship 4236 with ES814_AC-RESP-IN table 4295 in FIG. 23M wherein ES814_AC-RESP-IN table 4295 contains foreign key ESINTransactionMstrId corresponding to ESINTransactionMstr table 4220 primary key 4225.

ESINTransactionMstr table 4220 in FIG. 23L has a one to many relationship 4239 with ES814_25Mstr table 4265 in FIG. 23M wherein ES814_25Mstr table 4265 contains foreign key ESINTransactionMstrId corresponding to ESINTransactionMstr table 4220 primary key 4025.

ESINTransactionMstr 4220 in FIG. 23L has a one to many relationship 4240 with ES814_AH-RESP table 4285 in FIG. 23M wherein ES814_AH-RESP table 4285 contains foreign key ESINTransactionMstrId corresponding to ESINTransactionMstr table 4220 primary key 4225.

ESINTransactionMstr table 4220 in FIG. 23L has a one to many relationship 4248 with ESIN814_13Mstr table 4308 in FIG. 23M wherein ESIN814_13Mstr table 4308 contains foreign key ESINTransactionMstrId corresponding to ESINTransactionMstr table 4220 primary key 4225.

The Market Transaction tables shown in FIG. 23N comprise: ES810_INVL table 4315 for holding invoice records, having a primary key ES810_INVLId 4320; ES810_INVL_ChargeDetail table 4325 for holding invoice change details, having a primary key ES810_INVL_DTL_ChargeId 4330; ES867_03Mstr table 4335 for recording inbound 867_03 transactions, having a primary key ES867_03MstrId 4340; and ES810_INVL_TaxDetail table 4345 for holding the tax detail related to invoice records, having a primary key ES810_INVL_DTL_TaxId 4350.

ES810_INVL table 4315 has a one to many relationship 4321 with ES810_INVL_ChargeDetail table 4325 wherein ES810_INVL_ChargeDetail table 4325 contains foreign key ES810_INVLId corresponding to ES810_INVL table 4315 primary key 4320.

ES810_INVL table 4315 has a one to many relationship 4337 with ES810_INVL_TaxDetail table 4345 wherein ES810_INVL_TaxDetail table 4345 contains foreign key ES810_INVLId corresponding to ES810_INVL table 4315 primary key 4320.

ES867_03Mstr table 4335 has a one to many relationship 4342 with ES867_03Detail table 4525 in FIG. 23U wherein ES867_03Detail table 4525 contains foreign key ES867_03MstrId corresponding to ES867_03Mstr table 4335 primary key 4340.

ESINTransactionMstr table 4220 in FIG. 23L has a one to many relationship 4232 with ES810_INVL table 4315 in FIG. 23N wherein ES810_INVL table 4315 contains foreign key ESINTransactionMstrId corresponding to ESINTransactionMstr table 4220 primary key 4225.

ESINTransactionMstr table 4220 in FIG. 23L has a one to many relationship 4234 with ES867_03Mstr table 4335 in FIG. 23N wherein ES867_03Mstr table 4335 contains foreign key ESINTransactionMstrId corresponding to ESINTransactionMstr table 4220 primary key 4225.

The Market Transactions tables shown in FIG. 23O comprise: ES814_AC_REQ_OUTMeterDetail table 4110 for holding information for outbound 814 EDI meter requests, ES814_AC_REQ_OUTMeterDetail table 4110 having a primary key ES814_AC_REQ_OUTMeterDetailID 4115; ES814_AC_REQ_OUTMtrExpDetail table 4120 for holding information for outbound 814 EDI meter request exceptions, ES814_AC_REQ_OUTMtrExpDetail table 4120 having a primary key ES814_AC_REQ_OUTMtrExpDetail 4125; ES814_AC_REQ table 4130 for containing outbound account change information, ES814_AC_REQ table 4130 having a primary key transactionID 4135.

The Market Transactions shown in FIG. 23P comprise: ES814_24Mstr table 4140 for holding inbound 814_24 EDI transactions, ES814_24Mstr table 4140 having a primary key transactionID 4145; ES814_PCMstr table 4150 for holding inbound 814_PC EDI transactions ES814_PCMstr table 4150 having a primary key transactionID 4155; ESOUT814_12Mstr table 4165 for holding outbound 814_12 EDI transactions, ESOUT814_12Mstr table 4165 having a primary key transactionID 4170; ESOUT TransactionException table 4160 for holding outbound EDI transaction exceptions; ES814_AD_REQ_OUT table 4175 for containing outbound account address information, ES814_AD_REQ_OUT table 4175 having a primary key transactionID 4180.

ES814_08Mstr table 3815 in FIG. 23B has a one-to-one relationship 3821 with ESOUTTransactionMstr table 4070 in FIG. 23I wherein ES814_08Mstr table 3815 contains foreign key TransactionID corresponding to ESOUTTransactionsMstr table primary key 4075. ES814_29Mstr table 3825 in FIG. 23B has a one-to-one relationship 3831 with ESOUTTransactionMstr table 4070 wherein ES814_29Mstr table 3825 contains foreign key TransactionID corresponding to ESOUTTransactionsMstr table primary key 4075. ES814_AE_REQ table 3835 has a one-to-one relationship 3841 with ESOUTTransactionMstr table 4070 in FIG. 23I wherein ES814_AE_REQ table 3835 contains foreign key TransactionID corresponding to ESOUTTransactionsMstr table primary key 4075. ES824Mstr table 3845 in FIG. 23B has a one-to-one relationship 3851 with ESOUTTransactionMstr table 4070 in FIG. 23I wherein ES824Mstr table 3845 contains foreign key TransactionID corresponding to ESOUTTransactionsMstr table primary key 4075; ES814_AD_RESP_OUT table 4025 in FIG. 23H has a one-to-one relationship 4026 with ESOUTTransactionMstr table 4070 wherein ES814_AD_RESP_OUT table 4025 contains foreign key TransactionID corresponding to ESOUTTransactionsMstr table primary key 4075;

ES824_OUT table 4035 has a one-to-one relationship 4036 with ES824_OUT table 4035 wherein ESOUTTransactionsMstr table 4070 contains foreign key TransactionID corresponding to ESOUTTransactionMstr table primary key 4075; ESOUTTransactionMstr table 4070 in FIG. 23I has a one-to-many relationship 4046 with ES820_02Mstr table 4045 in FIG. 23I wherein ES820_02Mstr table 4045 contains foreign key TransactionID corresponding to ESOUTTransactionMstr table primary key 4075; ES814_26Mstr table 4060 in FIG. 23I has a one-to-one relationship 4061 with ESOUTTransactionMstr table 4070 in FIG. 23I wherein ES814_26Mstr table 4060 contains foreign key TransactionID corresponding to ESOUTTransactionsMstr table primary key 4075; ES814_21Mstr table 4080 in FIG. 23I has a one-to-one relationship 4081 with ESOUTTransactionMstr table 4070 wherein ES814_21Mstr table 4080 contains foreign key TransactionID corresponding to ESOUTTransactionsMstr table primary key 4075; ES814_AC_RESP_OUT table 4090 in FIG. 23I has a one-to-one relationship 4096 with ESOUTTransactionMstr table 4070 wherein ES814_AC_RESP_OUT table 4090 contains foreign key TransactionID corresponding to ESOUTTransactionsMstr table primary key 4075; ES814_AH_REQ table 4100 in FIG. 23I has a one-to-one relationship 4092 with ESOUTTransactionMstr table 4070 wherein ES814_AH_REQ table 4100 contains foreign key TransactionID corresponding to ESOUTTransactionsMstr table primary key 4075; ES814_24Mstr table 4140 in FIG. 23P has a one-to-one relationship 4063 with ESOUTTransactionMstr table 4070 in FIG. 23I wherein ES814_24Mstr table 4140 contains foreign key TransactionID corresponding to ESOUTTransactionsMstr table primary key 4075; ES814_PCMstr table 4150 in FIG. 23P has a one-to-one relationship 4071 with ESOUTTransactionMstr table 4070 wherein ES814_PCMstr table 4150 contains foreign key TransactionID corresponding to ESOUTTransactionsMstr table primary key 4075; ESOUT814_12Mstr table 4165 in FIG. 23P has a one-to-one relationship 4062 with ESOUTTransactionMstr table 4070 wherein ESOUT814_12Mstr table 4165 contains foreign key TransactionID corresponding to ESOUTTransactionsMstr table primary key 4075; ES814_AD_REQ_OUT table 4175 in FIG. 23P has a one-to-one relationship 4093 with ESOUTTransactionMstr table 4070 wherein ES814_AD_REQ_OUT table 4175 contains foreign key TransactionID corresponding to table primary key 4075; ES814_AC_REQ_OUT table 4130 in FIG. 23O has a one-to-one relationship 4064 with ESOUTTransactionMstr table 4070 wherein ES814_AC_REQ_OUT table 4130 contains foreign key TransactionID corresponding to ESOUTTransactionsMstr table primary key 4075; ESOUTTransactionMstr table 4070 has a one-to-many relationship 4091 with ESOUTTransactionException table 4160 in FIG. 23P wherein ESOUTTransactionException table 4160 contains foreign key TransactionID corresponding to ESOUTTransactionMstr table primary key 4075; ES820_02 table 4045 in FIG. 23I has a one-to-many relationship 4047 with ES820_02Detail table 4055 in FIG. 23I wherein ES820_02Detail table 4055 contains foreign key ES820_02MstrID corresponding to ES820_02Mstr table primary key 4050; ES814_AC_REQ_OUT table 4130 in FIG. 23O has a one-to-many relationship 4131 with ES814_AC_REQ_OUTMeterDetail table 4110 in FIG. 23O wherein ES81_AC_REQ_OUTMeterDetail table 4110 contains foreign key ES814_AC_REQ_OUTId corresponding to ES814_AC_REQ_OUT table primary key 4135; ES814_AC_REQ_OUT table 4130 in FIG. 23O has a one-to-many relationship 4132 with ES814_AC_REQ_OUTMtrExpDetail table 4120 wherein ES81_AC_REQ_OUTMtrExpDetail table 4120 contains foreign key ES814_AC_REQ_OUTId corresponding to ES814_AC_REQ_OUT table primary key 4135.

The Market Transaction tables shown in FIG. 23Q comprise: ES814_28Mstr table 4355 for recording inbound 814_28 transactions, having a primary key ES814_28MstrId 4360; ES814_AD_RESP_IN table 4365 for holding account drop response data, having a primary key ES814_AD_RESP_INId 4370; and ES867_02Mtr table 4375 for recording inbound 867_02 transactions, having a primary key ES867_02MstrId 4380.

ESINTransactionMstr table 4220 in FIG. 23L has a one to many relationship 4226 with ES814_28Mstr table 4355 in FIG. 23Q wherein ES814_28Mstr table 4355 contains foreign key ESINTransactionMstrId corresponding to ESINTransactionMstr table 4220 primary key 4225.

ESINTransactionMstr table 4220 in FIG. 23L has a one to many relationship 4228 with ES867_02Mtr table 4375 in FIG. 23Q wherein ES867_02Mtr table 4375 contains foreign key ESINTransactionMstrId corresponding to ESINTransactionMstr table 4220 primary key 4225.

ESINTransactionMstr table 4220 in FIG. 23L has a one to many relationship 4230 with ES814_AD_RESP_IN table 4365 in FIG. 23Q wherein ES814_AD_RESP_IN table 4365 contains foreign key ESINTransactionMstrId corresponding to ESINTransactionMstr table 4220 primary key 4225.

The Market Transaction tables shown in FIG. 23R comprise: ES867_HU_IN table 4385 for holding inbound 867_HU transactions, having a primary key ES867_HU_INId 4390; ES650_04Mstr table 4395 for recording inbound 650_04 transactions, having a primary key ES650_04MstrId 4400; ES650_02Mstr table 4405 for recording inbound 650_02 transactions having a primary key ES650_02MstrId 4410; ES867_HU_IN_Detail table 4415 for holding detailed information relating to 867_HU transactions, having a primary key ES867_HU_IN_DTLId 4420; ES650_04Detail table 4425 for holding detailed data relating to 650_04 transactions, having a primary key ES650_04DetailId 4430; and ES650_02Detail table 4435 for holding detailed data relating to 650_02 transactions, having a primary key ES650_02DetailId 4440.

ES867_HU_IN table 4385 has a one to many relationship 4417 with ES867_HU_IN_Detail table 4415 wherein ES867_HU_IN_Detail table 4415 contains foreign key ES867_HU_INId corresponding to ES867_HU_IN table 4385 primary key 4390.

ES650_04Mstr table 4395 has a one to many relationship 4427 with ES650_04Detail table 4425 wherein ES650_04Detail table 4425 contains foreign key ES650_04MstrId corresponding to ES650_04Mstr table 4395 primary key 4400.

ES650_02Mstr table 4405 has a one to many relationship 4437 with ES650_02Detail table 4435 wherein ES650_02Detail table 4435 contains foreign key ES650_02MstrId corresponding to ES650_02Mstr table 4405 primary key 4410.

ESINTransactionMstr table 4220 in FIGS. 23L and 23S have a one to many relationship 4254 with ES867_HU_IN table 4385 in FIG. 23R wherein ES867_HU_IN table 4385 contains foreign key ESINTransactionMstrId corresponding to ESINTransactionMstr table 4220 primary key 4225.

ESINTransactionMstr table 4220 in FIGS. 23L and 23S have a one to many relationship 4260 with ES650_04Mstr table 4395 in FIG. 23R wherein ES650_04Mstr table 4395 contains foreign key ESINTransactionMstrId corresponding to ESINTransactionMstr table 4220 primary key 4225.

ESINTransactionMstr table 4220 in FIGS. 23L and 23S have a one to many relationship 4261 with ES650_02Mstr table 4405 in FIG. 23R wherein ES650_02Mstr table 4405 contains foreign key ESINTransactionMstrId corresponding to ESINTransactionMstr table 4220 primary key 4225.

The Market Transaction tables shown in FIG. 23S comprise: ESINFileLog table 4445 for containing inbound transaction file logs, having a primary key ESINFileLogId 4450; ES814_11Mstr table 4455 for recording inbound 814_11 transactions, having a primary key ES814_11MstrId 4460; ES814_27Mstr table 4465 for recording inbound 814_27 transactions having a primary key ES814_27MstrId 4470.

ESINFileLog table 4445 has a one to many relationship 4263 with ESINTransactionMstr table 4220 wherein ESINTransactionMstr table 4220 contains foreign key ESINFileLogId corresponding to ESINFileLog table 4445 primary key 4450.

ESINTransactionMstr table 4220 has a one to many relationship 4258 with ES814_11Mstr table 4455 wherein ES814_11Mstr table 4455 contains foreign key ESINTransactionMstrId corresponding to ESINTransactionMstr table 4220 primary key 4225.

ESINTransactionMstr table 4220 has a one to many relationship 4257 with ES814_27Mstr table 4465 wherein ES814_27Mstr table 4465 contains foreign key ESINTransactionMstrId corresponding to ESINTransactionMstr table 4220 primary key 4225.

The Market Transaction tables shown in FIG. 23T comprise: ESIN814_12Mstr table 4475 for recording inbound 814_12 transactions, having a primary key ESIN814_12MstrId 4480; ESINTransactionMeter table 4485 for holding detailed meter data resulting from ISO transactions, having a primary key ESMeterDetailId 4490; ES814_AR_REQ table 4495 for holding inbound account reconnect records, having a primary key ES814_AR_ReqId 4500; and ES814_AD_REQ_IN table 4505 for holding inbound account drop requests, having a primary key ES814_AD_REQ_INId 4510.

ESINTransactionMstr table 4220 in FIG. 23L has a one to many relationship 4244 with ESIN814_12Mstr table 4475 in FIG. 23T wherein ESIN814_12Mstr table 4475 contains foreign key ESINTransactionMstrId corresponding to ESINTransactionMstr table 4220 primary key 4225.

ESINTransactionMstr table 4220 in FIG. 23L has a one to many relationship 4246 with ESINTransactionMeter table 4485 in FIG. 23T wherein ESINTransactionMeter table 4485 contains foreign key ESINTransactionMstrId corresponding to ESINTransactionMstr table 4220 primary key 4225.

ESINTransactionMstr table 4220 in FIGS. 23L and 23S have a one to many relationship 4250 with ES814_AR_REQ table 4495 in FIG. 23T wherein ES814_AR_REQ table 4495 contains foreign key ESINTransactionMstrId corresponding to ESINTransactionMstr table 4220 primary key 4225.

ESINTransactionMstr 4220 in FIGS. 23L and 23S have a one to many relationship 4256 with ES814_AD_REQ_IN table 4505 in FIG. 23T wherein ES814_AD_REQ_IN table 4505 contains foreign key ESINTransactionMstrId corresponding to ESINTransactionMstr 4220 primary key 4225.

The Market Transaction tables shown in FIG. 23U comprise: ESINTransactionOrgs table 4515 for maintaining a list of organizations that generate inbound transactions, having a primary key ESINTransactionOrgId 4520; and, ES867_03Detail table 4525 for holding detailed 867_03 transaction data, having a primary key ES867_03DetailId 4530.

ESINTransactionMstr table 4220 in FIGS. 23L and 23S have a one to many relationship 4252 with ESINTransactionOrgs table 4515 in FIG. 23U wherein ESINTransactionOrgs table 4515 contains foreign key ESINTransactionMstrId corresponding to ESINTransactionMstr table 4220 primary key 4225.

Figure 36:
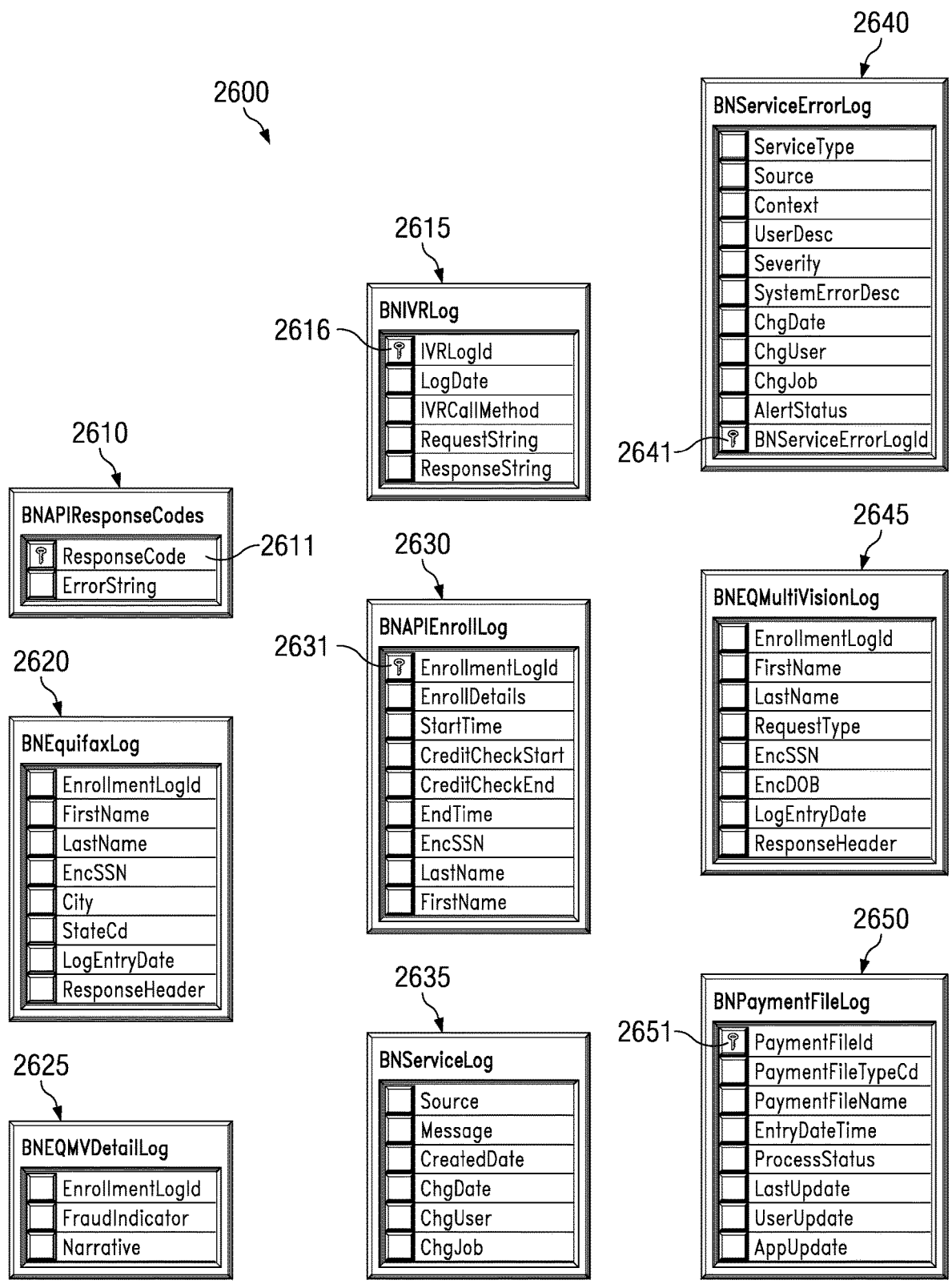
FIG. 36 is an entity relationship diagram of the system logs entity in the preferred embodiment.

FIG. 36 is an entity-relationship diagram of the System Logs entity 2600 within the preferred embodiment SQL database engine 150. There are no relationships between tables in System Logs entity 2600, the tables therein are repositories for information logs used by the system and by operations to understand system process history. System Logs entity 2600 comprises a set of tables: BNAPIResponseCodes table 2610 for holding API response codes, BNAPIResponseCodes table 2610 having a primary key ResponseCode 2611; BNIVRLog table 2615 for logging interactive voice response calls, BNIVRLog table 2615 having a primary key IVRLogID 2616; BNEquifaxLog table 2620 for logging Equifax enrollments; BNEQMVDetailLog table 2625 for logging details of Equifax enrollments; BNAPIEnrollLog table 2630 for logging API enrollments, BNAPIEnrollLog table 2630 having a primary key EnrollmentLogID 2631; BNServiceLog table 2635 for logging system service changes; BNServiceErrorLog table 2640 for logging system error records, BNServiceErrorLog table 2640 having a primary key BNServiceErrorLogID 2641; BNMultiVisionLog table 2645 for logging customer information; and BNPaymentFileLog table 2650 for logging records of payment files, BNPaymentFileLog table 2650 having a primary key PaymentFileID 2651.

Figure 37:
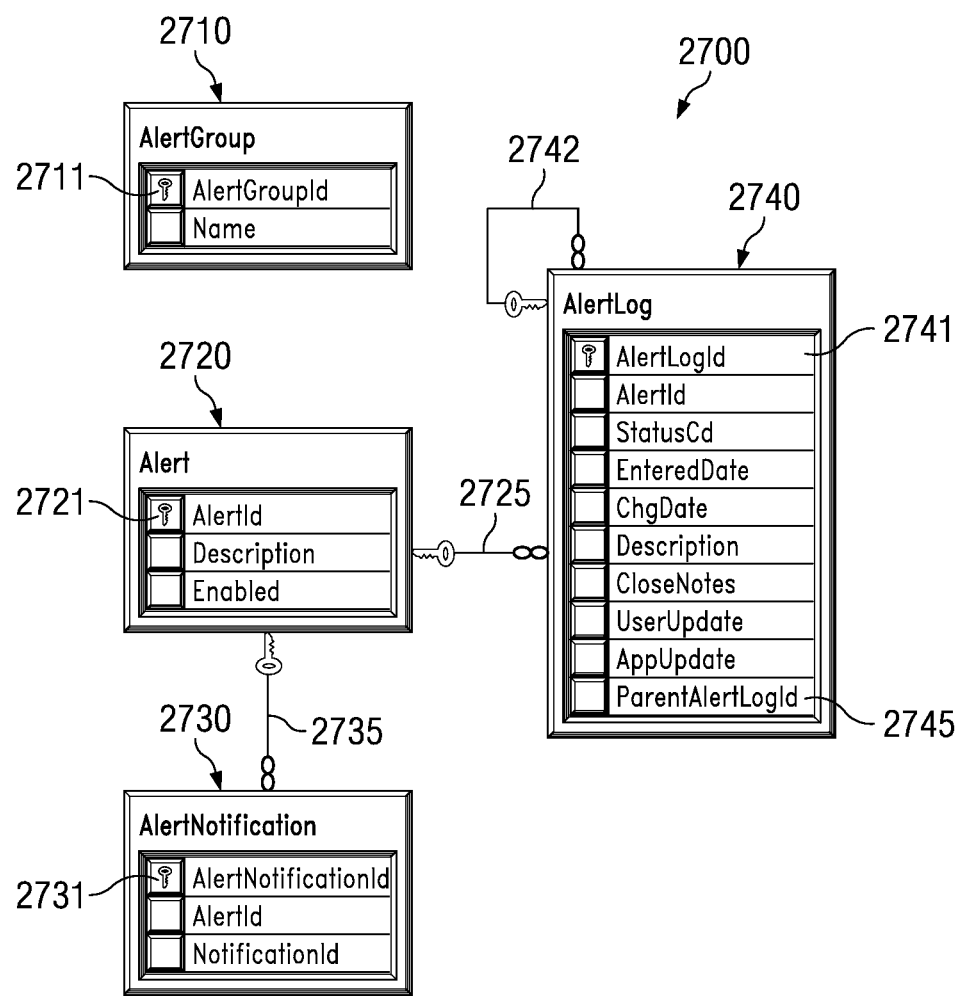
FIG. 37 is an entity relationship diagram of the alerts entity in the preferred embodiment.

FIG. 37 is an entity-relationship diagram of the Alerts entity 2700 within the preferred embodiment SQL database engine 150. Alerts entity 2700 comprises a set of tables: AlertGroup table 2710 for naming alert groups, AlertGroup table 2710 having a primary key AlertGroupID 2711; Alert table 2720 for containing records of various system alerts, Alert table 2720 having primary key AlertID 2721; AlertNotification table 2730 for containing records of system alert notifications, AlertNotification table 2730 having primary key AlertNotificationID 2731; and AlertLog table 2740 for logging records of detailed system alerts, AlertLog table 2740 having primary key AlertLogID 2741.

Alert table 2720 has a one-to-many relationship 2725 with AlertLog table 2740 wherein AlertLog table 2740 contains foreign key AlertID corresponding to Alert table primary key 2721. Alert table 2720 has a one-to-many relationship 2735 with AlertNotification table 2730 wherein AlertNotification table 2730 contains foreign key AlertID corresponding to Alert table primary key 2721. AlertLog 2740 may contain a hierarchy of records having parent-child 2742 one-to-many relationships between records wherein the foreign key ParentAlertLogID 2745 of a particular record may refer to the primary key AlertLogID 2741 to identify a parent record.

While the present invention has been described in reference to a preferred embodiment, this description is not intended to be construed in a limiting sense. Various modifications and combinations of the illustrative embodiments, as well as other embodiments of the preferred embodiment, will be apparent to persons skilled in the art upon reference to the description. It is therefore intended that the appended claims encompass any such modifications or embodiments.

The invention claimed is:

1. A computer network comprising:
   an application server;
   a database server operatively connected to the application server;

a payment processor, operating on the application server;
a treatment processor, operating on the application server;
a customer residual income (CRI) processor operating on the application server;
a database implemented on the database server; and,
a set of instructions, that when executed, cause the application server and the database server of the network to perform operations of:
 the application server receiving, from the payment processor according to a first set of relationships, a set of payment information related to an energy customer using a first data table;
 wherein the payment processor is connected to an application programming interface (API) to manage the set of payment information;
 the application server receiving, from the database through the API according to a second set of relationships, a set of sales information related to a sales agent using a second data table;
 the application server receiving, from the database server through the API according to a third set of relationships, a set of energy usage data for the energy customer using a third data table;
 the application server deriving, by the treatment processor, a set of bill information, related to the set of energy usage data and the set of payment information;
 wherein the set of bill information is stored in a fourth data table and is accessible according to a fourth set of relationships;
 the application server deriving, by the CRI processor, a set of commissions, based on the set of payment information, the set of bill information, the set of sales information and the set of energy usage data;
 wherein the set of commissions is stored in a fifth data table and is accessible according to a fifth set of relationships;
 the application server disconnecting the energy services of the customer with a treatment process performed at least in part by the treatment processor;
 the application server updating a disconnect status in a sixth data table, the sixth data table being accessible according to a sixth set of relationships;
 the application server determining, by the CRI processor, a set of CRI with a CRI daily calculation process and a seventh data table;
wherein the set of CRI is accessible using a seventh set of relationships; and,
 the application server releasing, from the CRI processor through the API according to an eighth set of relationships, the set of CRI with a CRI release process using an eighth data table.

2. The computer network of claim 1 wherein disconnecting the energy services further comprises:
 queueing disconnect orders for all customers "in treatment"; and,
 a disconnect date has been established, the disconnect date is due, and the customer status is currently connected to the energy services.

3. The computer network of claim 1 wherein determining a set of CRI further comprises:
 operating the CRI populating a BillPay table and a BillPayDetail table; and,
 data for a current billing month in each of the BillPay table and the BillPayDetail table is reconstructed each time the customer residual income daily calculation process runs.

4. The computer network of claim 1 wherein releasing the set of CRI further comprises:
 populating a CRI table, a CRIDetail table, and a CRI Info table;
 wherein all data for the current billing month in the CRI table and the CRIDetail table is reconstructed every time that the customer residual income release process runs,
 wherein all data for the current billing month in the CRI Info table is repopulated each time the customer residual income release process runs; and,
 wherein previous billing month data is left unaltered and in the CRI Info table.

5. The computer network of claim 1 wherein disconnecting the energy services further comprises:
 sending a disconnect order according to an Energy Reliability Council of Texas electronic data interchange transaction type 650_01 by a transaction exporter from a daily queue; and,
 confirming the disconnect order after a disconnect pending time,
 sending an Energy Reliability Council of Texas electronic data interchange transaction type 650_02 to a retail electricity provider connected to the network.

6. The computer network of claim 1 wherein disconnecting the energy services further comprises:
 queuing a set of confirmed disconnect orders that have been aged by a predetermined time; and,
 sending the confirmed disconnect orders at the same time.

* * * * *